(12) United States Patent  (10) Patent No.: US 7,816,822 B2
Nashiki  (45) Date of Patent: Oct. 19, 2010

(54) MOTOR AND CONTROL UNIT THEREOF

(75) Inventor: Masayuki Nashiki, Komaki (JP)

(73) Assignee: Denso Corporation, Kariya (JP)

( * ) Notice: Subject to any disclaimer, the term of this patent is extended or adjusted under 35 U.S.C. 154(b) by 165 days.

(21) Appl. No.: 11/919,440

(22) PCT Filed: Apr. 27, 2006

(86) PCT No.: PCT/JP2006/308904

§ 371 (c)(1),
(2), (4) Date: Nov. 15, 2007

(87) PCT Pub. No.: WO2006/118219

PCT Pub. Date: Nov. 9, 2006

(65) Prior Publication Data

US 2009/0236930 A1    Sep. 24, 2009

(30) Foreign Application Priority Data

Apr. 28, 2005 (JP) ............................. 2005-131808
May 17, 2005 (JP) ............................. 2005-144293
May 24, 2005 (JP) ............................. 2005-151257
Jul. 19, 2005 (JP) ............................. 2005-208358

(51) Int. Cl.
*H02K 37/14* (2006.01)
*H02K 1/00* (2006.01)
(52) U.S. Cl. ...................... 310/49.23; 310/185; 310/257
(58) Field of Classification Search .............. 310/49.02, 310/49.09, 49.11, 49.17, 49.19, 49.51, 49.53, 310/52–58, 216.021, 162, 164–165, 179–180, 310/184–185, 188, 201, 203, 257
See application file for complete search history.

(56) References Cited

U.S. PATENT DOCUMENTS

| 4,692,646 | A |  | 9/1987 | Gotou |  |
|---|---|---|---|---|---|
| 5,252,880 | A | * | 10/1993 | Kazmierczak et al. | ...... 310/270 |
| 6,664,704 | B2 |  | 12/2003 | Calley |  |
| 7,105,974 | B2 | * | 9/2006 | Nashiki | ...... 310/185 |
| 7,135,802 | B2 | * | 11/2006 | Seki et al. | ...... 310/257 |

(Continued)

FOREIGN PATENT DOCUMENTS

DE    1 261 946    2/1968

(Continued)

OTHER PUBLICATIONS

English translation of "Motor Control Seminar 1986." SGS Halbleiter Bauelemente GmbH. Grafing. p. G6.

(Continued)

*Primary Examiner*—Tran N Nguyen
(74) *Attorney, Agent, or Firm*—Oliff & Berridge, PLC

(57) ABSTRACT

A motor includes: a rotor having permanent magnets in which N-poles and S-poles are alternately arranged in the circumferential direction; seven stator pole groups, each of which has a plurality of stator poles arranged in the circumferential direction, the stator pole groups being arranged with the circumferential and axial positions of the stator poles in one stator pole group being offset from those of other stator pole groups; and a plurality of loop windings formed in the circumferential direction and arranged at positions adjacent to the plurality of stator pole groups in the rotor shaft direction.

9 Claims, 80 Drawing Sheets

U.S. PATENT DOCUMENTS

| | | |
|---|---|---|
| 7,466,057 B2 * | 12/2008 | Imai et al. .................. 310/257 |
| 7,508,108 B2 * | 3/2009 | Makita et al. ............ 310/49.11 |
| 7,598,633 B2 * | 10/2009 | Makita et al. ............... 310/185 |
| 2002/0033689 A1 | 3/2002 | Minagawa et al. |
| 2002/0096964 A1 | 7/2002 | Kometani et al. |
| 2005/0012427 A1 | 1/2005 | Seki et al. |
| 2006/0197397 A1 * | 9/2006 | Takahashi et al. .......... 310/185 |

FOREIGN PATENT DOCUMENTS

| | | |
|---|---|---|
| DE | 198 11 075 | 9/1999 |
| DE | 102 40 704 | 4/2004 |
| EP | 1 217 713 | 6/2002 |
| JP | A 63-198559 | 8/1988 |
| JP | A 6-261513 | 9/1994 |
| JP | A 8-322230 | 12/1996 |
| JP | A 9-247916 | 9/1997 |
| JP | A 2000-78820 | 3/2000 |
| JP | A 2001-218395 | 8/2001 |
| JP | A 2002-125394 | 4/2002 |
| JP | A 2002-142427 | 5/2002 |
| JP | A 2003-105507 | 4/2003 |
| JP | A 2003-268442 | 9/2003 |
| JP | A 2003-274590 | 9/2003 |
| JP | A 2003-278653 | 10/2003 |
| JP | A 2003-319583 | 11/2003 |
| JP | A 2005-20981 | 1/2005 |
| JP | A 2005-20991 | 1/2005 |
| JP | A 2005-57942 | 3/2005 |
| JP | A 2005-80362 | 3/2005 |
| JP | A 2005-94876 | 4/2005 |

OTHER PUBLICATIONS

English translation of German Office Action issued Jul. 15, 2009.

* cited by examiner (A)

(B)

(C)

(A)

(B)

(a)  (b)  (c)

(a)

(b)

(a)                         (b)

(a)                                (b)

(a)　　　　　　　(b)

MOTOR AND CONTROL UNIT THEREOF

TECHNICAL FIELD OF THE INVENTION

The present invention relates to a motor loaded on an automobile, a truck or the like, and to a control unit for the motor.

Brushless motors have been known, in each of which coils of individual phases are wound about stator poles in a concentrated manner (see Patent Document 1, for example). FIG. 141 is a schematic vertical cross section illustrating a configuration of such a conventional brushless motor. FIG. 143 is a cross section taken along a line A1-A1 of FIG. 141. These figures show a 4-pole 6-slot brushless motor having a stator with a so-called concentrated winding structures in which coils of individual phases are wound about respective stator poles in a concentrated manner. FIG. 142 shows a positional relationship between windings such as of U, V and W in a state where the stator is fully developed along its circumference. The horizontal axis represents electrical angles, in which one cycle corresponds to 720°. N- and S-pole permanent magnets are alternately arranged on a surface of a rotor 2 along the circumference thereof. In a stator 4, U-phase windings WBU1 and WBU2 are wound about U-phase stator magnet poles TBU1 and TBU2, respectively. Similarly, V-phase windings WBV1 and WBV2 are wound about V-phase stator magnet poles TBV1 and TBV2, respectively. W-phase windings WBW 1 and WBW 2 are wound about W-phase stator magnet poles TBW 1 and TBW 2, respectively. Currently, brushless motors having such a structure are widely spread for industrial and domestic uses.

FIG. 144 is a transverse cross section illustrating a configuration of another stator. The stator shown in FIG. 144 has a 24-slot configuration and enables distributed winding to provide a comparatively smooth magnetomotive force distribution of a sinusoidal form along the circumference of the stator in case of a 4-pole motor. Therefore, stators of this type are widely used in brushless motors, winding field synchronous motors and induction motors, for example. Particularly, in each of synchronous reluctance motors utilizing reluctance torque as well as various types of motors applied with reluctance torque, or in induction motors, for example, a stator is desired to produce a more accurate rotating field. For this reason, the stator structure having distributed winding as shown in FIG. 144 is appropriate for such motors.

[Patent Document 1] Japanese Patent Laid-Open No. 6-261513 (page 3 and FIGS. 1 to 3)

DISCLOSURE OF THE INVENTION

Problems to be Solved by the Invention

The conventional brushless motors, such as the one shown in FIGS. 141, 142 and 144 or the one disclosed in Patent Document 1 have a complicated structure because, in each of such motors, a motor winding is required to be wound about each of the stator poles and has to be located behind a slot. Accordingly, it has been a problem in the conventional brushless motors that productivity is lowered as far as the provision of the motor windings is concerned. This structure has raised another problem of difficulty in reducing the size and cost, and in raising the efficiency of the motors. Further, in the structure of such a conventional brushless motor, the stator is provided with only three salient poles within a range of 360° in electrical angle, leading to the difficulty in allowing the stator to produce a sinusoidal magnetomotive force to produce accurate rotating field. This has led to a problematic difficulty in applying such brushless motors to synchronous reluctance motors or various motors utilizing reluctance torque, and induction motors, for example.

In case a stator structure enables the distributed winding shown in FIG. 144, the magnetomotive force distribution of the stator may take a smooth sinusoidal form. In this case, however, the necessity of inserting the windings through the respective openings of the slots has entailed decrease in the space factor and increase in the axial length of the coil ends. Therefore, this has created a problem of difficulty in reducing the size of the motor, as well as a problem of low productivity of the winding.

The present invention has been made in light of the problems described above and has as its object to provide a motor having a simplified winding structure and enhanced productivity with reduced size and cost and with high efficiency, and to provide a control unit for controlling the motor.

Means for Solving the Problems

In order to solve the problems mentioned above, a first motor of the present invention comprises:

a rotor having rotor pole groups, in which N-poles and S-poles are alternately arranged in the circumferential direction;

an (N+1) number of stator pole groups, in which a plurality of stator poles are arranged for each phase along or around the circumference so as to be positioned at substantially the same rotational phase position in terms of electrical angle; and a 2N number of loop windings axially arranged between the stator pole groups of individual phases, with the same phase loop windings being arranged at axial ends.

The (N+1) number of stator pole groups are preferably be arranged so that an electrical angular position is sequentially changed. Such a configuration may enable more effective generation of motor torque by a magnetomotive force generated by currents passing through the loop windings.

It is preferable the (N+1) number of stator pole groups are arranged so that the stator pole groups corresponding to two phases having an electrical angle difference of about 180° are adjacent to each other. Such a configuration may allow an area of the stator pole configuration to be wide and large at an air-gap portion where the rotor and the stator face with each other. Thus, magnetic fluxes from the rotor for interlinkage with the windings can be increased to thereby increase generated torque.

It is preferable that, with the stator pole groups corresponding to two phases having an electrical angle difference of about 180° as being one set, the (N+1) number of stator pole groups are arranged so that adjacently positioned stator pole groups, each of which belongs to one of two adjacent sets, have a minimum phase difference in electrical angle. Such a configuration may reduce current to be supplied in between these stator pole groups and thus may reduce copper loss.

It is preferable that the (N+1) number of stator poles are arranged so that a sum of widths of the two stator poles positioned at both ends in the rotor shaft direction in a plane opposed to the rotor, is equal to a width of each of other stator poles in the rotor shaft direction in the plane opposed to the rotor. Such a configuration may ensure an equal electromagnetic effect between the axial end stator poles that belong to the same phase and each of other stator poles of other phases.

A second motor of the present invention comprises:

a rotor having rotor pole groups, in which N-poles and S-poles are alternately arranged in the circumferential direction;

an (N+1) number of stator pole groups, in which a plurality of stator poles are arranged for each phase along or around the circumference so as to be positioned at substantially the same rotational phase position in terms of electrical angle; and 2N number of loop windings axially arranged at both sides of each of the stator pole groups of individual phases, with the same phase loop windings being arranged at axial ends.

It is preferable that a plurality of the loop windings arranged in a slot formed by the two stator poles adjacent to each other in the rotor shaft direction are combined into a single loop winding. Such a configuration may simplify the loop windings and may allow arithmetic sum of the plurality of currents to pass through a common winding, by which currents are uniformed between the windings and copper loss is reduced. In particular, at a timing when positive and negative currents pass through the plurality of windings, these currents are counterbalanced to significantly reduce supply currents.

It is preferable that the loop winding which is arranged outside the two stator poles at both ends along the rotor shaft direction is removed. The removal of the winding may simplify the motor.

It is preferable that areas of the stator poles in a plane opposed to the rotor are in a sinusoidal distribution or analogous to sinusoidal distribution in the circumferential direction of the rotor. Thus, torque can be increased and torque ripple can be reduced.

It is preferable that a width of the stator poles in the rotor shaft direction in the plane opposed to the rotor is larger than an interval between the stator poles adjacently positioned in the rotor shaft direction. This configuration, which can pass los of magnetic fluxes therethrough, may increase a motor torque constant.

It is preferable that:

where, for a group of optional X-phase stator poles, a sum total of magnetic fluxes that pass through the stator poles is $\Phi x$, a rotation change rate of each magnetic flux $\Phi x$ is $d\Phi x/d\theta$, a magnetomotive force or a winding current that works on an air gap portion between each stator pole and each rotor pole is Ix, a number of turns of a winding is WTx, and a generated torque component that is a product calculated from $d\Phi x/d\theta \times Ix \times WTx$ is Tx; and where, for another group of optional Y-phase stator poles, a sum total of magnetic fluxes that pass through the stator poles is $\Phi y$, a rotation change rate of each magnetic flux $\Phi y$ is $d\Phi y/d\theta$, a magnetomotive force or a winding current that works on an air gap portion between each stator pole and each rotor pole is Iy, a number of turns of a winding is WTy, and a generated torque component that is a product calculated from $d\Phi y/d\theta \times Iy \times WTy$ is Ty, two or more among the magnetic fluxes $\Phi x$ and $\Phi y$, the winding currents Ix and Iy, and the numbers of turns of winding WTx and WTy, which are determined by a mutually facing area between the stator poles and the rotor poles, have different values between the X-phase stator poles and the Y-phase stator poles, and the generated torque components Tx and Ty of the respective stator poles are equal. Thus, when the stator pole configuration is required to be modified for the convenience, for example, of a motor cover and a mechanism on the side to be driven, the individual parameters can be changed without changing the final electromagnetic effects obtained by the flux $\Phi x$, the current Ix and the number of turns of winding WTx.

It is preferable that:

the stator poles of each phase are divided into K number of stator poles in the rotor shaft direction; and the K number of stator poles of individual phases are provided with K number of loop windings in the rotor shaft direction so that the loop windings of the same phase are disposed on one side or both sides of each of the K number of stator poles. Thus, circumferential magnetomotive force distribution is more smoothed so that a distribution analogous to a sine wave can be obtained. Accordingly, the motor can be driven more smoothly.

It is preferable that:

a plurality of loop windings for passing different phase currents are wound about a slot formed between the stator poles adjacently positioned in the rotor shaft direction to obtain a combined current; and the number of turns of each of the plurality of loop windings wound about the slot is determined so that a sum total of products, each of which is obtained by multiplying a current vector passing through each winding with the number of turns of each winding, equals to a vector of the combined current. Such a configuration may allow a current source having less number of phases to produce current phases equal to or more than the number of phases, for the stator pole group of each phase. Thus, smoother motor driving can be realized.

It is preferable that, in a wire connection between the loop windings, the loop windings having the same phase in terms of electrical angle are connected in series and the loop windings having different phases of about 180° in terms of electrical angle are oppositely connected in series. Such a configuration may realize motor driving with a less number of current sources. In this way, wiring of the motor can be simplified and thus the drive unit can also be simplified.

It is preferable that the rotor is partially provided with permanent magnets at a surface or an inside thereof, with at least a portion of the surface being made of a soft magnetic material. Thus, rotors of various configurations that can obtain reluctance torque can be readily realized.

It is preferable that the rotor is provided with a plurality of narrow gaps or nonmagnetic materials or permanent magnets, each of which extends from one rotor pole to another rotor pole. Thus, a synchronous reluctance motor can be readily realized.

It is preferable that the rotor is circumferentially provided with salient poles made of electromagnetically soft magnetic material. Thus, a reluctance motor can be readily configured.

It is preferable that the rotor is provided with windings to which induced currents can be supplied. Thus, induced torque can be obtained.

It is preferable that areas of the stator poles in a plane opposed to the rotor are in a sinusoidal distribution or analogous to sinusoidal distribution in the circumferential direction, with a relationship Nss=3×Pn, where Pn is the number of pole pairs and Nss is the number of the stator poles, being satisfied in case the stator poles of three phases are provided. Alternatively, an outer rotor structure may be preferable in which the stator poles are arranged on an inner-diameter side and the rotor is arranged on an outer-diameter side.

It is preferable that the stator poles and the rotor are relatively axially arranged to structure a so-called an axial gap motor.

It is preferable that the motor is configured by incorporating and combining two or more motors including the motors described above. By incorporating and combining two or more motors including the motors described above, spaces inside the motor can be efficiently utilized, or members structuring the motor can be commonly used, for example. Incorporation of two motors into one motor may decrease the spaces required for the system. In case supply currents in the motor are unbalanced to cause a magnetomotive force in the direction of the rotor shaft of the motor, an arrangement may be so made that the axial magnetomotive force generated by the two motors may be cancelled. As a result the axial magnetomotive force of the incorporated motor can be eliminated.

It is preferable that at least a portion of the rotor in the plane opposed to the stator poles is made of a soft magnetic material, with the rotor being provided, at a surface or an inside thereof, with permeable magnetic paths of soft magnetic material, for guiding magnetic fluxes in the rotor shaft direction or in the radial direction. Thus, magnetic paths in each phase of the stator, which cross in the direction of the rotor can be reduced.

It is preferable that at least a portion of the rotor in the plane opposed to the stator poles is made of a soft magnetic material, with the rotor being provided inside thereof with gap portions or nonmagnetic material portions for limiting rotation direction freedom of magnetic fluxes. Thus, position dependency of the rotor fluxes in the rotation direction can be raised.

It is preferable that a portion of the regularly arranged stator poles or a portion of the regularly arranged rotor poles is removed. Thus, the spaces left after the removal may be used for reinforcing the strength of the motor, placing sensors for current, voltage, flux, and the like, and drawing out the windings.

It is preferable that:
the number of the phases is set as being N, the number of pairs of the poles is set as being Pn, and the number of the poles is set as being 2×Pn; and
a portion of the stator poles are removed from a configuration where the number of the stator poles is S×Pn. Thus, flux leakage between the stator poles can be reduced.

A third motor of the present invention comprises:
a rotor having rotor pole groups, in which N-poles and S-poles are alternately arranged in the circumferential direction;
a P number of stator pole groups, in which a plurality of stator poles are arranged for each phase along or around the circumference so as to be positioned at substantially the same rotational phase position in terms of electrical angle; and
a Q number of loop windings axially arranged between the stator pole groups of individual phases, wherein:
input lines for motor are provided so that currents can be individually supplied to each of the Q number of loop windings (provided that Q=2n for P=(N+1), Q=2(N−1) for P=N, Q=N for P=(N+1), or Q=(N−1) for P=N, where N is a positive integer of "3" or more).

A fourth motor of the present invention comprises:
a rotor having rotor pole groups, in which N-poles and S-poles are alternately arranged in the circumferential direction;
a P number of stator pole groups, in which a plurality of stator poles are arranged for each phase along or around the circumference so as to be positioned at substantially the same rotational phase position in terms of electrical angle; and
a Q number of loop windings axially arranged between the stator pole groups of individual phases, wherein:
the same currents are reversely passed through two windings of the Q number of loop windings, the two windings being arranged sandwiching two or more stator pole groups (provided that Q=2N for P=(N+1), or Q=2(N−1) for P=N, where N is a positive inter of "3" or more).

A fifth motor of the present invention comprises:
a rotor having rotor pole groups, in which N-poles and S-poles are alternately arranged in the circumferential direction;
a P number of stator pole groups, in which a plurality of stator poles are arranged for each phase along or around the circumference so as to be positioned at substantially the same rotational phase position in terms of electrical angle; and
a Q number of loop windings axially arranged between the stator pole groups of individual phases (provided that Q=N for P=(N+1), or Q=(N−1) for P=N, where N is a positive inter of "3" or more).

A sixth motor of the present invention comprises:
a rotor having rotor pole groups, in which N-poles and S-poles are alternately arranged in the circumferential direction;
an (N+1) number of stator pole groups, in which a plurality of stator poles are arranged for each phase along or around the circumference so as to be positioned at substantially the same rotational phase position in terms of electrical angle; and
an N number of loop windings axially arranged between the stator pole groups of individual phases, wherein:
the N number of windings are in star connection.

A seventh motor of the present invention comprises:
a rotor having rotor pole groups, in which N-poles and S-poles are alternately arranged in the circumferential direction;
an N number of stator pole groups, in which a plurality of stator poles are arranged for each phase along or around the circumference so as to be positioned at substantially the same rotational phase position in terms of electrical angle; and
an (N−1) number of loop windings axially arranged between the stator pole groups of individual phases, wherein:
the (N−1) number of windings are in star connection; and
an N number of input lines are provided, the N number of lines including a center connection portion of the star connection, which portion serves as a motor input.

An eighth motor of the present invention comprises:
a rotor having rotor pole groups, in which N-poles and S-poles are alternately arranged in the circumferential direction; and
four stator pole groups, in which a plurality of stator poles are arranged for each phase along or around the circumference so as to be positioned at substantially the same rotational phase position in terms of electrical angle, wherein:
a loop winding having an Nw number of turns is arranged at an inner side of each of stator pole groups arranged at both ends;
two loop windings, each of which has an Nw/2 number of turns, are arranged between two central stator pole groups; and
the four windings are in star connection.

A ninth motor of the present invention comprises:
a rotor having rotor pole groups, in which N-poles and S-poles are alternately arranged in the circumferential direction; and
four stator pole groups, in which a plurality of stator poles are arranged for each phase along or around the circumference so as to be positioned at substantially the same rotational phase position in terms of electrical angle, wherein:
a loop winding having an Nw number of turns is arranged at an inner side of each of stator pole groups arranged at both ends;
a loop winding having an Nw/2 number of turns is arranged between two central stator pole groups; and
the three windings are in star connection.

A tenth motor of the present invention comprises:
a rotor having rotor pole groups, in which N-poles and S-poles are alternately arranged in the circumferential direction; and an (N+1) number of stator pole groups, in which a plurality of stator poles are arranged for each phase along or around the circumference so as to be positioned at substantially the same rotational phase position in terms of electrical angle, wherein:

among the stator pole groups, those which correspond to two phases having an electrical angle difference of about 180° are arranged so as to be adjacent to each other; and an N number of loop windings are arranged between the stator pole groups of individual phases.

An eleventh motor of the present invention comprises:

a rotor having rotor pole groups, in which N-poles and S-poles are alternately arranged in the circumferential direction; and an N number of stator pole groups, in which a plurality of stator poles are arranged for each phase along or around the circumference so as to be positioned at substantially the same rotational phase position in terms of electrical angle, wherein:

the N number of stator pole groups are alternately arranged in the order of phases in terms of electrical angle; and loop windings are arranged in respective spaces between the stator pole groups of individual phases.

A twelfth motor of the present invention is characterized in that:

a first configuration made up of stator pole groups of first, third and fifth phases in terms of electrical angle, and a second configuration made up of stator pole groups of a second, fourth and sixth phases in electrical angle, are arrange in the rotor shaft direction;

loop windings are arranged between the stator pole groups of the first, third and fifth phases;

loop windings are arranged between the stator pole groups of the second, sixth and fourth phases;

rotor poles are arranged opposed to the stator pole groups; and at least one of a space between the first configuration and the second configuration, or a space between the two pairs of rotor pole groups opposed to the stator pole groups, is vacant or provided with a nonmagnetic material for electromagnetic separation.

A thirteenth motor of the present invention comprises:

a rotor having rotor pole groups, in which N-poles and S-poles are alternately arranged in the circumferential direction; and an N number of stator pole groups, in which a plurality of stator poles are arranged for each phase along or around the circumference so as to be positioned at substantially the same rotational phase position in terms of electrical angle, wherein:

the N number of stator pole groups are arranged in the order of phases in terms of electrical angle with two phases being skipped inbetween; and loop windings are arranged in respective spaces between the stator pole groups of individual phases.

In order to solve the object mentioned above, the present invention provides the motors and control units therefor having various configurations other than the ones provided above. These configurations will become apparent from the embodiments described hereinafter and the accompanying drawings.

ADVANTAGES OF THE INVENTION

The present invention is advantageous in that a motor and a control unit therefor can be presented, which motor has a simplified winding structure and thus can enhance the productivity with reduced size and cost and with high efficiency.

In a first motor of the present invention having the above configuration, circumferential magnetomotive force distribution of the stator may take a comparatively smooth sinusoidal form. Therefore, high-quality motor can be realized with weak vibration and low level noise. Also, loop windings used in the motor can facilitate winding of the motor to thereby provide the motor with excellent manufacturability.

A second motor of the present invention has a configuration, in which the stator pole group arranged at one end is displaced to a position adjacent to the stator pole group at the other end. By collecting the same phase stator pole groups at both ends to either one of the ends, the motor configuration can be simplified.

BRIEF DESCRIPTION OF THE DRAWINGS

FIG. 120 illustrates a wire connection, in which the windings of the motor shown in FIG. 119 are star-connected;

FIG. 121 is a schematic diagram illustrating a configuration of a 4-phase motor having loop windings;

FIG. 122 is a schematic diagram illustrating a configuration of a 4-phase motor having loop windings;

FIG. 123 is a schematic diagram illustrating a configuration of a 6-phase motor having loop windings;

FIG. 124 is a schematic diagram illustrating a configuration of a 6-phase motor having loop windings;

FIG. 125 is a schematic diagram illustrating a configuration of a 6-phase motor having loop windings;

Figure 125:
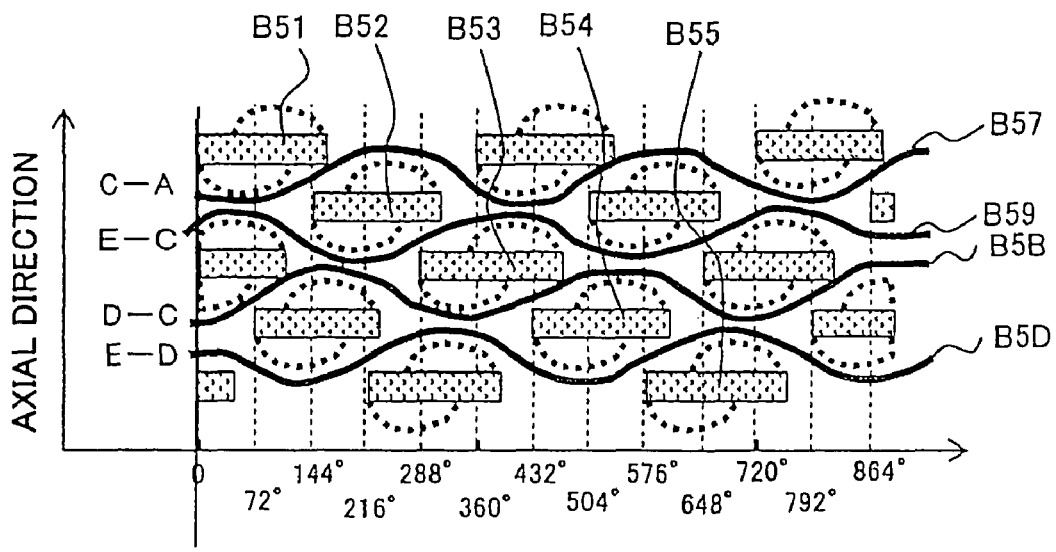
Figure 126:
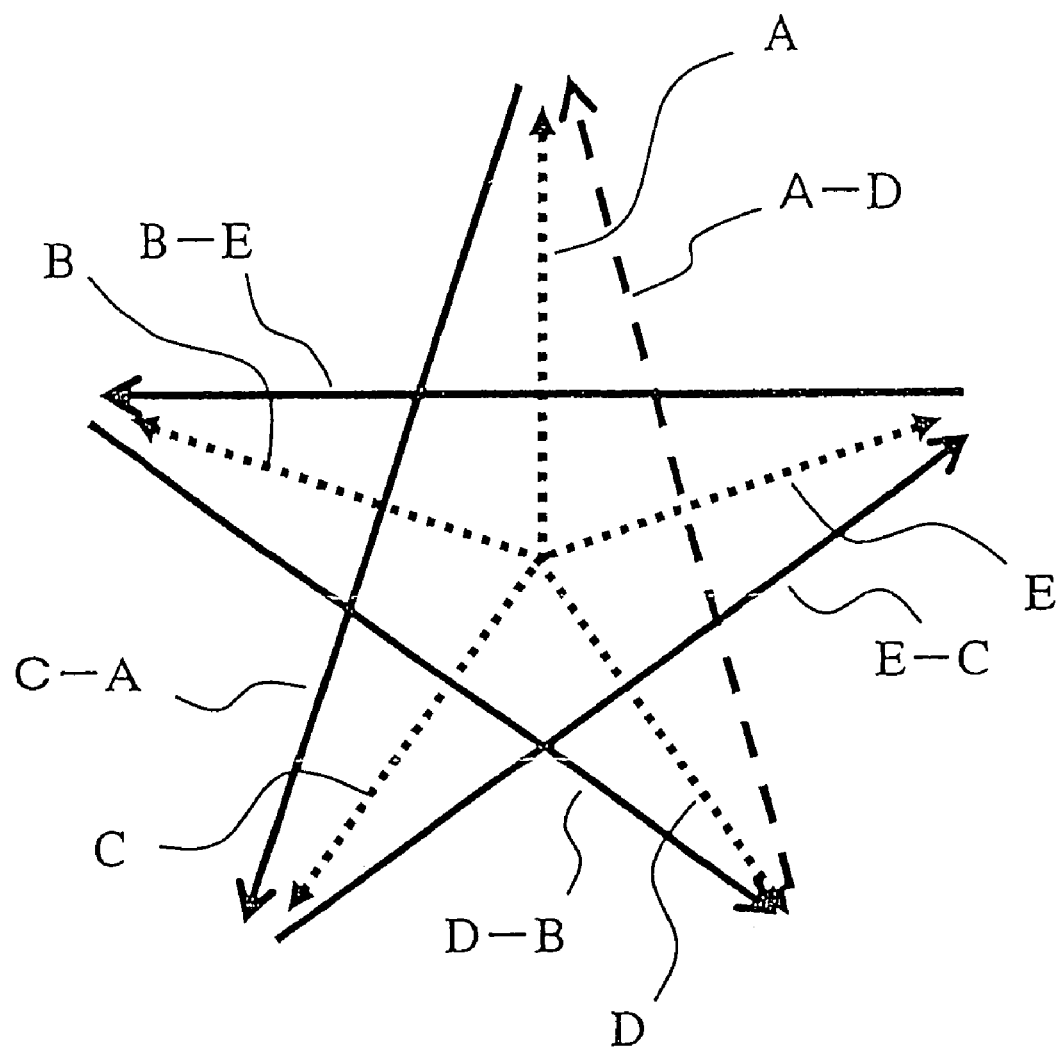
Figure 127:
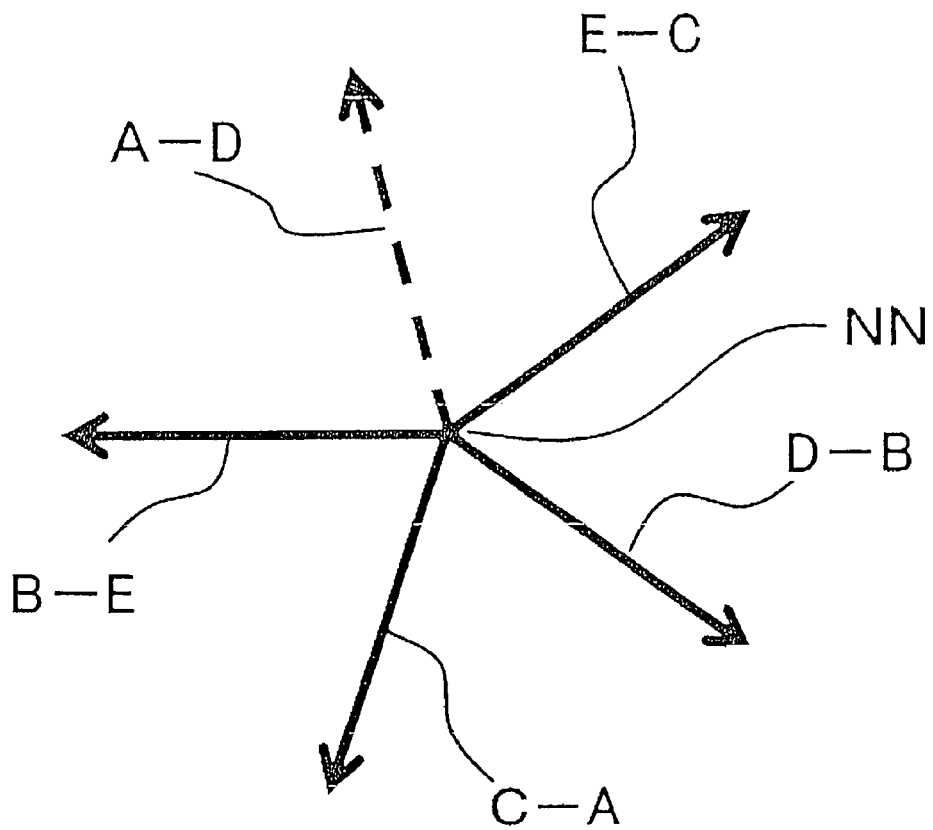
Figure 128:
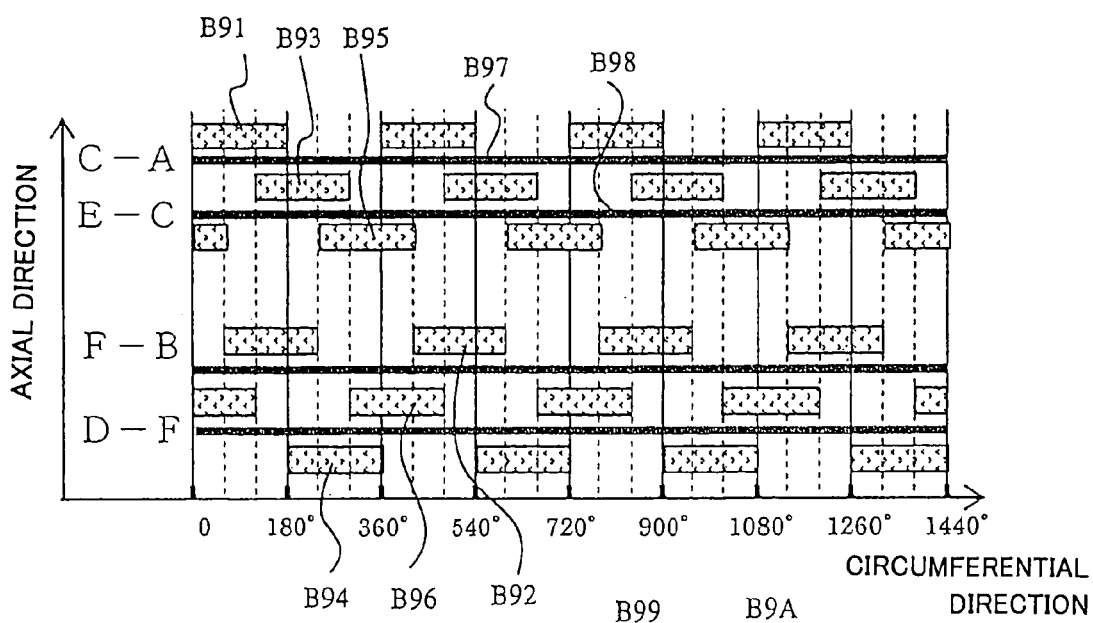
Figure 129:
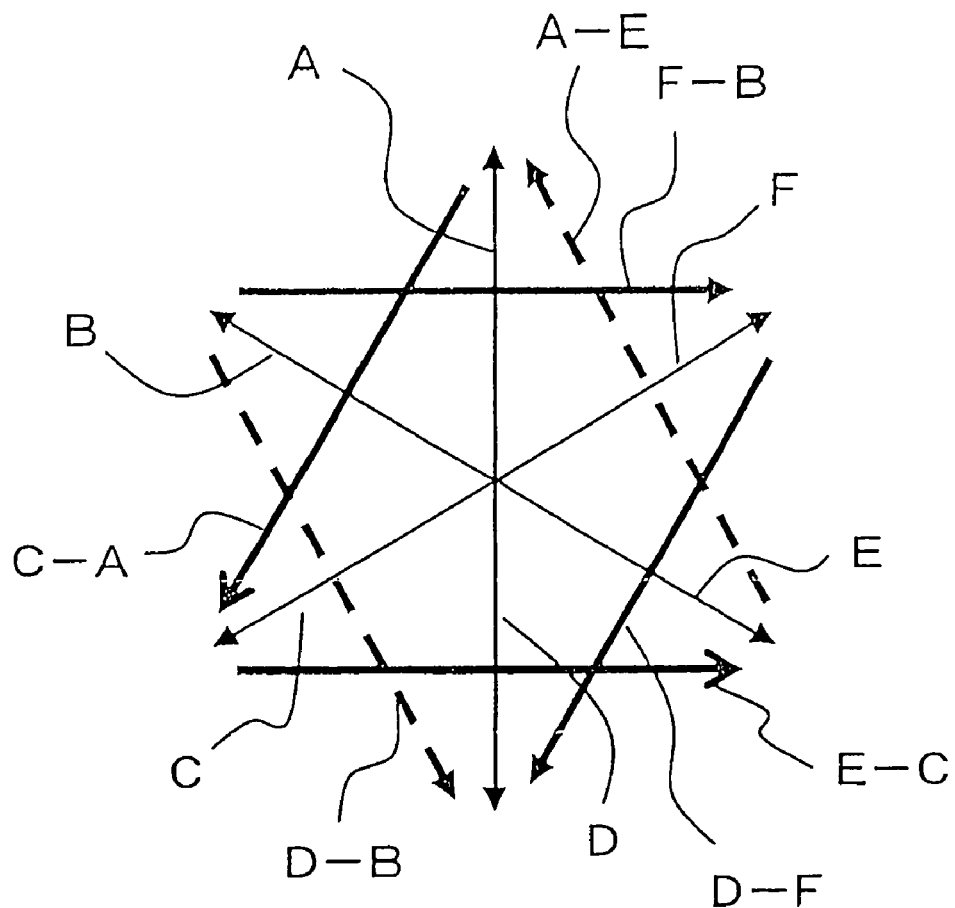
Figure 130:
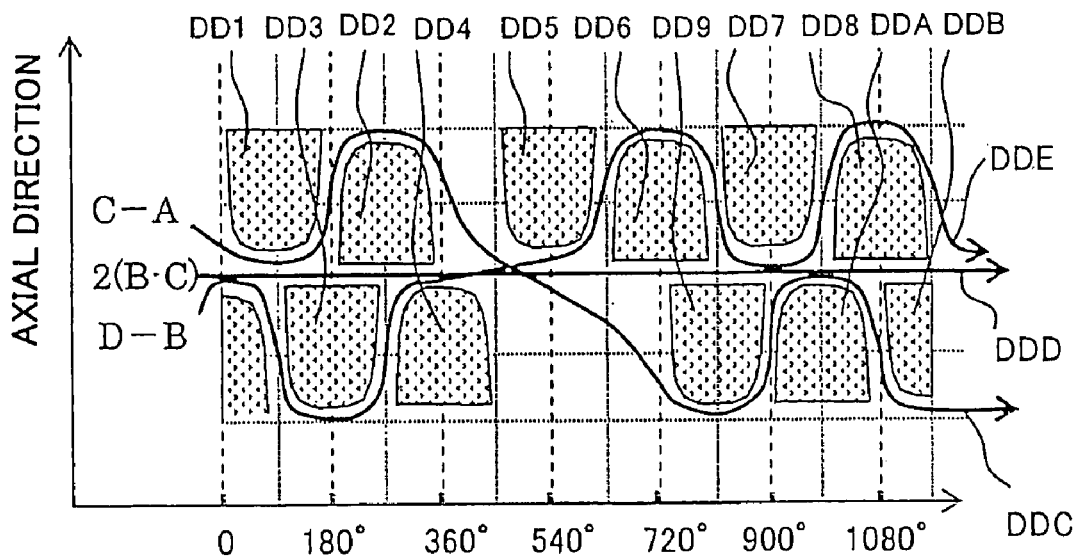
Figure 131:
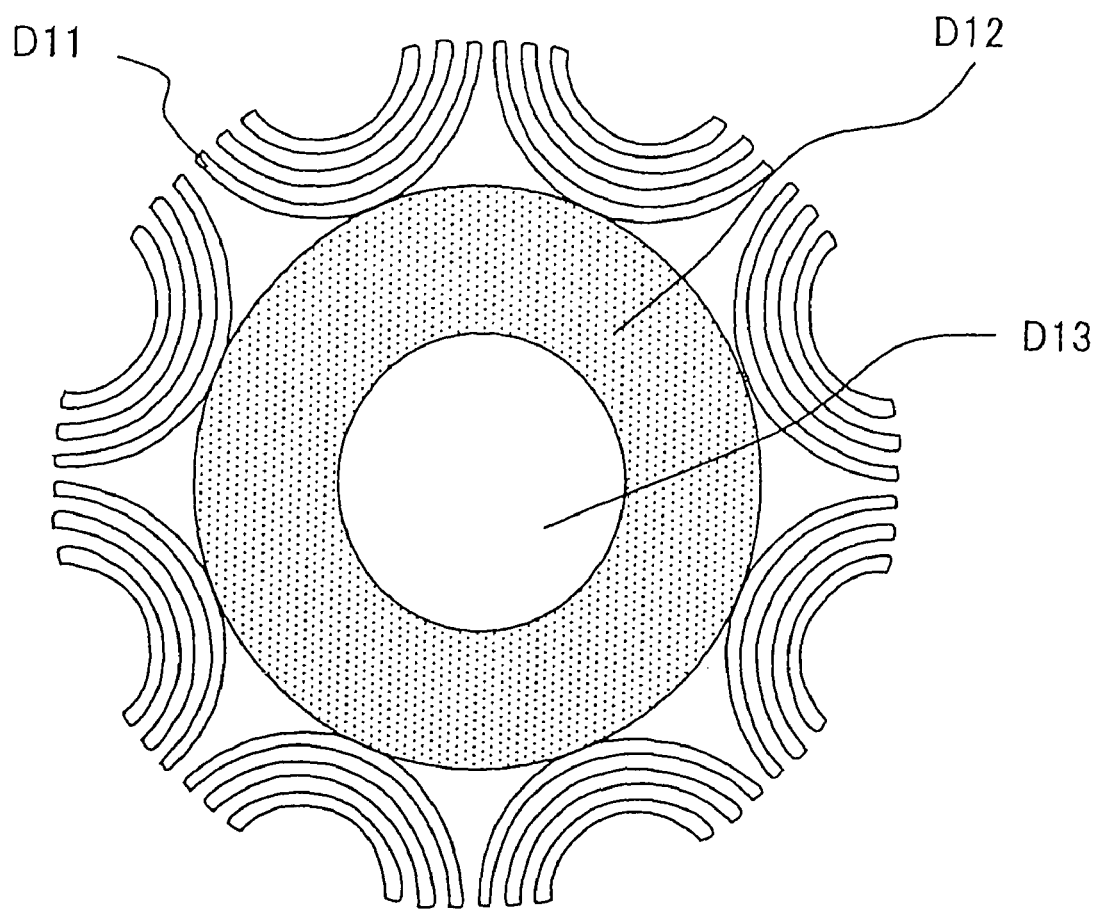
Figure 132:
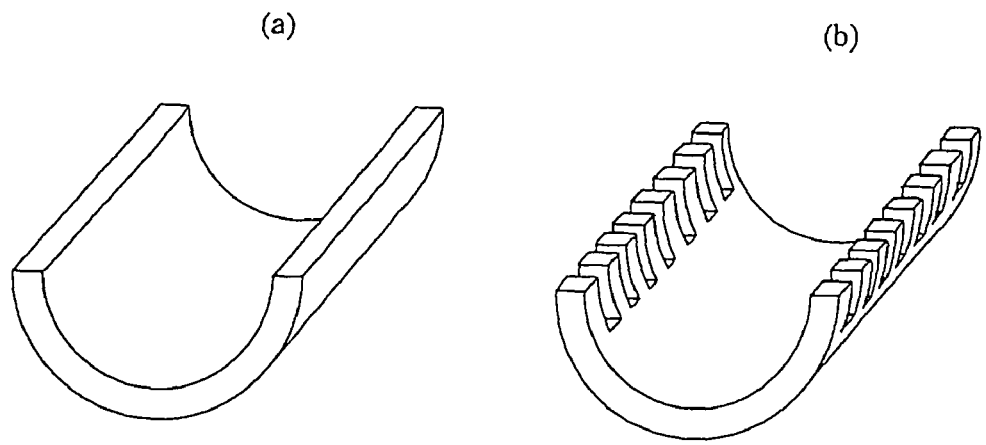
Figure 133:
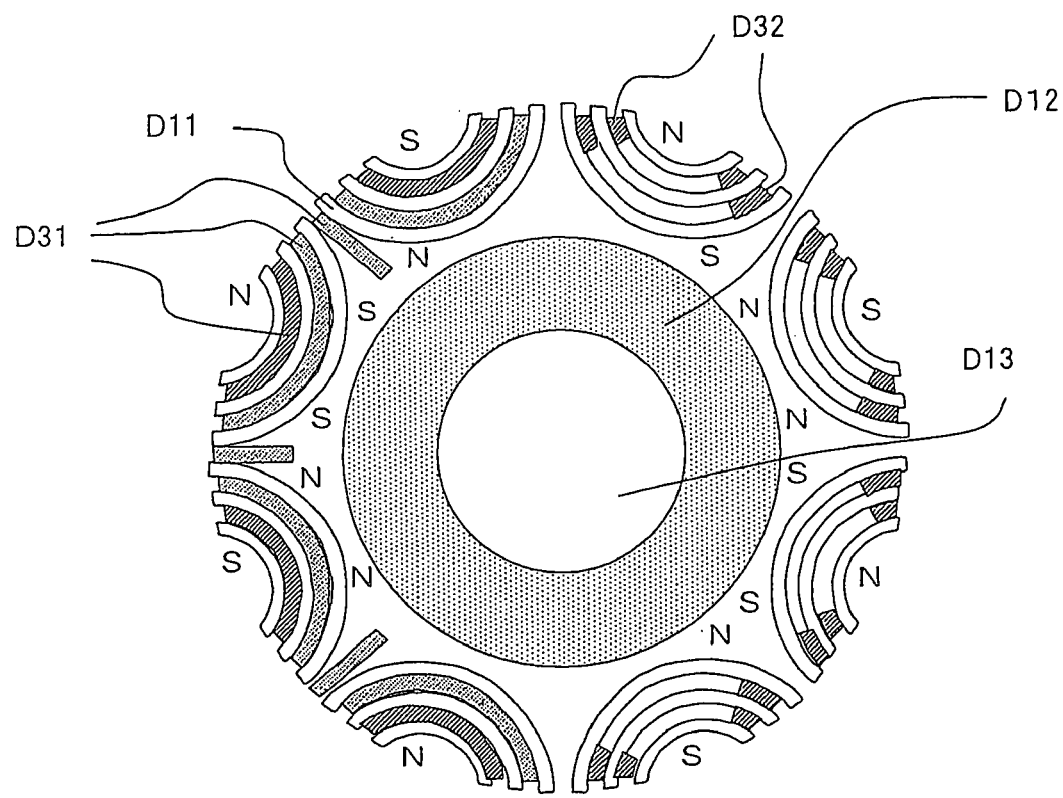
Figure 134:
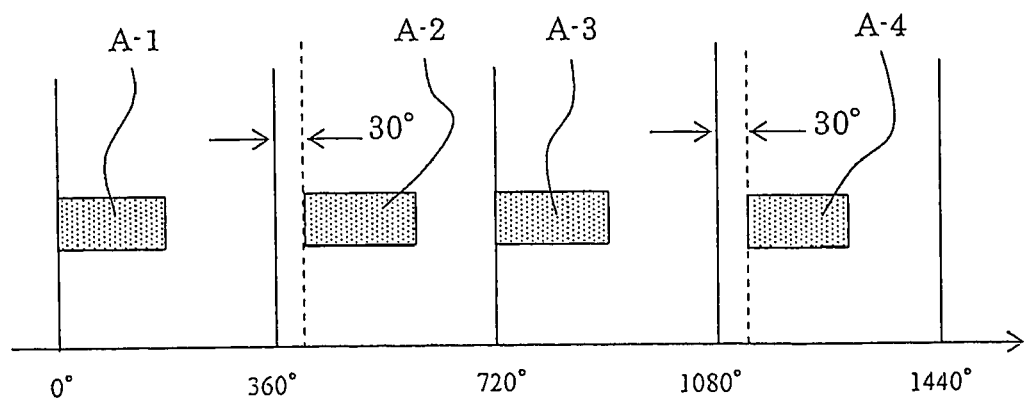
Figure 135:
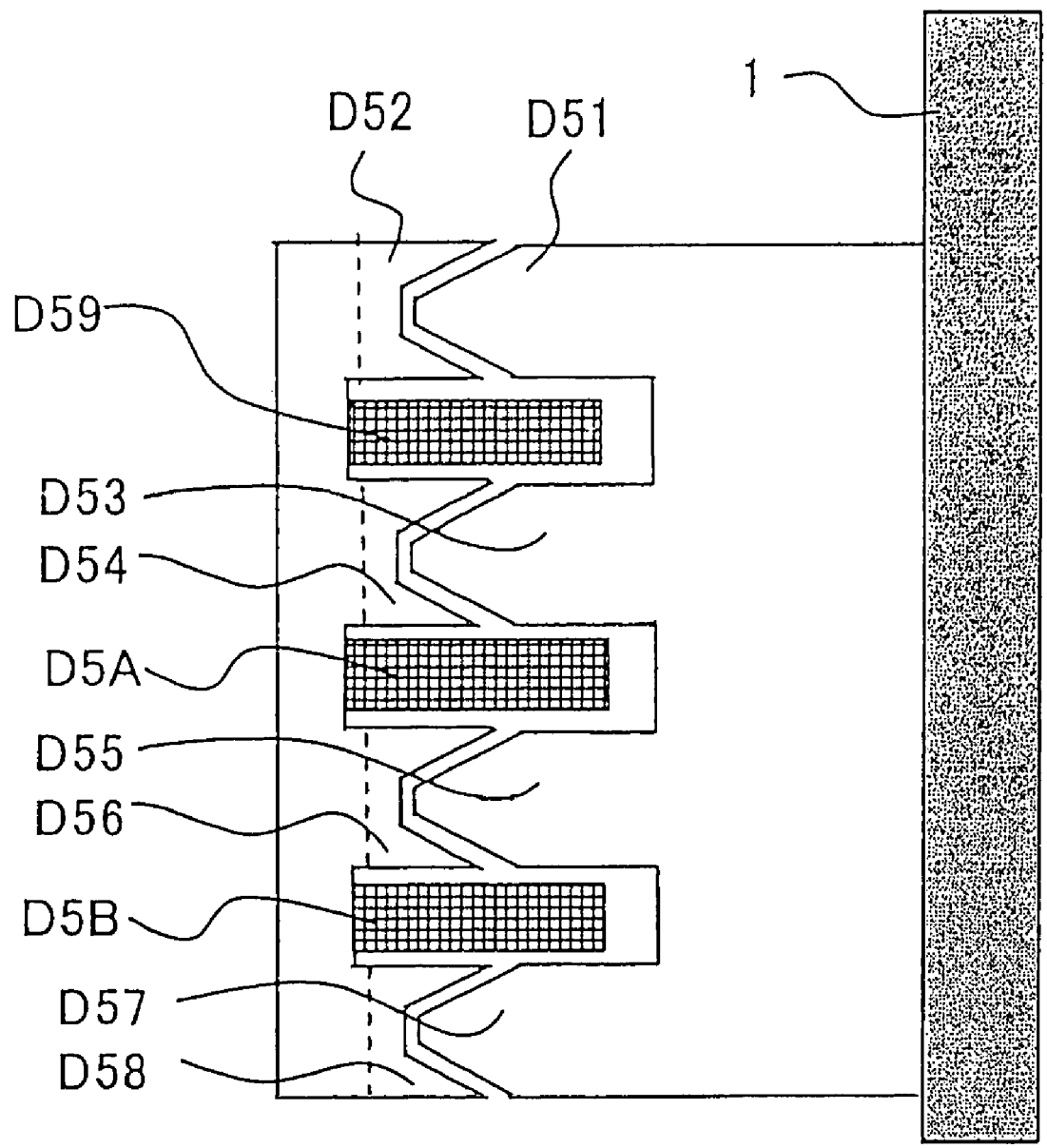
Figure 136:
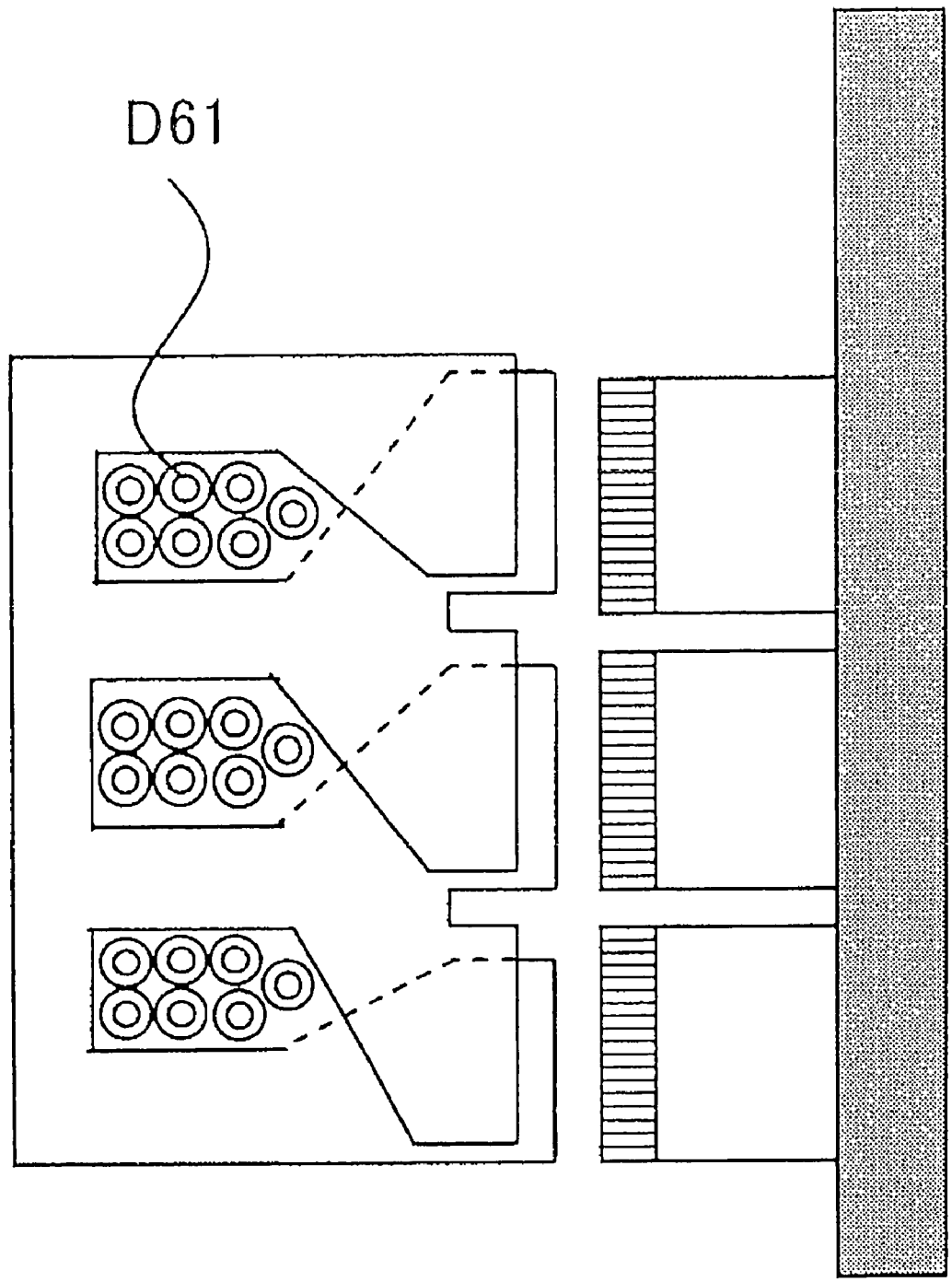
Figure 137:
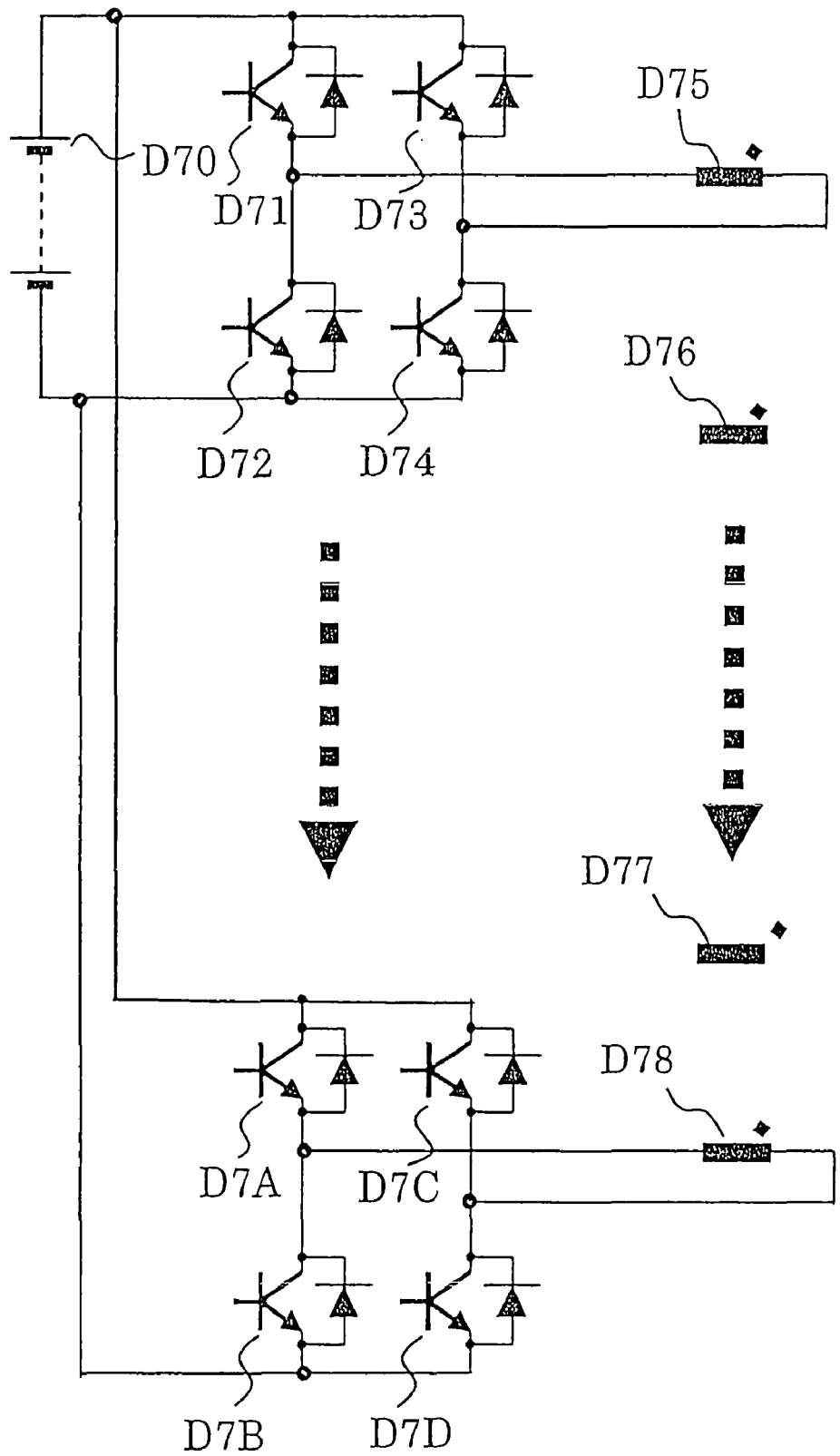
Figure 138:
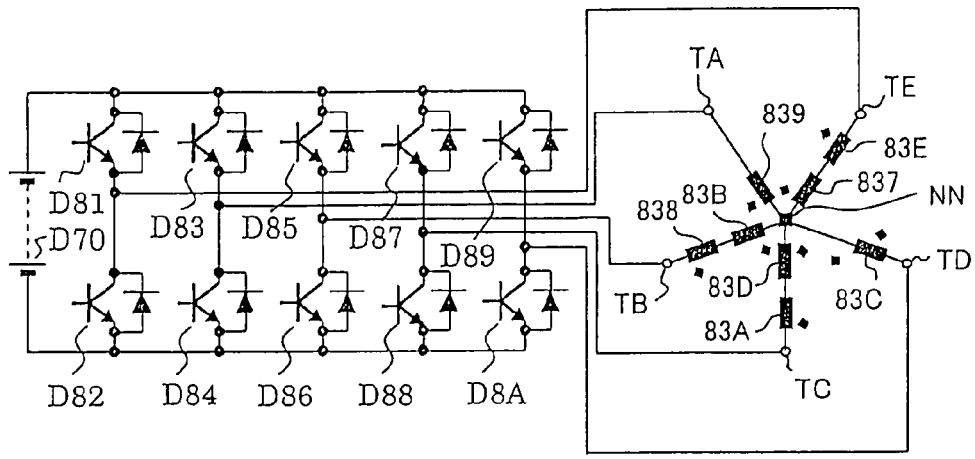
Figure 139:
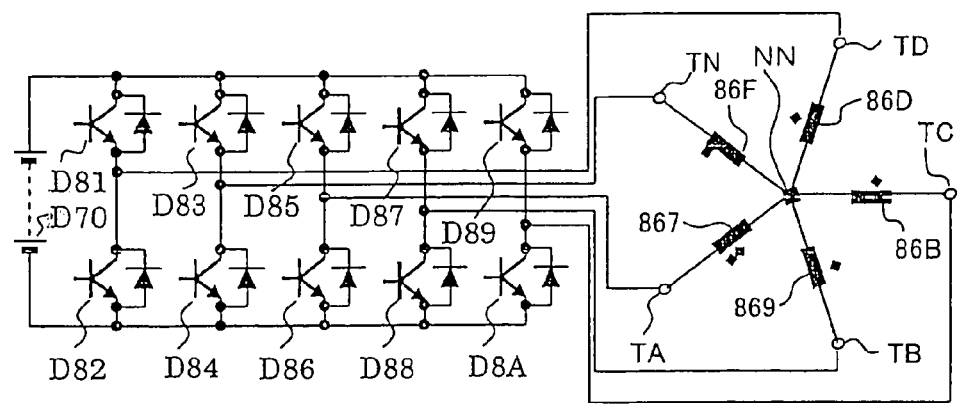
Figure 140:
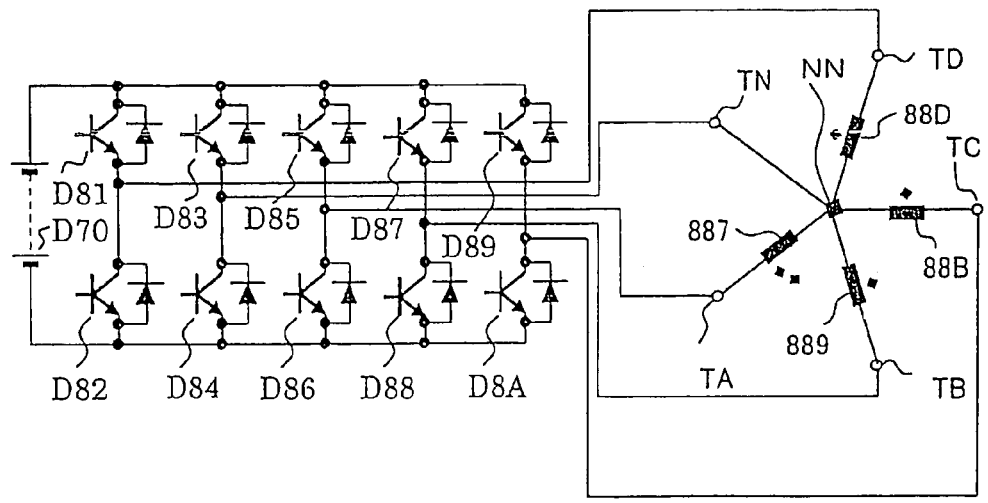
Figure 141:
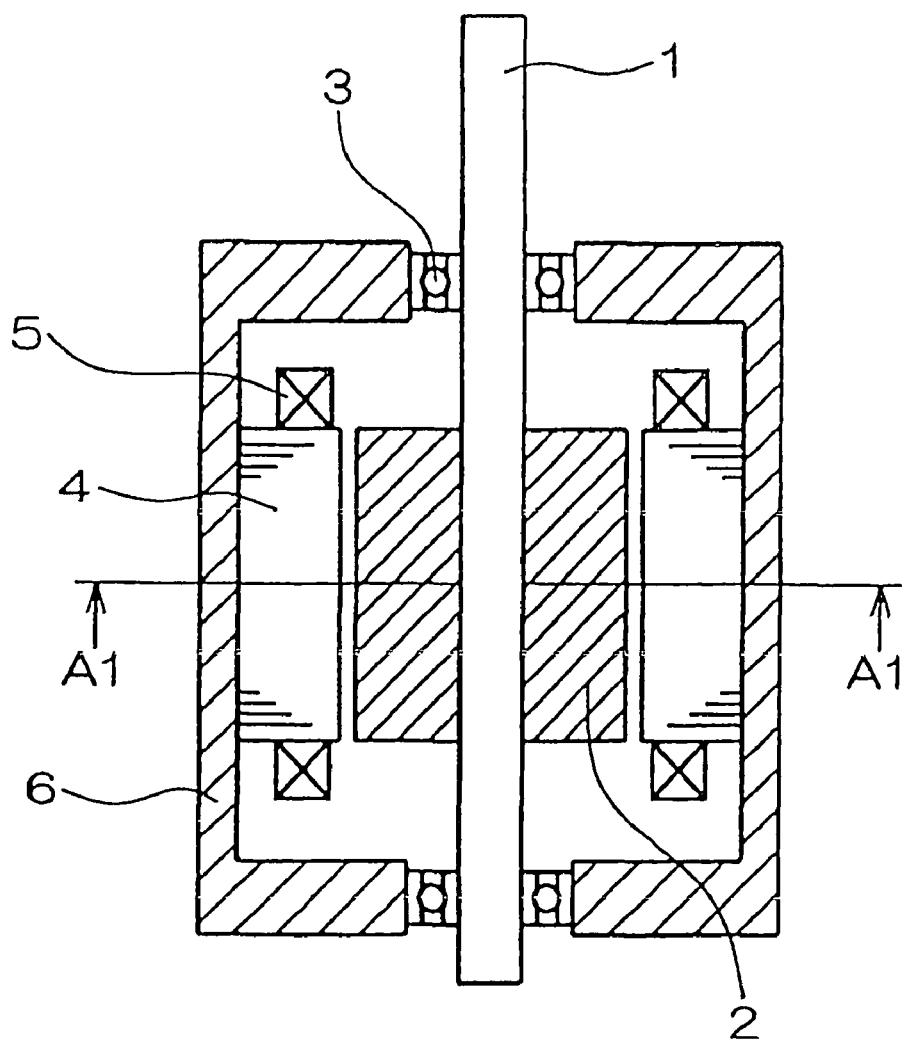
Figure 142:
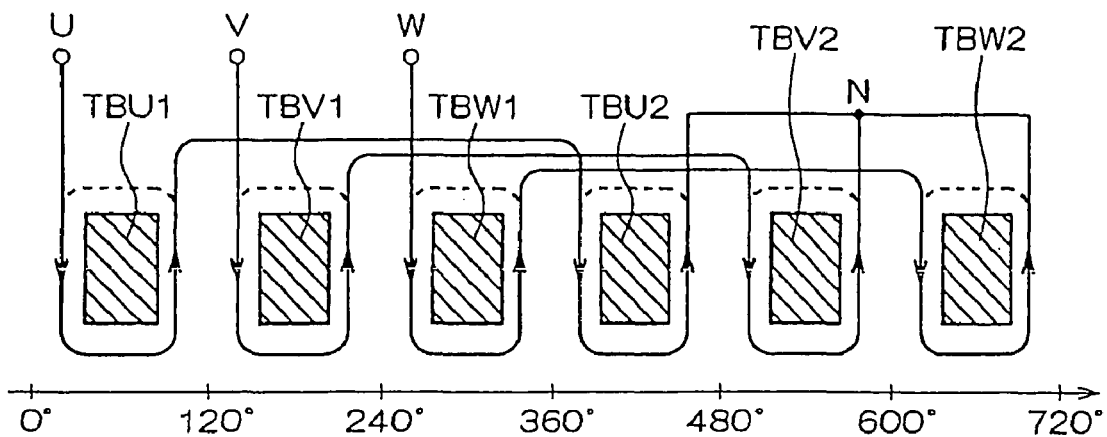
Figure 143:
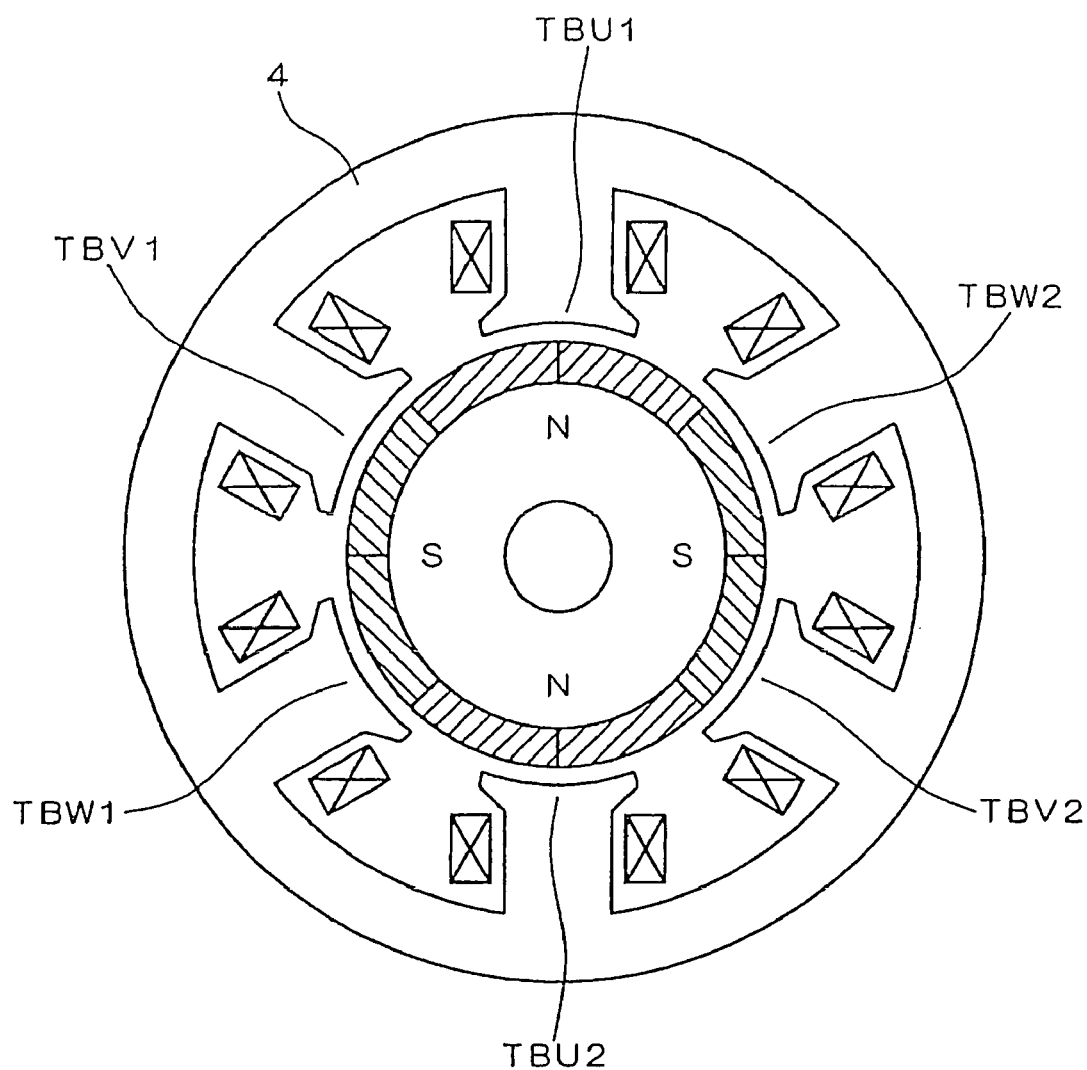

FIG. 126 vectorially illustrates the electrical currents of the 6-phase motor shown in FIG. 125;

FIG. 127 vectorially illustrates the electrical currents of the 6-phase motor shown in FIG. 125;

FIG. 128 is a schematic diagram illustrating a configuration of a 4-phase motor having loop windings;

FIG. 129 vectorially illustrates the electrical currents of the 6-phase motor shown in FIG. 128;

FIG. 130 is a schematic diagram illustrating a configuration of a 4-phase motor having loop windings;

FIG. 131 is a schematic diagram illustrating a rotor in a 4-pole reluctance motor;

FIG. 132 illustrates a configuration of an electromagnetic steel plate used for the rotor shown in FIG. 131;

FIG. 133 illustrates a configuration of the rotor shown in FIG. 131 with permanent magnets being arranged therein;

FIG. 134 illustrates a configuration, in which stator poles are circumferentially shifted;

FIG. 135 illustrates configurations of radially indented stator poles and rotor poles;

FIG. 136 illustrates an example of using pipes for the windings of a stator;

FIG. 137 illustrates an example of a configuration of a control unit for individually driving the windings of a motor;

FIG. 138 illustrates a winding configuration of a 5-phase motor and a control unit therefor;

FIG. 139 illustrates a winding configuration of a 5-phase motor and a control unit therefor;

FIG. 140 illustrates a winding configuration of a 5-phase motor and a control unit therefor;

FIG. 141 is a schematic vertical cross section illustrating a configuration of a conventional brushless motor;

FIG. 142 is a development of a stator showing a relationship between stator poles and windings in a conventional brushless motor;

FIG. 143 is a cross section taken along a line A1-A1 of FIG. 141; and

Figure 144:
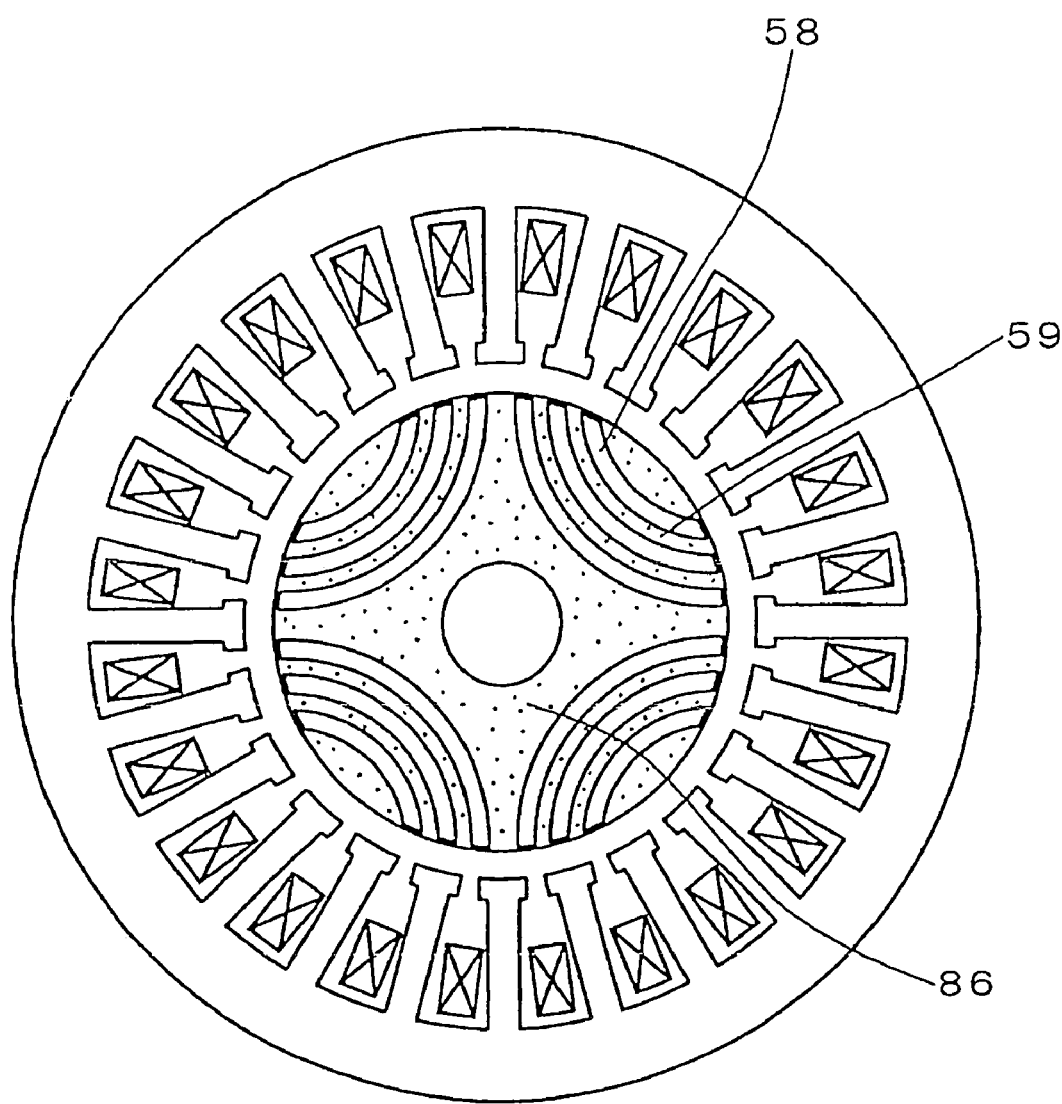

FIG. 144 is a transverse cross section of a conventional synchronous reluctance motor.

BEST MODES FOR EMBODYING THE INVENTION

With reference to the drawings, hereinafter will be described a motor according to an embodiment to which the present application is applied.

First of all, a known basic configuration of the motor related to the present invention will be explained, and then a configuration characteristic of the present invention will be explained.

Figure 1:
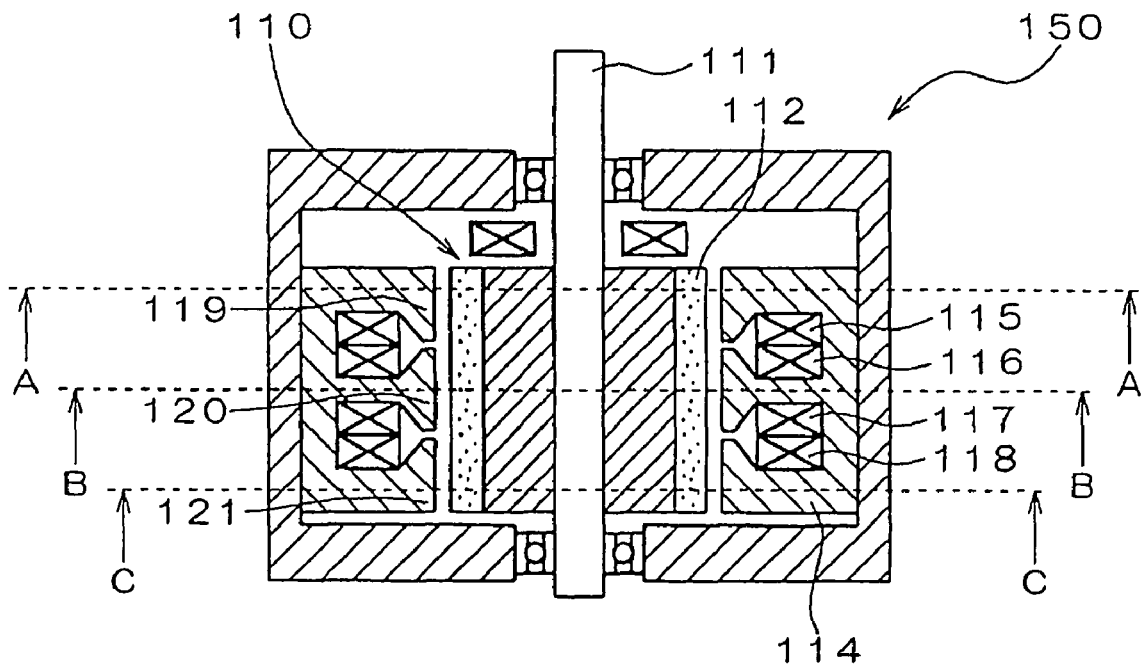
FIG. 1 is a schematic vertical cross section illustrating a configuration of a 3-phase motor having loop windings.

FIG. 1 is a cross section illustrating a basic configuration of a brushless motor as the motor related to the present embodiment. A brushless motor 150 shown in FIG. 1 is an 8-pole motor that operates with 3-phase alternating current, and comprises a rotor shaft 111, permanent magnets 112 and a stator 114.

Figure 2:
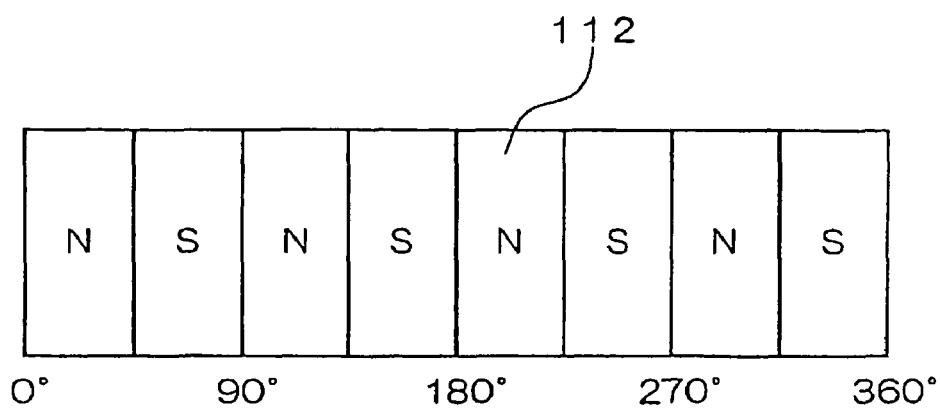
FIG. 2 illustrates a surface configuration of the rotor shown in FIG. 1 linearly developed along the circumference thereof.

A rotor 110 includes a plurality of permanent magnets 112 arranged on a surface thereof. These permanent magnets 112 have N-poles and S-poles alternately arranged on the surface of the rotor 110 along the circumference thereof. FIG. 2 is a circumferential development of the rotor 110. The horizontal axis indicates mechanical angles. A position expressed by mechanical angle 360° corresponds to electrical angle 1440°.

Figure 4:
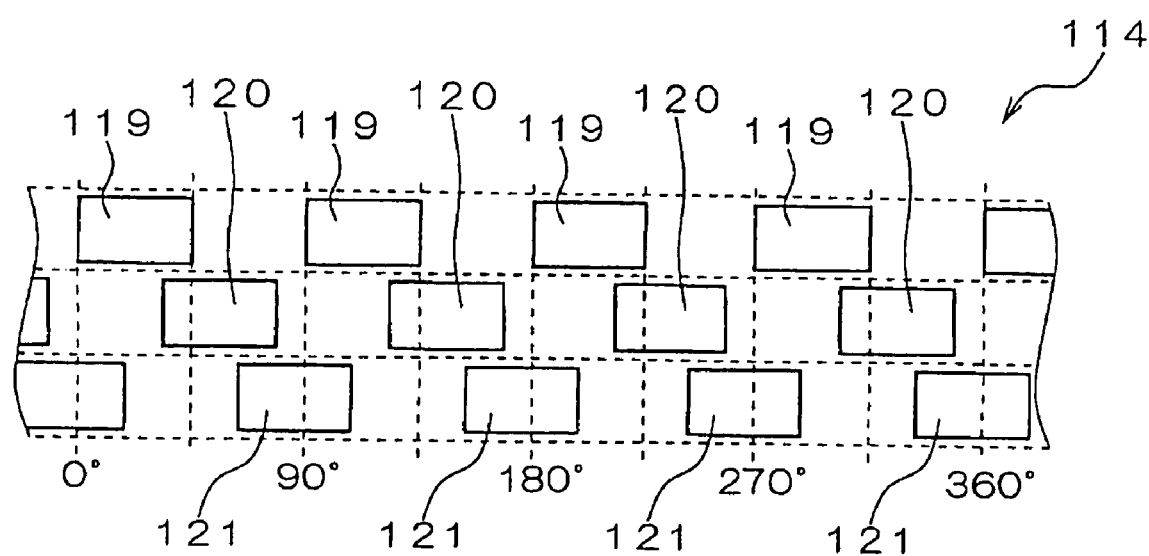
FIG. 4 illustrates an inner peripheral surface configuration of the stator shown in FIG. 1 linearly developed along the circumference thereof.

The stator 114 is provided with four U-phase stator poles 119, four V-phase stator poles 120 and four W-phase stator poles 121. Each of the stator poles 119, 120 and 121 is saliently formed toward the rotor 110. FIG. 4 is a development illustrating an inner peripheral configuration of the stator 114 as viewed from the rotor 110. The four U-phase stator poles 119 are arranged on a single circumference with an even interval therebetween. Similarly, the four V-phase stator poles 120 are arranged on a single circumference with an even interval therebetween, and the four W-phase stator poles 121 are arranged on a single circumference with an even interval therebetween. The four U-phase stator poles 119 are referred to herein as "U-phase stator poles", the four V-phase stator poles 120, as "V-phase stator poles", and the four W-phase stator poles 121, as "W-phase stator poles". Further, among the groups of stator poles, the U-phase stator poles and the W-phase stator poles, which are arranged at axial end portions, are referred to herein as "end stator poles" and the remaining V-phase stator poles are referred to as "intermediate stator poles".

The U-phase stator poles 119, the V-phase stator poles 120 and the W-phase stator poles 121 are arranged so that the axial and circumferential positions are offset from each other. In particular, the individual groups of stator poles are circumferentially offset from each other so as to have a relative phase difference of 30° in mechanical angle, which is 120° in electrical angle. Broken lines indicated in FIG. 4 represent the permanent magnets 112 of the rotor 110. A pitch between the same poles in the rotor poles (between the permanent magnets 112 of N-poles or between the permanent magnets 112 of S-poles) is 360° in electrical angle. A pitch between the same phases in the stator poles is also 360° in electrical angle.

Figure 6:
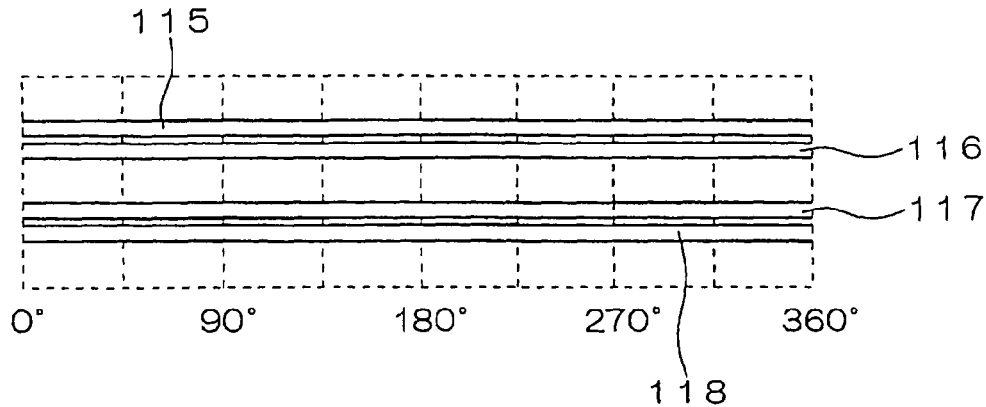
FIG. 6 illustrates the loop windings shown in FIG. 1 linearly developed along the circumference thereof.

The U-phase stator poles 119, the V-phase stator poles 120 and the W-phase stator poles 121 are provided therebetween with U-phase windings 115, V-phase windings 116 and 117, and W-phase windings 118. FIG. 6 is a circumferential development illustrating these phase windings. Each of the U-phase windings 115 is disposed between the U-phase stator poles 119 and the V-phase stator poles 120 and has a circumferentially looped form. When a clockwise current as viewed from the rotor shaft is positive (the same applies to the phase windings of other phases), a current Iu that flows through the U-phase windings 115 is negative (−Iu). Similarly, each of the V-phase windings 116 is disposed between the U-phase stator poles 119 and the V-phase stators pole 120 and has a circumferentially looped form. A current Iv that flows through the V-phase windings 116 is positive (+Iv). Each of the V-phase windings 117 is disposed between the V-phase stator poles 120 and the W-phase stator poles 121 and ahs a circumferentially looped form. A current Iv that flows through the V-phase windings 117 is negative (−Iv). Each of the W-phase windings 118 is disposed between the V-phase stator poles 120 and the W-phase stator poles 121 and has a circumferentially looped form. A current Iw that flows through the W-phase windings 118 is positive (+Iw). These three types of currents Iu, Iv and Iw are 3-phase alternating currents, whose phases are offset from each other by 120°.

Figure 3:
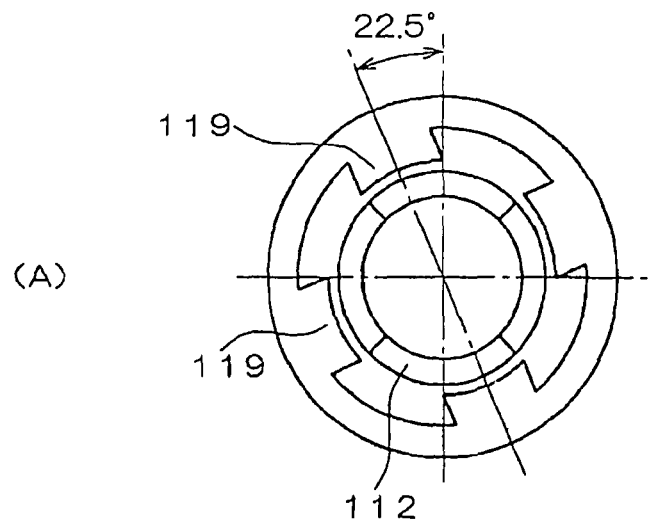
FIG. 3 illustrates schematic transverse cross sections of the stator shown in FIG. 1.
Figure 3:
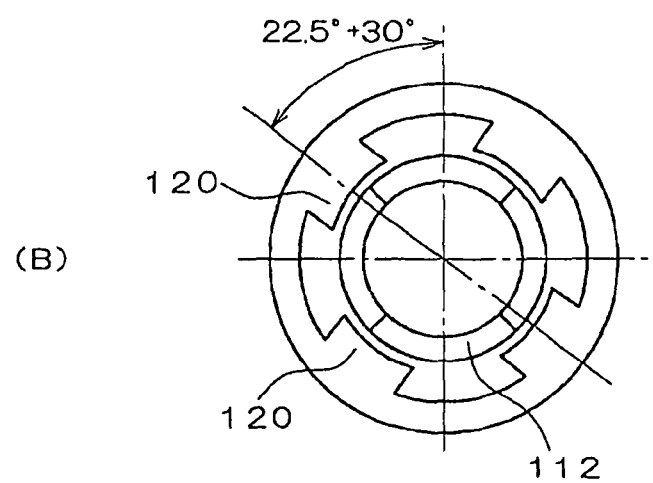
Figure 3:
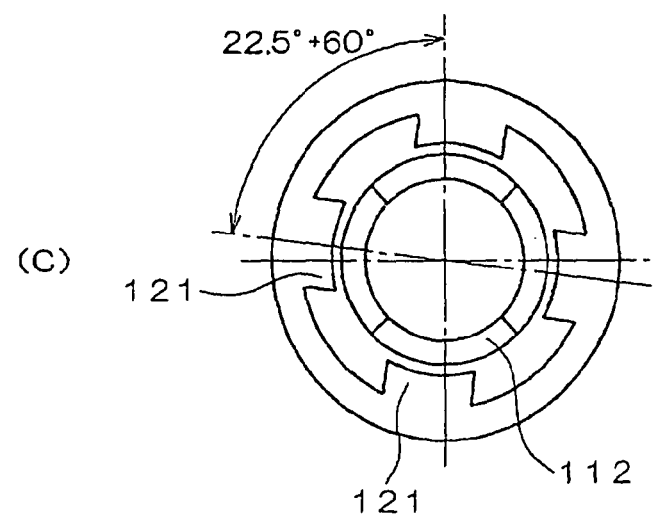

The shapes of the stator poles and the windings of the individual phases will now be explained in detail. FIG. 3 illustrates cross sections of the stator 114 at the portions shown in FIG. 1. That is, FIG. 3 shows by (A) a cross section taken along a line A-A, by (B) a cross section taken along a line B-B, and by (C) a cross section taking along a line C-C. As shown in FIG. 3, the U-phase stator poles 119, the V-phase stator poles 120 and the W-phase stator poles 121 are saliently formed toward the rotor 110, and are arranged to provide a positional relationship having a relative phase difference of 30° in mechanical angle, which corresponds to 120° in electrical angle.

Figure 5:
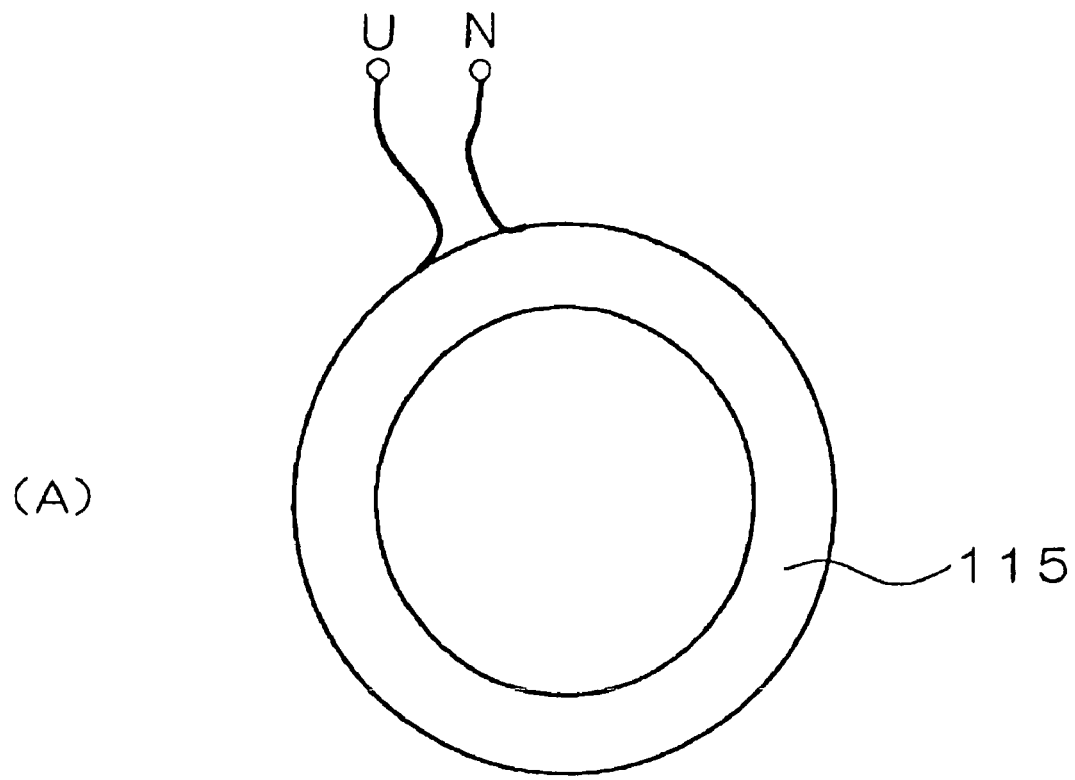
FIG. 5 illustrates front and side views of one of the windings of the stator shown in FIG. 1.
Figure 5:
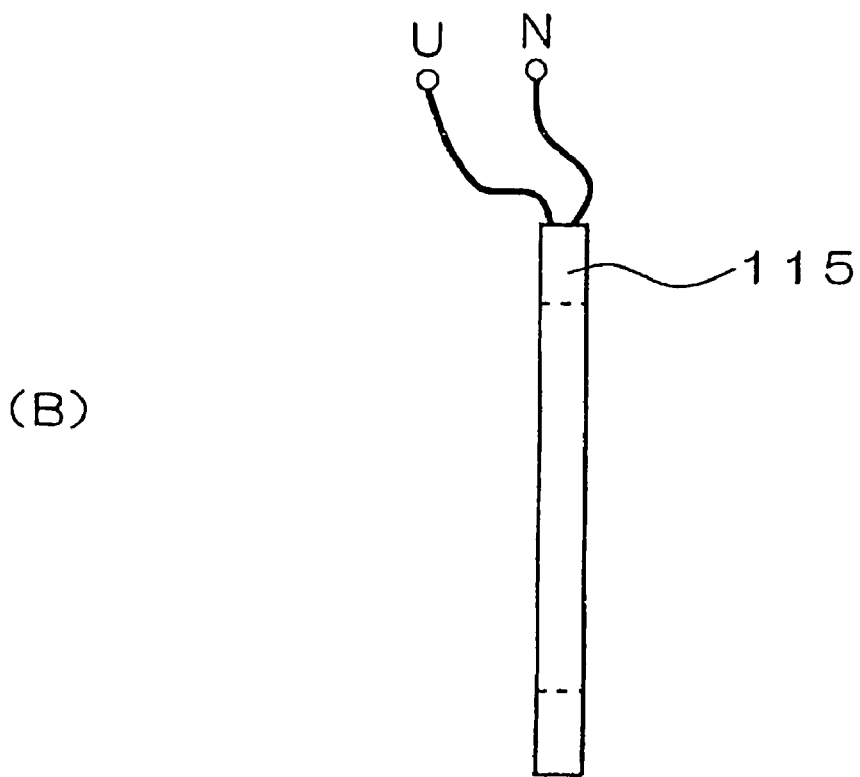

FIG. 5 illustrates schematic configuration of the U-phase winding 115. In FIG. 5, (A) represents a front view and (B) represents a side view. The U-phase winding 115 has a winding-start terminal U and a winding-end terminal N. Similarly, each of the V-phase windings 116 and 117 has a winding-start terminal V and a winding-end terminal N, and the W-phase winding 118 has a winding-start terminal W and a winding-end terminal N. In case of achieving a 3-phase Y-connection of the phase windings, the winding-end terminals N of the phase windings 115, 116, 117 and 118 are connected. The currents Iu, Iv and Iw flowing through the phase windings 115, 116, 117 and 118 are controlled by current phases, which produce torque between the stator poles 119, 120 and 121 of the individual phases and the permanent magnets 112 of the rotor 110. The control is effected so as to establish a relation:

$$Iu+Iv+Iw=0.$$

Figure 8:
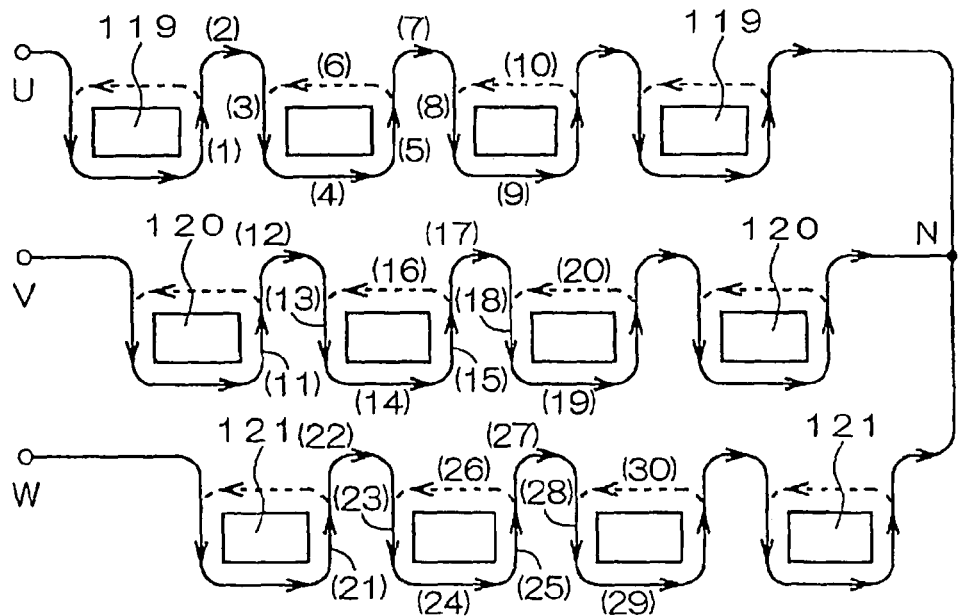
FIG. 8 illustrates a relationship between the stator poles and the windings shown in FIG. 1.

Hereinafter is explained a relationship between the phase currents Iu, Iv and Iw and a magnetomotive force imparted to the stator poles 119, 120 and 121 of the individual phases by the phase currents. FIG. 8 illustrates a development of the stator poles 119, 120 and 121 of the individual phases (FIG. 4) as viewed from an air-gap surface (from the side of the rotor 110) with an addition of equivalent current windings of the individual phases.

The U-phase winding is serially and unidirectionally wound about the four U-phase stator poles 119. Accordingly, the U-phase stator poles 119 are imparted with a unidirectional magnetomotive force. For example, the U-phase winding wound about the second U-phase stator pole 119 from the left in FIG. 8 is formed by wires (3), (4), (5) and (6). These wires are wound, in this order, about the U-phase stator pole 119 for a plurality of times. Wires (2) and (7) are connecting wires connecting the adjacent U-phase stator poles 119 and thus exert no electromagnetic effect.

Detailed study on portions of the current Iu flowing through such a U-phase winding reveals that magnitudes of the currents in the wires (1) and (3) are the same but the currents flow in the opposite direction from each other, so that the magnetomotive force ampere turn is offset. Accordingly, these wires can be regarded as being in a state equivalent to the state where no current is passed. Similarly, as to currents in the wires (5) and (8), the magnetomotive force ampere turn is offset. Thus, these wires can be regarded as being in a state equivalent to the state where no current is passed. Thus, since the currents passing through the wires disposed between the U-phase stator poles 119 are constantly offset, there is no need to pass currents, leading to the possible removal of the wires concerned. As a result, it can be regarded that the U-phase loop current Iu passing along the circumference of the stator 114 for the wires (10) and (6) flows simultaneously with the U-phase loop current −Iu passing along the circumference of the stator 114 for the wires (4) and (9).

Moreover, the U-phase loop current Iu passing along the circumference of the stator 114 for the wires (10) and (6), is a looped current that passes outside the stator core. Outside the stator core, there exists air, for example, having large magnetic resistance, and therefore the loop current can exert little electromagnetic effect on the brushless motor 150. Thus, omission of the loop current may involve no influence, leading to possible removal of the loop winding positioned outside the stator core. (Although this loop winding is omitted in the above example, it may be left without being removed.) Consequently, the effects of the U-phase windings shown in FIG. 1 can be regarded as being equivalent to those of the U-phase loop windings 115 shown in FIGS. 1 and 6.

The V-phase winding shown in FIG. 8 is convolutedly and serially wound about the four V-phase stator poles 120 as in the case of the U-phase winding. In the winding, currents flowing through the wires (11) and (13) have the same magnitude but are oppositely directed, so that the magnetomotive force ampere turn is offset. Accordingly, these wires can be regarded as being in a state equivalent to the state where no current is passed. Similarly, the magnetomotive force ampere turn is offset as to the currents flowing through the wires (15) and (18). As a result, it can be regarded that the V-phase loop current Iv passing along the circumference of the stator 114 for the wires (20) and (16) flows simultaneously with the V-phase loop current −Iv passing along the circumference of the stator 114 for the wires (14) and (19). Consequently, the effects of the V-phase winding shown in FIG. 1 can be regarded as being equivalent to those of the V-phase loop windings 116 and 117 shown in FIGS. 1 and 6.

The W-phase winding shown in FIG. 8 is convolutedly and serially wound about the four W-phase stator poles 121 as in the case of the U-phase winding. In the winding, currents flowing through the wires (21) and (23) have the same magnitude but are oppositely directed, so that the magnetomotive force ampere turn is offset. Accordingly, these wires can be regarded as being in a state equivalent to the state where no current is passed. Similarly, the magnetomotive force ampere turn is offset as to the currents flowing through the wires (25) and (28). As a result, it can be regarded that the W-phase loop current Iw passing along the circumference of the stator 114 for the wires (30) and (26) flows simultaneously with the W-phase loop current −Iw passing along the circumference of the stator 114 for the wires (24) and (29).

Moreover, the W-phase loop current −Iw passing along the circumference of the stator 114 for the wires (24) and (29) mentioned above is a loop current that passes outside the stator core. Outside the stator core, there exists air, for example, having large magnetic resistance, and therefore the loop current can exert little electromagnetic effect on the brushless motor 150. Thus, omission of the loop current may involve no influence, leading to possible removal of the loop winding positioned outside the stator core. Consequently, the effects of the W-phase winding shown in FIG. 8 can be regarded as being equivalent to those of the looped W-phase winding 118 shown in FIGS. 1 and 6.

As described above, windings and current that impart the phase stator poles 119, 120 and 121 of the stator 114 with electromagnetic effects can be replaced by simplified loop windings. In addition, the loop windings at the axial ends of the stator 114 can be removed. As a result, the amount of copper used for the brushless motor 150 can be significantly reduced to thereby enable achievement of high efficiency and high torque. Also, since there is no need of circumferentially arranging winding (wires) between the stator poles of the same phase, a multipole structure beyond the conventional structure can be achieved. In particular, the simplified winding structure can enhance the productivity of motors with reduced cost.

Figure 71:
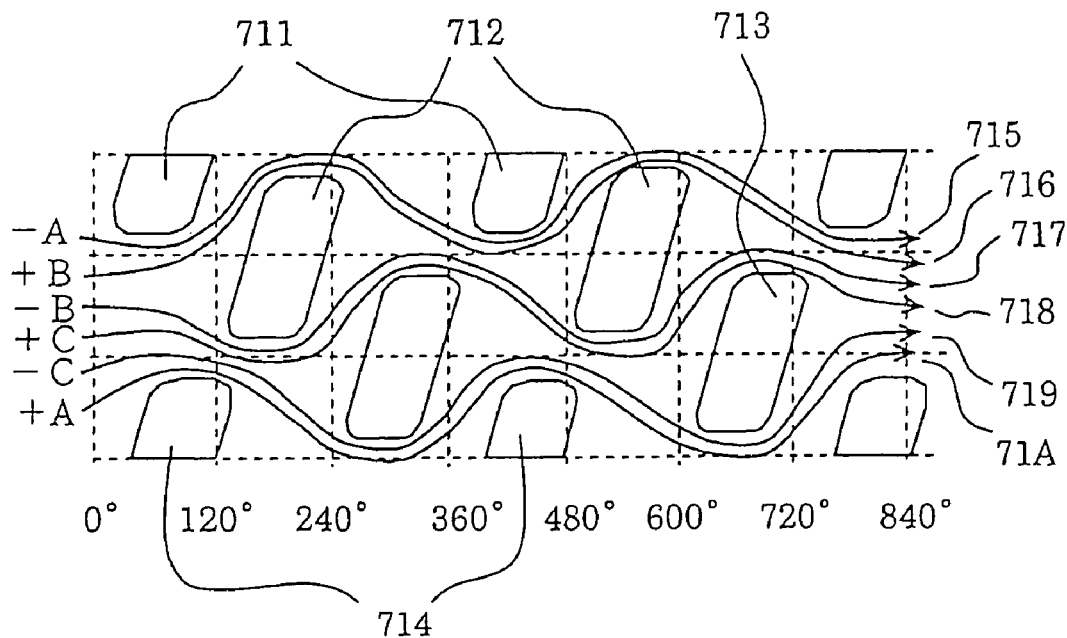
FIG. 71 is a schematic diagram illustrating a configuration of a 3-phase motor having loop windings.
Figure 72:
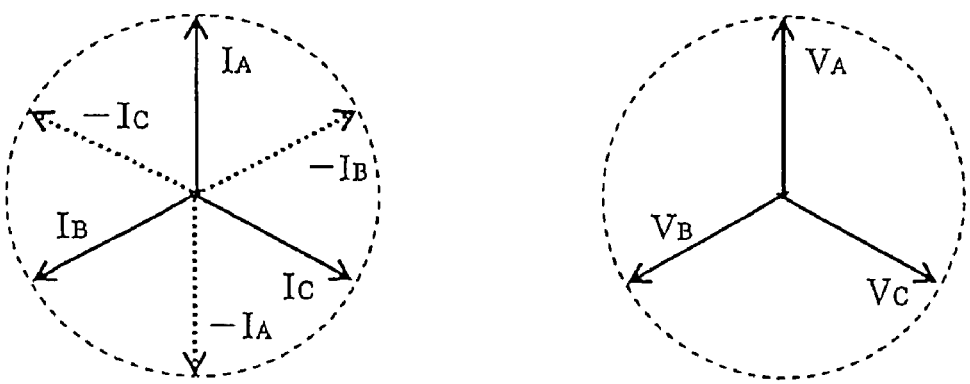
FIG. 72 vectorially illustrates electrical currents and voltages of FIG. 71.
Figure 73:
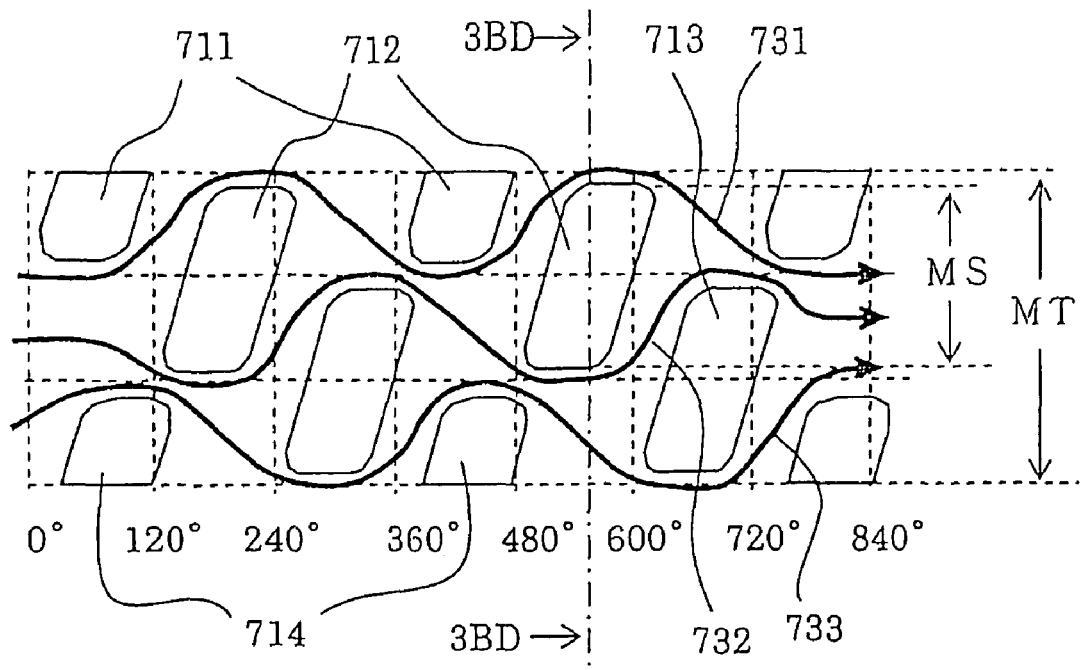
FIG. 73 is a schematic diagram illustrating a configuration of a 3-phase motor having loop windings.

It should be appreciated that magnetic fluxes $\phi u$, $\phi v$ and $\phi w$ that pass through the U-, V- and W-phase stator poles, respectively, merge together at a back yoke to establish a relation in which a sum total of the 3-phase AC magnetic fluxes is "0" as expressed by an equation: $\phi u + \phi v + \phi w = 0$. The conventional structure shown in FIGS. 71, 72 and 73 is a structure where two each of the salient poles 119, 120 and 121, i.e. six in total, shown in FIG. 8 are arranged along the same circumference, with each of the salient poles exerting the same electromagnetic effect and torque generation as in the brushless motor 150. However, unlike the brushless motor 150 shown in FIGS. 1 to 7, the conventional brushless motor shown in FIGS. 71 and 72 cannot be removed with portions of the winding or cannot have simplified winding for structural reasons.

Figure 9:
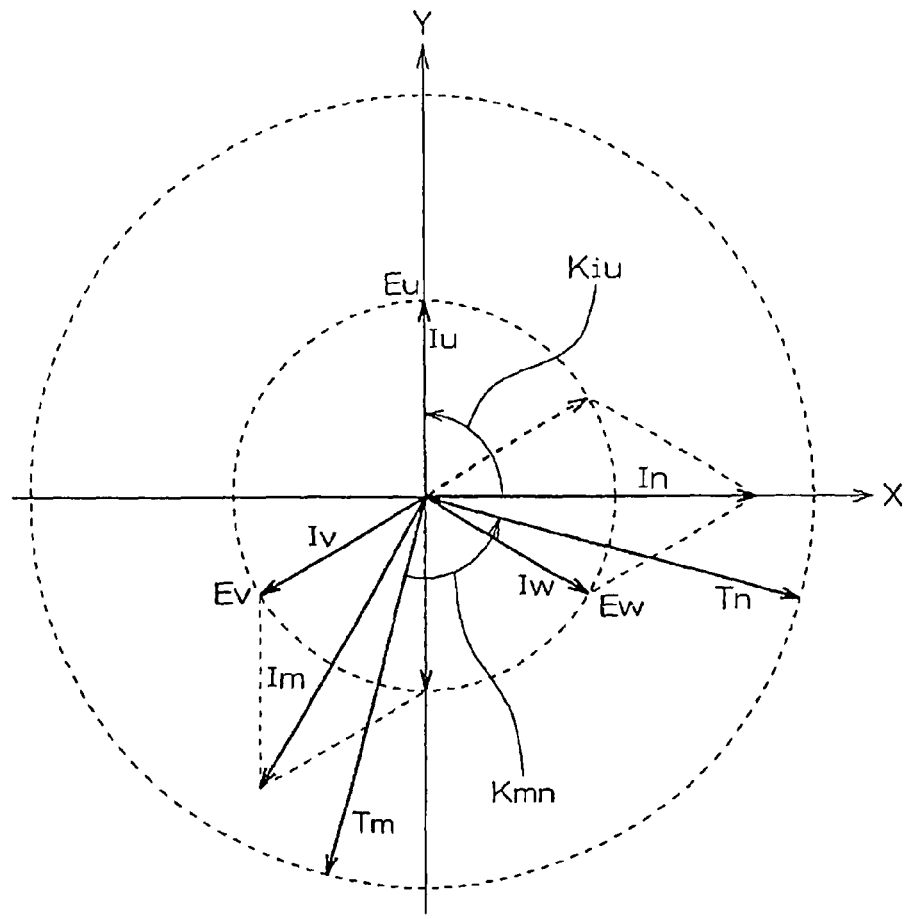
FIG. 9 is a vector diagram vectorially illustrating a relationship between the current, voltage and torque of the motor shown in FIG. 1.

The brushless motor 150 has the configuration as described above. The operation of the brushless motor 150 will now be explained. FIG. 9 is a vector diagram illustrating currents, voltages and output torque of the brushless motor 150. The X-axis corresponds to a real axis and the Y-axis corresponds to an imaginary axis. Counterclockwise angles with respect to the X-axis are vector phase angles.

The rotation angle rate of the fluxes $\phi u$, $\phi v$ and $\phi w$ that are present in the stator poles 119, 120 and 121 of the individual phases of the stator 114 are referred to herein as a "unit voltage", and thus relations are provided as $Eu = d\phi u/d\theta$, $Ev = d\phi v/d\theta$ and $Ew = d\phi w/d\theta$. The relative positions of the phase stator poles 119, 120 and 121 for the rotor 110 (permanent magnets 112) are shifted by 120° in electrical angle as shown in FIG. 4. Accordingly, as shown in FIG. 9, the unit voltages Eu, Ev and Ew induced by one turn of the phase windings 115 to 118 result in 3-phase AC voltages.

On condition that the rotor rotates at constant rotation $d\theta/dt = S1$, and the number of turns of the phase windings 115 to 118 are Wu, Wv and Ww with each of these values being equal to Wc, the induction voltages Vu, Vv and Vw of the windings 115 to 118 are expressed by the following Formulas. It should be appreciated that ignorance of flux components leaked from the stator poles may result in the number of flux linkages as being $Wu \times \phi u$ in the U-phase winding, $Wv \times \phi v$ in the V-phase winding and $Ww \times \phi w$ in the W-phase winding.

$$Vu = Wu \times (-d\phi u/dt) \quad (1)$$
$$= -Wu \times d\phi u/d\theta \times d\theta/dt$$
$$= -Wu \times Eu \times S1$$

Similarly, $$Vv = Wv \times Ev \times S1 \quad (2)$$

$$Vw = Ww \times Ew \times S1 \quad (3)$$

Particular relationship between the windings and the voltages are as follows. The unit voltage Eu of the U-phase is a voltage generated at one reverse turn of the U-phase winding 115 shown in FIGS. 1 and 6. The U-phase voltage Vu is a voltage generated in a reverse direction in the U-phase winding 115. The unit voltage Ev of the V-phase is a voltage generated across a serial connection of one turn of the V-phase winding 116 and one reverse turn of the V-phase winding 117. The V-phase voltage Vv is a voltage across a serial connection of the V-phase winding 116 and the reverse V-phase winding 117. The unit voltage Ew of the W-phase is a voltage generated at one turn of the W-phase winding 118 shown in FIGS. 1 and 6. The W-phase voltage Vw is a voltage generated in a reverse direction in the W-phase winding 118.

In order to efficiently generate torque in the brushless motor 150, the phase currents Iu, Iv and Iw are required to be fed to the same phases as the unit voltages Eu, Ev and Ew, respectively, of the phase windings. In FIG. 9, Iu, Iv and Iw are assumed to reside in the same phases as Eu, Ev and Ew, respectively, and the voltage vector and the current vector of the same phase are represented by a single vector arrow for simplification of the vector diagram.

An output power Pa and phase powers Pu, Pv and Pw of the brushless motor 150 are expressed by the following Formulas:

$$Pu = Vu \times (-Iu) = Wu \times Eu \times S1 \times Iu \quad (4)$$

$$Pv = Vv \times Iv = Wv \times Ev \times S1 \times Iv \quad (5)$$

$$Pw = Vw \times Iw = Ww \times Ew \times S1 \times Iw \quad (6)$$

$$Pa = Pu + Pv + Pw = Vu \times Iu + Vv \times Iv + Vw \times Iw \quad (7)$$

Further, an output torque Ta and phase torques Tu, Tv and Tw of the brushless motor 150 are expressed by the following Formulas:

$$Tu = Pu/S1 \quad (8)$$
$$= Wu \times Eu \times Iu$$

$$Tv = Pv/S1 \quad (9)$$
$$= Wv \times Ev \times Iv$$

$$Tw = Pw/S1 \quad (10)$$
$$= Ww \times Ew \times Iw$$

$$Ta = Tu + Tv + Tw \quad (11)$$
$$= Wu \times Eu \times Iu + Wv \times Ev \times Iv + Ww \times Ew \times Iw$$
$$= Wc \times (Eu \times Iu + Ev \times Iv + Ew \times Iw)$$

It should be appreciated that the vector diagram associated with the voltages, currents and torques of the brushless motor 150 according to the present embodiment is the same as the vector diagram associated with the conventional brushless motor shown in FIGS. 71, 72 and 73.

An explanation will now be given on an approach for modifying the phase windings and currents shown in FIGS. 1 and 6, which modification may attain higher efficiency. The U-phase winding 115 and the V-phase winding 116 are loop windings, which are adjacently arranged between the U-phase stator poles 119 and the V-phase stator poles 120. These windings can be combined into a single winding. Similarly, the V-phase winding 117 and the W-phase winding 118 are loop windings, which are adjacently arranged between the V-phase stator poles 120 and the W-phase stator poles 121. These windings can be combined into a single winding.

Figure 7:
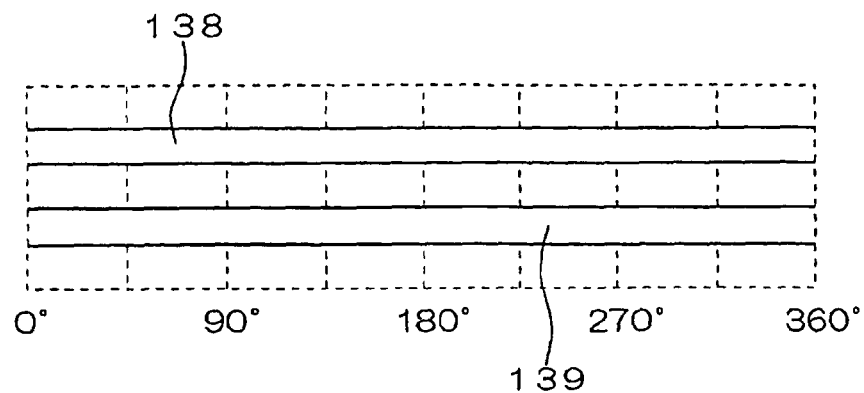
FIG. 7 illustrates the windings shown in FIG. 6 combined two by two.

FIG. 7 shows the modification in which two windings are combined into a single winding. As is apparent from the comparison between FIGS. 7 and 6, the U-phase winding 115 and the V-phase winding 116 are replaced by a single M-phase winding 138, and the V-phase winding 117 and the W-phase winding 118 are replaced by a single N-phase winding 139. The current (−Iu) of the U-phase winding 115 and the current (Iv) of the V-phase winding 116 are added to obtain an M-phase current Im (=−Iu+Iv) for passing through the M-phase winding 138. The condition of magnetic flux generated by the M-phase winding 138 results in the same as that of the magnetic flux obtained by combining the magnetic fluxes generated by the U- and V-phase windings 115 and 116, thereby attaining electromagnetic equivalence between these conditions. Similarly, the current (−Iv) of the V-phase winding 117 and the current (Iw) of the W-phase winding 118 are added to obtain an N-phase current In (=−Iv+Iw) for passing through the N-phase winding 139. The condition of magnetic flux generated by the N-phase winding 139 results in the same as that of the magnetic flux obtained by combining the magnetic fluxes generated by the V- and W-phase windings 117 and 118, thereby attaining electromagnetic equivalence between these conditions.

These conditions are reflected on FIG. 9. A unit voltage Em of the M-phase winding 138 and a unit voltage En of the N-phase winding 39 shown in FIG. 9 are expressed by the following Formulas:

$$Em = -Eu = -d\phi u/d\theta$$

$$En = Ew = d\phi w/d\theta$$

Further, vector calculations of voltage V, power P and torque T of the individual windings result in the following Formulas:

$$Vm = Wc \times Em \times S1 \quad (12)$$

$$Vn = Wc \times En \times S1 \quad (13)$$

$$Pm = Vm \times Im \quad (14)$$
$$= Wc \times (-Eu) \times S1 \times (-Iu + Iv)$$
$$= Wc \times Eu \times S1 \times (-Iu + Iv)$$

$$Pn = Vn \times In \quad (15)$$
$$= Wc \times Ew \times S1 \times (-Iv + Iw)$$

$$Pb = Pm + Pn \quad (16)$$
$$= Vu \times (-Iu + Iv) + Vw \times (-Iv + Iw)$$

$$Tm = Pm/S1 \quad (17)$$
$$= Wc \times (-Eu) \times (-Iu + Iv)$$

$$Tn = Pn/S1 \quad (18)$$
$$= Wc \times Ew \times (-Iv + Iw)$$

-continued $$Tb = Tm + Tn \quad (19)$$
$$= Wc \times ((-Eu \times Im) + Ew + In)$$
$$= Wc \times (-Eu \times (-Iu + Iv) + Ew \times (-Iv + Iw))$$
$$= Wc \times Eu \times Iu + Wc \times Iv \times (-Eu - Ew) + Wc \times Ew \times Iw$$
$$= Wc \times (Eu \times Iu + Ev \times Iv + Ew \times Iw) \quad (20)$$
$$\text{because, } Eu + Ev + Ew = 0 \quad (21)$$

The torque formula indicated by Formula (11) is expressed by three phases, while the torque formula indicated by Formula (19) is expressed by two phases. Although the expressions of these torque formulas are different, expansion of Formula (19) results in Formula (20). As can be seen, therefore, these Formulas are mathematically equivalent. In particular, in case the voltages Vu, Vv and Vw and the currents Iu, Iv and Iw are balanced 3-phase alternating currents, the torque Ta expressed by Formula (11) results in a steady value. In this case, the torque Tb expressed by Formula (19) is obtained as a sum of square function of the sine wave which is a phase difference, i.e. Kmn=90°, between Tm and Tn, and results in a steady value.

Formula (19) is an expression of a mode of a 2-phase AC motor, and Formulas (11) and (21) are expressions of modes of a 3-phase AC motor. These values are the same. However, in Formula (19), a copper loss is different between a case where the current Im for (−Iu+Iv) is supplied to the M-phase winding 138 and a case where the currents −Iu and Iv are supplied to the U- and V-phase windings 115 and 116, respectively, although there is no electromagnetic difference. As shown in the vector diagram of FIG. 9, a real axis component of the current Im is reduced to a value obtained by multiplying Im with cos 30°. Accordingly, supplying the current Im to the M-phase winding 138 may result in a copper loss of 75%, exerting an effect of reducing copper loss by 25%.

Hereinafter will be described a modification in the shapes of the poles in gap surfaces, associated with the configuration of the stator 114 of the motor shown in FIG. 1. The shapes of the poles of the stator 114 give significant influences on torque characteristics, and are closely related to cogging torque ripple, or torque ripple induced by supply current. A specific example will be described, in which shapes of the stator poles in the individual groups of stator poles are modified, so that a configuration and amplitude of each unit voltage, that is, a rotation change rate of the magnetic flux that resides in each group of stator poles may be substantially kept at a certain level and that a phase difference of 120° in electrical angle can be maintained.

Figure 10:
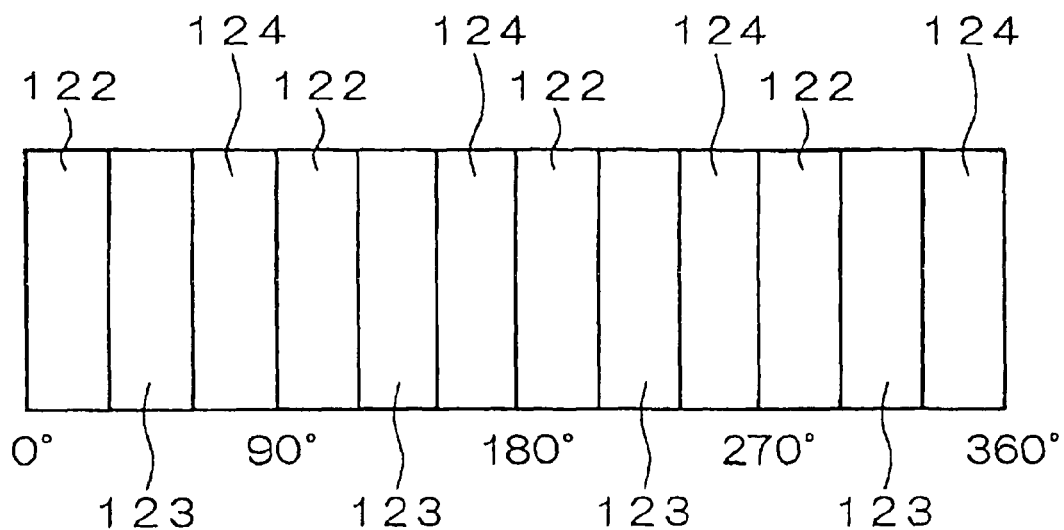
FIG. 10 illustrates a modification of the inner peripheral surface configuration of the stator poles of the motor shown in FIG. 1.

FIG. 10 is a circumferential development of modified stator poles. Stator poles 122, 123 and 124 of the individual phases shown in FIG. 4 have basic shapes, being arranged parallel to the rotor shaft 11. The stator poles in each phase have the same shapes and are arranged so as to have a relative phase difference of 120° in electrical angle. There is concern that use of the stator poles 122, 123 and 124 having such shapes may induce larger torque ripple. In this regard, formation of domed indents in a radial direction of the stator poles 122, 123 and 124 may allow smooth electromagnetic effects at border portions, by which torque ripple can be reduced. Alternatively, domed indents may be formed in individual pole surfaces of the permanent magnets 112 of the rotor 110 to realize a sinusoidal magnetic flux distribution in a circumferential direction, by which torque ripple can be reduced. The angles indicated by the horizontal axis of FIG. 10 are mechanical angle along the circumference, with one cycle that starts from the left end to the right end being 360°.

Figure 11:
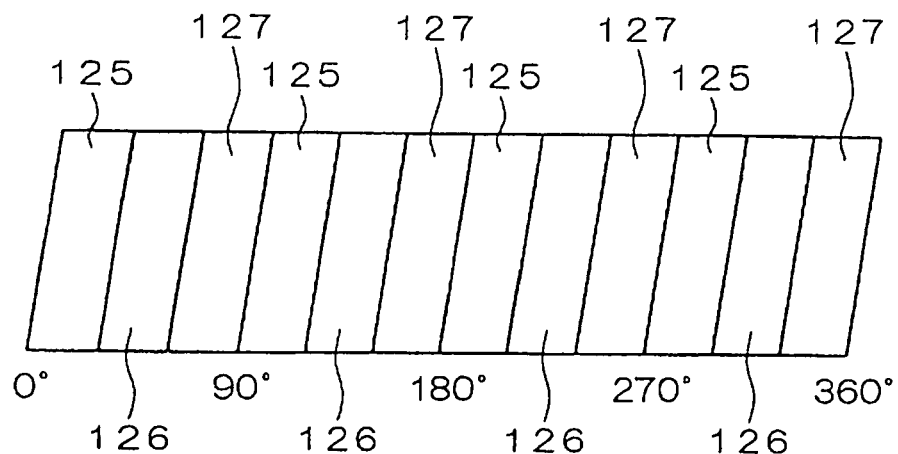
FIG. 11 illustrates a modification of the inner peripheral surface configuration of the stator poles of the motor shown in FIG. 1.

FIG. 11 is a circumferential development illustrating another modification of the stator poles. Stator poles 125, 126 and 127 of the individual phases shown in FIG. 11 are skewed by about 60° in electrical angle with respect to the basic shapes shown in FIG. 10 (circumferentially inclined by about 60° in electrical angle with respect to a direction parallel to the rotor shaft 111). This has an effect of reducing torque ripple. Further, since the widths of the stator poles 125, 126 and 127 of the individual phases are smaller than 180°, there is no reduction in the maximum magnetic fluxes passing through the stator poles 125, 126 and 127 of the individual phases, giving a feature that reduction of torque average value is small.

In case the shapes of the stator poles shown in FIGS. 10 and 11 are employed, air-gap surface configurations of the stator poles are realized by allowing ends of the stator poles of the individual phases to come out between the phase windings 115, 116, 117 and 118, and the air-gap portions along the axial direction of the rotor. This requires spaces for magnetic paths so that the ends of the stator poles can axially come out, raising a problem that an outer shape of the motor tends to be enlarged because of the necessity of ensuring the spaces.

Figure 12:
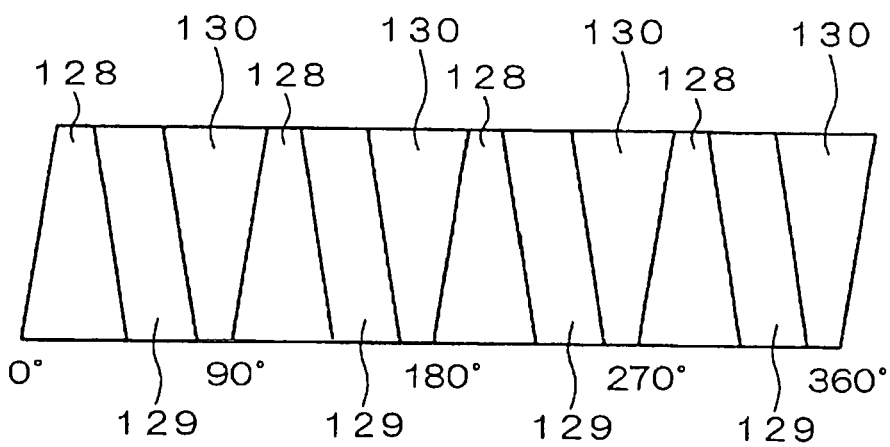
FIG. 12 illustrates a modification of the inner peripheral surface configuration of the stator poles of the motor shown in FIG. 1.

FIG. 12 is a circumferential development illustrating another modification of the stator poles, i.e. a modification of the stator pole shapes for mitigating the problem. FIG. 12 shows an example, in which, the shapes of the stator poles 128, 129 and 130 of the individual phases have been modified so that a phase difference of 120° in electrical angle is maintained, while the configurations and amplitudes of the unit voltages Eu, Ev and Ew of the individual phases are substantially the same, on condition that: the U-phase unit voltage corresponding to a rotation angle rate of the magnetic flux φu that resides in the U-phase stator pole 128 is Eu (=dφu/dθ); the V-phase unit voltage corresponding to a rotation angle rate of the magnetic flux φv that resides in the V-phase stator pole 129 is Ev (=dφv/dθ); and the W-phase unit voltage corresponding to a rotation angle rate of the magnetic flux φw that resides in the W-phase stator pole 130 is Ew (=dφw/dθ) in the stator 114. The shapes of these stator poles are characterized in that the length of each of the air-gap surfaces of the stator poles 128, 129 and 130 is mostly small for intermediate portions of individual teeth, i.e. the individual stator poles, so that the magnetic fluxes from the rotor 110 can easily pass the stator pole surfaces and the intermediate portions of the teeth and can further pass through magnetic paths toward the back yoke of the stator 114. Accordingly, comparing with the stator pole shapes shown in FIGS. 10 and 11, the stator pole shapes shown in FIG. 12 can reduce the spaces between the phase windings 115, 116, 117 and 118, and the air-gap portions. As a result, the outer shape of the brushless motor can be reduced.

Figure 13:
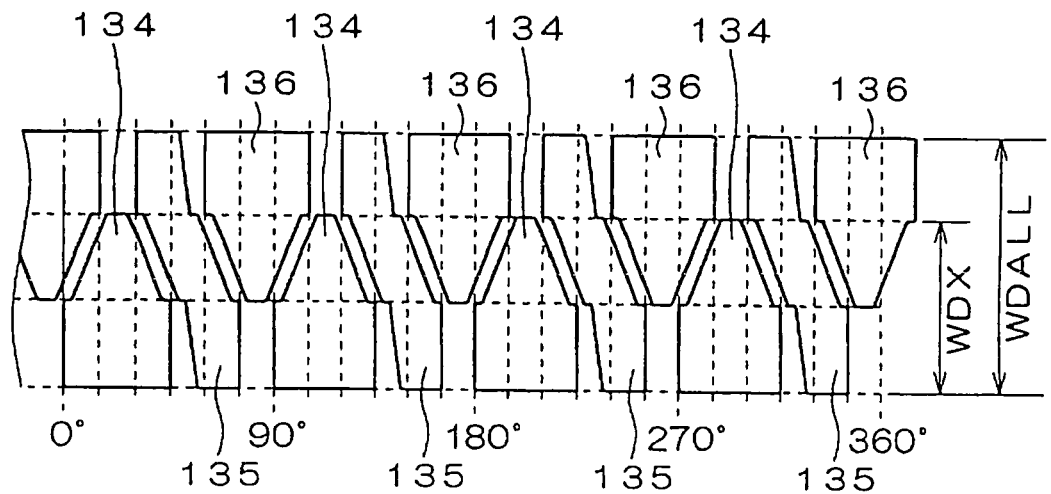
FIG. 13 illustrates a modification of the inner peripheral surface configuration of the stator poles of the motor shown in FIG. 1.

FIG. 13 is a circumferential development illustrating another modification of the stator poles, in which the stator pole shapes shown in FIG. 10 are further modified. In the example shown in FIG. 13, the U- and W-phase stator poles 134 and 136, respectively, at the axial ends of the rotor shaft 111 are circumferentially expanded in the pole width by 180° in electrical angle. The remaining space is distributed and located so as to balance the V-phase stator poles 135. As to the portions of the teeth of the U- and W-phase stator poles 134 and 136, respectively, whose surfaces are located far from the back yoke, end portions thereof are removed because these end portions are so thin that they are difficult to be fabricated. Indicated by numeral 135 are the V-phase stator poles. The rotation angle rates, i.e. the unit voltages Eu, Ev and Ew, at the surfaces of the stator poles of the individual phases having such shapes are modified so as to have the same value, although the phases are different. As a result, the shapes of these stator poles can allow for passage of comparatively large effective magnetic fluxes and can be comparatively easily fabricated.

A description will now be given on the detailed configuration and advantages of the motor according to the present embodiment, presenting the features of the present invention. This motor includes a configuration associated with a stator structure that presents features of the present invention, and a configuration for achieving effects peculiar to the combinations of this stator structure with the various rotors shown in FIGS. 14 to 19, 73 and 74. As shown in the vector diagrams at (a) to (f) of FIG. 20, the number of phases of this motor may be varied to realize 2-phase alternating current, 3-phase alternating current and multiphase alternating current having four phases or more to attain variation in the configuration. As to the number of poles of this motor as well, two to multipole are applicable. In particular, a larger number of poles may raise the rotation change rate of interlinked fluxes of the phase windings, by which large torque can be obtained. The 3-phase AC motor shown in FIG. 1 corresponds to a 3-phase AC motor represented by (b) of FIG. 20.

Figure 21:
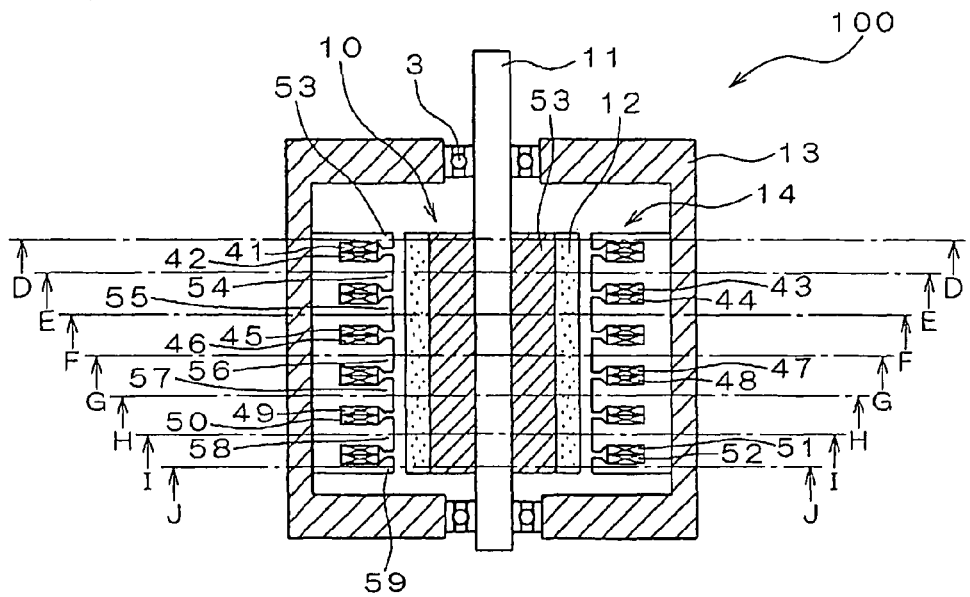
FIG. 21 illustrates a motor according to an embodiment provided with a 6-phase stator poles and 6-phase windings.
Figure 22:
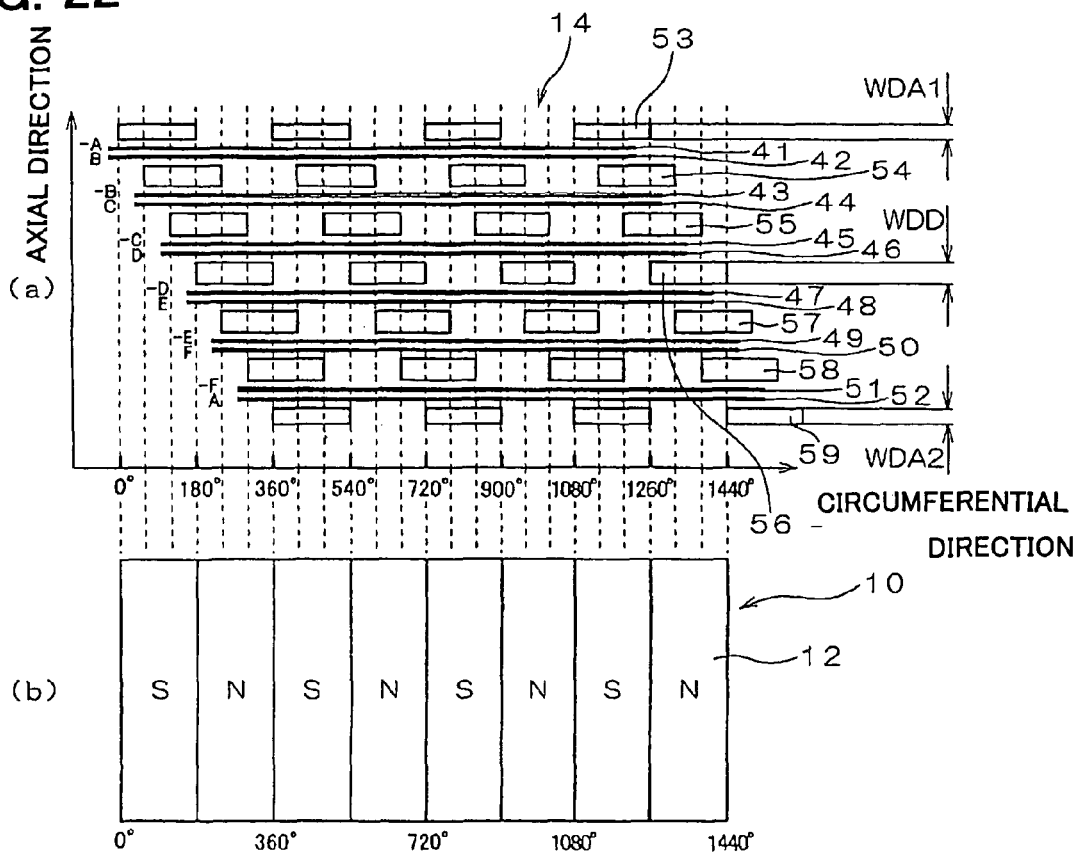
FIG. 22 illustrates an inner peripheral surface configuration of the stator shown in FIG. 21 linearly developed along the circumference with the loop windings being arranged therein, as well as an outer surface configuration thereunder of a rotor linearly developed along the circumference.

FIG. 21 is a vertical cross section of an 8-pole 6-phase motor according to an embodiment. FIG. 22 is a circumferential development of an inner surface of a stator and an outer surface of a rotor.

A motor 100 shown in FIG. 21 includes a rotor 10, a rotor shaft 11, permanent magnets 12 and a stator 14. The permanent magnets 12 are attached to an outer periphery of the rotor 10. Specifically, as shown by (a) of FIG. 22, N-poles and S-poles are alternately arranged along an outer peripheral surface of the rotor 10. The horizontal axis at (b) of FIG. 22 indicates positions of the rotor in the rotation direction, in which one cycle corresponds to 360°×4=1440° in electrical angle. As shown by (a) of FIG. 22, the stator 14 is provided, at an inner periphery thereof, with stator poles 53, 54, 55, 56, 57, 58 and 59 of first to sixth phases. The stator poles 53 and 59 located at the axial ends have the same polarity and both serve as stator poles for the first phase. Four stator poles of the same phase are arranged along the same circumference at a pitch of 360°. In this example, stator poles of the first to sixth phases are arranged so as to have a relative phase difference of 360°/6=60° in electrical angle, with a circumferential width of each stator pole being 180°.

Figure 23:
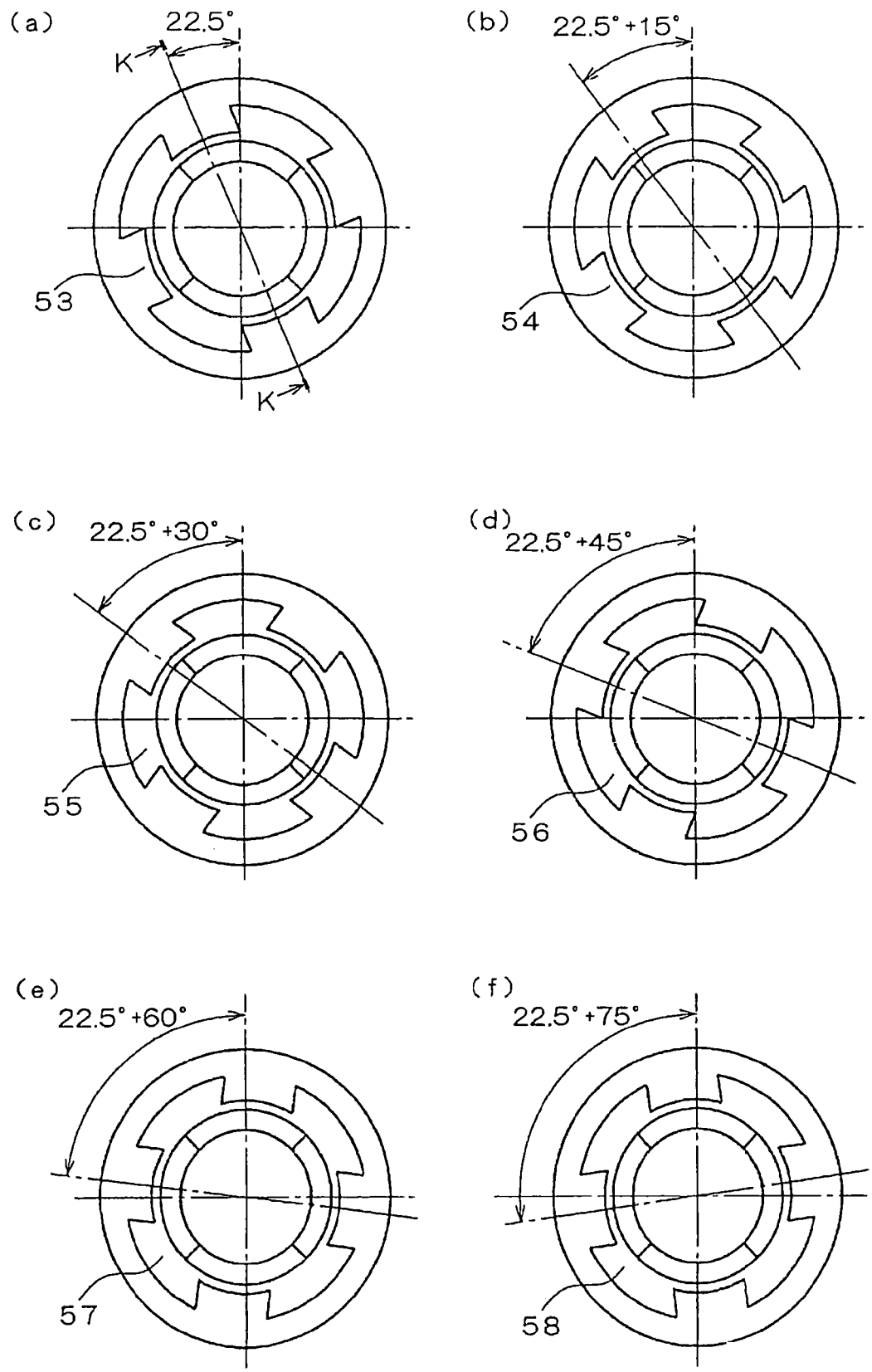
FIG. 23 is a transverse cross section illustrating portions of the motor shown in FIG. 21.

FIG. 23 illustrates various cross sections of the motor 100 shown in FIG. 21. A cross section taken along a line D-D and a line J-J is shown by (a) of FIG. 23, a cross section taken along a line E-E is shown by (b) of FIG. 23, a cross section taken along a line F-F is shown by (c) of FIG. 23, a cross section taken along a line G-G is shown by (d) of FIG. 23, a cross section taken along a line H-H is shown by (e) of FIG. 23 and a cross section taken along a line I-I is shown by (f) of FIG. 23. It should be appreciated that the cross sections taken along the lines D-D and J-J corresponding to the same phase stator poles 53 and 59, respectively, present the same configuration as shown by (a) of FIG. 23. It will be understood from FIG. 23, which reflects the arrangement of the stator poles shown in FIG. 22, that the circumferential positions of the stator poles are offset from each other by 60°.

As shown in FIG. 21 and as shown by (a) of FIG. 22, the stator 14 is provided with loop windings 41 to 52 centering the rotor shaft 11. The windings 41 and 42 are provided at a slot between the stator poles 53 and 54. Similarly, the windings 43 and 44 are provided at a slot between the stator poles 54 and 55. The windings 45 and 46 are provided at a slot between the stator poles 55 and 56. The windings 47 and 48 are provided at a slot between the stator poles 56 and 57. The windings 49 and 50 are provided at a slot between the stator poles 57 and 58. The windings 51 and 52 are provided at a slot between the stator poles 58 and 59. A linear development of the circumferential configuration of each winding corresponds to a configuration obtained by opening up the loop winding and thus can be linearly indicated as shown in FIG. 22. In case of a balanced 6-phase magnetic circuit configuration, the electromagnetic effect of the current in each winding can be considered to be exerted as described referring to FIG. 8. For example, a magnetomotive force can be considered to work on the stator pole 54 by imparting the same number of turns to the windings 42 and 43, both of which are adjacent to the stator pole 54, supplying current to the winding 42 as indicated by a vector B at (e) of FIG. 20, and passing reverse current to the winding 43 as shown by a vector −B. From the viewpoint of equivalency, winding direction of the winding 43 may be reverse of the winding 42 to establish connection, while supplying the same current B. As to other stator poles, the windings are arranged to attain the same relationship. The currents supplied to the respective windings 41 to 52 of FIG. 22 have current vectors as indicated at the left end in the figure, and are represented by the vectors shown by (e) of FIG. 20, being assigned with the same references. The stator poles 53 and 59 at the axial ends are a little special. Specifically, the air at both sides, which exerts large magnetic resistance, causes the currents passing through the windings 41 and 52 to exert magnetic effects to the respective stator poles 53 and 59 at the ends. When an axial width of each stator pole is WDD, the stator poles 53 and 59 that belong to the same phase are configured so that a sum of the respective axial widths WDA1 and WDA2 thereof will be equal to WDD. That is, if a relation WDD=WDA1+WDA2 is satisfied, the two stator poles 53 and 59 can exert an electromagnetic effect substantially equal to each of the stator poles of other phases that are axially and intermediately arranged in the stator 14. To sum up, the stator poles 53 and 59 correspond to a phase A, and the windings 52 and 41 are interlinked with the magnetic flux passing through these stator poles. Similarly, the stator poles 54 correspond to a phase B, and the windings 42 and 43 are interlinked with the magnetic flux passing through these stator poles. The stator poles 55 correspond to a phase C, and the windings 44 and 45 are interlinked with the magnetic flux passing through these stator poles. The stator poles 56 correspond to a phase D, and the windings 46 and 47 are interlinked with the magnetic flux passing through these stator poles. The stator poles 57 correspond to a phase E, and the windings 48 and 49 are interlinked with the magnetic flux passing through these stator poles. The stator poles 58 correspond to a phase F, and the windings 50 and 51 are interlinked with the magnetic flux passing through these stator poles. The stator poles 53 and 59 at the axial ends may be influenced by the wraparound of the fluxes leaked from around the individual stator poles. In a precise sense, the stator poles 53 and 59 may produce an error that cannot be caused in a simple model. Accordingly, correction in the shapes of the stator poles considering such an influence may reduce torque ripple much more, leading to realization of a higher precision motor.

Hereinafter will be described a particular example for supplying current to the motor 100. The rotor 10 is a surface magnet rotor and has eight poles. First windings, i.e. the windings 41 and 52, are oppositely connected in series. When a maximum value of a flux Φ1 interlinked with these windings is FLm and the circumferential distribution of the flux is sinusoidal, a rotation change rate E1 of the flux Φ1=FL×sin(θE) interlinked with the windings 41 and 52 can be expressed by the following Formula:

$$E1 = d(\Phi1)/d\theta \quad (22)$$
$$= d(FLm \times \sin(\theta E))/d\theta$$
$$= d(FLm \times \sin(\theta E))/d(\theta E) \times d(\theta E))/d\theta$$
$$= 4 \times MLm \times \cos(\theta E)$$

where "θ" is a rotational position of the rotor 10, "θE" is an electrical angle unit of the rotational position. In case of eight poles, θE=4×θ can be established. When the number of turns of each of the windings 41 and 52 is W1, a voltage V1 induced to the first-phase windings 41 and 52 can be expressed by the following Formulas:

$$V1 = W1 \times d(\Phi1)/dt \quad (23)$$
$$= W1 \times d(\Phi1)d\theta \times d\theta/dt \quad (24)$$
$$= 4 \times W1 \times FLm \times \cos(\theta E) \times d\theta/dt \quad (25)$$

Thus, Formula (25) indicates that torque can be efficiently generated when a supplied current is Ip×cos(θE) which is of the same phase as the rotation angle rate E1 of the interlinked flux Φ1. The "Ip" represents a current amplitude. It should be appreciated that the number of interlinked fluxes of the first-phase windings 41 and 52 is W1×Φ1, and the voltage V1 represents a time change rate of the number of interlinked fluxes.

The same applies to other phases. Specifically, two windings sandwiching and axially adjacent to each stator pole are oppositely wound and connected in series. Voltages induced to the individual windings establish the same relationship, although there is a phase difference of 60°. When an internal loss of the motor 100 is Ploss=0, "Pc" that is an input of the motor 100 and a mechanical output of the motor 100 can be obtained as a sum total of products of the voltage and current of each of the phases and can be expressed by the following Formula:

$$Pc = 4W1 \times FLm \times \cos(\theta E) \times d\theta/dt \times Ip \times \cos(\theta E) + \quad (26)$$
$$4W1 \times FLm \times \cos(\theta E - \pi/6) \times d\theta/dt \times Ip \times$$
$$\cos(\theta E - \pi/6) +$$
$$4W1 \times FLm \times \cos(\theta E - 2\pi/6) \times d\theta/dt \times Ip \times$$
$$\cos(\theta E - 2\pi/6) +$$
$$4W1 \times FLm \times \cos(\theta E - 3\pi/6) \times d\theta/dt \times Ip \times$$
$$\cos(\theta E - 3\pi/6) +$$
$$4W1 \times FLm \times \cos(\theta E - 4\pi/6) \times d\theta/dt \times Ip \times$$
$$\cos(\theta E - 5\pi/6)$$
$$= 4W1 \times FLm \times 6/2 \times d\theta/dt \times Ip$$
$$= 12W1 \times FLm \times Ip \times d\theta/dt$$

On the other hand, a mechanical output "Pmec" is a product of a torque "Tc" and a rotation angle frequency "dθ/dt", and thus the following Formula can be established:

$$Pmec = Tc \times d\theta/dt \quad (27)$$

Since the electromagnetic output Pc and the mechanical output Pmec of the motor 100 are equal, the torque Tc can be expressed by the following Formula (28) based on Formulas (26) and (27):

$$Tc = 12W1 \times FLm \times Ip \quad (28)$$

As a result, the torque Tc is in proportion to the number of poles, the number of turns W1 of each winding, the current Ip and the flux FLm interlinked with each phase winding. The torque ripple therefore may not be caused, in principle, if the fluxes interlinked with the phase windings are sinusoidally distributed with respect to the rotation angle. Practically, however, the interlinked fluxes Φ1 are not in sinusoidal distribution but may have a large number of harmonic components, and thus may contain cogging torque when the motor current is zero, or may contain torque ripple when current is supplied.

Modifications may be made in the number of turns W1, the current Ip and the flux FL interlinked with each winding if a product of them is the same between the phases. For example, a magnetomotive force generated by the current of each loop winding is a product of the number of turns and a current. Thus, if "ampere×number of turns" results in the same value, the same magnetomotive force can be generated between the individual windings. Therefore, for example, the number of turns may be reduced to one half and the current may be increased by a factor of two. In this case, the same electromagnetic effect can be attained. Alternatively, the pole width may be reduced by 20% to reduce the flux FL interlinked with the winding by 20%, while increasing the number of turns W1 or the current value Ip by 20%, so that the torque Tc remains unchanged. In this way, for the convenience of motor design, internal parameters of the motor 100 can be changed without changing the output characteristics of the motor 100.

FIGS. 21, 22 and 23 have shown an example of the motor 100 in which the axial arrangement of the stator poles of the individual phases is made in the order of the phases. The axial arrangement order of the stator poles however is not limited to the order of the phases but may be made in various ways. In particular, in case of using the surface magnet rotor shown in FIGS. 21 and 22, production of the magnetic flux at the rotor surface is chiefly dependent on the permanent magnets 12. Accordingly, the stator poles of the individual phases may be arranged in the order or vectors A, B, C, D, E and F as shown by (e) of FIG. 20, or may be arranged in other orders, e.g., in the order of vectors A, C, E, B, D and F, which may not bring about a large difference in the output torque of the motor 100. However, the relationship between the stator poles of each phase and the currents passing through the windings of the phase is required to be the same as the one shown in FIGS. 21 and 22. The axial arrangement of the stator poles can be selectively made depending on the conveniences, for example, of the arrangements of the stator poles and the windings, or depending on other factors, such as assemblage and facilitation of fabrication.

The current passed through each loop winding, which is so large as to significantly change the magnetic flux density of the permanent magnets 12, may form a strong interphase between the current amplitude Ip and the maximum value FLm of the flux interlinked with each phase winding, thereby varying the FLm. Thus, errors may become large for the characteristic values indicated by Formulas (22) to (28), whereby the order of the axial arrangement of the stator poles may finally influence the output torque of the motor 100.

The motor 100 shown in FIG. 21 is provided with the loop winding 41 and the like having a simple structure, and thus has a characteristic that there is no coil end unlike the motor of the conventional structure shown in FIGS. 71 to 74. If multipole structure is imparted to the motor of the conventional structure as shown in FIGS. 71 to 74, the number of poles is increased to increase the rotation change rate of the fluxes interlinked with the windings, but at the same time, the wire area is decreased in inverse proportion to the number of poles because the slot area is decreased. As a result, the increase in the number of the motor poles has been cancelled by the decrease in the amount of current per pole, and thus increase of torque has not been attained. However, since the stator 14 shown in FIG. 21 is provided with the loop winding 41 and the like, no winding (wire) is required to be arranged between the circumferentially arranged stator poles of the same phase. This may eliminate the necessity of reducing a diameter of each of the wires making up each winding even when a multipole structure is employed. Thus, in principle, the stator pole 14 has a characteristic that motor torque can be enhanced in proportion to the number of poles.

There may be a motor, which is structured by combining the rotor 10 as a type of rotor containing a good amount of soft magnetic material in the vicinity of the rotor surface as shown in FIG. 74 or FIGS. 14 to 19, instead of the surface magnet rotor, with the stator 14 shown in FIGS. 21 and 22. In such a motor, a strong interphase is formed between the current amplitude Ip and the magnetic flux interlinked with each phase winding. As a result, the output torque of the motor may be significantly influenced by the order of the axially arranged stator poles of the individual phases. This problem can be solved by axially arranging the stator poles of the individual phases in the order of the phases, which, at the same time, can serve as a scheme for raising the output torque of the motor.

Figure 24:
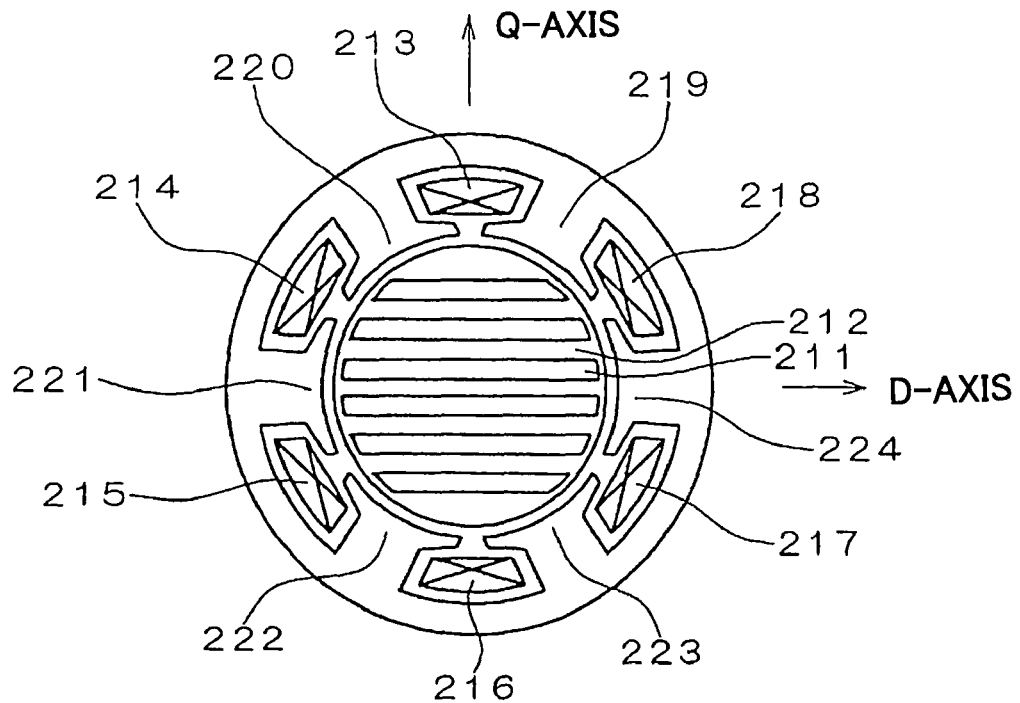
FIG. 24 is a transverse cross section illustrating a 3-phase 2-pole synchronous reluctance motor.
Figure 74:
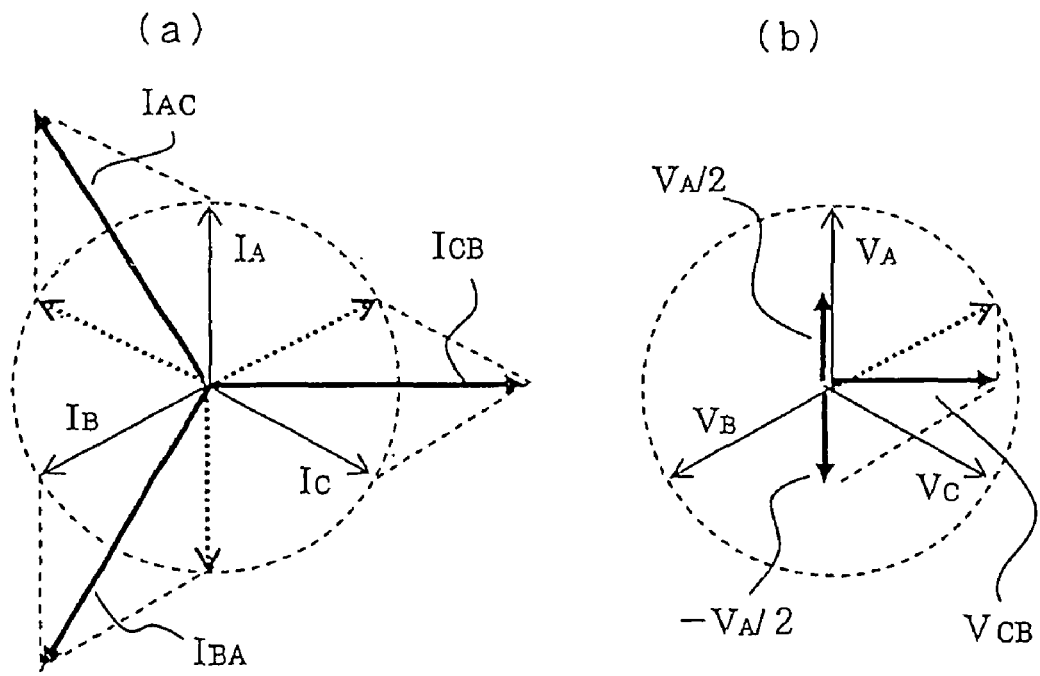
FIG. 74 vectorially illustrates electrical currents and voltages of FIG. 73.

The stator of a synchronous reluctance motor shown in FIG. 74 as a conventional example, is a quite typical 3-phase 4-pole 24-slot stator, which is also used as a stator of an induction motor. An electromagnetic effect exerted by the motor having a combination of such a stator and the rotor shown in FIG. 74 or FIGS. 14 to 19 can be mostly expressed by expressing the motor in terms of a d-q axis logic. To put it more clearly, a cross section of a 3-phase 2-pole 6-slot synchronous reluctance motor is shown in FIG. 24 as a typical model. In the figure, indicated by numeral 211 is a slit or a gap or a nonmagnetic material provided in the direction of the rotor poles, and by 212 is a narrow magnetic path sandwiched by the slits 211 and directing magnetic flux in the direction of the rotor poles. Generally, the direction of the rotor poles is referred to as a "d-axis", and the direction electromagnetically perpendicular to the d-axis is referred to as a "q-axis". Indicated by numerals 219 to 223 are stator teeth. In the present specification, these teeth are referred to as "stator poles" in a sense of imparting the individual teeth with a particular electromagnetic function. Indicated by numerals 213 and 216 are windings of a U-phase among the three phases, which are U-, V- and W-phases. The windings 213 and 216 are provided with full-pitch winding through coil end portions. A U-phase current Iu is supplied to the winding 213, and the winding 216 is supplied with a current of opposite direction. Similarly, a V-phase current Iv is supplied to a winding 215 and a current of opposite direction is supplied to a winding 218. A W-phase current Iw is supplied to a winding 217 and a current of opposite direction is supplied to a winding 214. Current components of each phase are subjected to vector decomposition to obtain d-axis components and q-axis components. Then, the d-axis components of each phase are added up to obtain d-axis current Id, and the q-axis components of each phase are added up to obtain q-axis current Iq. For example, in the state shown in FIG. 24, the current Iu passing through the windings 213 and 216 produces negative magnetic flux in a d-axis direction. Accordingly, the entire Iu is made up of the negative d-axis current components, with its value being −Iu. The current Iv passing through the windings 215 and 218 has an electromotive force directed to the d-axis direction at an angle of 60° to provide the d-axis current components expressed by 1/2×Iv and the q-axis current components expressed by −1.732/2×Iv. In the motor, an inductance in the d-axis direction is "Ld", and an inductance in the q-axis direction is "Lq".

Figure 25:
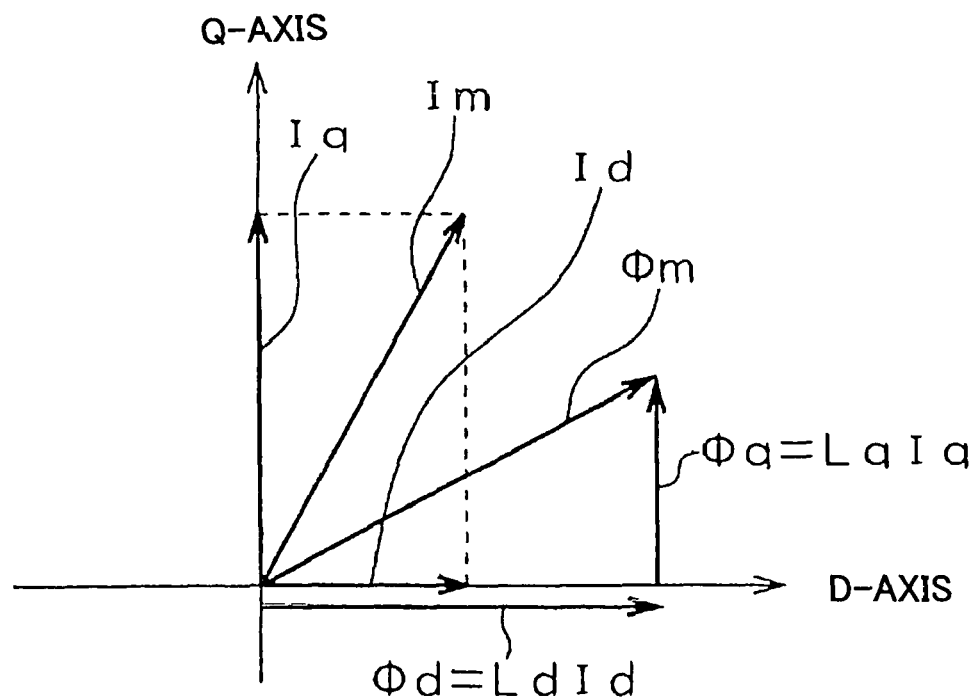
FIG. 25 is a vector diagram of electrical current and magnetic flux in d-q coordinates associated with the synchronous reluctance motor.

In such a configuration, FIG. 25 shows a vectorial relationship between the individual values in an example of controlling the phase currents with an appropriate supply of currents. A d-axis flux Φd induced in the d-axis direction by the d-axis current is Ld×Id, and q-axis flux Φq induced in the q-axis direction by the q-axis current is Lq×Iq. A flux Φm produced within the motor is a value obtained by a vectorial addition of the fluxes Φd and Φq. A torque "Tsyn" generated then is expressed by the following Formulas:

$$Tsyn = (Ld - Lq)Id \times Iq \qquad (29)$$
$$= \Phi d \times Iq - \Phi q \times Id \qquad (30)$$

In case of the surface magnet motor 100 shown in FIGS. 21 and 22, the magnetic fluxes of the individual stator poles are chiefly dependent on the permanent magnets 12 and can be expressed by Formulas (22) to (28). However, in case of the motor having a rotor structure as shown in FIG. 24 and containing a good amount of soft magnetic material in the rotor surface, it may be well understood that the magnetic flux of each stator pole greatly depends on each current supplied.

A description will now be given on a motor in which the rotor shown in FIG. 74 or FIGS. 14 to 19 is combined with the stator 14 shown in FIGS. 21 and 22. This motor, comparing with the motor model shown in FIGS. 24 and 25, has quite different configuration and structure. However, some electromagnetic characteristics are common. The following is a description on the comparison.

The stator 14 included in the motor 100 shown in FIGS. 21 and 22 has an 8-pole structure, and thus is provided with four stator poles which are circumferentially arranged in each phase. However, comparison is made with the stator shown in FIG. 24, assuming that only two poles are provided and thus that one stator pole is provided in each phase. As to the windings, a sum of the currents passing through the windings 41 and 42 of FIG. 22 corresponds to the current passing through the winding 213 of FIG. 24. Similarly, the windings 43 and 44 correspond to the winding 214, the windings 45 and 46 correspond to the winding 215, the windings 47 and 48 correspond to the winding 216, the windings 49 and 50 correspond to the winding 217, and the windings 51 and 52 correspond to the winding 218. As to the mode of the winding, the stator 14 of FIG. 21 has loop windings, while the stator of FIG. 24 is made up of axial windings and coil end portions, thus presenting a significant difference. As to the stator poles, the stator poles 59 and 53 of FIG. 22 correspond to a stator pole 219 of FIG. 24, the stator pole 54 corresponds to a stator pole 220, the stator pole 55 corresponds to a stator pole 221, the stator pole 56 corresponds to a stator pole 222, the stator pole 57 corresponds to a stator pole 223, and the stator pole 58 corresponds to a stator pole 224.

Each stator pole of FIG. 22 has such a shape with a circumferential width of 180° in electrical angle and a width in the direction of the rotor shaft 11 being about ⅙ of the axial width of the motor. Meanwhile, each stator pole of FIG. 24 has a circumferential width of about 60°, and a width in the direction of the rotor shaft is the same as the axial width of the motor. Thus, the shapes of both stator poles are structurally greatly different. However, the electromagnetic effects exerted by the whole motors are analogous to each other. Accordingly, vector diagram representing the motor made up of the rotor shown in FIG. 74 or FIGS. 14 to 19 and the stator 14 shown in FIG. 22 results in the one shown in FIG. 25, which is the same as that of the motor of FIG. 24.

For example, a 3-phase 8-pole synchronous reluctance motor can be provided by combining the 8-pole stator 14 of the motor 100 shown in FIG. 21 with the rotor shown in FIG. 24 of 8-pole version. In this case, when a supply of the U-phase current Iu in total to the windings 41 and 42 and a supply of current −Iu to the windings 47 and 48 can allow a magnetomotive force equivalent to the current Iu to work on the stator poles 54, 55 and 56 from, for example, an outer-diameter side to an inner-diameter side of the stator, a reverse magnetomotive force simultaneously works on the stator poles 57, 58, 59 and 53 from the inner-diameter side to the outer-diameter side of the stator. This relationship corresponds to a case where, when a supply of the U-phase current Iu to the U-phase windings 213 and 216 of FIG. 24 can allow a magnetomotive force to work on the stator poles 220, 221 and 222 from, for example, an outer-diameter side to an inner-diameter side of the stator, a reverse magnetomotive force simultaneously works on the stator poles 223, 224 and 219 from the inner-diameter side to the outer-diameter side of the stator. The currents of other windings of FIG. 21 function in the similar fashion and exert the electromagnetic effect similar to that of the motor shown in FIG. 24. A lot of differences can be found from a structural viewpoint. For example: the magnetomotive force and the magnetic flux of the motor shown in FIG. 24 are provided in the circumferential and radial directions, while in the motor shown in FIG. 21, they also work in the direction of the rotor shaft; the stator poles of different phases in FIG. 24 are arranged in the circumferential direction, while in FIG. 21, they are arranged in the direction of the rotor shaft; the windings 41 and the like of FIG. 21 have a looped shape; and the windings of different phases in FIG. 24 are arranged in the circumferential direction in the order of the phases, while the windings of different phases in FIG. 21 are arranged in the direction of the rotor shaft in the order of the phases.

In this way, the motor 100 of FIGS. 21 and 22 is so configured that the stator poles having different phases in the rotation direction are arranged in the direction of the rotor shaft in the order of the phases, the loop windings are provided at the respective slots at the axial gaps of the stator poles, and currents are supplied to the respective windings in synchronization with the phases in the rotation direction. The motor having the above configuration functions such that: the components of the d-axis current Id for chiefly producing field magnetic flux and the components of the q-axis current Iq for chiefly producing torque can be produced; the effects indicated in the vector diagram of FIG. 25 can be realized; the motor field magnetic flux Φm can be efficiently produced as need arises; and the torque expressed by Formulas (29) and (30) can be obtained. It should be appreciated that various modifications can be made in the shapes of the stator pole 53 and the like and the modes of the windings shown in FIG. 21. (This will be described later.)

Figure 26:
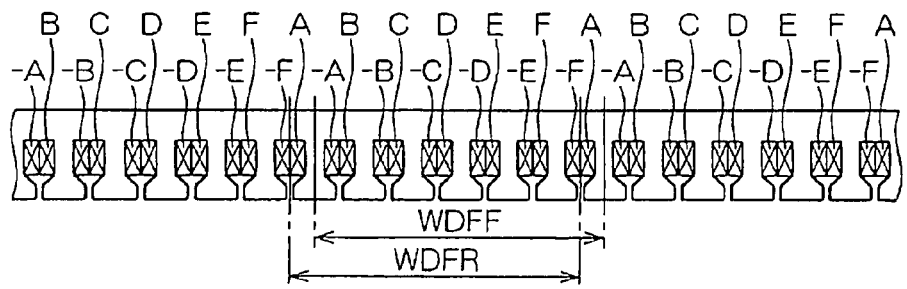
FIG. 26 is a vertical cross section illustrating an axially infinitely long stator with 6-phase loop windings in a motor model.

FIG. 26 is a vertical cross section illustrating an infinitely long stator in the direction of the rotor shaft. The horizontal direction of the drawing sheet corresponds to the direction of the rotor shaft, and the vertical direction of the drawing sheet corresponds to the radial direction (radial direction perpendicular to the rotor shaft). The stator poles of the individual phases, as well as the slots and the windings are axially and repeatedly arranged involving the phase relation as indicated by A, B, C, D, E and F at (e) of FIG. 20. The stator 14 of the motor 100 shown in FIG. 21 can be regarded as a set of WDFF that has been cut off from the stator shown in FIG. 26. A width of the WDFF corresponds to one electromagnetic cycle. In light of this idea, it may be readily conceived that, unless the width of one cycle is changed, a differently cut off one set, such as a set of WDFR, may exert the similar electromagnetic effect.

Figure 27:
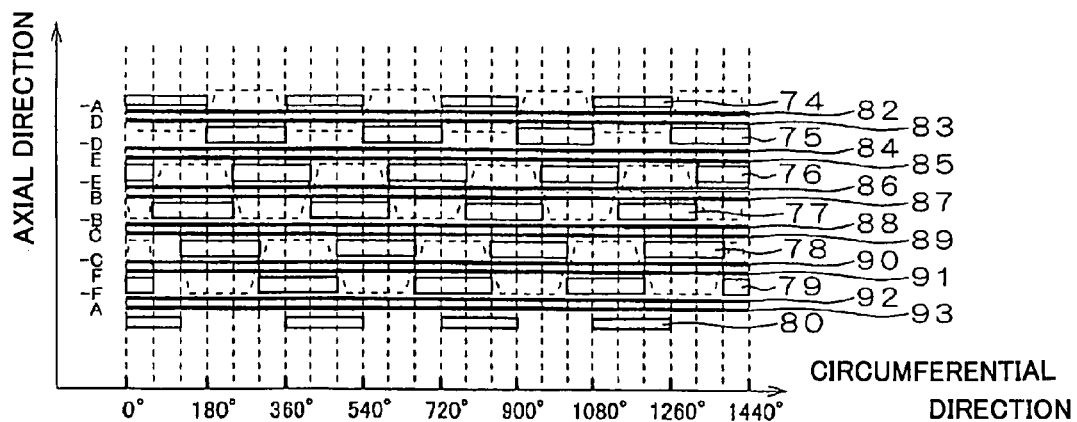
FIG. 27 illustrates an example of an inner peripheral surface configuration of a stator linearly developed along the circumference with loop windings being arranged therein.

Hereinafter will be described an example of the arrangement/structure and configuration of the stator poles. FIG. 27 illustrates an example of a configuration in which each stator pole is axially and adjacently provided with a reverse-phase stator pole. The figure illustrates an inner peripheral surface of the stator linearly developed in the circumferential direction. Each of sets of adjacent stator poles 74 and 75, 76 and 77, and 78 and 79 is imparted with a phase difference of 180° in electrical angle. Current vectors associated with the current supply to loop windings 82 to 93 are indicated at the left end as current vectors −A to A. The relationship between the stator poles and the currents shown in FIG. 22 is maintained.

In the stator of FIG. 27, the adjacent stator poles are imparted with the phase difference of 180° therebetween. Accordingly, in the vicinity of a boundary plane between the stator and the rotor, an area of each of the stator poles facing the rotor can be enlarged by allowing ends of the stator poles to mutually project toward the direction of the rotor shaft.

Figure 28:
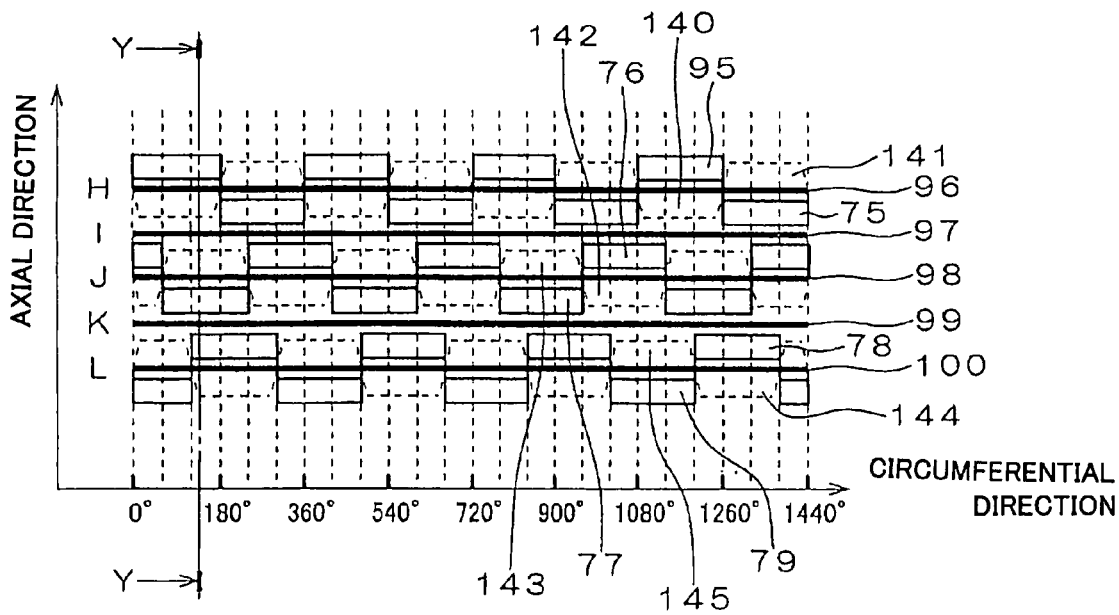
FIG. 28 illustrates an example of an inner peripheral surface configuration of a stator linearly developed along the circumference with loop windings being arranged therein.
Figure 29:
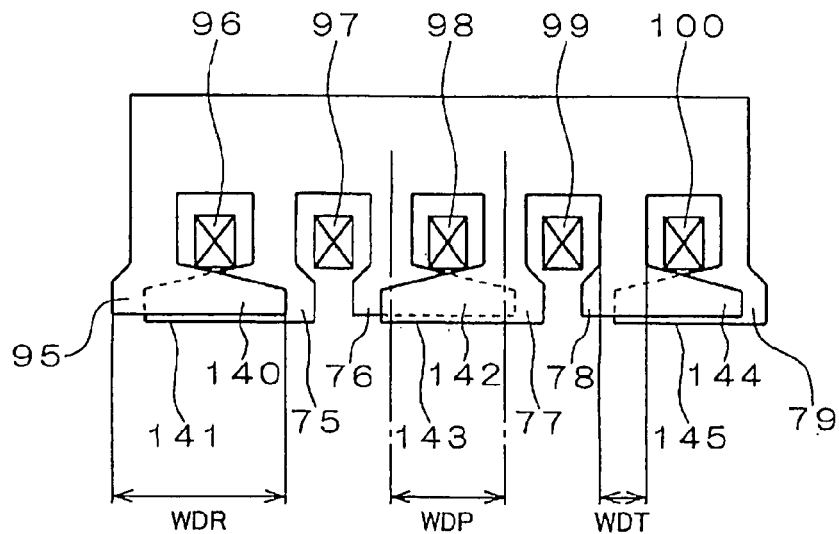
FIG. 29 is a vertical cross section illustrating a portion of the stator shown in FIG. 28.

FIG. 28 illustrates a stator which has been obtained by modifying the windings and the stator poles at both ends of the stator shown in FIG. 27. Other portions of this stator are the same as the stator shown in FIG. 27. FIG. 29 is a cross section taken along a line Y-Y of FIG. 28. Taking, as an example, the stator poles 76 and 77 common between FIGS. 27 and 28, it may be understood that an end 142 of the stator pole 76 shown in FIG. 29 is projected toward the stator pole 77. Similarly, an end 143 of the stator pole 77 is projected toward the stator pole 76. In FIG. 27, the projected portion at the end of each stator pole is indicated by a broken line. The phase difference of 180° in electrical angle between the stator poles 76 and 77 allows these stator poles to be alternately combined to provide a configuration that can avoid interference therebetween. In this way, the enlargement of the area of the stator poles facing the rotor may enable interlinkage of much more fluxes with the windings of the individual phases, leading to generation of larger torque.

In the structure shown in FIG. 27, simplification of the stator poles and the loop windings is possible by modifying them as shown in FIG. 28. In particular, the stator pole 80 shown in FIG. 27 can be displaced to a position adjacent to the stator pole 74 while maintaining an electromagnetically equivalent state. The loop windings 82 and 83 can be changed to a single loop winding 96 on condition that currents to be supplied to both of the windings are arithmetically added and supplied to the single loop winding. Similarly, the windings 84 and 85 can be changed to a winding 97, the windings 86 and 87 to a winding 98, the windings 88 and 89 to a winding 99, and the windings 90 and 91 to a winding 100. The windings 92 and 93, being located outside a stator core due to the displacement of the stator pole 80, barely make an electromagnetic contribution to the generation of torque, and thus can be removed. As a result of these changes, the stator shown in FIG. 27 can be modified to the stator shown in FIG. 28 while maintaining an electromagnetically equivalent state.

In the shape of the cross section taken along the Y-Y line of the stator shown in FIG. 28, the stator poles whose phases are reversed with each other mutually penetrate into the ends of the stator poles as shown in FIG. 29. Accordingly, an axial length WDR of each stator can be increased so that much more magnetic fluxes of the rotor can be supplied to the side of the stator poles and thus much more magnetic fluxes can be interlinked with the windings to thereby increase torque. When a thickness of each stator pole at its base along the rotor shaft is WDT and a distance between the stator poles is WDP, the length WDR of each stator pole at its base along the rotor shaft is larger than WDP. The length WDR can be increased up to nearly twice as large as WDP.

Figure 30:
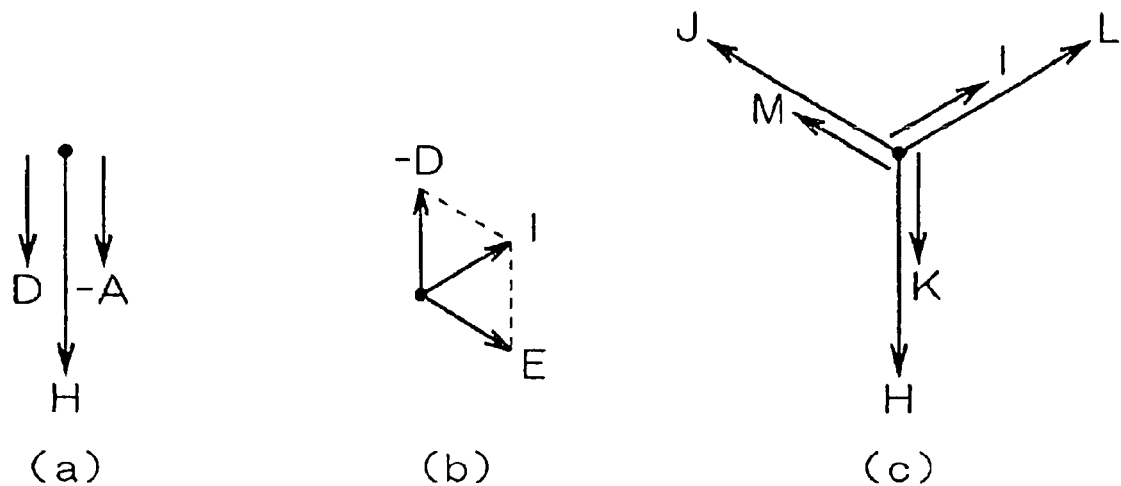
FIG. 30 illustrates vector diagrams of the electrical currents in the windings shown in FIGS. 27 and 28.

Hereinafter will be described currents to be passed through the loop windings of the stators shown in FIGS. 27 and 28. The windings of the stator shown in FIG. 27 can pass currents represented by the current victors shown by (e) of FIG. 20. For example, a current which is of reverse phase of a current vector A, i.e. −A-phase current, is supplied to the winding 82, a current represented by a current vector D is supplied to the winding 83. These currents are current vectors D and −A shown by (a) of FIG. 30, and an additional value thereof is indicated by a current vector H. The current vector H has the same phase as the current A and amplitude twice as large as the current A, and this current is supplied to the winding 96 shown in FIG. 28. A current having a −D-phase current vector is supplied to the winding 84, and a current having a current vector E is supplied to the winding 85. These currents are current vectors −D and E shown by (b) of FIG. 30, and an additional value thereof is indicated by a current vector I. The current vector I has a phase which is intermediate between the current vectors −D and E with its amplitude being the same, and this current is supplied to the winding 97 shown in FIG. 28. Similarly, currents having current vectors J, K and L shown by (c) of FIG. 30 are supplied to the windings 98, 99 and 100, respectively. The current vectors of the currents to be supplied are indicated at the left end of the windings. Since the amplitude of the currents supplied to the respective windings of FIG. 28 is different between the windings, a diameter of each of the windings is determined according to a value of the current, so that individual parts, such as the stator poles, may have proper dimensions.

A description is now provided on a method for arranging the stator poles of the stator shown in FIG. 28 along the rotor shaft. The method introduced here is how to provide pairs of stator poles SMP1, SMP2 and SMP3 so that adjacent pairs of the stator poles can mutually have a phase difference of 180° in electrical angle. In particular, the method for the relative arrangement of the stator pole pairs SMP1, SMP2 and SMP3 in the rotor shaft direction involves providing stator pole pairs in such a way that adjacent stator poles will have the closest phases. In this case, current passing through the loop winding disposed between two pairs of stator poles can be reduced, which can resultantly reduce motor loss to thereby enhance motor efficiency.

Specifically, in FIG. 28, when the stator pole pair SMP1 is formed by the stator poles 95 and 75, the stator pole pair SMP2 by the stator poles 76 and 77, and the stator pole pair SMP3 by the stator poles 78 and 79, stator poles adjacently located between the stator pole pairs SMP1 and SMP2 are the stator poles 75 and 76. A circumferential phase difference between the stator poles 75 and 76 is 60°, the minimum phase difference for 6-phase alternating current. As a result, as shown by (b) of FIG. 30, the current passing through the winding 97 disposed between these two pairs of stator poles will have the current vector I, a small current, that is the additional value of the current vectors −D and E. As shown by (e) of FIG. 20, since the combination of the current vectors −D and E has the largest phase difference except for the combination of reverse phases, the amplitude of the current vector I may have small amplitude.

Figure 31:
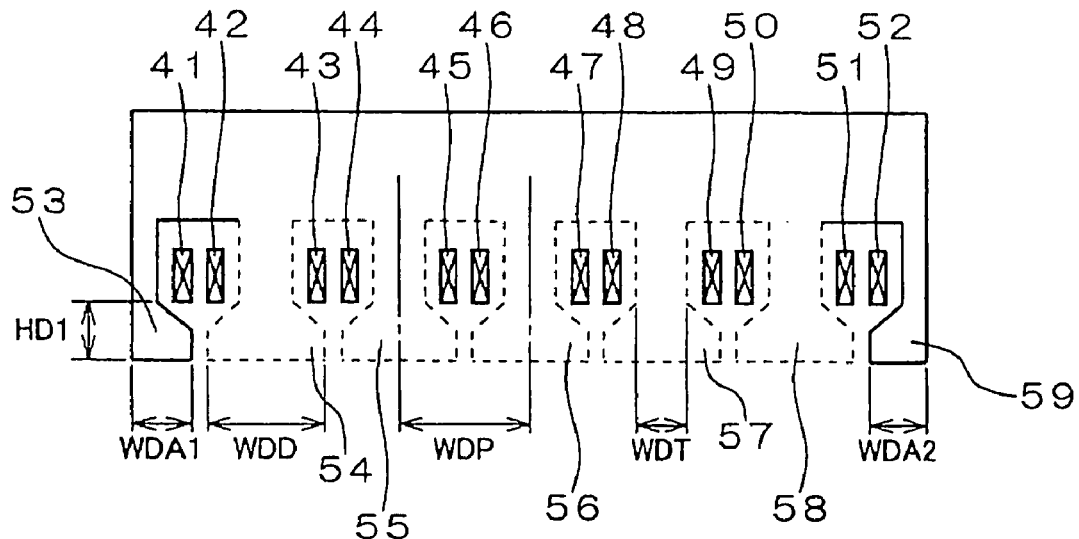
FIG. 31 is an enlarged view of the stator core and the windings in the motor shown in FIG. 21.

A description is now provided on a configuration of the stator poles of the stator 14 shown in FIGS. 21 and 22 and a modification thereof. FIG. 31 is an enlarged view of the stator core and the windings taken out of the vertical cross section of the motor 100 illustrated in FIG. 21. The horizontal direction corresponds to the rotor shaft direction and the vertical direction corresponds to the radial direction of the motor 100. Indicated by WDP is a distance between the centers of adjacent stator poles, that is, a distance between stator poles. Indicated by WDD is an axial width of a stator pole facing an air-gap portion between the stator and the rotor. A larger WDD can make larger the maximum interlinked flux FLm mentioned above to attain larger torque. Indicated by WDT is a width of a stator pole at a base thereof along the rotor shaft direction.

The stator poles 53 and 59 at both ends have the same phase from the viewpoint of electrical angle, with respect to the poles of the rotor 10. Also, there is a relationship that an electromotive force of the current vector A is applied to both of the stator poles 53 and 59 in the same direction. There is another relationship that the total function of these two stator poles 53 and 59 correspond to the function of a single phase. Accordingly, the stator poles 53 and 59 have shapes that satisfy a relation WDD=WDA1+WDA2, where WDA1 and WDA2 are widths of the stator poles 53 and 59, respectively. Thus, an arrangement is so made that the maximum interlinked flux FLm of the first phase may be equal to the maximum interlinked flux FLm of each of other phases that are located intermediately.

Contrary to the infinitely long stator model shown in FIG. 26, the stator model shown in FIG. 31 can be regarded as a model which has been cut off by one cycle of the width WDFF. In light of this idea, it may be readily conceived that, unless the width of one cycle is changed, a differently cut off one set, such as a set of the WDFR, may exert the similar electromagnetic effect. As a result, the relation WDD=WDA1+WDA2 is established.

Further, a relation expressed by WDA2=0 and WDA1=WDD may be established. This means that the stator pole 59 has been removed to reduce the number of the stator poles from seven to six, by which the motor configuration can be simplified. In terms of the infinitely long stator shown in FIG. 26, this configuration is represented by the section WDFR.

Figure 20:
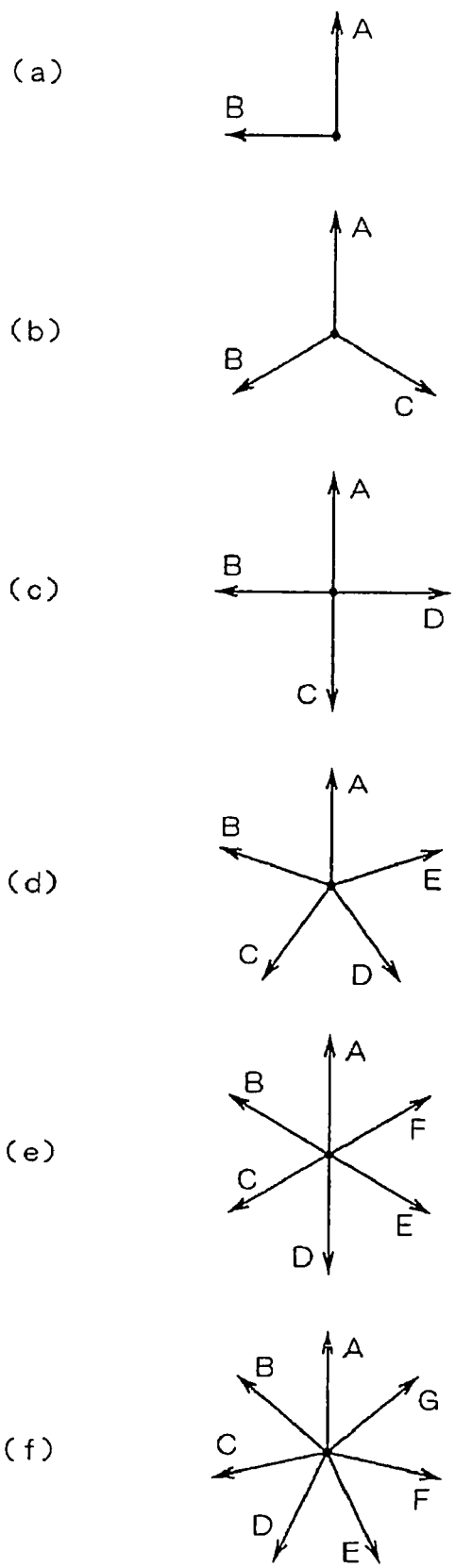
FIG. 20 illustrates 2-, 3-, 4-, 5-, 6- and 7-phase vectors.
Figure 32:
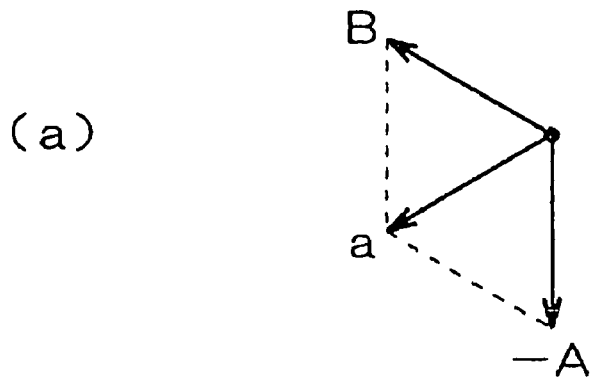
FIG. 32 illustrates combinations of vectors.
Figure 32:
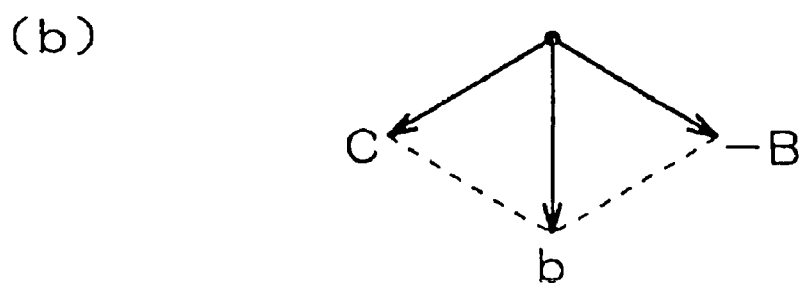
Figure 33:
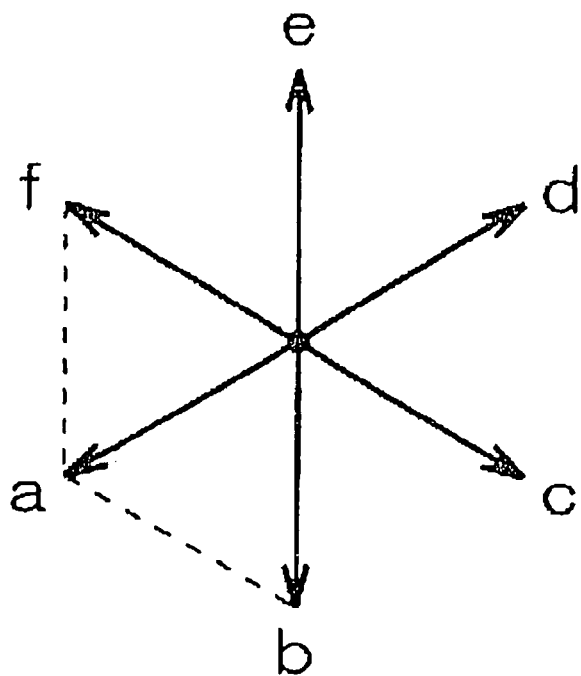
FIG. 33 illustrates 6-phase vectors made up of combined vectors.
Figure 34:
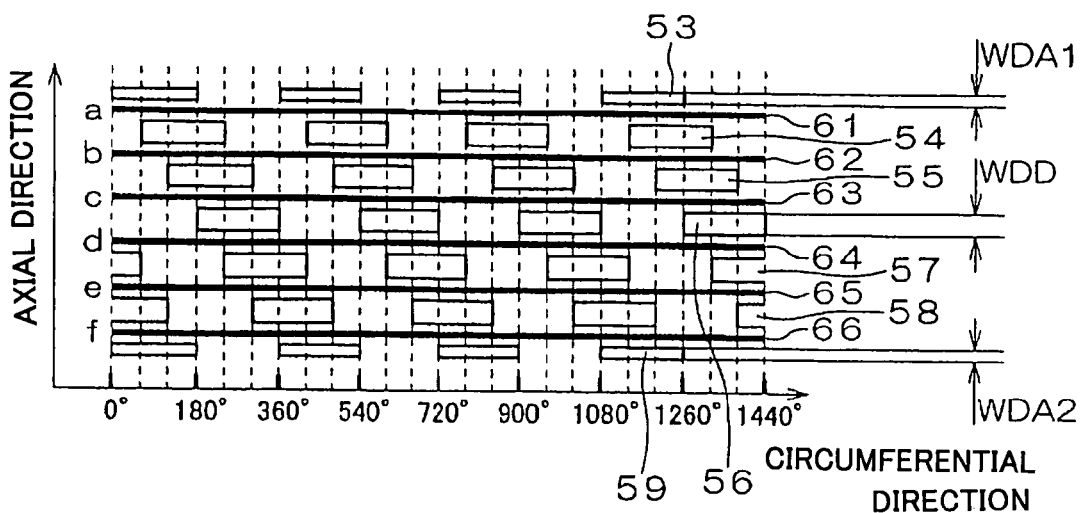
FIG. 34 illustrates an example of an inner peripheral surface configuration of a stator linearly developed along the circumference with loop windings being arranged therein.

A method for modifying the windings of the stator shown in FIGS. 21 and 22 will be described below. As shown in FIG. 22, two sets of windings are disposed at each slot. For example, as indicated at the left end, the −A current indicated at (e) of FIG. 20 is supplied to the winding 41, and the current B indicated at (e) of FIG. 20 is supplied to the winding 42. A sum of these currents is equivalent to a current "a" as shown by (a) of FIG. 32. Similarly, the −B current indicated at (e) of FIG. 20 is supplied to the winding 43, and the current C indicated at (e) of FIG. 20 is supplied to the winding 44. A sum of these currents is equivalent to a current "b" as shown by (b) of FIG. 32. The same is applicable to other slots. Consequently, the individual slots may be supplied with currents "a", "b", "c", "d", "e" and "f" shown in FIG. 33. As shown in FIG. 34, combined one set of windings may only be provided to each slot, with the number of turns being the same as that in each loop winding shown in FIG. 22. As a result, the number of turns in the same slot shown in FIG. 34 may be one half of the slot shown in FIG. 22. Thus, a cross sectional area, or a size, of the winding can be enlarged by a factor of about two while the amplitude of currents is the same as shown in FIG. 32, thereby reducing the current in the slot to one half. Accordingly, copper loss is reduced to one fourth. It should be appreciated that, where the number of phases of the stator is not six, the reduction rate may be changed.

As to the phases of supplied currents, there is a large difference between the stator of FIGS. 21 and 22 and the stator of FIG. 34. As indicated by Formulas (22) to (28), currents to be supplied to the windings 41 to 52 of FIG. 22, or, for example, currents to be supplied to the windings 42 and 43 are the ones substantially synchronized with the rotation change rate of the magnetic flux passing through the stator pole 54 and each have the current vector B shown by (e) of FIG. 20. On the other hand, in case of FIG. 34, as indicated by "a", "b", "c", "d", "e" and "f" in FIGS. 22 and 23, there is a phase difference of 120° in electrical angle.

Figure 35:
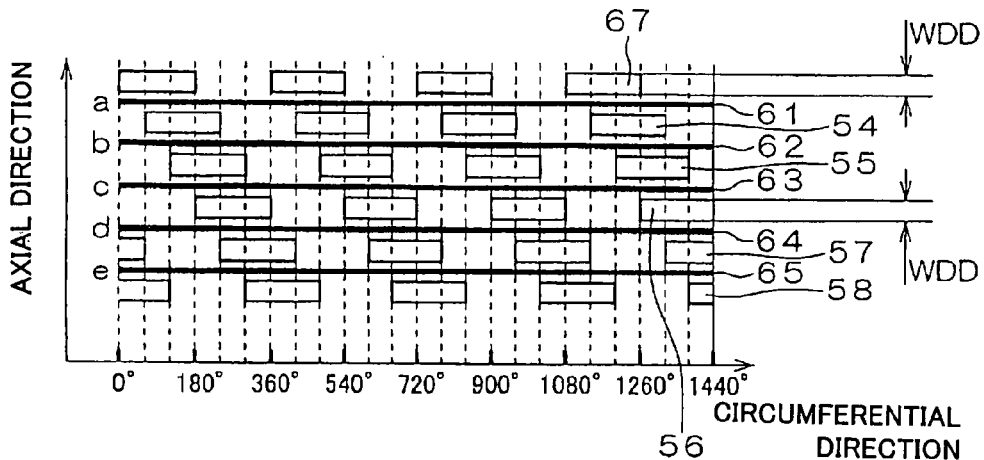
FIG. 35 illustrates an example of an inner peripheral surface configuration of a stator linearly developed along the circumference with loop windings being arranged therein.

The stator poles 53 and 59 shown in FIG. 34 can be combined, for replacement, into a stator pole 67 shown in FIG. 35. In this case, a winding 66 is located outside the stator core. Since the ambient air has a large magnetic resistance, the winding 66 can only exerts substantially very small electromagnetic effect on the motor, and thus can be removed. Consequently, as shown in FIG. 35, the stator can be structured by six sets of stator poles, the number being the same as that of the phases, and five sets of windings, the number being smaller by one than that of the phases. In this case as well, the internal wire connection may be provided in such a way that driving can be achieved by imparting the motor with 3-phase AC voltage and current. Therefore, the motor shown in FIG. 21 or 35 may also be externally regarded as being a 3-phase AC motor.

Removal of the winding 66 does not cause any problem as far as torque generation is concerned, but can cause a magnetomotive force along the rotor shaft. This may raise a problem that the powder of the soft magnetic material attaches to the rotor shaft, or electromagnetic influence is caused in the vicinity of the motor. Therefore, in a use that may raise a problem of magnetomotive force in the vicinity of the motor, some measures have to be taken. For example, the winding 66 may be left without being removed, or the motor shaft may be made of a nonmagnetic material.

Figure 36:
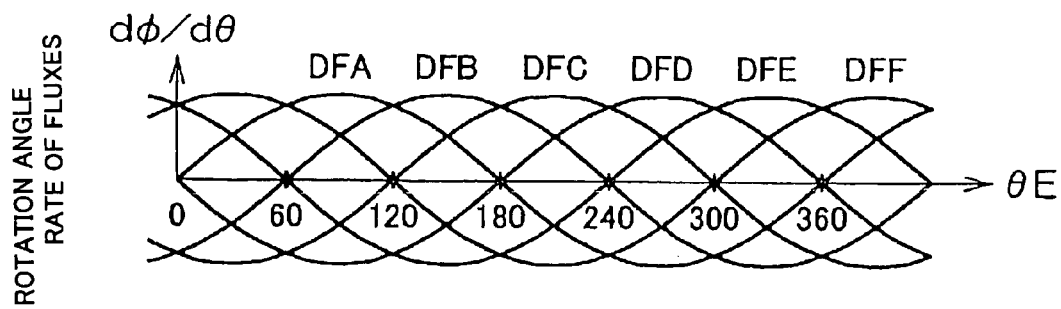
FIG. 36 illustrates an example of a rotation rate of the magnetic fluxes passing through stator poles.

Hereinafter are described a configuration of the stator poles facing the air-gap portion between the stator and the rotor, and interlinked fluxes of the individual phases. As described above, FIG. 22 shows by (a) an example of a linearly developed circumferential configuration of the ends of the stator poles facing the air-gap portion between the stator 14 and the rotor 10, for the motor 100 shown in FIG. 21. A shape of each of the stator poles 54 to 58, which is placed at the inner-diameter side of the stator, is actually a circular arc. However, since the stator poles shown by (a) of FIG. 22 are linearly developed in the circumferential direction, each of them has a rectangular shape. Study is made herein on the rotation angle rate of the flux passing through each stator pole in the case where the rotor 10 is of a surface magnet type and has a circular outer peripheral shape as shown in FIG. 21 and by (b) of FIG. 22. Indicated by FA is a magnetic flux passing through the stator poles 53 and 59, by DFA is its rotation angle rate, by FB is a magnetic flux passing through the stator pole 54, by DFB is its rotation angle rate, by FC is a magnetic flux passing through the stator pole 55, by DFC is its rotation angle rate, by FD is a magnetic flux passing through the stator pole 56, by DFD is its rotation angle rate, by FE is a magnetic flux passing through the stator pole 57, by DFE is its rotation angle rate, by FF is a magnetic flux passing through the stator pole 58, and by DFF is its rotation angle rate. In case of an ideal 6-phase AC motor, a rotation change rate of the flux of each stator pole, i.e. components of the voltage generated in the winding, may preferably have a sinusoidal waveform characteristic, as shown in FIG. 36, with respect to a rotational position θE indicated by electrical angle on the horizontal axis. However, each of the stator poles of FIG. 22 has a rectangular shape and thus the rotation angle rate of each flux presents a rectangular waveform characteristic including lots of harmonic components. These harmonic components may become the cause of cogging torque and torque ripple, or may affect the torque generation of the motor.

Figure 37:
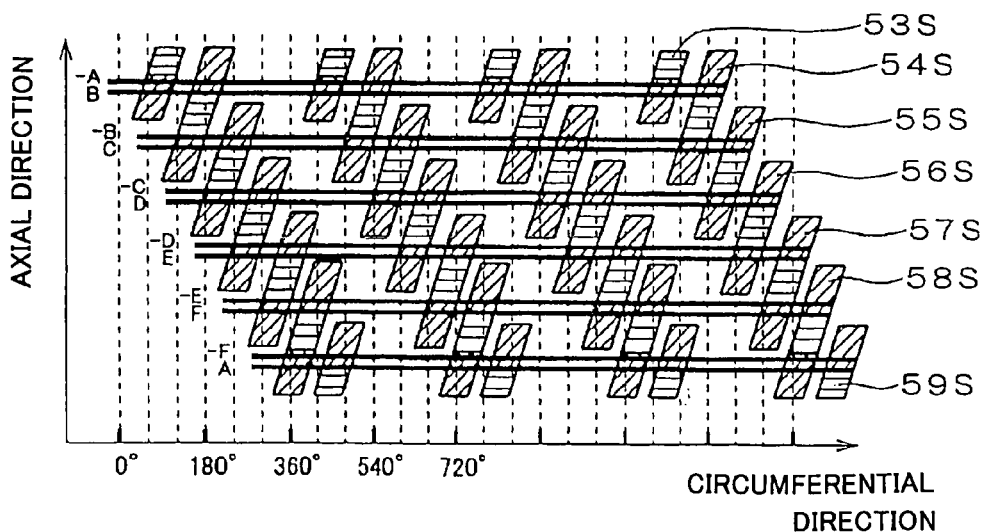
FIG. 37 illustrates an example of an inner peripheral surface configuration of a stator linearly developed along the circumference with loop windings being arranged therein.

As an example of a method for mitigating these problems, a configuration SPS of each stator pole shown in FIG. 22 may be modified to a stator configuration shown in FIG. 37. As shown in the figure, stator poles 53S, 54S, 55S, 56S, 57S, 58S and 59S are elongated along the rotor shaft direction and are circumferentially skewed. Skewing can reduce the harmonic components of the rotation angle rate of the magnetic flux passing through each stator pole, so that torque ripple or the like can be reduced. Also, elongation of each stator pole along the rotor shaft can increase the rotation angle rate of the magnetic flux, so that torque can be increased. It should be appreciated that, in the shape of the stator pole 54S, for example, shown in FIG. 37, the portion indicated by horizontal hatching corresponds to a base portion 54SB of the stator pole shown in FIG. 38, and the portion indicated by diagonal hatching corresponds to an end portion 54SS of the stator pole shown in FIG. 38.

Figure 38:
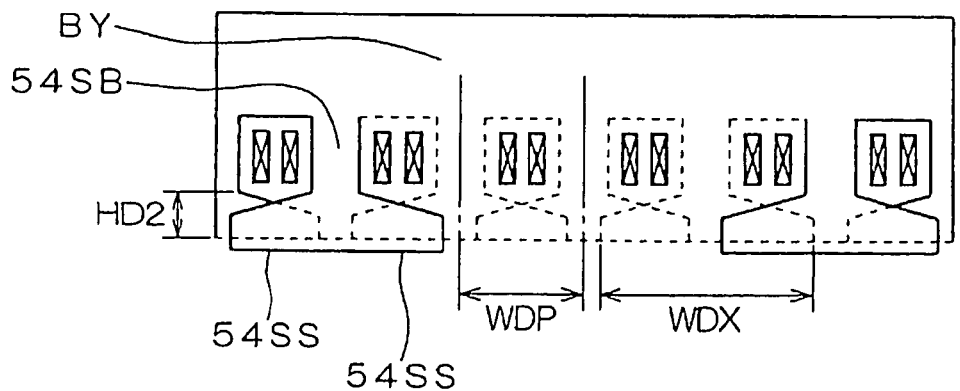
FIG. 38 is a vertical cross section illustrating an example of the configuration of a stator pole.

Thus, a configuration of a vertical cross section of the stator is changed from the one shown in FIG. 31 to the one shown in FIG. 38, whereby a width, in the rotor shaft direction, of the stator pole at its end portion 54SS is increased from WDD shown in FIG. 31 to WDX shown in FIG. 38. As to the base portion 54SB of the stator pole, which resides intermediate between the end portion 54SS of the stator pole and a back yoke BY, magnetic flux passing therethrough is increased, necessitating the increase in the diameter of the magnetic path.

Figure 39:
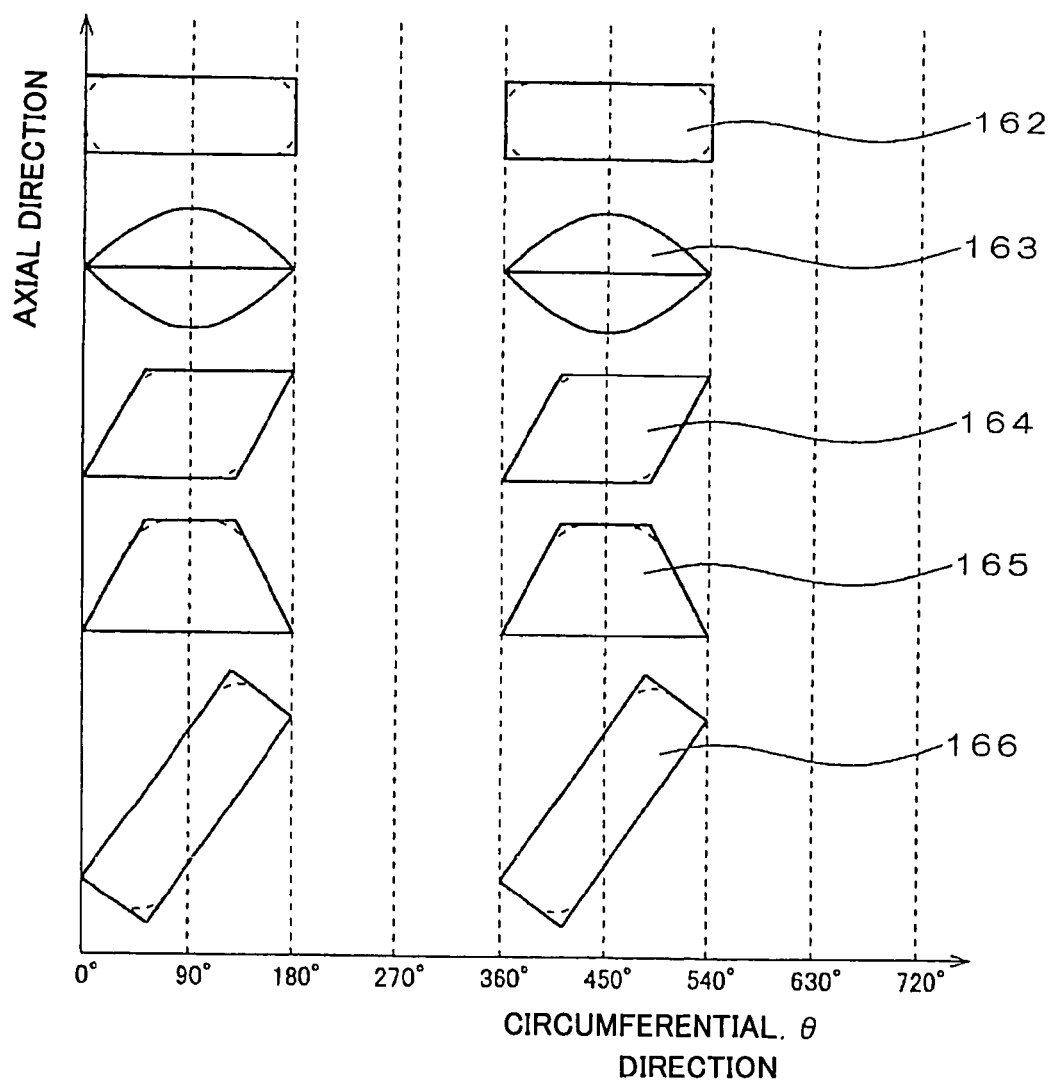
FIG. 39 illustrates various examples of an inner-diameter side configuration of a stator pole.

As to the improvement and modification of the stator pole configuration SPS, various ways can be suggested as shown in FIG. 39. The stator pole configuration SPS indicated by numeral 162 is the same as the one shown in FIG. 22. On the other hand, sinusoidal area distribution in the circumferential direction, as indicated by numeral 163, may significantly reduce the harmonic components. A stator pole indicated by numeral 164 is an example of skewing in the circumferential direction. This stator pole, comparing with the rectangular one indicated by numeral 162, is closer to the one indicated by numeral 163 having a sinusoidal area distribution. The stator pole configuration shown in FIG. 37 is close to the one indicated by numeral 164. Although the stator pole indicated by numeral 165 is trapezoidal, it is equivalent to a skewed structure indicated by numeral 164 as far as the circumferential area distribution is concerned. A stator pole indicated by numeral 166 has a rectangular shape inclined toward the circumferential direction, which is particularly useful in case where stator poles are arranged as shown in FIG. 37. This stator pole can avoid interference between adjacent stator poles, and can present a circumferential area distribution equivalent to the trapezoidal stator pole indicated by numeral 165, so that the rotation angle rate of the magnetic flux passing therethrough can be increased to thereby increase torque. In addition, the harmonic components can be decreased, so that torque ripple or the like can be reduced. The harmonic components may also be reduced by providing rounded corners as indicated by broken lines in the stator pole configurations 162, 164, 165 and 166 shown in FIG. 39. The rounded shapes indicated by the broken lines may be optionally selected. In a precise sense, for example, a circumferential area distribution may be sinusoidally provided so that the same characteristics can be achieved as those of the stator poles indicated by numeral 163, in which a sinusoidal area distribution is provided in the circumferential direction. A circumferential length of each of the shapes of the poles in FIG. 39 is shown as being 180° in electrical angle, but may be longer than 180° or shorter than 180°. In this case, similar to the effects of reducing a winding factor of a conventional-structure motor to be smaller than "1", such effects can be exerted as the reduction of interference between adjacent stator poles according to a theory based on a simple model, although torque may be reduced by that much. The circumferential length may be made smaller than 180° to impart each stator pole with short-pitch winding, so as to advantageously reduce specific harmonic components of torque, i.e. cogging torque and torque ripple.

Figure 40:
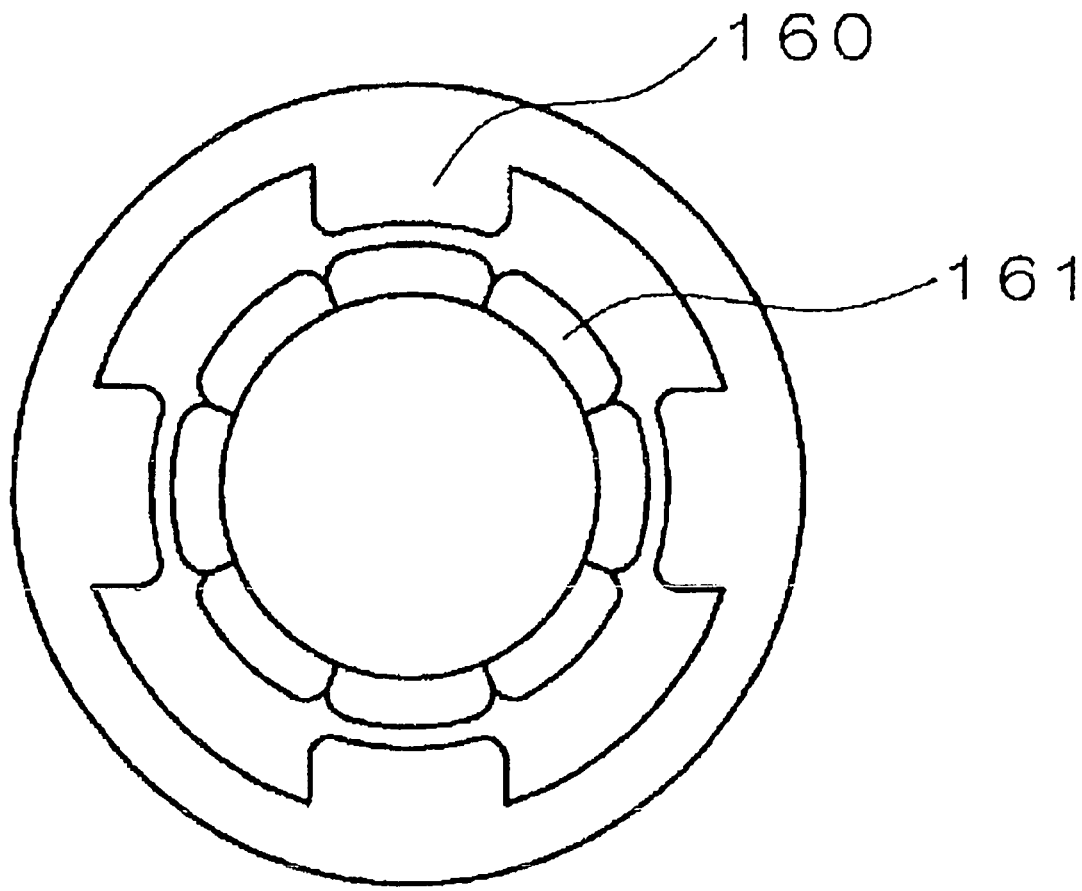
FIG. 40 is a transverse cross section illustrating an example of stator pole and rotor pole configurations.

Other effective methods for reducing cogging torque and torque ripple may include one for increasing the air gap between the stator and the rotor by forming the ends of a stator pole 160 along the circumference as shown in FIG. 40 contrary to the configuration shown in FIG. 23, and one for rounding the ends along the circumference of a permanent magnet 161 of the rotor to provide a recessed form at a boundary portion between the rotor poles. The methods for reducing the harmonic components are not only effective for reducing torque ripple or the like but are also effective for mitigating drastic change in a radial attraction force between the rotor and the stator when the rotor is rotated, or for mitigating vibration or noise of the motor.

Cogging torque and torque ripple may also be reduced by combining the methods mentioned above, such as the method for modifying the stator pole configuration SPS, the method for modifying a rotor pole configuration, the method for relatively skewing the stator and the rotor, and the method for circumferentially displacing the circumferential positions of rotor poles or stator poles.

Description has been provided on a 6-phase motor referring, for example, to FIGS. 21, 22 and 35. In a motor having less number of phases "Ns", in particular, the fact of having the stator pole configuration SPS with sinusoidal circumferential area distribution is effective for reducing torque ripple or the like. When the number of pairs of poles in the motor is "Pn" and the number of stator poles is "Nss", the following Formula can be established for a basic motor structure as shown in FIG. 35:

$$Nss = Pn \times Ns \qquad (31)$$

If the number of phases Ns is large, stator poles can be arranged in a distributed manner within an electrical angle of 360° by the number equal to the number of the phases. In this case, currents for respective windings may also turn to multiphase currents having Ns phases. Thus, in a simple theory, if the phase number Ns is so large as "30", for example, circumferential discreteness of the stator poles will be greatly mitigated to reduce the value of cogging torque and torque ripple, although this may practically be difficult from the structural viewpoint of the stator. Contrarily, the circumferential discreteness of the stator poles may be high in case of 2-phase alternating current that is the multiphase alternating current having the smallest number of phases, or in case of 3-phase alternating current which is advantageous from the viewpoint of inverter drive load, motor wiring load or the like, leading to the tendency of generating cogging torque and torque ripple.

Where discreteness is high, the sinusoidal area distribution along the circumference in the stator pole configuration is very advantageous because it has an effect of compensating the circumferential discreteness of the stator poles. In practice, a 2-phase AC motor of phase number Ns=2 has large cogging torque and requires measures for reducing the cogging torque. In case of a 3-phase AC motor having phase number Ns=3 as expressed by Nss=3×Pn based on Formula (31), or, in particular, in case of a 3-phase motor where three stator poles are arranged within electrical angle of 360° along the circumferential direction, a high-level importance is labeled on the method for achieving the sinusoidal form in the circumferential area distribution in the stator pole configuration so as to reduce cogging torque and torque ripple. The 3-phase AC motor having phase number Ns=3 of the present invention can be simplified in the structure to thereby reduce the number of parts. This structure is also advantageous in the cost.

The stator poles 53 to 59 shown in FIGS. 21 and 31 are structured so that the width WDD of each stator pole in the rotor shaft direction is slightly smaller than the pitch WDP of each stator pole in the rotor shaft direction (interval in the rotor shaft direction). However, as far as the rotation angle rate of the magnetic flux passing through each stator pole is concerned, more advantages may be provided by the stator pole having larger length in the rotor shaft direction. Therefore, preferably, as in the case of the stator pole 54SS or the like shown in FIG. 38, the arrangement may be so made that the width WDX of the stator pole in the rotor shaft direction has a larger value than the pitch WDP, while employing a configuration for avoiding interference between adjacent stator poles. Particular shapes of end portions of such stator poles are indicated in the stator pole configuration shown in FIG. 37, the stator pole configuration 166 shown in FIG. 39 and the stator pole configuration shown in FIG. 29.

Figure 41:
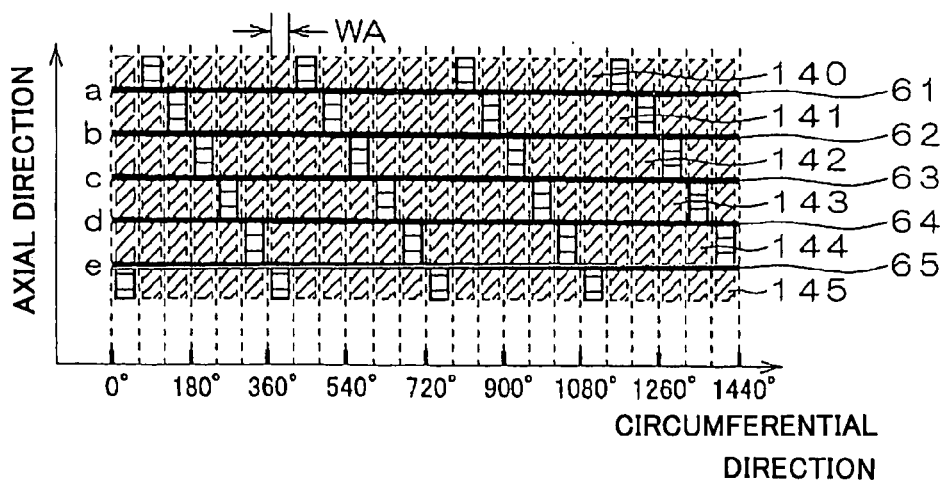
FIG. 41 illustrates an example of an inner peripheral surface configuration of a stator linearly developed along the circumference with loop windings being arranged therein.

The 6-phase stator poles shown in FIG. 41 have end portions 140 to 145, in which a width WA in the circumferential direction is made slightly smaller than electrical angle 360°/6=60° so as not to cause interference between adjacent stator poles, while the length of the 6-phase stator poles along the rotor shaft axially covers the full maximum length of the motor, which length is based on its outer diameter. It should be appreciated that, for example, in the configuration of stator poles 142 shown in FIG. 41, portions having horizontal hatching are bases of stator poles, which extend from end portions of stator poles to a back yoke of the stator, and portions having diagonal hatching are end portions of stator poles. The stator pole configuration shown in FIG. 41 is obtained by circumferentially and linearly developing an inner surface configuration of the stator as viewed from the air gap portion between the stator and the rotor. The stator configuration as shown in FIG. 41 is particularly preferable for a flat and thin motor whose core length, i.e. length along the rotor shaft, is small. This configuration can contribute to increasing the rotation angle rate of the magnetic flux passing through each stator pole, whereby motor torque can be increased.

In N-phased stator pole groups MPN, indicated by "Φx" is a sum total of magnetic fluxes passing through a group of stator poles of an optional phase X, by "dΦx/dθ" is a rotation angle rate of each flux Φx, by "Ix" is a winding current that is a magnetomotive force working on an air-gap portion between each stator pole and each rotor pole, by "WTx" is the number of turns of winding, and by "Tx" is a generated torque component of the motor that is a product calculated from dΦx/dθ×Ix×WTx. As to a configuration of another phase Y, indicated by "Φy" is the magnetic fluxes passing through the group of stator poles, by "Iy" is a winding current, by "WTy" is the number of turns of winding, and by "Ty" is a generated torque component of the motor that is a product calculated from dΦy/dθ×Iy×WTy. Preferably, an arrangement may be so made that, excepting the phase difference between the X and Y phases, two or more among the fluxes Φx and Φy, the winding currents Ix and Iy, and the numbers of turns of winding WTx and WTy, which are determined by a mutually facing area between the stator pole and the rotor pole, have different values between the X and Y phases, and that the generated torque components Tx and Ty have equal values. If a stator pole configuration is required to be modified for convenience sake, for example, of a motor cover and a mechanism to be driven, individual parameters may sometimes better be conveniently changed without changing the final electromagnetic effects exerted by the flux Φx, the current Ix and the number of turns of winding WTx.

Figure 42:
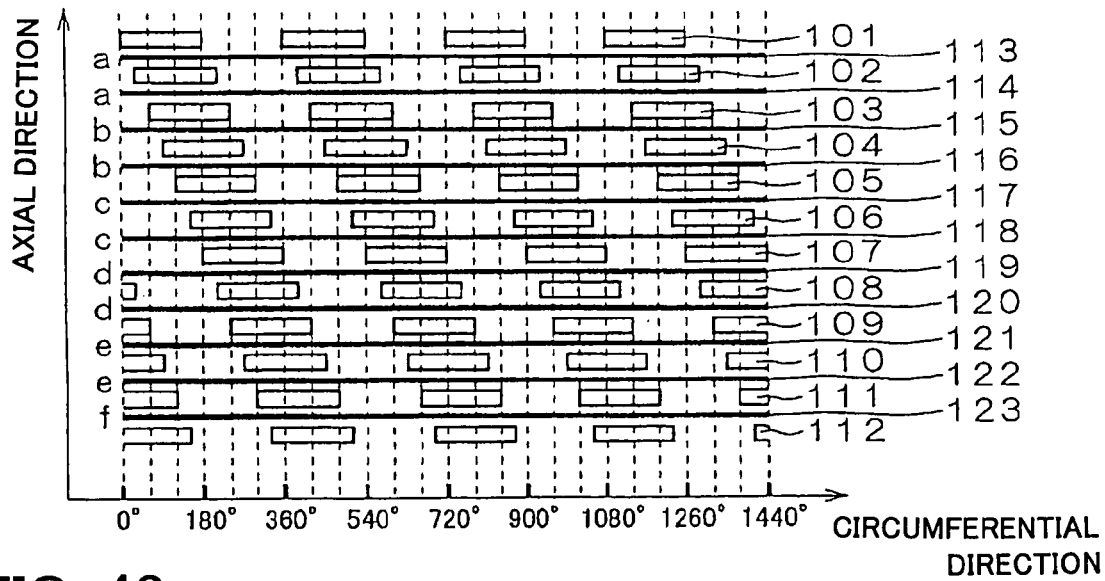
FIG. 42 illustrates an example of an inner peripheral surface configuration of a stator linearly developed along the circumference with loop windings being arranged therein.

FIG. 42 shows another example of stator pole arrangement and winding arrangement. In the stator poles shown, for example, in FIGS. 21, 37 and 35, six types of phases have been provided along the circumference. FIG. 42, however, shows a configuration in which stator poles 101 to 112 having twelve types of phases are arranged with an addition of intermediate-phase stator poles. As to the windings, eleven loop windings 113 to 123 are arranged. Values of current vectors of the windings are represented by the symbols at the left end of the windings. These current vectors correspond to those shown in FIG. 33 assigned with the same symbols. Two sets of loop windings are prepared for each phase and these windings are arranged so that the same phase current may be supplied to the windings provided at two adjacent slots. In this way, same phase windings and currents can be arranged by dividing into a plurality of juxtaposed slots. The configuration shown in FIG. 41 may allow the stator poles to be arranged in a larger number of phases to cancel the harmonic components of torque, whereby torque ripple is reduced and motor driving can be performed more smoothly. Meanwhile, six types of current vectors are provided, which may be controlled by a 3-phase inverter by reversing current supply direction as to the reverse-phase current vectors. Thus, a motor control apparatus may not be complicated.

Figure 43:
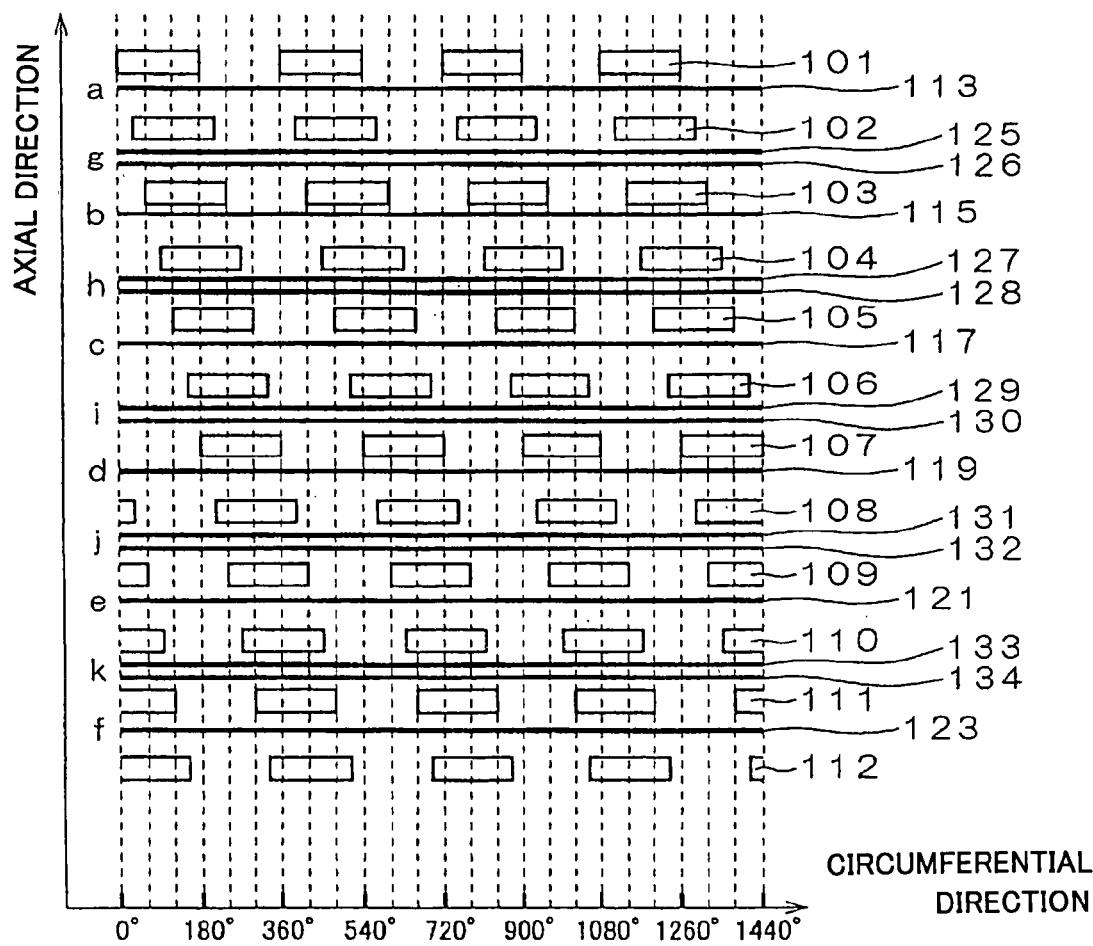
FIG. 43 illustrates an example of an inner peripheral surface configuration of a stator linearly developed along the circumference with loop windings being arranged therein.
Figure 44:
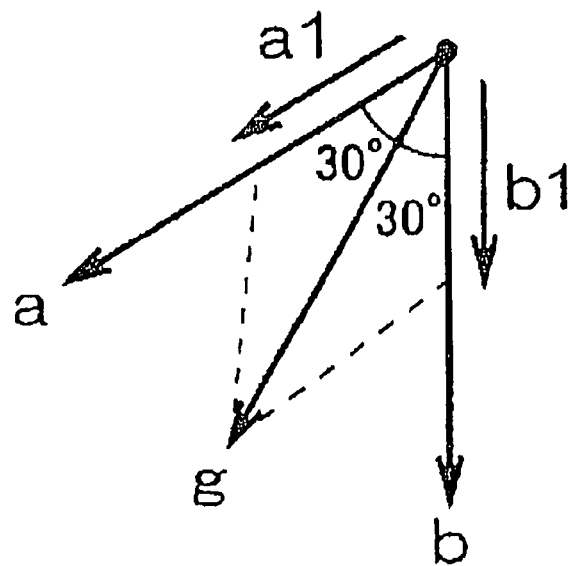
FIG. 44 is a vector diagram illustrating electrical currents of the windings shown in FIG. 43.
Figure 45:
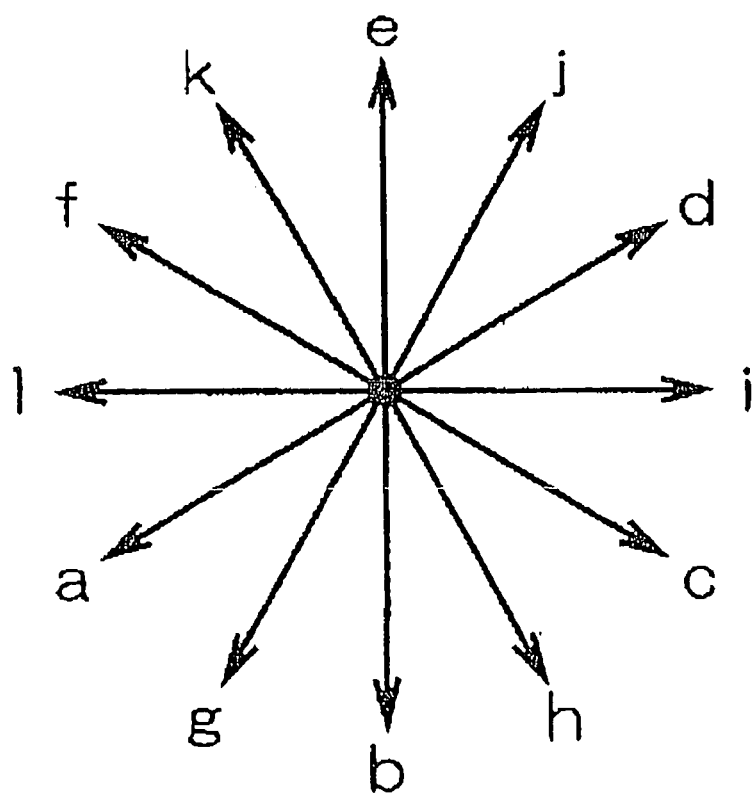
FIG. 45 is a vector diagram illustrating electrical currents of the windings shown in FIG. 43.

FIG. 43 shows an example of another stator pole arrangement and winding arrangement. Comparing with FIG. 42, the windings are modified. A more precise motor having small torque ripple is realized by changing the windings 114, 116, 118, 120 and 122 shown in FIG. 42 to the ones that can provide more precise currents. As shown in FIG. 44, current vectors of windings 125 and 126 are "a1" and "b1", respectively. Sum of the current vectors a1 and 1b, which is indicated by "g", has the same amplitude as current vectors "a" and "b" and has a phase intermediate of "a" and "b". The following relations can be established: a1=1/(2×cos 30°)× a=0.57735×a; and b1=0.57735×b. The magnetomotive force, which is equal to "ampere×number of turns", of the windings 125 and 126 can be realized by passing the same current with the adjustment of the number of turns. The same can be applied to windings 127 to 134 to obtain the current vectors shown in FIG. 44. FIG. 45 illustrates a relationship between the current vectors passed through the windings shown in FIG. 43.

The motor shown in FIG. 43 has been multi-phased by a factor of two comparing with the motor shown in FIG. 35. With this multi-phasing, the harmonic components of torque are cancelled, torque ripple is reduced, and driving of the motor can be performed more smoothly. In this case, since a drive unit of the motor only has to produce the current vectors "a", "b", "c" "d", "e" and "f", this motor can be driven by a 3-phase inverter. Although the motor is slightly complicated because of the multi-phasing, no load is imposed on the drive unit. In case where current vectors "g", "h", "I", "j", "k" and "l" for intermediate phases are produced by the drive unit, the number of transistors in the drive unit is required to be increased by a factor of two.

The number of turns of the newly provided windings 125, 126 and the like, relative to the number of turns of the windings 113, 115 and the like does not result in an integral ratio but may mostly be fractional. In this regard, selection of the numbers of turns as close as possible to each other can attain an aimed effect and practical characteristics. For example, there may be a case where a ratio of the numbers of turns is 1:0.57735=6:3.4641. The FIG. 3.4641 is quite far away from an integer. In this case, a1 may have 3 turns and b1 may have 4 turns to reduce an amplitude error, although a phase error may be a little large. Alternatively, the winding of a1 may have 3.5 turns, that is, may be drawn out of the magnetic circuit after being wound 3 turns and a half, while the winding of b1 may also have 3.5 turns and be located at a rotational position circumferentially offset from the winding of a1 by 180° in mechanical angle. Thus, the desired purpose can be substantially accomplished.

Figure 46:
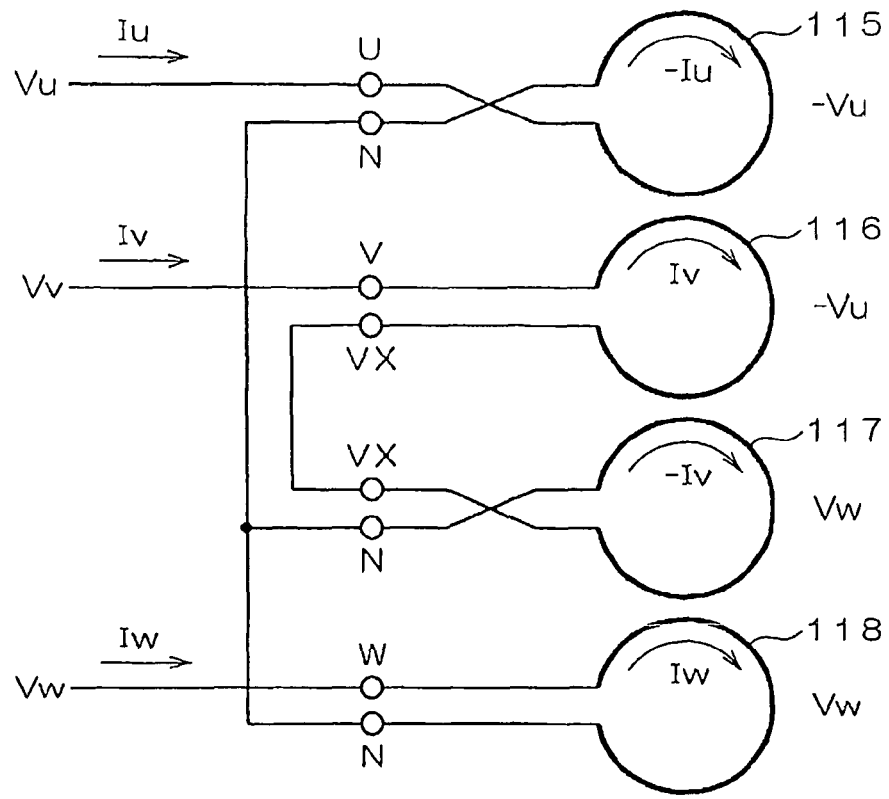
FIG. 46 is a connection diagram illustrating a wire connection relationship between the windings of the motor shown in FIG. 1, involving electrical currents, voltages and windings.

Hereinafter will be described a method for connecting the loop windings of the motor and a method for establishing connection with an inverter. The motor 100 shown in FIG. 21 is an example of the 6-phase motor shown by (e) of FIG. 20. The present invention can be extendedly applied to motors with various phases. The 3-phase motor shown by (b) of FIG. 20 is represented by the motor shown in FIG. 1, in which the windings 115, 116, 117 and 118 can be connected as shown in FIG. 46 so as to be controlled by a 3-phase inverter. In the figure, each of the loop windings 115, 116, 117 and 118 is indicated by a one-turn winding symbol to easily indicate a winding-start position. The windings 115 and 116 are interlinked with the same U-phase flux, and thus the induced voltage of the windings is a negative voltage −Vu of the same U-phase. The windings 117 and 118 are interlinked with the same W-phase flux, and thus the induced voltage of the windings is a voltage Vw of the same W-phase. Thus, the U-phase current Iu is reversely passed through the winding 115, while the W-phase current Iw is forwardly passed through the winding 118. As to the V-phase voltage Vu, a relation Vv=−Vu−Vw is established based on a relation Vu+Vv+Vw=0. Accordingly, the V-phase current Iv is forwardly passed through the winding 116, while the winding 117 is brought into an anti-series connection to allow the V-phase current Iv to reversely pass therethrough.

Figure 47:
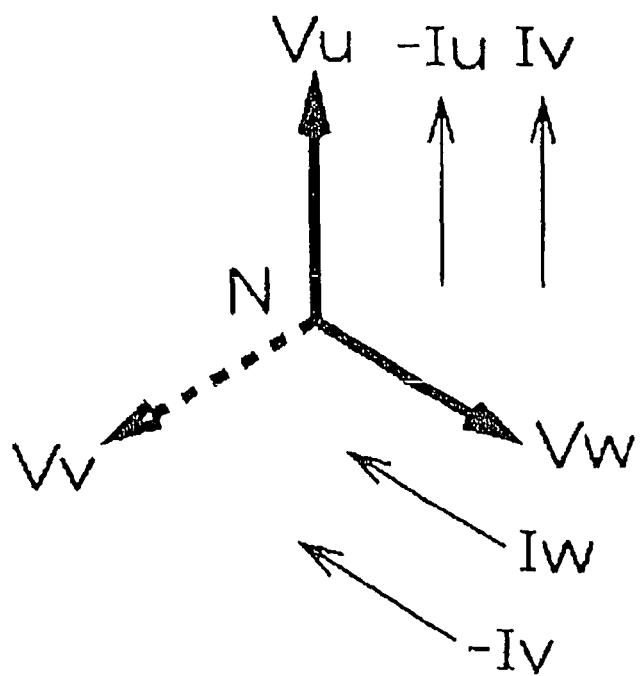
FIG. 47 vectorially illustrates a relationship between the electrical current and voltage of the windings shown in FIG. 46.
Figure 48:
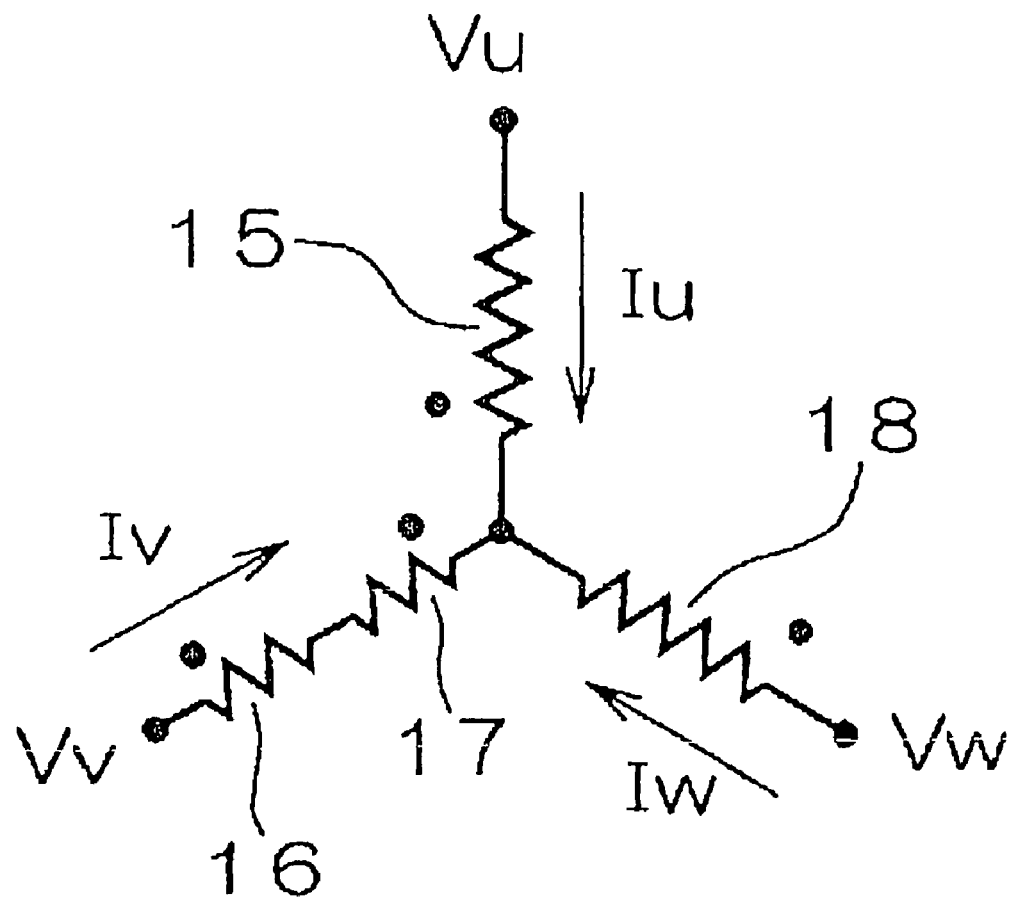
FIG. 48 illustrates the windings, electrical currents and voltages shown in FIG. 46.

A relationship between these voltages and currents is indicated by the vector diagram of FIG. 47. A relationship between the windings, currents and voltages can also be indicated as shown in FIG. 48. Each of dot marks provided to the individual windings indicates a winding-start side of the winding. In this way, the motor can be efficiently operated by a 3-phase inverter by oppositely connecting the windings in series, which windings are to be passed with reverse-phase currents.

Figure 49:
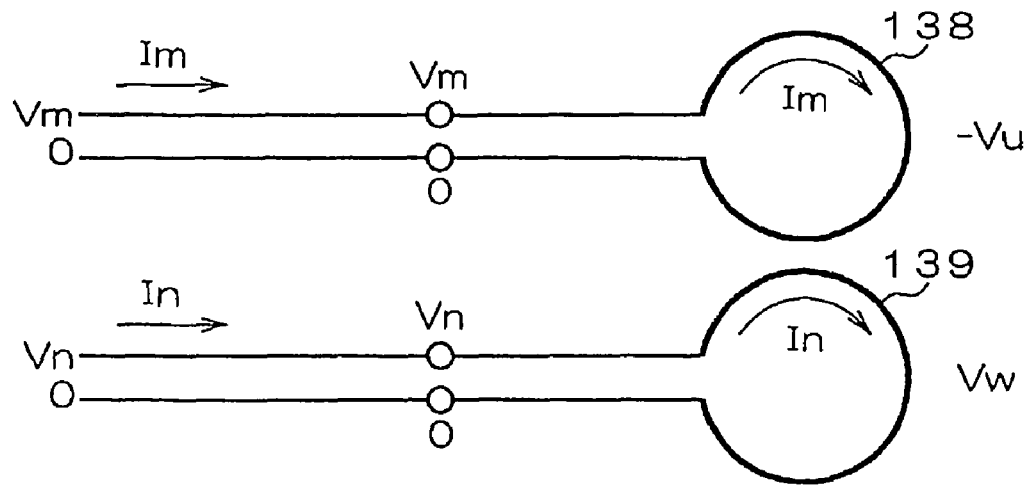
FIG. 49 illustrates a wire connection relationship involving electrical currents, voltages and windings in case the windings of the motor shown in FIG. 1 are replaced by the windings shown in FIG. 7.
Figure 50:
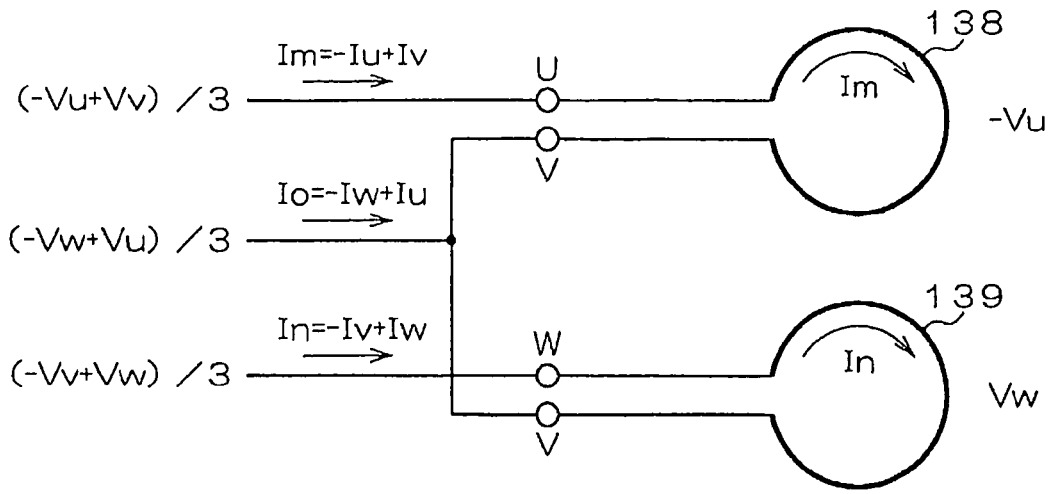
FIG. 50 illustrates a wire connection relationship involving electrical currents, voltages and windings in case the windings of the motor shown in FIG. 1 are replaced by the windings shown in FIG. 7.
Figure 51:
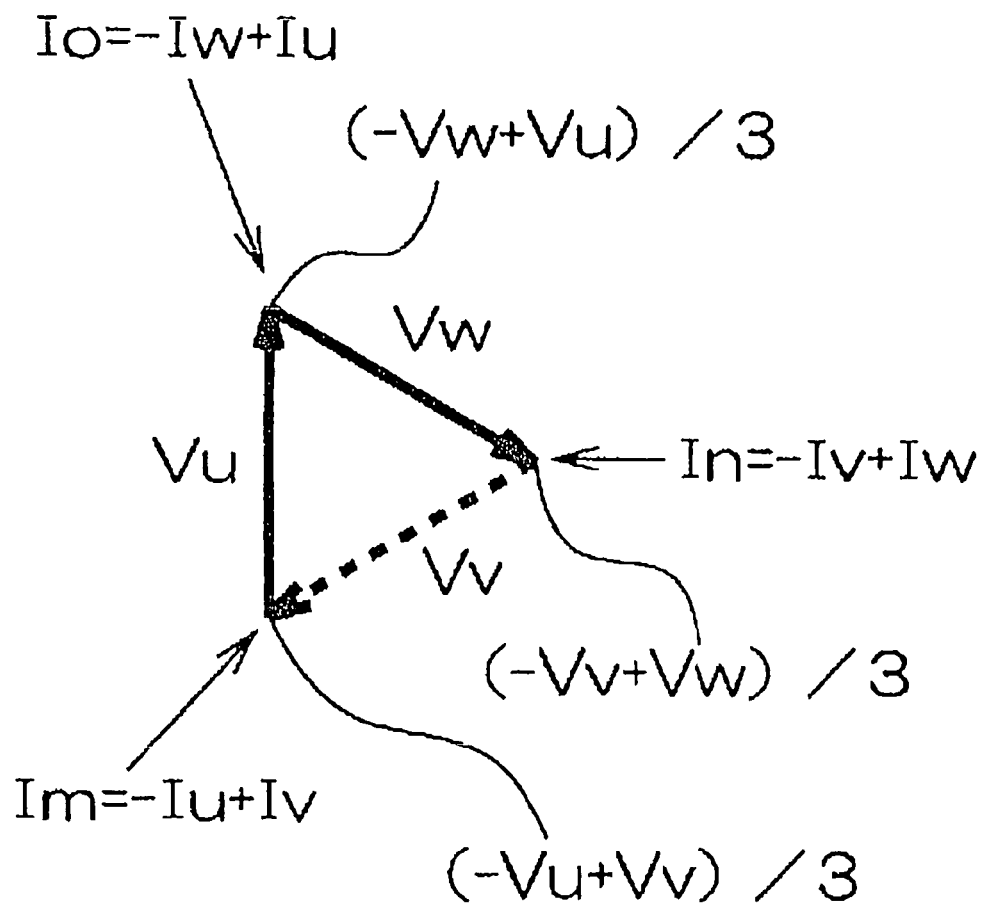
FIG. 51 vectorially illustrates a relationship between the windings, electrical currents and voltages shown in FIG. 50.
Figure 52:
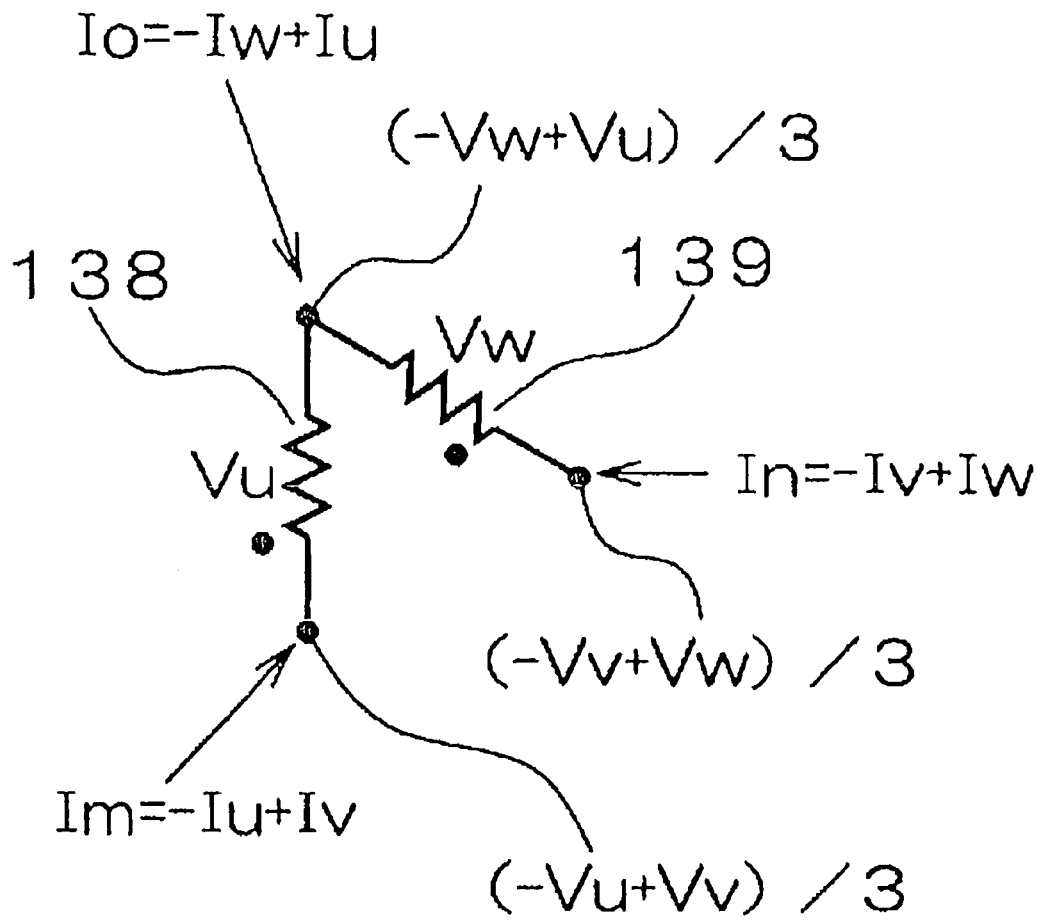
FIG. 52 illustrates the windings, electrical currents and voltages shown in FIG. 50.
Figure 53:
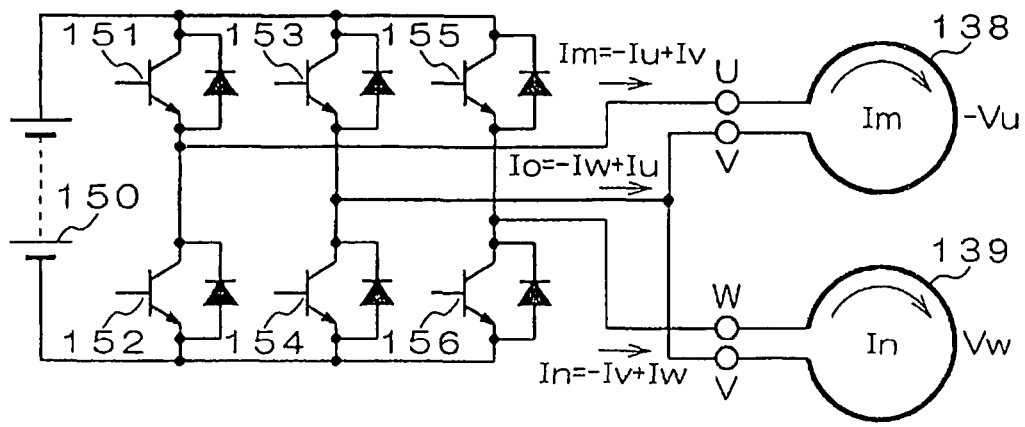
FIG. 53 illustrates a connection relationship between the windings shown in FIG. 50 and a 3-phase inverter.

As shown in FIGS. 6 and 7, the two loop windings 115 and 116 can be combined into the winding 138 to which a current obtained by arithmetically summing up the currents to be supplied to the windings 115 and 116 can be supplied. Similarly, the two loop windings 117 and 118 can be combined into the winding 139 to which a current obtained by arithmetically summing up the currents to be supplied to the windings 117 and 118 can be supplied. With reference to FIG. 49 or FIGS. 50, 51 and 52, hereinafter will be described voltages and currents to be applied to the windings 138 and 139, models of windings, and a method for connecting the windings. The method shown in FIG. 49 is a method for separately and independently controlling the currents of the windings 138 and 139. This method does not involve any technical difficulty in particular, but may increase the number of elements of the inverter and the cost therefor in order to separately generate the two currents. On the other hand, in the configuration shown in FIG. 50, current Im=−Iu+Iv is supplied to the winding-start of the winding 138, current In=−Iv+Iw is supplied to the winding-start of the winding 139, and the winding-ends of the windings 138 and 139 are connected so that current Io=−Im−In=−Iw=Iu can be supplied thereto. These currents Im, In and Io are offset from each other in their phases by 120° and are larger in amplitude than the 3-phase currents Iu, Iv and Iw by a factor of 1.732. When phase voltages of the windings 138 and 139 are −Vu and Vw, respectively, terminal voltages will be (−Vw+Vu)/3, (−Vu+Vv)/3 and (−Vv+Vw)/3 as additionally depicted in FIGS. 50, 51 and 52. Line-to-line voltage shown in FIG. 51 is larger than the one shown in FIG. 48 as expressed by 1/1.732. A relationship between these voltages and currents is shown in the vector diagram of FIG. 47. The relationship between the windings, currents and voltages can also be expressed as shown in FIG. 48. In order to render the motor voltage and current shown in FIGS. 50, 51 and 52 to be the same as those shown in FIGS. 46, 47 and 48, the number of turns of the windings 138 and 139 may be made larger than that of the windings 115, 116, 117 and 118 by a factor of 1.732. Driving of the motor shown in FIGS. 50, 51 and 52 is of balanced 3-phase voltages and 3-phase currents, and thus the motor can be driven by a normal 3-phase inverter as shown in FIG. 53. In FIG. 53, indicated by numeral 150 is a DC voltage source, and by numerals 151, 152, 153, 154, 155 and 156 are transistors each having oppositely juxtaposed diodes.

Figure 54:
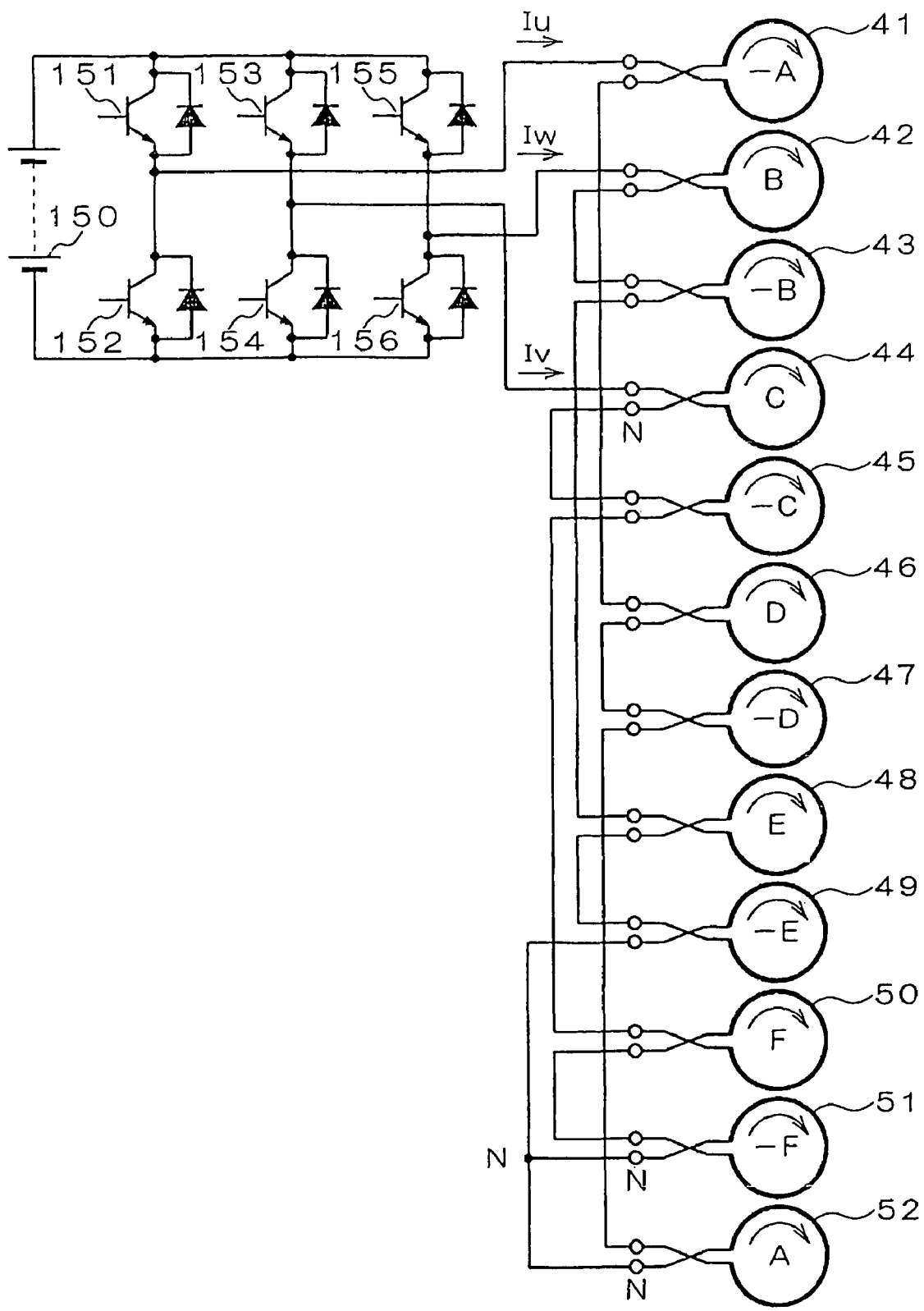
FIG. 54 illustrates a connection relationship between the windings shown in FIG. 21 and a 3-phase inverter.

FIG. 54 shows an example of a method for establishing connection between the windings 41 to 52 shown in FIGS. 21 and 22 and a method for establishing connection with a 3-phase inverter. As have been explained referring to the motor model shown in FIGS. 21 and 22, the stator poles 53 and 59 belong to the same phase and the stator pole 56 is a reverse-phase stator pole having a phase difference of 180°. A connection for allowing the U-phase flux magnetic flux to pass through the stator poles 53, 59 and 56, and for attaining interlinkage with the same phase, is reflected in the connection of the windings 41, 46, 47 and 52 shown in FIG. 54. For example, in order to attain interlinkage with the flux passing through the stator pole 56, the windings 46 and 47 adjacently and axially provided at both sides of the stator pole 56 may be oppositely connected in series. The winding directions may be in reverse of the windings 52 and 41 for the respective stator poles 59 and 53.

Magnetic flux that passes through the stator pole 55 is the V-phase flux and magnetic flux that passes through the stator pole 58 is the −V-phase flux. This is reflected in the connection of the windings 44, 45, 50 and 51 of FIG. 54. In order to attain interlinkage with the flux passing through the stator pole 55, the windings 44 and 45 adjacently and axially provided at both sides of the stator pole 55 may be oppositely connected in series. In order to attain interlinkage with the flux passing through the stator pole 58, the windings 50 and 51 adjacently and axially provided at both sides of the stator pole 58 may be oppositely connected in series. The winding directions of the windings 44 and 45 for the stator pole 55 may be in reverse of the winding directions of the windings 50 and 51 for the stator pole 58.

Magnetic flux that passes through the stator pole 57 is the W-phase flux and magnetic flux that passes through the stator pole 54 is the −W-phase flux. This is reflected in the connection of the windings 48, 49, 42 and 43 of FIG. 54. In order to attain interlinkage with the flux passing through the stator pole 57, the windings 48 and 49 adjacently and axially provided at both sides of the stator pole 57 may be oppositely connected in series. In order to attain interlinkage with the flux passing through the stator pole 54, the windings 42 and 43 adjacently and axially provided at both sides of the stator pole 54 may be oppositely connected in series. The winding directions of the windings 48 and 49 for the stator pole 57 may be in reverse of the winding directions of the windings 42 and 43 for the stator pole 54.

Figure 55:
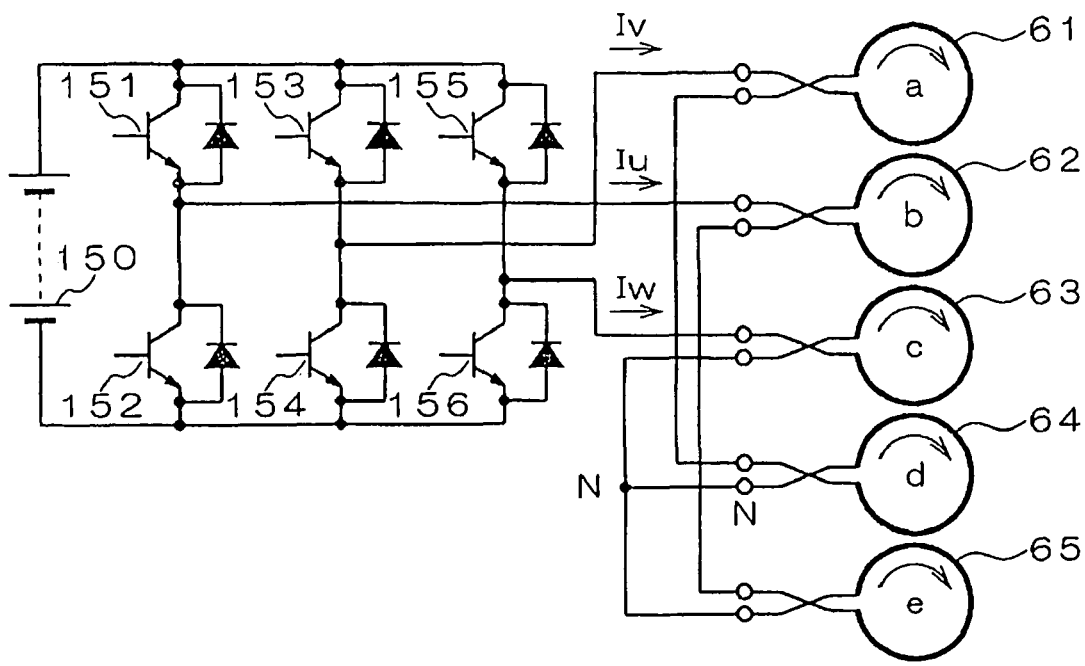
FIG. 55 illustrates a connection relationship between the windings shown in FIG. 35 and a 3-phase inverter.

FIG. 55 shows an example of a method for establishing connection between the loop windings 61, 42, 63, 64 and 65 shown in FIG. 35 and a method for establishing connection with a 3-phase inverter. As have been explained referring to the motor model shown in FIG. 35, magnetic flux of one of the three phases can be interlinked with the windings 62 and 65 by oppositely connecting the two loop windings in series, and voltage of this opposite serial connection presents a phase represented by the vector "e" in FIG. 33 for passing the current Iu. Also, magnetic flux of one of the three phases can be interlinked with the windings 61 and 64 by oppositely connecting the two loop windings in series, and voltage of this opposite serial connection presents a phase represented by the vector "a" in FIG. 33 for passing the current Iv. Voltage of the remaining winding 63 presents a phase represented by the vector "c" in FIG. 33 for passing the current Iw. The winding 63 is located at the center of the stator and this single loop winding can be interlinked with the flux of one of three phases. To put it another way, the winding 66 shown in FIG. 34, which does not generate voltage, is omitted.

Figure 56:
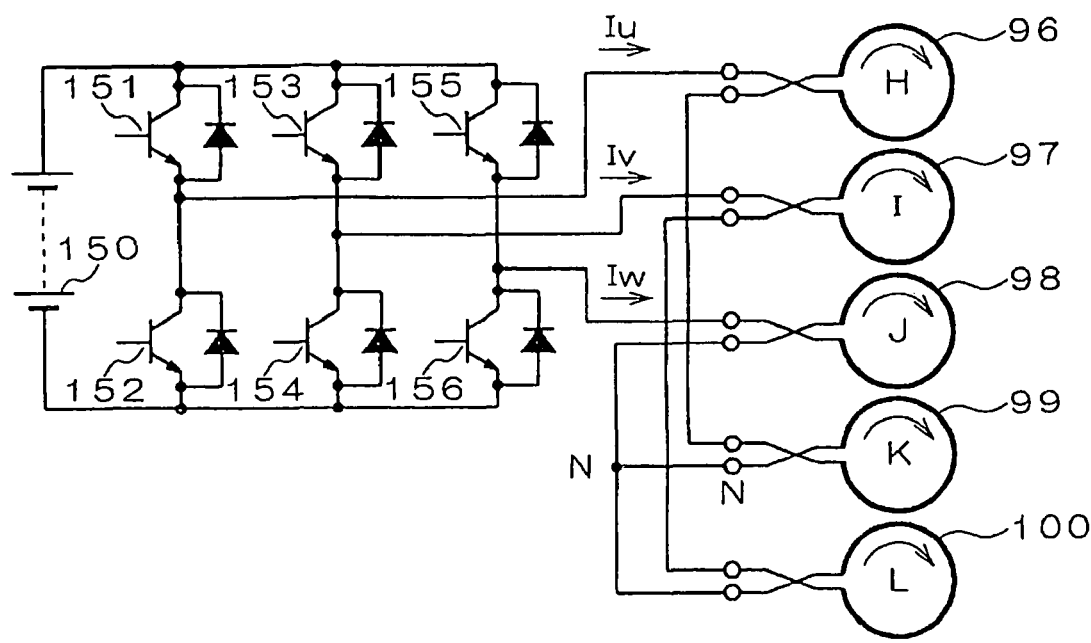
FIG. 56 illustrates a connection relationship between the windings shown in FIG. 28 and a 3-phase inverter.

FIG. 56 shows an example of a method for establishing connection between the loop windings 96, 97, 98, 99 and 100 shown in FIG. 28 and a method for establishing connection with a 3-phase inverter. As have been explained referring to the motor model shown in FIG. 28, the stator structure and the winding arrangement of this motor have been attained by modifying the windings 82 to 93 in the stator structure shown in FIG. 27. Currents passing through the windings are H, I, J, K and L as indicated in FIG. 28 and the magnitudes of the currents are different from each other as indicated by the current vectors at (c) of FIG. 30. As a result, a rather complicated relationship is established between the currents passing through the windings and the magnetic fluxes of the stator poles shown in FIG. 28. However, the effects of the stator shown in FIG. 28 are equivalent to those obtained from the relationship between the currents of the windings and the fluxes of the stator poles shown in FIG. 27. Examples of the method for establishing connection between the windings and the method for establishing connection with a 3-phase inverter are presented on the assumption that the currents passing through the windings of FIG. 28 are represented by the current vectors shown by (c) of FIG. 30. The current vectors H and K supplied to the windings 96 and 99, respectively, have a phase −U, with the amplitudes being such that a current which is one half of the current supplied to the winding 96 should be supplied to the winding 99. Accordingly, the number of turns of the winding 99 is rendered to be one half of that of the winding 96 and the same U-phase current Iu is supplied to these windings. The current vectors I and L supplied to the windings 97 and 100, respectively, have a phase −V, with the amplitudes being such that a current which is one half of the current supplied to the winding 100 should be supplied to the winding 97. Accordingly, the number of turns of the winding 97 is rendered to be one half of that of the winding 100 and the same V-phase current Iv is supplied to these windings. The current vector I supplied to the winding 98 has a phase −W, with the amplitude being the same as that of each of the windings 96 and 100, and the W-phase current Iw is supplied to the winding.

As described above, the windings having substantially the same phase in terms of electrical angle are unidirectionally connected in series, and the windings having a phase difference of about 180° in electrical angle are oppositely connected in series. Further, the number of turns of each loop winding is adjusted depending on the magnitude of the current vector. As a result, the multiphase currents can be controlled with less current sources to drive the motor. Accordingly, the motor wiring as well as the drive unit can be simplified.

As to the inverter for controlling voltages and currents of a motor, an example of the 3-phase inverter using six transistors has been shown chiefly in FIGS. 53 to 56, however, various other methods may be used. For example, three sets of inverters, each of which controls a single current and voltage with four transistors, may be used to perform the 3-phase AC control.

Motor configurations based on certain regularity have so far been described referring, for example, to FIGS. 21, 22, 34, 35. These motors and motors obtained by modifying these motors, for example, individually have advantages, and at the same time have room for improvement. Hereinafter, more detailed description will be given on the advantages. Also, points of improvement and motors of new configurations will be described.

The motor shown in FIG. 22 has an (N+1) number of stator pole groups and an N number of windings, in which indicated by numerals 53 and 59 are stator poles of the same phase. The motor shown in FIG. 22 is a 6-phase motor with N=6. This motor, in a way, can also be interpreted to be a 3-phase AC motor if the phases having a phase difference of 180° are taken as belonging to the same phase. The motor may be interpreted or named in either way, but it is a motor arranged with stator poles of six phases within an electrical angle of 360°.

In FIG. 22 illustrating a linearly developed circumferential configuration of the stator poles facing the rotor, a magnetic pole is arranged within an electrical angle of 180° along the circumference but no magnetic pole is arranged within the remaining electrical angle of 180° along the circumference. This creates a problem that approximately a half of the area is not effectively used. Further, fluxes leaked out from the side of the rotor through a space are collected to this unused portion, and these leaked fluxes affect torque in such a way as to reduce the torque, raising another problem. In FIG. 22, the rotation angle rates of the fluxes working on the stator poles are in proportion to torque and voltage, and thus a width of each stator pole along the rotor shaft is small, raising still another problem.

In the arrangement structure of the stator poles shown in FIG. 41, the stator pole configurations of the individual phases, which are opposed to the rotor, are arranged along the rotor shaft from one end to other end. In a simple logic, this structure may maximally raise the rotation change rates of the fluxes of the stator poles. FIGS. 37 and 38 show an example which is not as extreme as the one shown in FIG. 41. This example has a configuration, in which the size of the stator poles of the individual phases along the rotor shaft occupies about a half of the entire size of the motor in the rotor shaft direction. FIG. 38 is a vertical cross section of the stator, in which the horizontal direction corresponds to the rotor shaft direction, and the vertical direction corresponds to the radial direction of the motor. Indicated by 54SS is an end portion of a tooth of the stator pole 54S of FIG. 37 facing the rotor, by BY is a back yoke of the stator, and by 54SB is the tooth that passes flux from the end portion 54SS of the tooth to the back yoke BY. Comparing with the configuration shown in FIGS. 21 and 22, the motor having the configuration shown in FIGS. 37 and 38 has a structure which, in simple logic, may efficiently allow the rotor surface to face the stator poles and also may raise the rotation angle rates of the fluxes of the stator poles. In particular, in an area where flux density of the rotor surface is smaller than 1 tesla (1 T) and drive current of the motor is also comparatively small, for example, effective driving can be achieved. However, when large torque is desired to be obtained by supplying large current to the motor, this arrangement structure, in which the stator poles of each phase are closely adjacent to the stator poles of other phase, may tend to allow the magnetomotive force of the windings to cause flux leakage between the stator poles having different phases, thus creating a problem. Further, in this structure, a cross-sectional area of the tooth 54SB constituting a magnetic path is smaller than an area of the tooth end portion 54SS facing the rotor. Accordingly, this structure tends to cause magnetic saturation when rare-earth magnets having high flux density are used. Furthermore, partly due to the flux leakage mentioned above, magnetic saturation may tend to occur at various portions from the tooth end portion to the back yoke, creating another problem.

Methods for mitigating these problems will be described below. To make the explanation simple, description hereinafter is provided on an example of a motor having stator pole groups of three phases shown in FIG. 71. Indicated by numerals 711 and 714 are A-phase stator poles. Indicated by numeral 712 are B-phase stator poles, and by 713 are C-phase stator poles. Although not shown, various types of rotor can be used, such as the surface magnet rotor as shown in FIGS. 1 and 2. In a configuration of the stator poles facing the rotor shown in FIG. 71, when a length of the motor core along the rotor shaft is MT, a length MS of each stator pole along the rotor shaft is made larger than MT/3, so that the rotation angle rate of magnetic flux passing through the stator pole may be increased. This contrives to increase a rotation angle rate $d\phi/d\theta$ of a magnetic flux $\phi$ passing through the stator pole and to increase the voltage induced in the winding and the torque generated by the motor. In the example shown in FIG. 4, the length of each stator pole along the rotor shaft is slightly smaller than one third of the length of the motor core along the rotor shaft. Therefore, the configuration of FIG. 71 is more advantageous than that of FIG. 4 as far as torque is concerned.

In addition, stator poles are arranged most of the area where the stator and the rotor face with each other. As to the examples of six phases, the one shown in FIG. 22 leaves approximately a half of the space unused. The example of FIG. 37 arranges the stator poles so as to occupy much more space. The arrangement of FIG. 71 is analogous to the stator pole arrangement of FIG. 37.

Two windings are provided between respective stator poles, and the windings have wavy forms in synchronization with the irregularity in the rotor shaft direction of the stator poles. In case of configuring a synchronous motor, 3-phase AC current is supplied to each winding in synchronization with the rotor to drive the motor. For example, a winding 71A is supplied with a current $I_A$ shown by (a) of FIG. 72 and a winding 715 is supplied with a current $-I_A$. Similarly, a winding 716 is supplied with a current $I_B$, a winding 717 with $-I_B$, a winding 718 with a current $I_C$, and a winding 719 with a current $-I_C$. As to the voltages of the windings, for example, voltage across the oppositely connected windings 71A and 715 connected in series is a voltage $V_A$ shown by (b) of FIG. 72, voltage across the oppositely connected windings 716 and 717 connected in series is a voltage $V_B$, and voltage across the oppositely connected windings 718 and 719 connected in series is a voltage $V_C$. As a result, this motor can be driven by supplying balanced 3-phase voltages and currents.

In a motor shown in FIG. 73, the two windings between the respective stator poles of FIG. 71 have been combined into a single winding, and each single winding is supplied with a current obtained by arithmetic addition of the two currents. Accordingly, a winding 731 is supplied with a current $I_{BA}$ shown by (a) of FIG. 74, a winding 732 is supplied with a current $I_{CB}$ and a winding 733 is supplied with a current $I_{AC}$. As shown by (a) of FIG. 74, the winding 731 is supplied with the current $I_{BA}$ which is a sum of $-I_A$ and $+I_B$, with the current amplitude being larger by a factor of 1.732. On the other hand, since the thickness of the winding can be increased by a factor of two, copper loss of the winding can finally be three fourth. In other words, copper loss can be decreased by 250%.

Voltages of the windings are shown by (b) of FIG. 74. Voltage of the winding 731 is $-V_A/2$, voltage of the winding 732 is $V_{CB}$, and voltage of the winding 733 is $V_A/2$. As shown by (b) of FIG. 74, the voltages of the three windings are unbalanced 3-phase voltages. However, when the three windings are star-connected, the voltages between the three terminals will mutually have the same amplitudes $V_A$, $V_B$ and $V_C$ to present balanced 3-phase voltages. The star connection establishes a relationship that a center point of the star connection varies with the variation of the 3-phase AC voltage. As a result, this motor can be ideally driven by a normal 3-phase inverter for controlling 3-phase voltages and currents.

Figure 75:
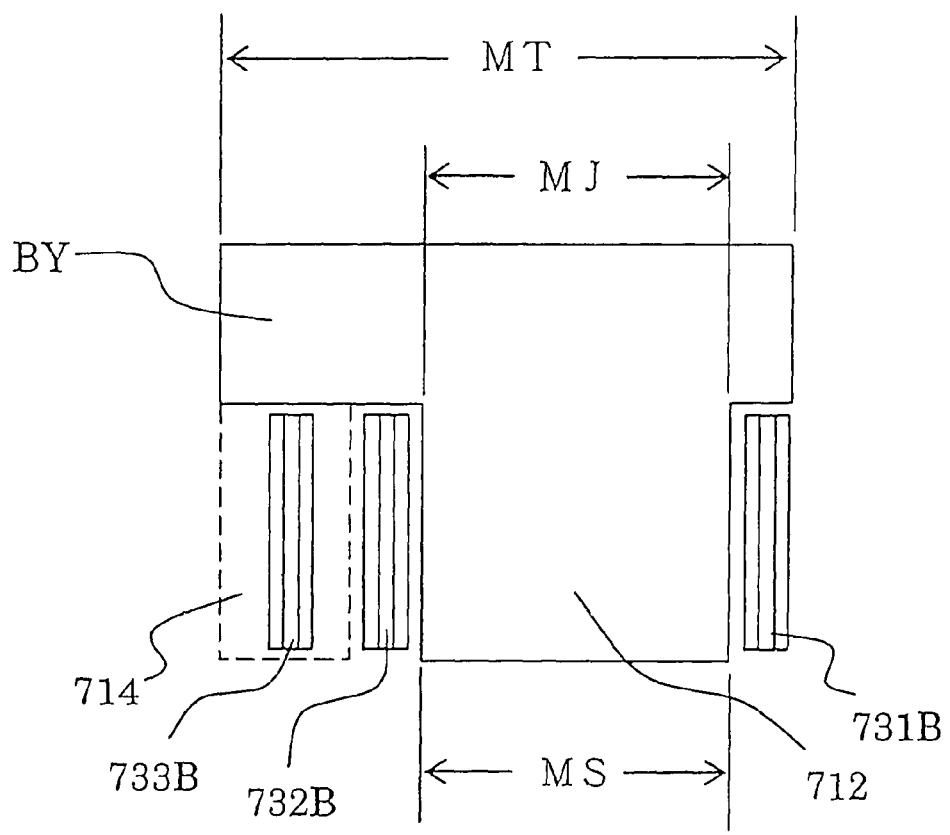
FIG. 75 is a transverse cross section illustrating stator poles of the motor shown in FIG. 73.

FIG. 75 shows a cross section taken along a line 3DB-3DB of FIG. 73. This figure shows a configuration of each stator pole, a configuration of each winding and electromagnetic characteristics. Indicated by BY is a back yoke of the stator and indicated by numeral 712 is a B-phase tooth. Indicated by MT is a length of the motor core along the rotor shaft, by MS is a length of the B-phase tooth 712 along the rotor shaft, and by MI is a length of a magnetic path portion extending from the end portion of the B-phase stator pole to the back yoke BY along the rotor shaft. In the example shown in FIG. 75, the configuration of the B-phase stator pole from the end thereof to the back yoke BY is uniform, i.e. MS and MI have the same length. In order to enhance torque of this motor, MS may be made larger than that shown in FIG. 75.

The magnetic path 54SB, or a portion of a tooth, shown in FIG. 38 has a length which is about one fourth of the length WDX of the end portion of the stator pole along the rotor shaft. Thus, in case rare-earth magnets having high flux density are used for the rotor to pass large current through the windings, the problem of magnetic saturation at the magnetic path 54SB is tend to be created. Comparing with FIG. 38, the configuration of FIG. 75 allows the magnetic path to have a sufficiently large length MJ along the rotor shaft. Accordingly, the magnetic path will have a large cross-sectional area for passing magnetic flux through each stator pole to eliminate the problem of magnetic saturation at a soft magnetic material. Thus, the motor having the configuration of FIG. 75 may be capable of providing large torque by passing large current. The A-phase stator pole 714 located behind is also ensured to have a sufficiently large magnetic path cross-sectional area. Similarly, the C-phase magnetic path cross-sectional area is also sufficiently large.

Indicated by 731B is a cross section of the winding 731, by 732B is a cross section of the winding 732 and by 733B is a cross section of the winding 733. The figure shows an example where each of the windings is made up of three turns of a flat conductor. These phase windings are located so as to block the stator poles of the individual phases to provide a winding configuration in which the electromotive force is allowed to work on the vicinity of the end portions of the stator poles of the individual phases, so that the electromotive force can work from the stator poles toward the rotor. As a result, the problem of flux leakage between the stator poles of different phases, which would have been created in the motor of FIG. 38, can be significantly reduced. Further, the winding configuration is flat as the winding 736B shown by (a) of FIG. 76, for example. Therefore, increase of the flux leakage as indicated by an arrow 761 may induce an eddy current as shown by an arrow 762. This eddy current in turn exerts an effect of preventing the increase of the magnetic flux 761. Thus, the flux 761 leaked between the stator poles of different phases can be reduced. It should be appreciated that the winding configuration of the motor of the present invention is not limited to the one shown by (a) of FIG. 76 or the like, but may be radially divided as shown by (b) of FIG. 76, or may be made up of a normal round wire or a strand wire. The current that flows through the winding 732 is a combined current of the eddy current shown by the arrow 762 and a phase current supplied to the winding 732. Further, the phase winding configuration is not limited to the one shown in FIG. 75. If only the windings are located covering each stator pole up to the vicinity of an opening portion of the stator pole, then this configuration has an effect of reducing flux leakage between the stator poles of different phases.

As represented by the configurations of the stator poles shown in FIG. 41 or FIGS. 38 and 75, extremes of stator pole configurations have been explained. However, motors having arrangements and structures intermediate of these extremes may also be realized. In the stator pole configuration of FIG. 37, each of the stator poles of B to F phases is configured to extend from a center thereof and project to both directions along the rotor shaft. Meanwhile, the A-phase stator poles located at both ends in the rotor shaft direction are divided into two for the structural reasons, each being extended and projected to one side in the rotor shaft direction. When the stator poles of FIG. 35, in which the stator poles at the ends are combined, is modified to the stator poles shown in FIG. 37, stator poles located at both ends in the rotor shaft direction are required to be much more projected (extended) toward a center of the stator than other phase stator poles by a factor of about two. For this reason, an amount of magnetic flux at each projected portion is increased, raising a problem of magnetic saturation of the soft magnetic material. In this point, although it may depend on the stator pole configurations, division of a stator pole of a phase for location of the same phase stator pole at both ends in the rotor shaft direction is significant as far as the magnetic path configuration is concerned.

Hereinafter will be described connection of the windings of the motor of the present invention, and a method for applying voltages and currents by a control unit of the motor. The examples of the motors of the present invention shown, for example, in FIGS. 1, 6, 7, 27, 28, 34 and 35, and windings of motors or the like, whose numbers of phases are changed, show voltages, inductances, resistances and the like which are characteristic of the individual motors. Such characteristics are not necessarily uniformed. Specifically, since interlinked magnetic fluxes may be significantly changed depending on the arrangements of the windings, the induced voltage of each winding, in particular, may be differentiated. A specific method for wire connection and a specific method for driving voltage and current may be used depending on motor configurations. One such particular method may be to individually drive the windings in a drive circuit as shown in FIG. 137. In this case, voltage in a drive circuit is mostly driven under a driving condition of a constant power supply voltage. Accordingly, if a winding is designed with the number of turns that matches the power supply voltage for the sake of driving efficiency of each power element, efficient driving may be realized. For example, when an interlinked flux φ is small, a number of turns Nw may be increased so that a product of the flux φ and the number of turns Nw, i.e. a number of interlinked fluxes Ψ expressed by Ψ=φ×Nw, will be as large as that of each of other windings. Thus, in this method, the number of turns Nw of a winding is set so that the number of interlinked fluxes Ψ=φ×Nw of individual windings will be approximately of the same level, and the windings are independently driven in a drive circuit as shown in FIG. 137.

Figure 77:
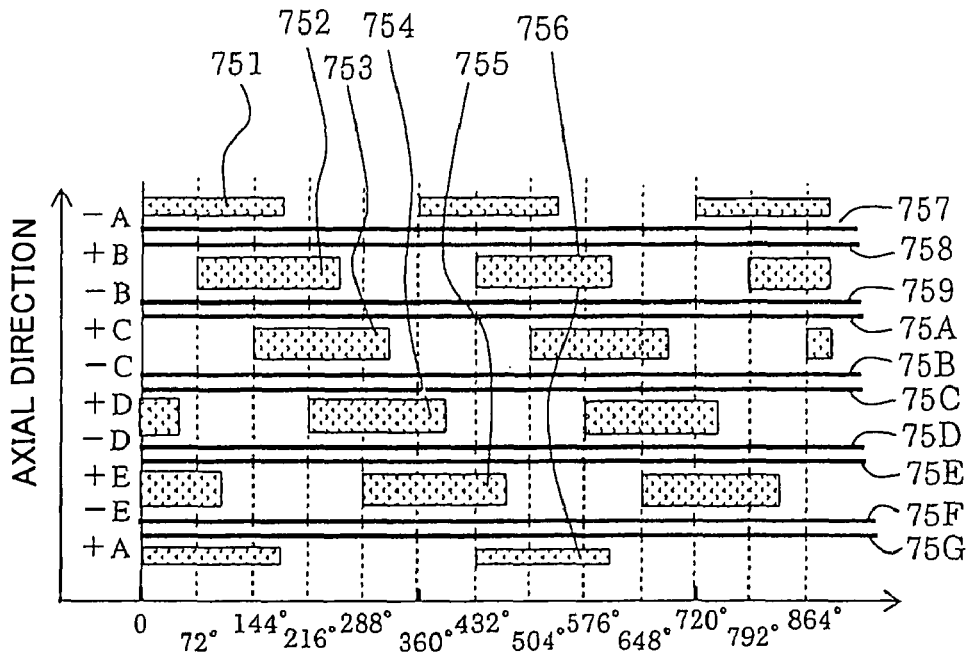
FIG. 77 is a schematic diagram illustrating a configuration of a 5-phase motor having loop windings.

Hereinafter will be described an example of a 5-phase motor of the present invention shown in FIG. 77. Contrary to the 6-phase motor having seven stator pole groups shown in FIGS. 21 and 22, the layout of the stator poles and windings shown in FIG. 77 is associated with a 5-phase motor. Such a 5-phase motor is analogous to a 4- or 6-phase motor in some points, however, has a number of peculiarities and configuration differences due to the odd number "5", as well as differences in characteristics.

FIG. 77 illustrates a circumferential configuration of the stator poles and windings opposed to the rotor, which has been linearly developed. The horizontal axis indicates circumferential rotation angle in terms of electrical angle and the vertical axis indicates the rotor shaft direction, with the current vectors −A, +B, −B +C and the like of the windings being additionally indicated. Indicated by numerals 751 and 756 are stator poles that belong to A-phase. A combination of these two stator poles can achieve the function of the A-phase stator pole. The stator poles of the same phase are arranged along the circumference at an interval of 360° in electrical angle. Similarly, indicated by numeral 752 are B-phase stator poles, by 753 are C-phase stator poles, by 754 are D-phase stator poles, and by 755 are E-phase stator poles. Indicated by numeral 757 is a loop winding which passes a current of vector −A indicated in a vector diagram of FIG. 78. Similarly, a winding 758 passes a current of phase +B, a winding 759 passes a current of phase −B, a winding 75A passes a current of phase +C, a winding 75B passes a current of phase −C, a winding 75C passes a current of phase +D, a winding 75D passes a current of phase −D, a winding 75E passes a current of phase +E, and a winding 75F passes a current of phase −E.

Figure 78:
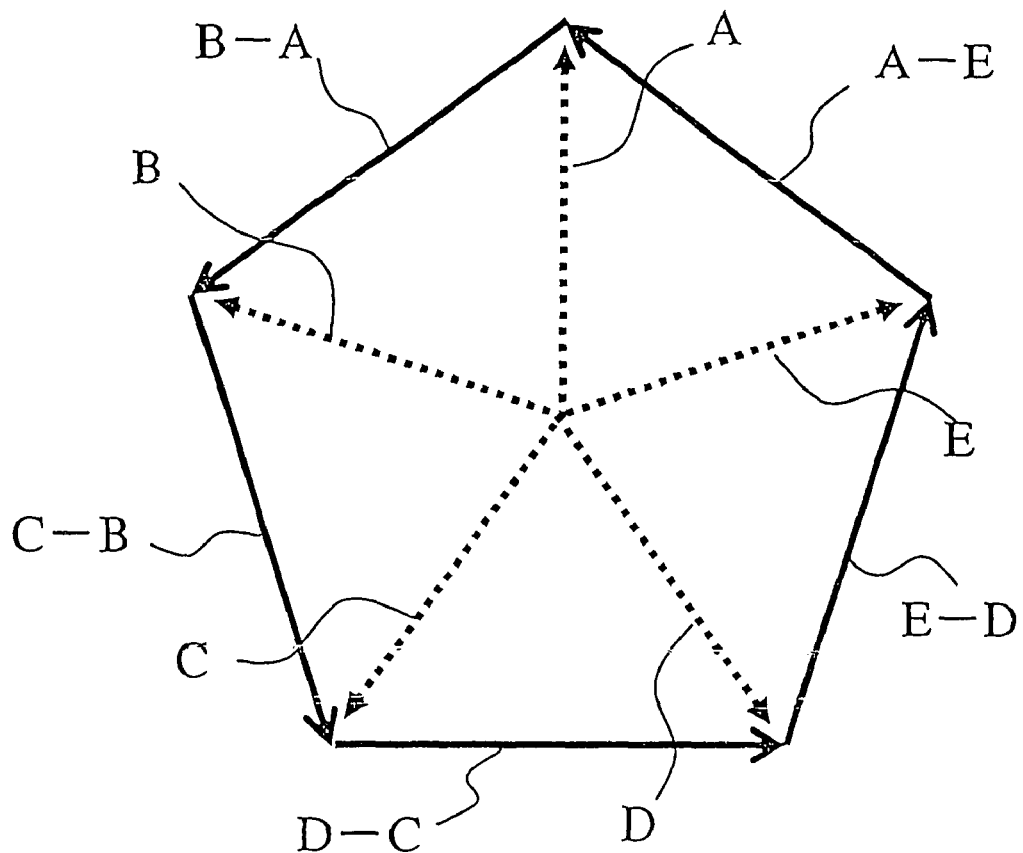
FIG. 78 vectorially illustrates electrical currents of FIG. 77.
Figure 79:
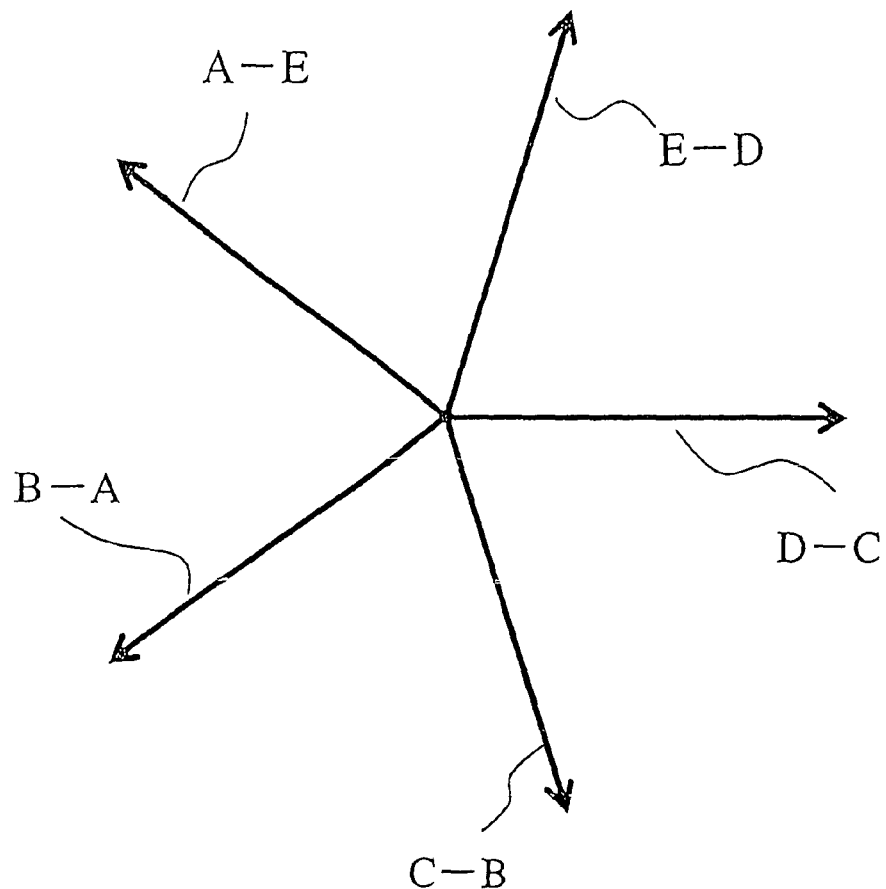
FIG. 79 vectorially illustrates electrical currents of FIG. 77.

The windings 757 and 758 are arranged in the same space, and thus a sum of currents passing through the two windings is obtained by subtracting the vector B from the vector A shown in FIG. 78, i.e. can be represented by a vector B-A. Similarly, the windings 759 and 75A are represented by a vector C-B, the windings 75B and 75C are represented by a vector D-C, the windings 75D and 75E are represented by a vector E-D, and the windings 75F and 75G are represented by a vector A-E. For clearer understanding, vectors of the individual currents are indicated at the left side in FIG. 77. Based on a vector relationship of FIG. 78, 5-phase delta connection can be established so as to be driven with a 5-phase inverter. The vectors of FIG. 78 can be rewritten as shown in FIG. 79, based on which, a star connection can be established so as to be driven with a 5-phase inverter.

However, assuming that a current of the vector (B-A) effectively works in a motor, a winding factor of the windings 757 and 758 is expressed by COS ((180°−72°)/2)=0.5878. This means that the 5-phase motor of FIGS. 77 and 77 is not large. There is room for improvement in the use of the windings.

Figure 80:
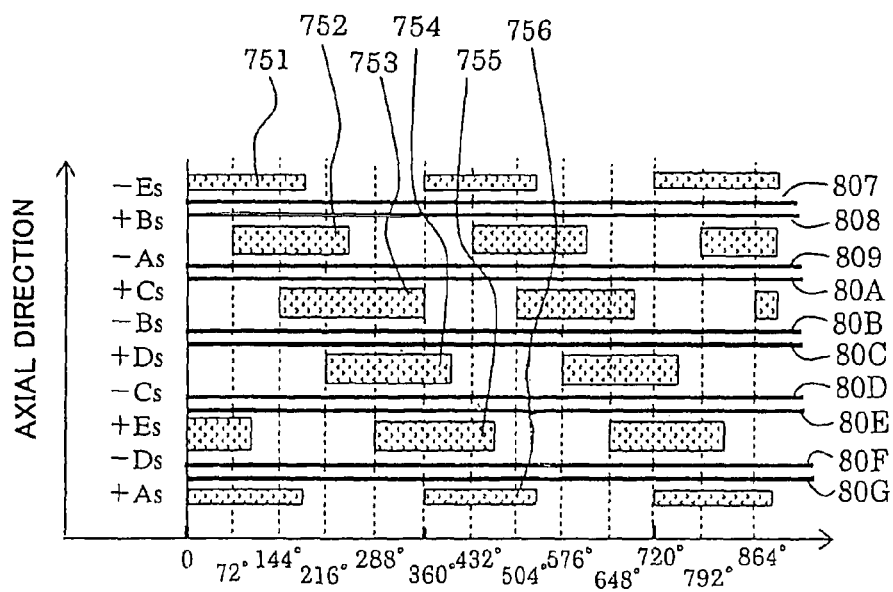
FIG. 80 is a schematic diagram illustrating a configuration of a 5-phase motor having loop windings.
Figure 81:
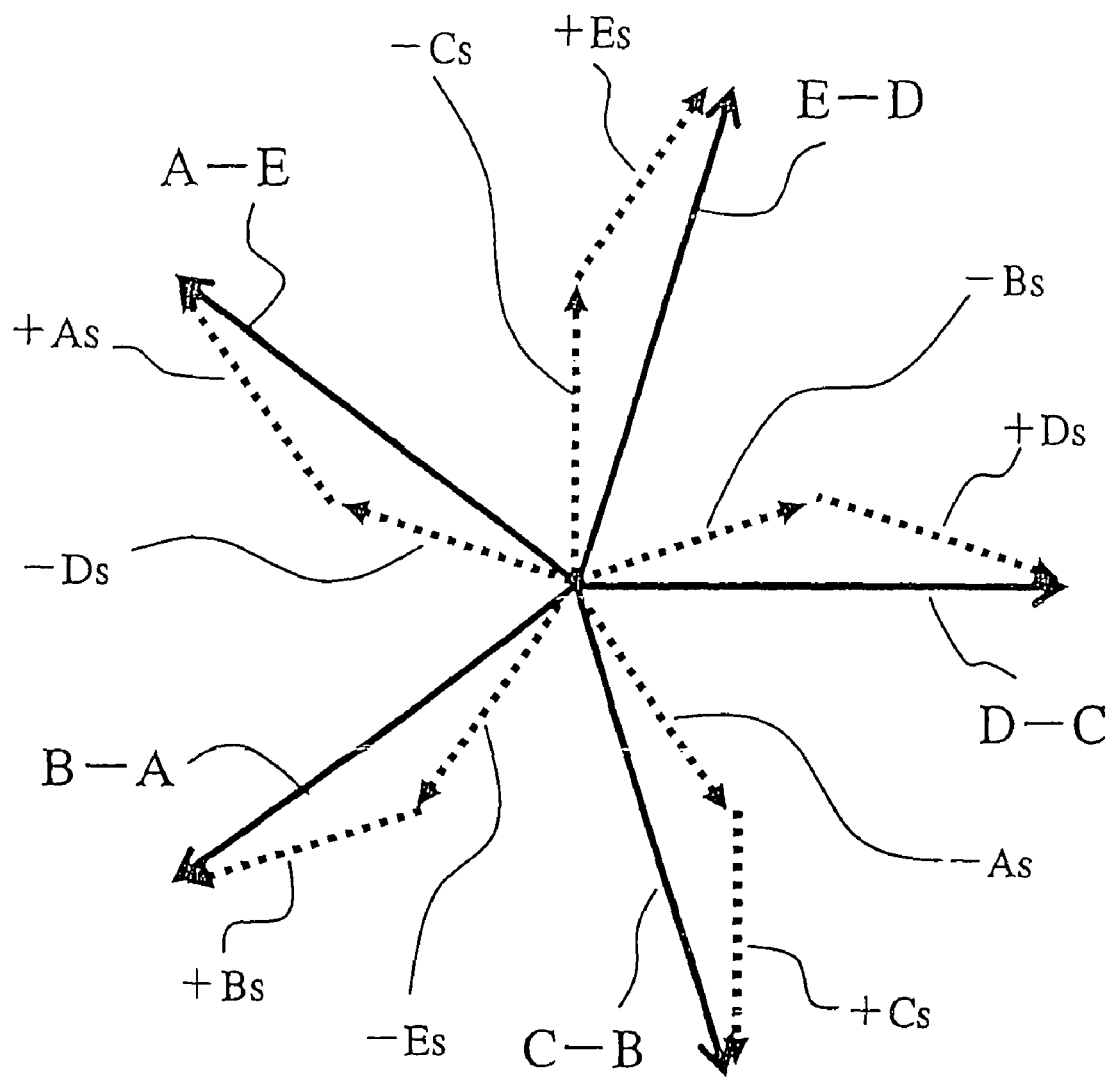
FIG. 81 vectorially illustrates electrical currents of the motor shown in FIG. 80.

An example of a motor is shown in FIGS. 80 and 81, in which the winding factor is improved by changing the arrangement of the windings. Specifically, in the winding arrangement, a current +$B_S$ is supplied to a winding 808 and a current −$B_S$ is supplied to a winding 80B which sandwiches between itself and the winding 808 the B-phase stator pole 752 and the C-phase stator pole 753 in the rotor shaft direction. Similarly, a current +$C_S$ is supplied to a winding 80A, and a current −$C_S$ is supplied to a winding 80D. A current +$D_S$ is supplied to a winding 80C, and a current −$C_S$ is supplied to a winding 80D. A current +$E_S$ is supplied to a winding 80E, and a current −$E_S$ is supplied to a winding 807. A current +$A_S$ is supplied to a winding 80G, and a current −$A_S$ is supplied to a winding 809. The vectors B-A, C-B, D-C, E-D and A-E have the same values between FIGS. 79 and 81. The vectors $A_S$, $B_S$, $C_S$, $D_S$ and $E_S$ in FIG. 81 are the vectors of five phases.

Thus, the winding 807 is supplied with the current of the vector −$E_S$ and the winding 808 is supplied with the current of the vector +Bs with a result that the current of the vector (B-A) is supplied between the A-phase stator pole 751 and the B-phase stator pole 752, exerting the same electromagnetic effect as the case of the windings 757 and 758 of the motor shown in FIG. 77. Similarly, the winding 809 is supplied with the current of the vector −$A_S$ and the winding 80A is supplied with the current of the vector +$C_S$ with a result that the current of the vector (C-B) is supplied between the B-phase stator pole 752 and the C-phase stator pole 753, exerting the same electromagnetic effect as the case of the windings 759 and 75A of the motor shown in FIG. 77. The winding 80B is supplied with the current of the vector −$B_S$ and the winding 80C is supplied with the current of the vector +$D_S$ with a result that the current of the vector (D-C) is supplied between the C-phase stator pole 753 and the D-phase stator pole 754, exerting the same electromagnetic effect as the case of the windings 75B and 75C of the motor shown in FIG. 77. The winding 80D is supplied with the current of the vector −$C_S$ and the winding 80E is supplied with the current of the vector +$E_S$ with a result that the current of the vector (E-D) is supplied between the D-phase stator pole 754 and the E-phase stator pole 755, exerting the same electromagnetic effect as the case of the windings 75B and 75C of the motor shown in FIG. 77. The winding 80F is supplied with the current of the vector −$D_S$ and the winding 80G is supplied with the current of the vector +$A_S$ with a result that the current of the vector (A-E) is supplied between the E-phase stator pole 755 and the A-phase stator pole 756, exerting the same electromagnetic effect as the case of the windings 75F and 75G of the motor shown in FIG. 77.

Figure 83:
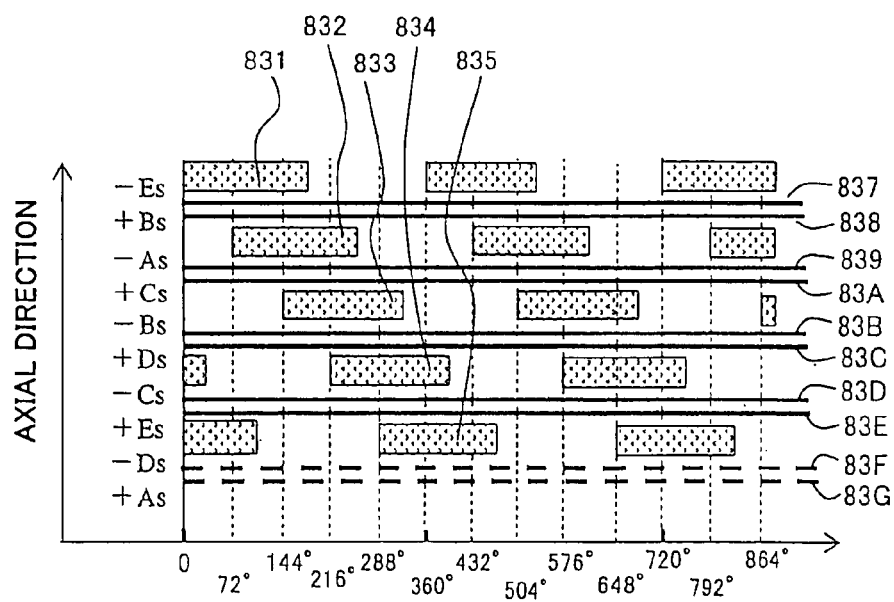
FIG. 83 is a schematic diagram illustrating a configuration of a 5-phase motor having loop windings.

FIG. 83 shows an example of the motor of the present invention. In the motor shown in FIG. 83, the A-phase stator pole 756 of FIG. 80 is combined into the stator pole 751 to obtain a stator pole 831 of FIG. 83. Indicated by numeral 832 is a B-phase stator pole, by 833 is a C-phase stator pole, by 834 is a D-phase stator pole, and by 835 is an E-phase stator pole. Windings 837, 838, 839, 83A, 83B, 83C, 83D and 83E are analogous to the windings of FIG. 80, but the phases of the voltages and currents are both offset by 360°/(5×2)=36° to make up for the stator pole 756. The windings 83F and 83G, which are resultantly located outside the stator core, hardly exert electromagnetic effect on torque generation of the motor and thus can be omitted.

Figure 84:
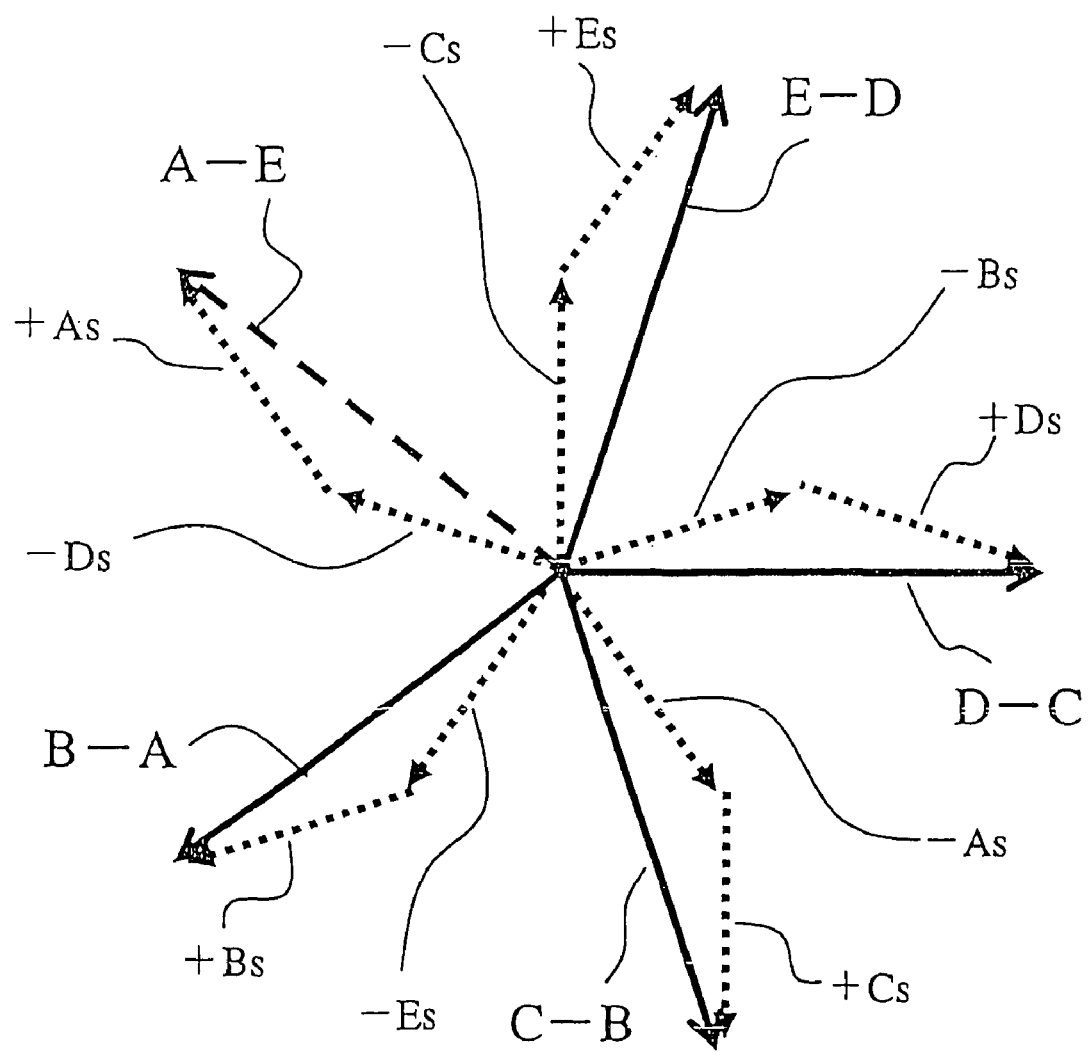
FIG. 84 vectorially illustrates electrical currents of the motor shown in FIG. 83.

Current vectors of the windings are shown in FIG. 84. The current −$D_S$ corresponding to the winding 83F and the current +A_S corresponding to the winding 83G are no longer necessary. The remainders have the same relationship as the vectors shown in FIG. 81.

Figure 85:
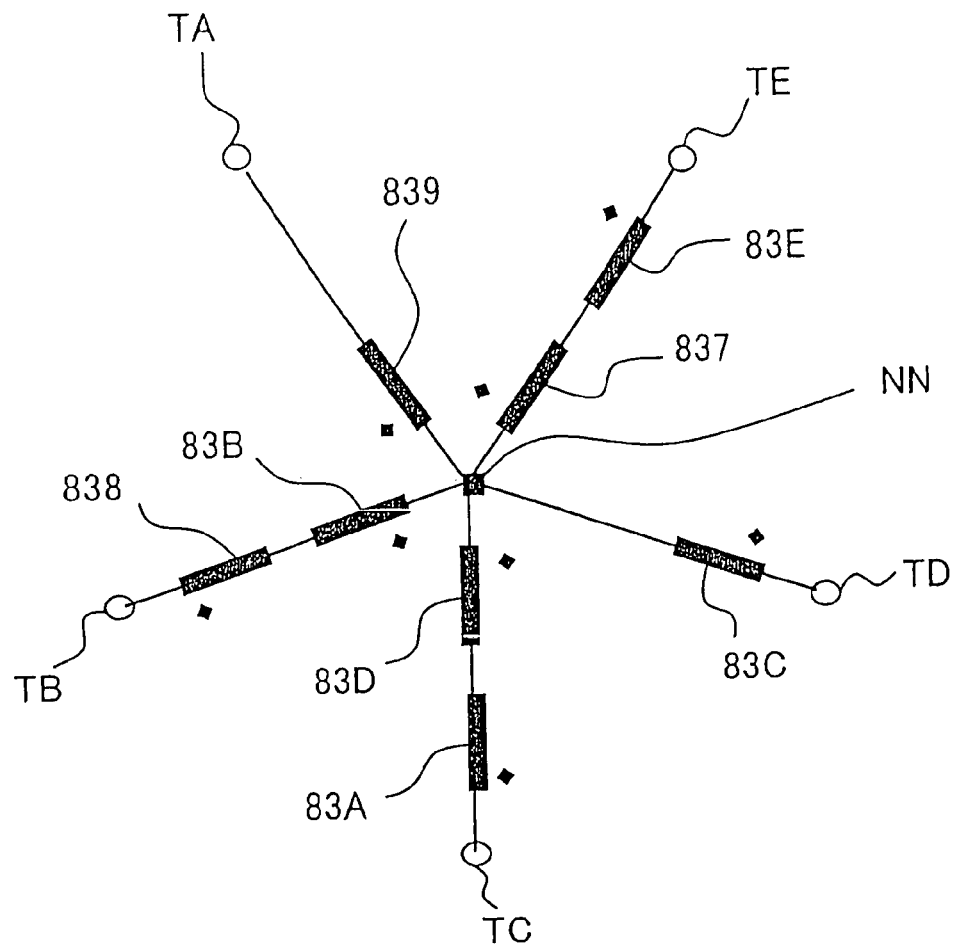
FIG. 85 illustrates a wire connection, in which the windings of the motor shown in FIG. 83 are a star-connected.

Star connection of the windings of FIG. 83 will be as shown in FIG. 85 if two windings with the same currents reversely passed therethrough are oppositely connected in series sandwiching two stator poles. Comparing with the windings of FIG. 82, the two windings 83F and 83G are removed from the windings of FIG. 85 with a phase offset of 36°. Meanwhile, the voltage amplitude and current amplitude of terminals TA, TB, TC, TD and TE in the star connection and the relative phase of the individual phases are the same. Further, a point NN that is a center of the star connection has a potential which is equal to an average voltage of the five terminals.

Figure 82:
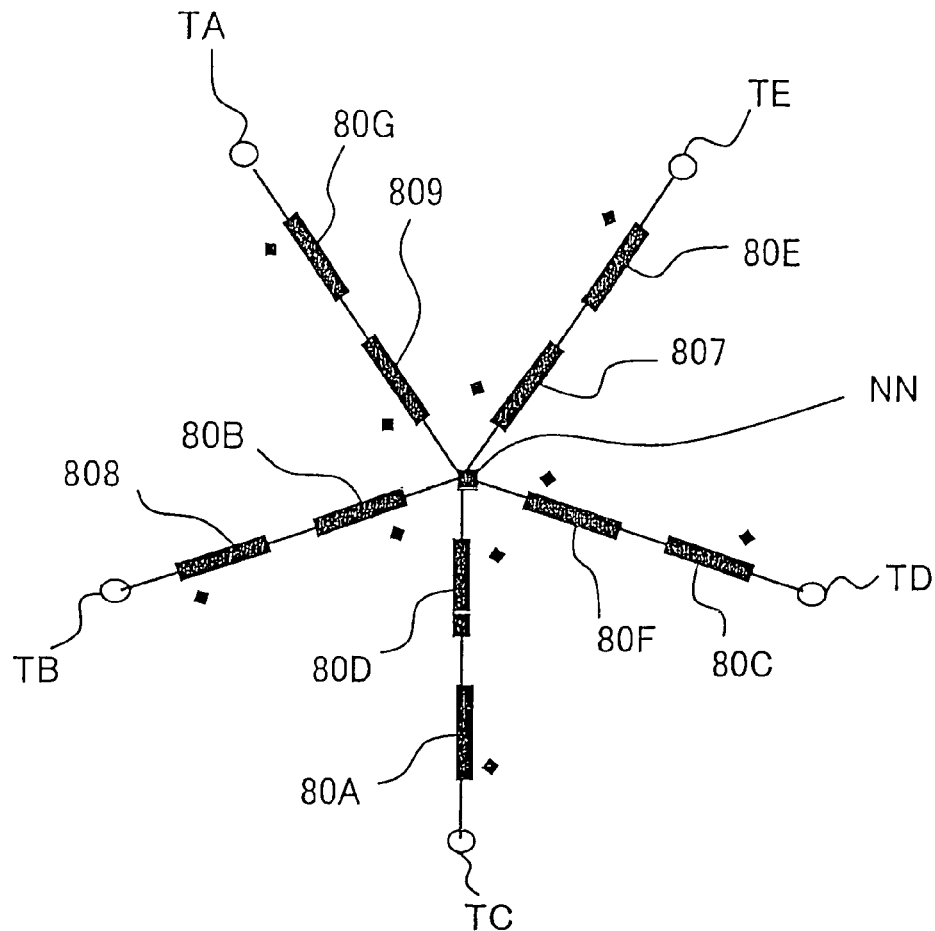
FIG. 82 illustrates a wire connection, in which the windings of the motor shown in FIG. 80 are star-connected.

From the viewpoint of voltage, since the reverse-phase currents in the above condition are oppositely passed sandwiching two stator poles, anti-series connection of these two windings can establish a relationship where the windings are interlinked with magnetic fluxes that fall within an electrical angle of (72°+72°)=144°. The windings of FIG. 81 can provide a relationship where currents of the individual windings can efficiently generate a combined magnetomotive force to thereby provide a 5-phase voltages having the same voltage amplitude and a phase difference of 72°. Thus, as shown in FIG. 82, the windings can be star-connected so as to control and drive the 5-phase currents. In the same way, the wire connection can be changed to a delta connection.

Figure 86:
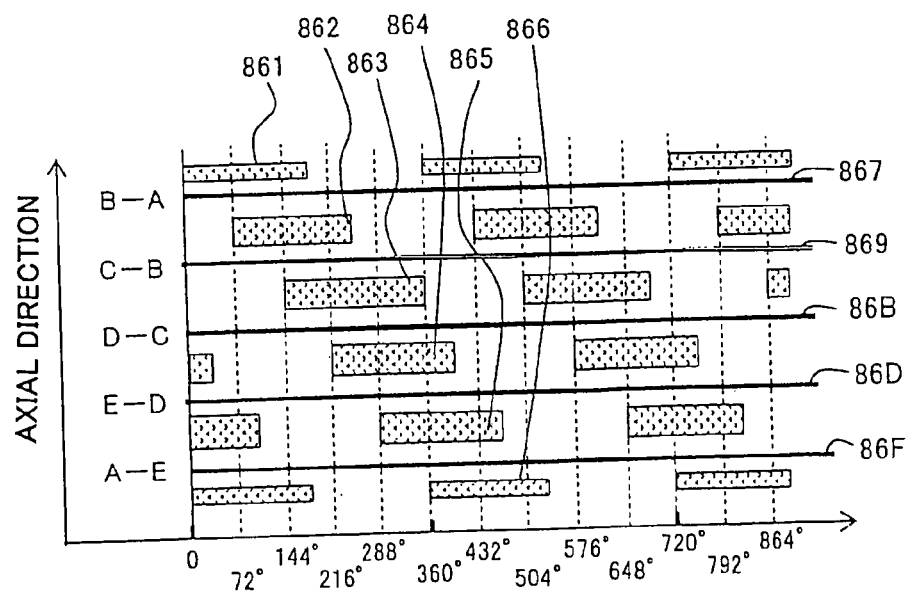
FIG. 86 is a schematic diagram illustrating a configuration of a 5-phase motor having loop windings.

The voltage of each winding shown in FIGS. 77 and 80 has different phase and amplitude, as shown in FIG. 86, depending on the slot the winding is arranged. As described above, in the five sets of two windings that are oppositely connected in series sandwiching two stator poles, the voltage across each of the five sets of the two windings has the same amplitude with a mutual phase difference of 72° to thereby constitute balanced 5-phase voltages.

In the above condition, a winding factor of each winding presents an excellent value of COS (180°−144°)/2)=0.951 irrespective of the way of connection of the windings, thus providing significantly improved relationship comparing with that shown in FIGS. 77 and 78.

When the motor of the present invention has an odd number of phases, there exist no slots having a phase difference of 180° in electrical angle. However, if the two windings are imparted with reverse turns and located at positions closer to 180°, efficient driving can be realized. In case of a 5-phase motor, windings of the same phase may be oppositely wound sandwiching two or three stator poles. In case of a 7-phase motor, windings of the same phase may only be oppositely wound sandwiching three or four stator poles. Even a configuration sandwiching two stator poles will achieve dramatically good efficiency comparing with a configuration in which a single stator pole is sandwiched between windings. The similar effects can be achieved by other motors having odd or even numbers of phases.

A motor having even-number phases with a large prime number, such as 5, 7, 9 or 11, has a high probability, in its entirety as a motor, of being cancelled with the harmonic components in the individual phases, so that motor driving with small torque ripple can be realized. For example, a 3-phase motor tends to have 60°-cycle harmonic components and a 6-phase motor also tends to have 60°-cycle harmonic components, although the frequency of the latter is mitigated. A 4-phase motor, with its prime number being "2", tends to cause a large number of harmonic components and requires contriving a way of reducing the harmonic components when motors are designed. In this regard, a 5- or 7-phase motor can mostly cancel low-level harmonic components, so that the harmonic components reduction can be readily performed in designing motors. Accordingly, a high-quality motor having small torque ripple with low noise and vibration can be realized. Unlike the motors used in automated or unattended industrial machinery or production line, for motors which are used in a location close to man's acoustic or tactile sense, quietness is a very important characteristic.

As described above, a motor having stator pole groups with an N number of phases within an electrical angle of 360°, where N is an odd number, and having a plurality of loop windings arranged between the stator pole groups, can reduce the winding factor depending on the methods of the wire connection and thus can realize efficient driving. Also, as described above, a star connection may enable control of the balanced N-phased voltages and currents and driving of the motor.

As will be described later, a motor having a single loop winding between stator pole groups may not impart the windings with balanced N-phased voltages. However, as shown by (a) of FIG. 93, such a motor may enable balanced N-phased voltages and current driving with an N number of terminals in a star connection made up of an (N−1) number of windings and a center point thereof. Also, as shown by (b) of FIG. 93, the balanced N-phased voltages and current driving may be enabled by the N number of terminals in a delta connection where one line of the (N−1) number of windings is absent.

Methods of driving a motor by applying voltages and currents to the windings include a method performed by individually controlling and driving the windings, a method performed by N-phased driving with a star connection, a method performed by N-phased driving with a delta connection, and other methods performed by modified driving of the foregoing.

There may be a case where stator pole groups have N types of phases, where N is an even number of "6" or more. Taking the case of the motor shown in FIGS. 34 and 35 as an example, where N=6, two windings, i.e. 61 and 64, 62 and 65, and 63 and 66, having a phase difference of 180° in electrical angle may each be oppositely connected in series. Thus, a 3-phase star connection with three sets of windings can be realized, which can be driven by a 3-phase inverter. Thus, where N is an even number of "6" or more, the motor can be driven by a balanced AC inverter of N/2 phases.

Where N is "4", two windings having a phase difference of 180° in electrical angle can be oppositely connected in series. However, two sets of the windings cannot configure a multiphased and balanced AC circuit net of three or more phases. In this case therefore, a particular circuit configuration is required to be fabricated.

Where N is "3", two windings passed with the same phase currents may be serially connected with the directions of the currents being matched, in a motor configuration shown in FIG. 1 or 71. In this way, a 3-phase star connection can be configured, which can be controlled by a 3-phase inverter.

Where stator pole groups have the N types of phases, where N is an odd number of "5" or more, N sets of star windings can be provided, which are connected and configured according to a certain rule. In this case, an N-phased multiphased and balanced circuit net can be configured, which can be driven by an N-phased balanced AC inverter.

Thus, a characteristic that efficient driving can be performed by a multiphase AC inverter can be obtained. In case of the star connection discussed herein, the center connection portion has a voltage which is equal to an average voltage at the terminals of the star connection. Therefore, steady potential can be provided, or potential can be steadied. Use of the steadied potential portion of each winding as a winding-start portion for a motor core may reduce potential variation between the winding and the core, leading to the reduction of current leakage due to stray capacitance between the winding and the core. In this way, the problem of electromagnetic interference or the like can be mitigated.

The windings may be delta connected for control by a multiphase AC inverter. However, this may have a risk of causing a flow of loop current in the delta connection. Therefore, a motor is required to be designed so that unbalanced components of the motor can be prevented from being generated, or one has to be careful so that no unbalance may be caused in fabrication or inverter control. Accordingly, unless there are particular reasons, star connection is most normally used.

Figure 87:
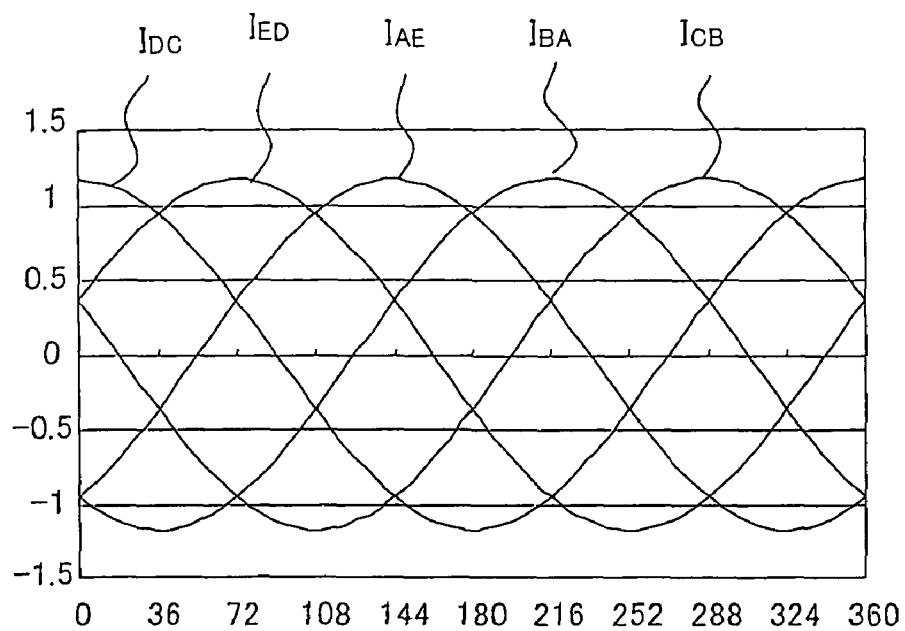
FIG. 87 is a current waveform diagram associated with the motor shown in FIG. 83.

FIG. 86 shows an example of the motor of the present invention. This motor is a 5-phase motor having six stator pole groups as in FIGS. 77 and 80. Indicated by numerals 861 and 865 are A-phase stator poles, by 862 are B-phase stator poles, by 863 are C-phase stator poles, by 864 are D-phase stator poles and by 865 are B-phase stator poles. Indicated by 867, 869, 86B, 86D and 86F are windings between the stator poles. Current vectors to be passed through the windings are B-A, C-B, D-C, E-D and A-E shown in FIG. 79. Phase currents $I_{BA}$, $I_{CB}$, $I_{DC}$, $I_{ED}$ and $I_{AE}$ can be expressed by the following Formulas (31) to (35) and FIG. 87, provided that a rotor position of A-phase in rotation direction is expressed by θr=0:

$$I_{BA}=I_o \times (\sin(\theta r - 72°) - \sin(\theta r)) \quad (31)$$

$$I_{CB}=I_o \times (\sin(\theta r - 144°) - \sin(\theta r - 72°)) \quad (32)$$

$$I_{DC}=I_o \times (\sin(\theta r - 216°) - \sin(\theta r - 144°)) \quad (33)$$

$$I_{ED}=I_o \times (\sin(\theta r - 288°) - \sin(\theta r - 216°)) \quad (34)$$

$$I_{AE}=I_o \times (\sin(\theta r) - \sin(\theta r - 288°)) \quad (35)$$

Figure 88:
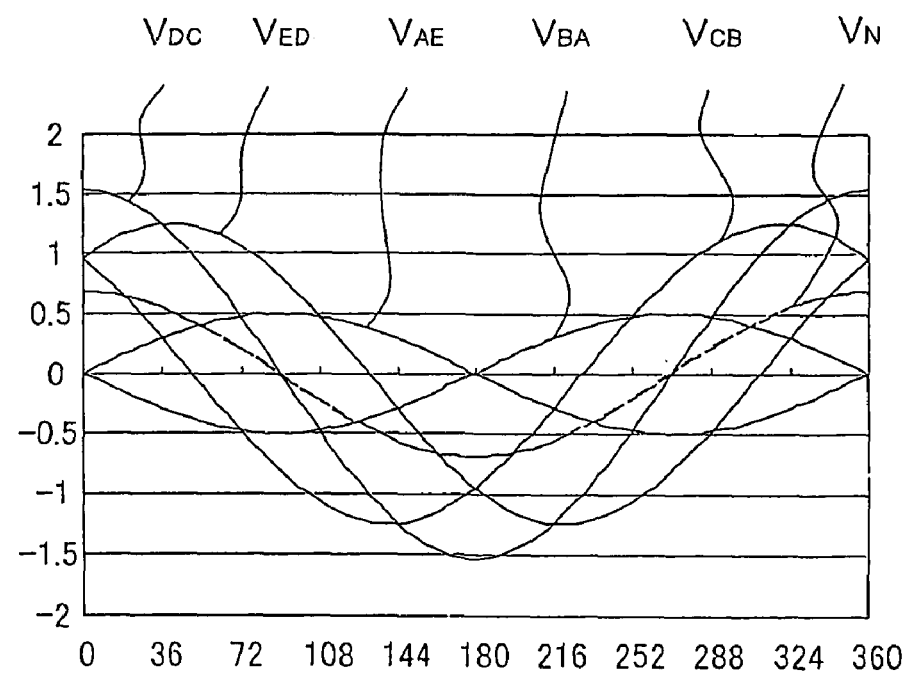
FIG. 88 is a voltage waveform diagram associated with the motor shown in FIG. 83.

Voltages $V_{BA}$, $V_{CB}$, $V_{DC}$, $V_{ED}$ and $V_{AE}$ of the windings can be expressed by the following Formulas (36) to (40) and FIG. 88:

$$V_{BA}=-V_o \times \sin(\theta r)/2 \quad (36)$$

$$V_{CB}=V_{BA}-V_o \times \sin(\theta r - 72°) \quad (37)$$

$$V_{DC}=V_{CB}-V_o \times \sin(\theta r - 144°) \quad (38)$$

$$V_{ED}=V_{DC}-V_o \times \sin(\theta r - 216°) \quad (39)$$

$$V_{AE}=V_{ED}-V_o \times \sin(\theta r - 288°) \quad (40)$$

As will be understood from the voltage characteristics shown in FIG. 88, the windings do not present balanced 5-phase voltages. Indicated by $V_N$ in FIG. 88 is an average voltage derived from Formulas (36) to (40). Assuming that the windings are star-connected and that voltage at the center point is $-V_N$, calculation of the terminal voltages of the star connection results in as indicated by $V_{BAN}$, $V_{CBN}$, $V_{DCN}$, $V_{EDN}$ and $V_{AEN}$ in FIG. 89. The terminal voltages of the star connection present balanced 5-phase voltages.

In this way, when the motor of FIG. 86 is imparted with a star connection and currents of (31) to (35) are passed in synchronization with the rotation of the rotor, the voltage at the center of the star connection is significantly varied and shows the value $-V_N$. However, the terminal voltages of the star connection results in as indicated by $V_{BAN}$, $V_{CBN}$, $V_{DCN}$, $V_{EDN}$ and $V_{AEN}$ in FIG. 89. In other words, balanced 5-phase voltages are attained, so that efficient operation and driving with a 5-phase inverter can be confirmed.

Although the above description has been provided for a 5-phase motor, the same relationship can be established for motors having other number of phases than five. The 3-phase motor of FIG. 73 can also attain the same relationship.

Figure 90:
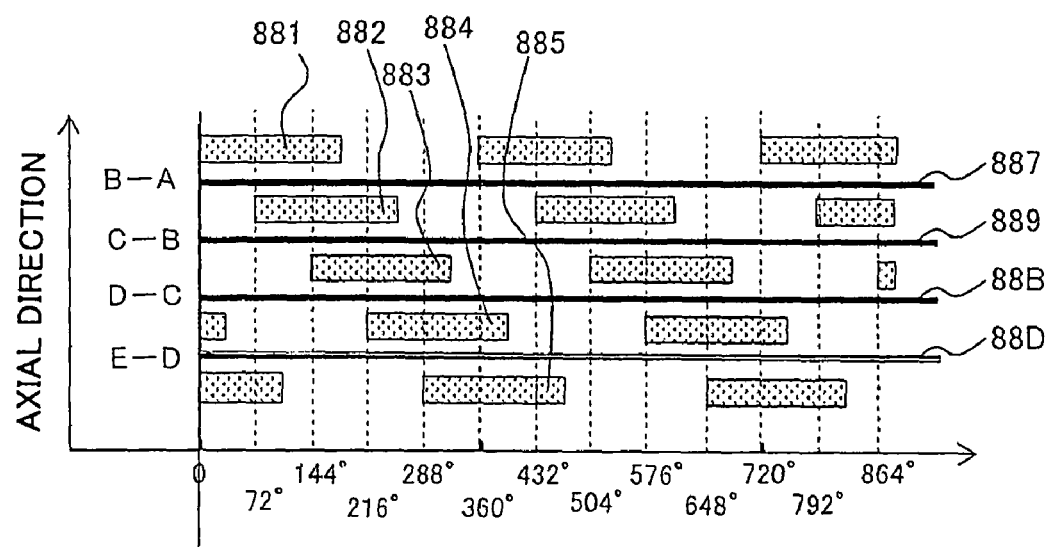
FIG. 90 is a schematic diagram illustrating a configuration of a 5-phase motor having loop windings.
Figure 91:
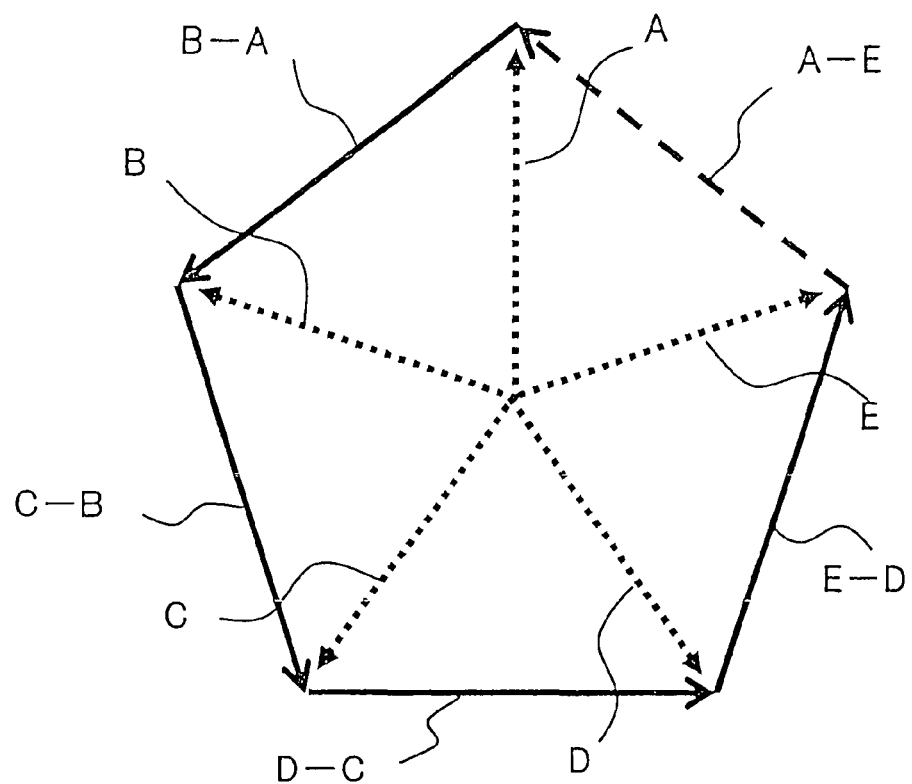
FIG. 91 vectorially illustrates the electrical currents of the motor shown in FIG. 90.
Figure 92:
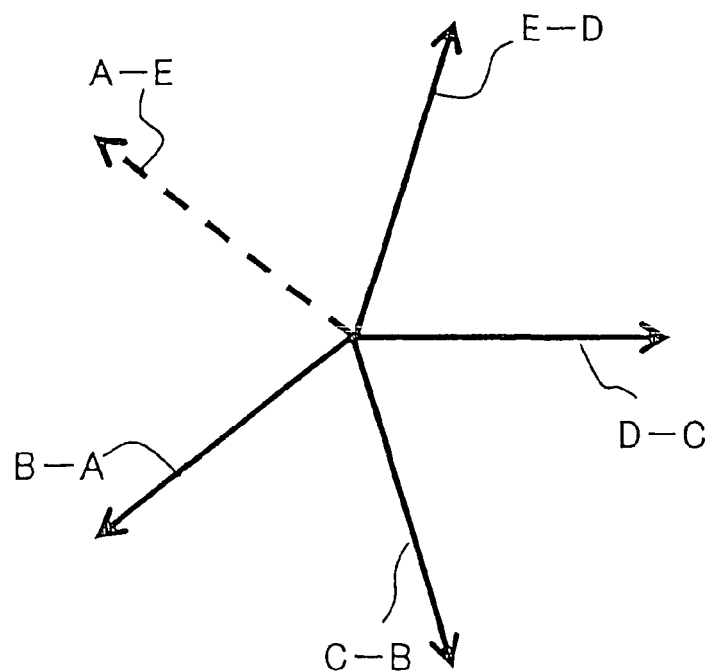
FIG. 92 vectorially illustrates the electrical currents of the motor shown in FIG. 90.

FIG. 90 shows another example of the present invention. Indicated by numeral 881 are A-phase stator poles having a configuration obtained by combining the A-phase stator poles 866 and 861 of FIG. 86. Indicated by 882 are B-phase stator poles, by 883 are C-phase stator poles, by 884 are D-phase stator poles and by 885 are E-phase stator poles. Current indicated by a vector B-A in FIGS. 91 and 92 is passed through a winding 887, current indicated by a vector C-B is passed through a winding 889, current indicated by a vector D-C is passed through a winding 88B, and current indicated by a vector E-D is passed through a winding 88D. A current $I_N$ indicated by a vector A-E in FIGS. 91 and 92 is not required to be directly passed to the motor. However, when the windings are star-connected as shown by (a) of FIG. 93, a sum of the currents of the four windings is passed to a center NN of the star connection. A negative value of the summed up current corresponds to a current $I_N$ represented by the vector A-E. As a result, although there is no winding for directly passing the current $I_N$ represented by the vector A-E, the motor may be regarded as being supplied with the current $I_N$.

Voltage characteristics of the individual windings are different from those shown in FIG. 88 and can be expressed by the following Formulas (51) to (54):

$$V_{BA}=-V_o \times \sin(\theta r) \quad (51)$$

$$V_{CB}=V_{BA}-V_o \times \sin(\theta r - 72°) \quad (52)$$

$$V_{DC}=V_{CB}-V_o \times \sin(\theta r - 144°) \quad (53)$$

$$V_{ED}=V_{DC}-V_o \times \sin(\theta r - 216°) \quad (54)$$

Figure 95:
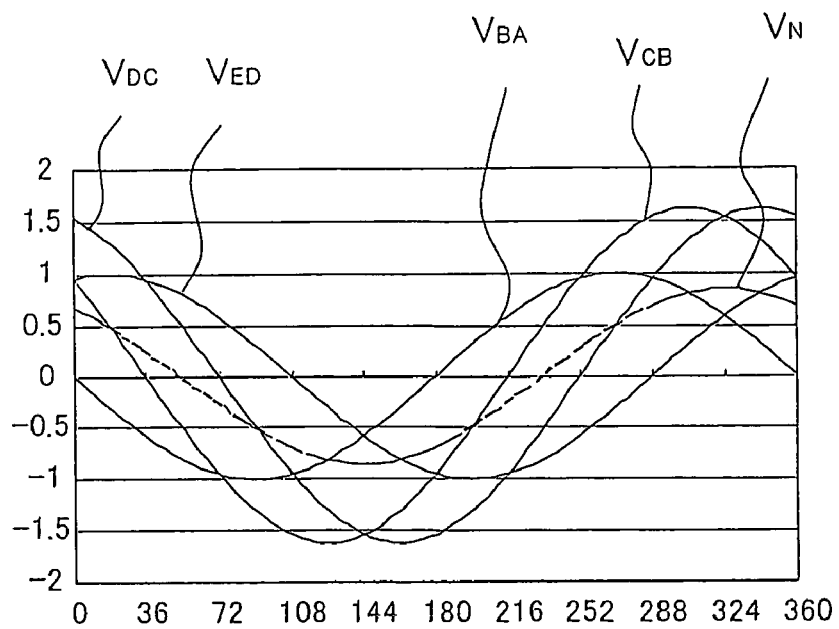
FIG. 95 is a voltage waveform diagram associated with the windings of the motor shown in FIG. 93.

A value obtained by the addition of the above four values, followed by a division with five is indicated by $V_N$ in FIG. 95.

$$V_N=(V_{BA}+V_{CB}+V_{DC}+V_{ED}+0)/5 \quad (55)$$

Figure 93:
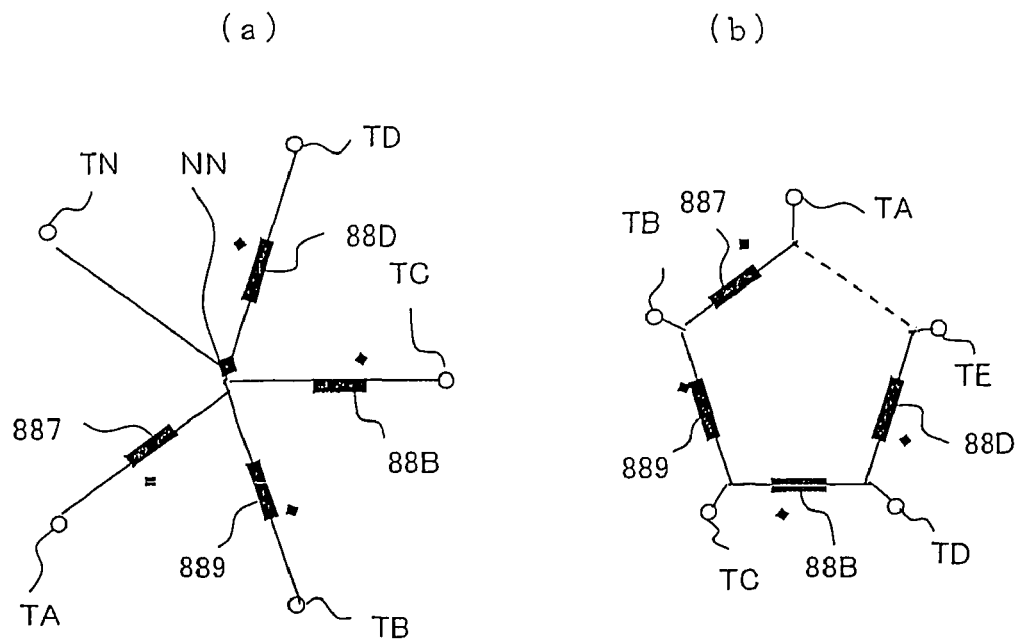
FIG. 93 illustrates wire connections, in which the windings of the motor shown in FIG. 90 are star-connected and delta-connected.
Figure 94:
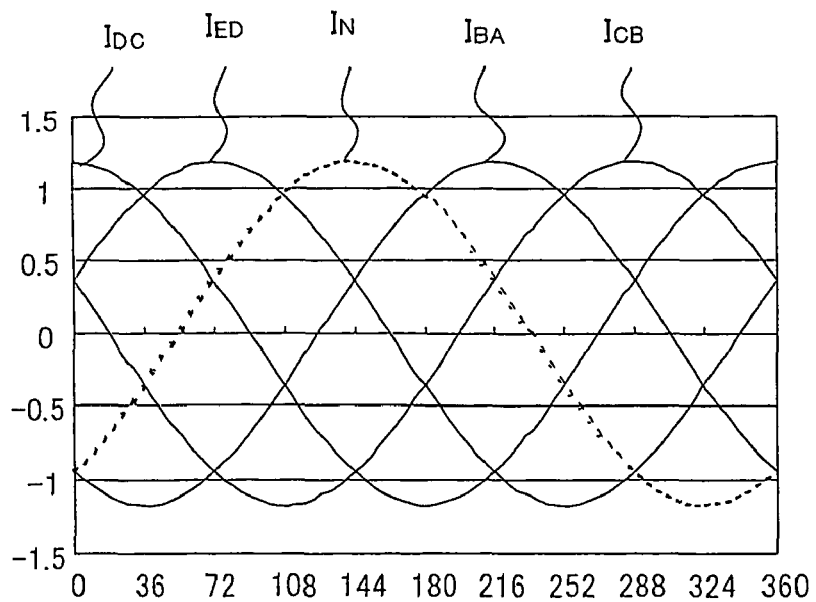
FIG. 94 is a current waveform diagram associated with the motor shown in FIG. 93.
Figure 96:
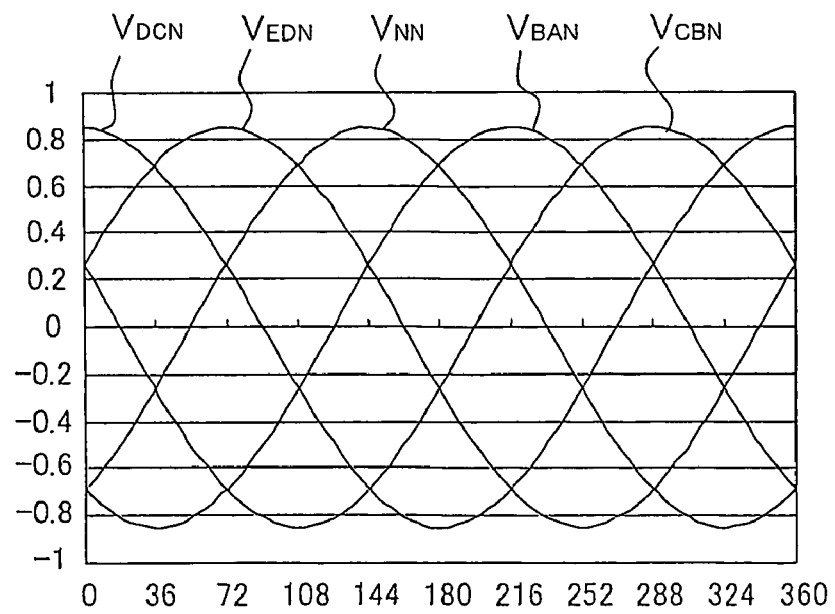
FIG. 96 is a voltage waveform diagram associated with the terminals in case the windings of the motor shown in FIG. 93 are star-connected.

When the windings are connected as shown by (a) of FIG. 93, and a potential $V_{NN}$ at the center NN, which is expressed by:

$$V_{NN}=-V_N \quad (56)$$

is added on to Formulas (51) to (54) to recalculate the terminal voltages $V_{BAN}$, $V_{CBN}$, $V_{DCN}$ and $V_{EDN}$, the individual voltages including the voltage $V_{NN}$ result in balanced 5-phase voltages shown in FIG. 96.

In this way, when the motor of FIG. 90 is imparted with a star connection and currents of Formulas (31) to (35) are passed to the four terminals and the center point NN of the star connection in synchronization with the rotation of the rotor, the voltage at the center point of the star connection is significantly varied and shows the value $-V_N$. However, the terminal voltages of the star connection results in as indicated by $V_{BAN}$, $V_{CBN}$, $V_{DCN}$, $V_{EDN}$ and $V_{NN}$ in FIG. 96, so that efficient operation and driving with a 5-phase inverter can be confirmed.

Although the above description has been provided for a 5-phase motor, the same relationship can be established for motors having other number of phases than five. The same relationship can be attained as to the motor in which the two windings in each set of the windings as shown in FIG. 1 are combined into a single winding as shown in FIG. 7.

Computationally, values of torque and power will be completely the same between the motors shown in FIGS. 86 and 90.

Figure 97:
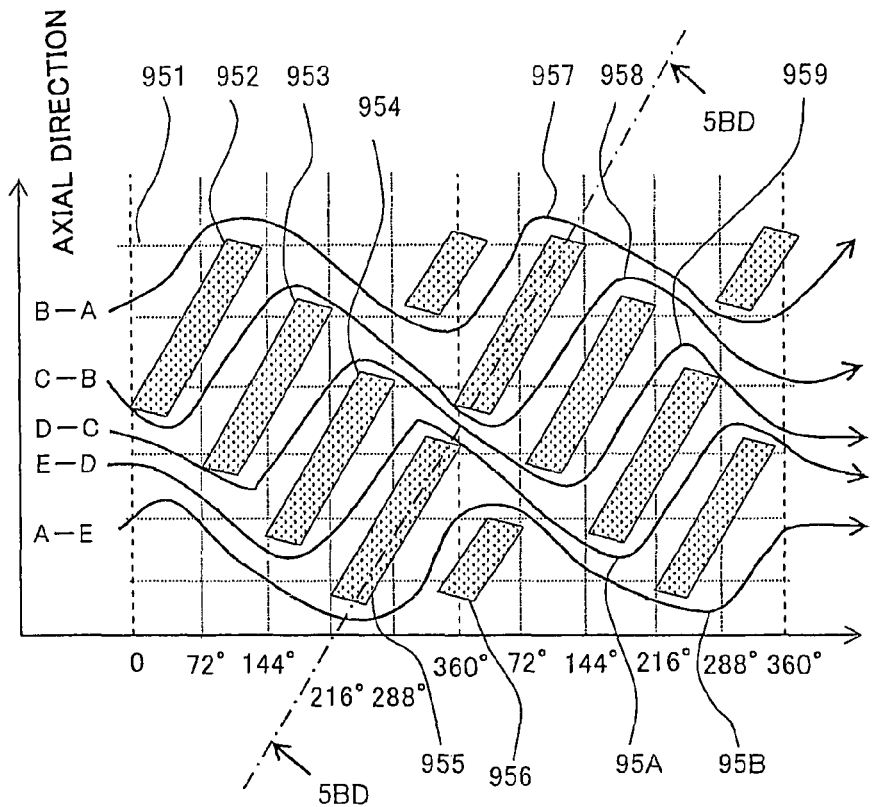
FIG. 97 is a schematic diagram illustrating a configuration of a 5-phase motor having loop windings.

FIG. 97 shows an example of a more practical arrangement of the stator poles of the 5-phase motor according to the present invention. Principally, the motor of FIG. 97 has the same relative positional relationship as the motor shown in FIG. 86. However, the configuration, arrangement and the like of the former are considerably different from those of the latter, and thus the former presents considerably different characteristics. Indicated by numerals 951 and 956 are A-phase stator poles, by 952 are B-phase stator poles, by 953 are C-phase stator poles, by 954 are D-phase stator poles and by 955 are E-phase stator poles. Current indicated by the vector B-A in FIGS. 91 and 92 is passed through a winding 957, current indicated by the vector C-B is passed through a winding 958, current indicated by the vector D-C is passed through a winding 959, current indicated by the vector E-D is passed through a winding 95A, and current indicated by the vector A-E is passed through a winding 95B.

Figure 76:
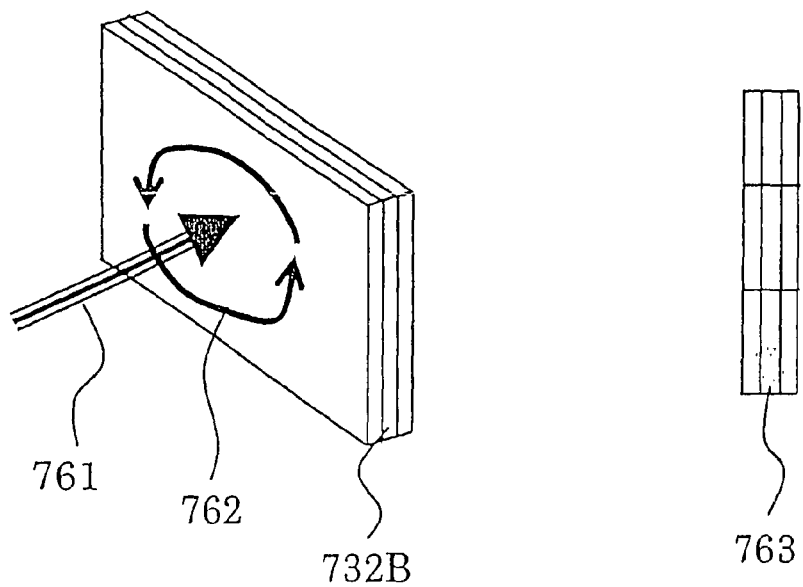
FIG. 76 illustrates a configuration of a winding of the motor shown in FIG. 73 and eddy current.
Figure 98:
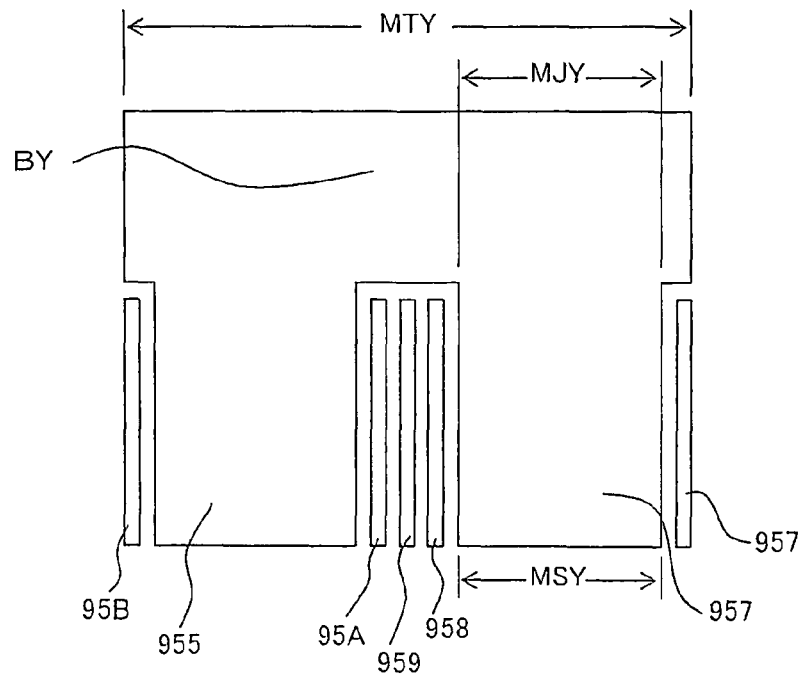
FIG. 98 is a transverse cross section of the stator poles in the motor shown in FIG. 97.

One of the differences of this motor from the one shown in FIG. 86 is a stator configuration facing the rotor. FIG. 98 is a cross section taken along a line 5BD-5BD. Since the vertical axis of FIG. 97 indicates the rotor shaft direction, this 5BD-5BD cross section stands oblique to the rotor shaft direction, however, the relative size remains the same. Indicated by BY is a back yoke, by MTY is a length of the back yoke along the rotor shaft, and by MSY is a length of the B-phase stator pole 957 facing the rotor. The length MSY is larger than MTY/5. In FIGS. 97 and 98, the length MSY is larger than 2×MTY/5. Accordingly, a rotation rate of the flux passing through the stator poles 957 is so high that large torque can be expected. A thickness MJY of a magnetic path extending from the stator pole 957 in the vicinity of the rotor surface to the back yoke BY is the same as the MSY at the end of the stator pole, thereby providing a structure unlikely to cause magnetic saturation. Comparing with the magnetic path 54SB of FIG. 38, the magnetic path of this motor is larger by a factor of two or more. The windings 958, 959 and 95A of FIG. 98 are located between the B-phase stator pole and the E-phase stator pole so as to fully extend up to an opening portion of the stator poles facing the rotor, thereby providing an arrangement structure which is unlikely to cause flux leakage between stator poles of different phases. In the arrangement structure of FIG. 97, the windings are located between the stator poles of the individual phases in the similar fashion to reduce flux leakage as much as possible between the stator poles of different phases. The winding configuration has an irregularity in the rotor shaft direction with the structure as shown in FIG. 76, so that the same effect can be exerted. Thus, the motor having the structure as shown in FIGS. 97 and 98 is adapted to obtain large peak torque.

Figure 99:
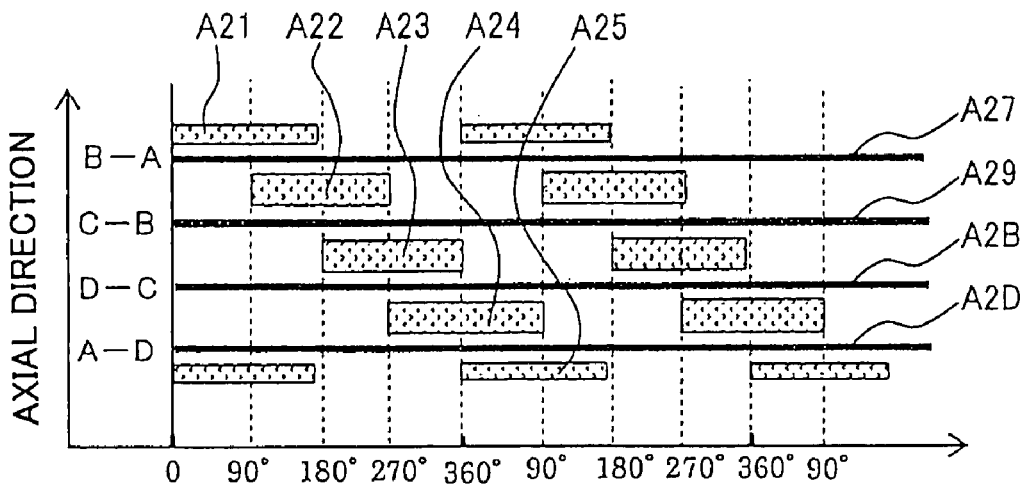
FIG. 99 is a schematic diagram illustrating a configuration of a 4-phase motor having loop windings.
Figure 100:
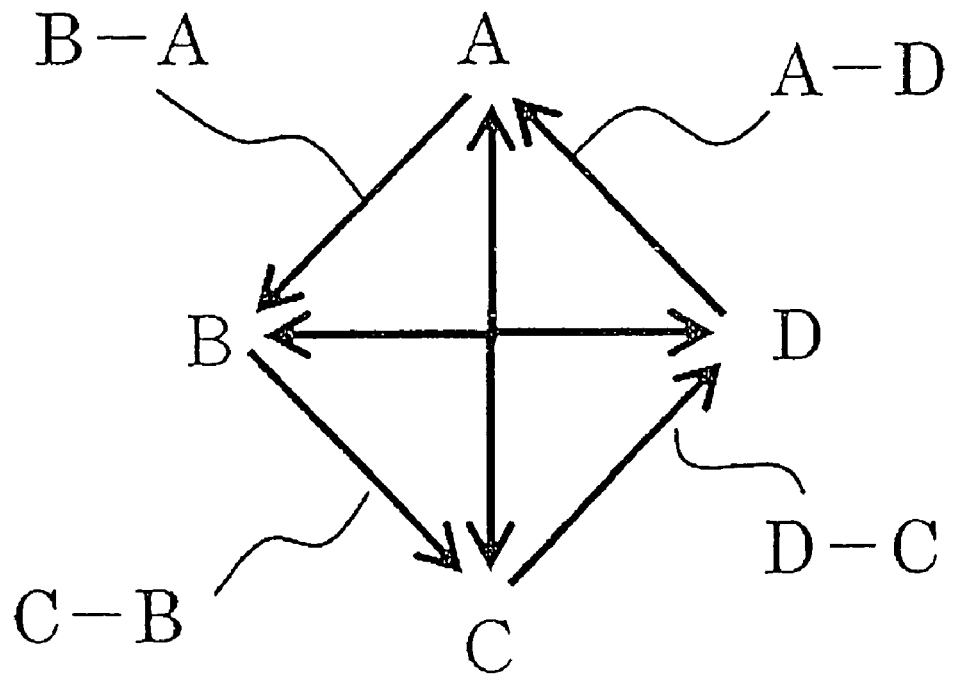
FIG. 100 vectorially illustrates the electrical currents of FIG. 99.

FIG. 99 shows another example of the present invention. This motor corresponds to a 4-phase version of the 5-phase motor shown in FIG. 86. Indicated by A21 and A25 are A-phase stator poles, by A22 are B-phase stator poles, by A23 are C-phase stator poles and by A24 are D-phase stator poles. Current represented by a vector B-A in FIG. 100 is passed through a winding A27, current represented by a vector C-B is passed through a winding A29, current represented by a vector D-C is passed through a winding A2B, and current represented by a vector A-D is passed through a winding A2D.

Figure 101:
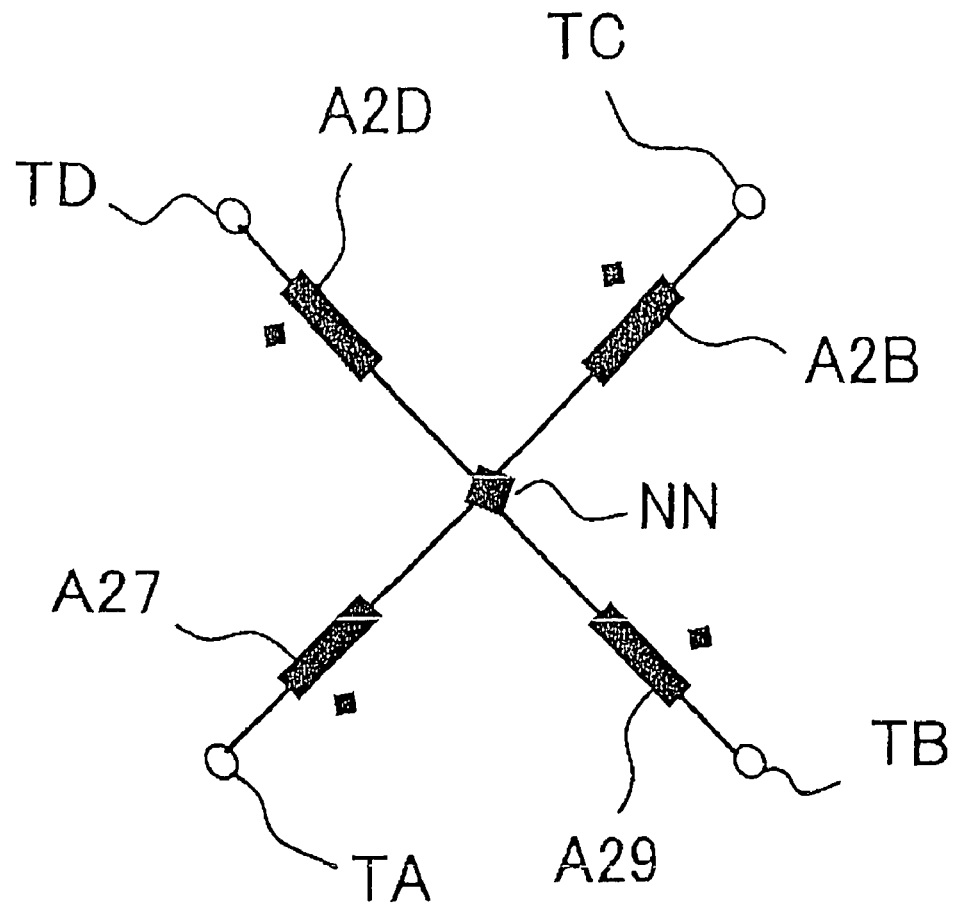
FIG. 101 illustrates a wire connection, in which the windings of the motor shown in FIG. 99 are star-connected.

FIG. 101 shows a star connection of the windings. Voltages of the individual windings have amplitude not so constant as in the 5-phase example shown in FIG. 88, but inter-terminal voltages are balanced 4-phase voltages. The only constraint on the 4-phase star connection is that a sum of the currents of the four windings should be zero, and thus control for adding harmonic components to the phase currents, for example, can be performed. While maintaining an orthogonal relationship between two phases, other two phases may be rotated by 45° for improvement, such as reduction of torque ripple. Such improvement cannot be realized in a method for providing two sets of windings among the windings shown in FIG. 99, in each of which set the windings having a phase difference of 180° are oppositely connected in series. The arrangement and structure of the stator poles and windings may be changed as shown in FIGS. 97 and 98.

Figure 102:
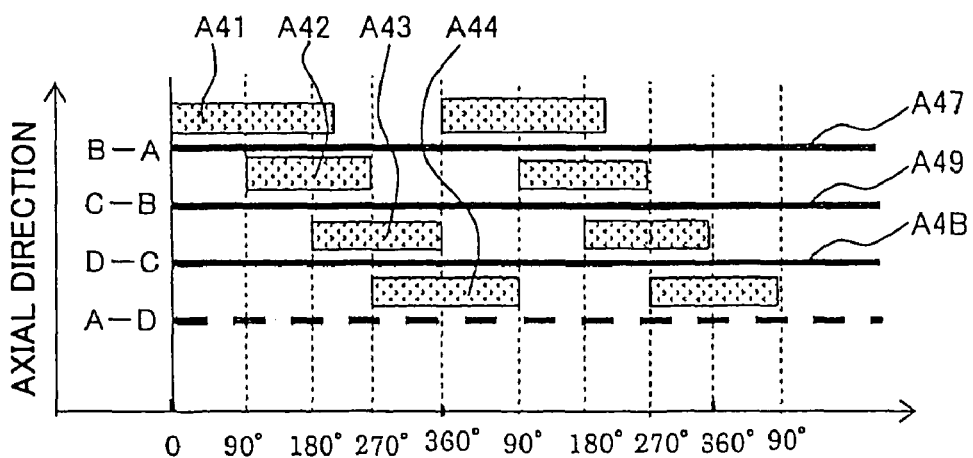
FIG. 102 is a schematic diagram illustrating a configuration of a 4-phase motor having loop windings.
Figure 103:
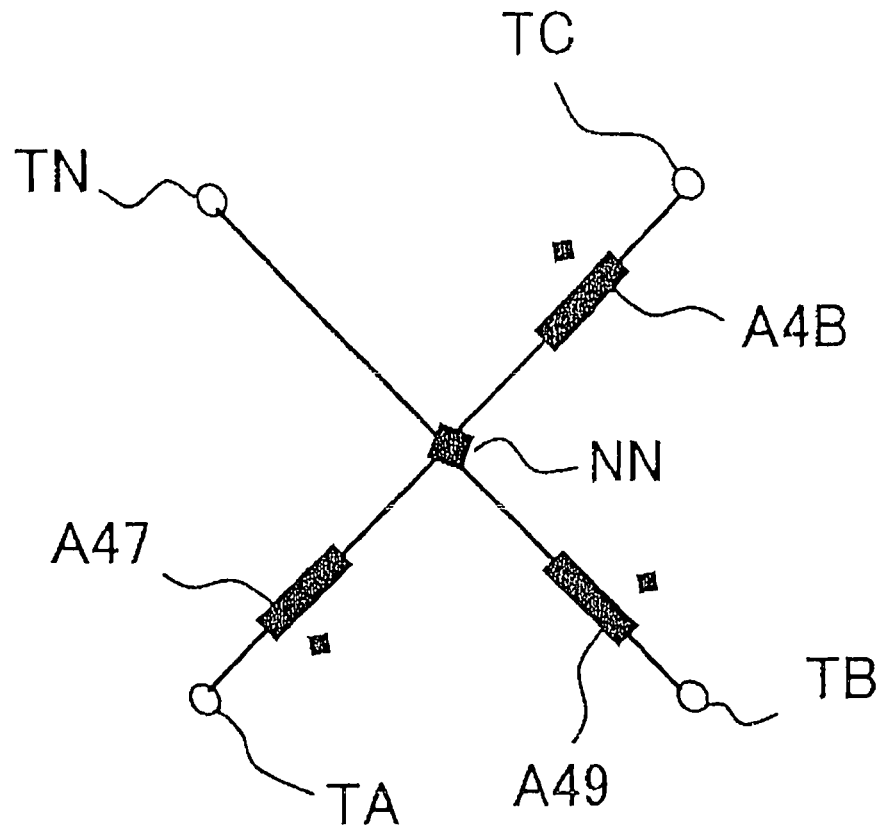
FIG. 103 illustrates a wire connection, in which the windings of the motor shown in FIG. 102 are star-connected.

FIGS. 102 and 103 show another example of the present invention. Indicated by A41 are A-phase stator poles having a configuration obtained by combining the A-phase stator poles A21 and A25 shown in FIG. 99. Indicated by A42 are B-phase stator poles, by A43 are C-phase stator poles, and by A44 are D-phase stator poles. The current represented by the vector B-A of FIG. 100 is passed through a winding A47, the current represented by the vector C-B is passed through a winding A49, and the current represented by the vector D-C is passed through a winding A4B. The current $I_N$ represented by the vector A-D in FIGS. 91 and 92 is not required to be directly passed to the motor. However, when the windings are star-connected as shown in FIG. 103, a sum of the currents of the three windings is passed to a center NN of the star connection. A negative value of the summed up current corresponds to a current $I_N$ represented by the vector A-D. As a result, although there is no winding for directly passing the current $I_N$ represented by the vector D-E, the motor may be regarded as being supplied with the current $I_N$. Comparing with the motor shown in FIG. 99, the number of windings of the motor shown in FIG. 102 is smaller by one, and thus the latter motor can exert an effect of reducing copper loss. Considering that the windings are arranged in the same space, winding resistance is reduced to three fourth, that is, resistors per se can be reduced from four to three. As a result, copper loss can be reduced to nine sixteenth in total. The arrangement and structure of the stator poles and windings may be changed as shown in FIGS. 97 and 98.

Figure 104:
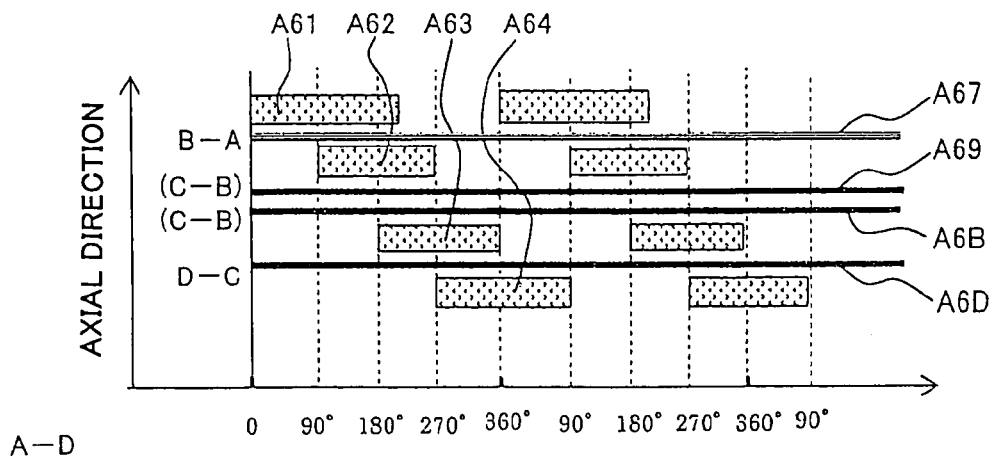
FIG. 104 is a schematic diagram illustrating a configuration of a 4-phase motor having loop windings.
Figure 105:
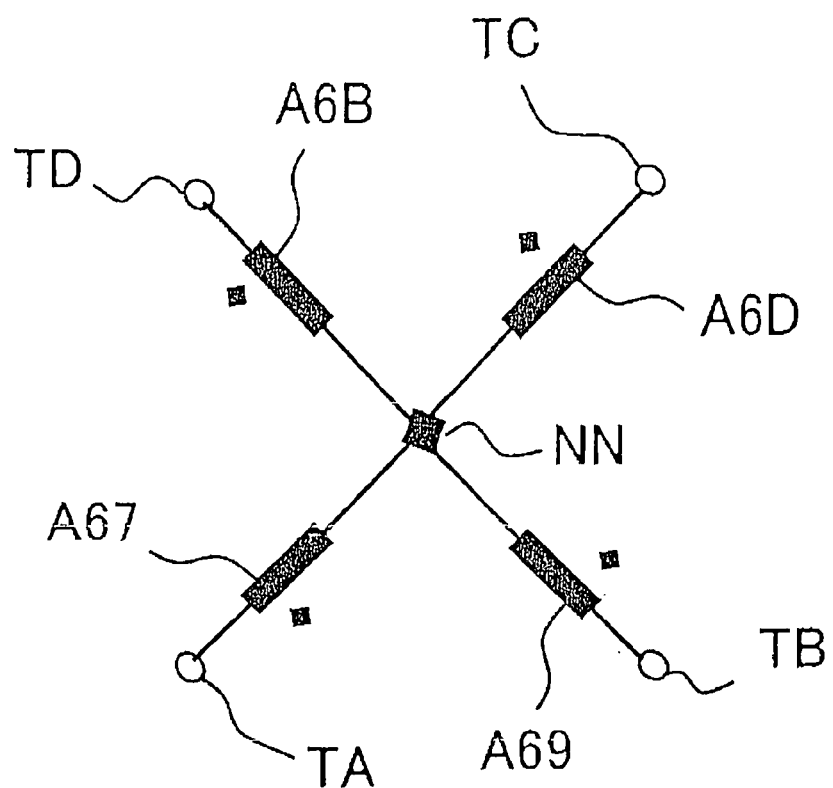
FIG. 105 illustrates a wire connection, in which the windings of the motor shown in FIG. 104 are star-connected.

FIGS. 104 and 105 show another example of the present invention. Indicated by A61 are A-phase stator poles, by A62 are B-phase stator poles, by A63 are C-phase stator poles, and by A64 are D-phase stator poles. The winding A49 of FIG. 102 has been divided into two windings A69 and A6B. Further, a star connection is achieved as shown in FIG. 105. The current represented by the vector B-A of FIG. 100 is passed through the winding A67, the current of the phase represented by the vector C-B is passed through the winding A6B, and the current represented by the vector D-C is passed through the winding A6B. The number of turns of the windings A69 and A6B may be one half of other windings to balance voltage amplitude. The arrangement and structure of the stator poles and windings may be changed as shown in FIGS. 97 and 98.

Figure 106:
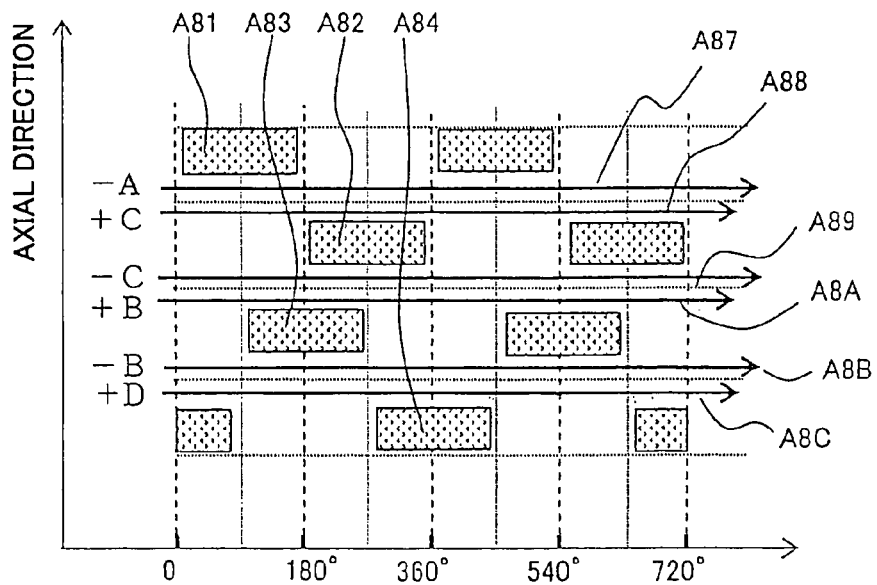
FIG. 106 is a schematic diagram illustrating a configuration of a 4-phase motor having loop windings.
Figure 107:
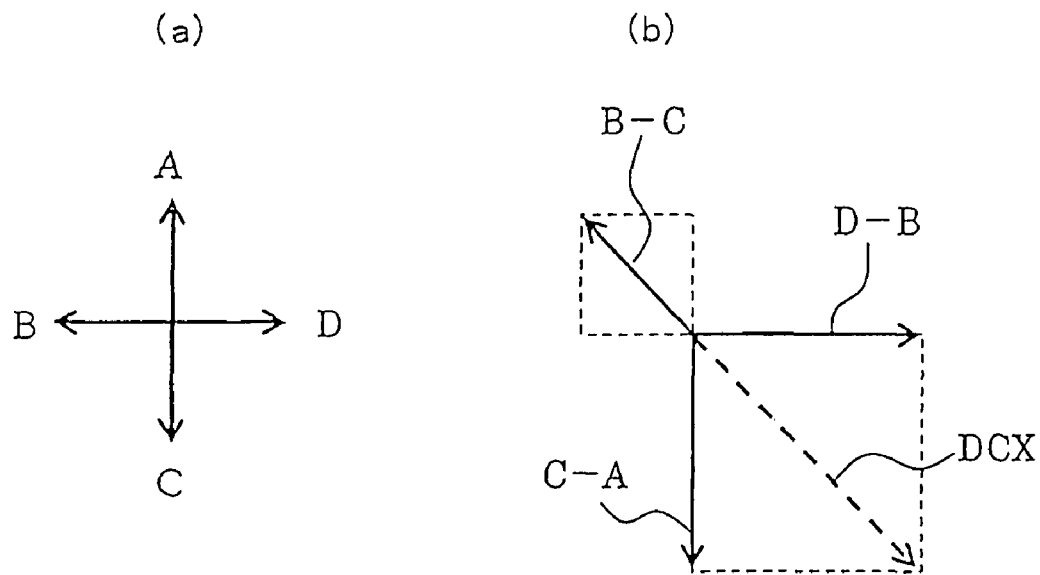
FIG. 107 vectorially illustrates the electrical currents of the motor shown in FIG. 106.

FIGS. 106 and 107 show another example of the present invention. This example of stator pole configuration corresponds to a 4-phase version of the 6-phase stator pole configuration shown in FIG. 28 with two windings being provided between the respective stator poles as shown in FIG. 27. Indicated by A81 are A-phase stator poles, by A82 are C-phase stator poles, by A83 are B-phase stator poles, and by A84 are D-phase stator poles. By providing a configuration in which the stator poles having a phase difference of 180° are adjacently arranged along the rotor shaft, the stator poles of the individual phases can be readily extended to vacant spaces of FIG. 106 along the rotor shaft. Current corresponding to a vector A shown by (a) of FIG. 107 is passed through the winding A87, current corresponding to a vector C is passed through the winding A88, current corresponding to a vector −C is passed through the winding A89, current corresponding to a vector B is passed through the winding A8A, current corresponding to a vector −B is passed through the winding A8B, and current corresponding to a vector DC is passed through the winding A8C.

In this case, the windings A87 and A88 may be combined into a single winding to pass current represented by a vector C-A shown by (b) of FIG. 107, the windings A89 and A8A may be combined into a single winding to pass current represented by a vector B-C shown by (b) of FIG. 107, and the windings A8B and A8C may be combined into a single winding to pass current expressed by a victor D-B shown by (b) of FIG. 107. In this way, copper loss can be reduced to about five sixth.

Figure 108:
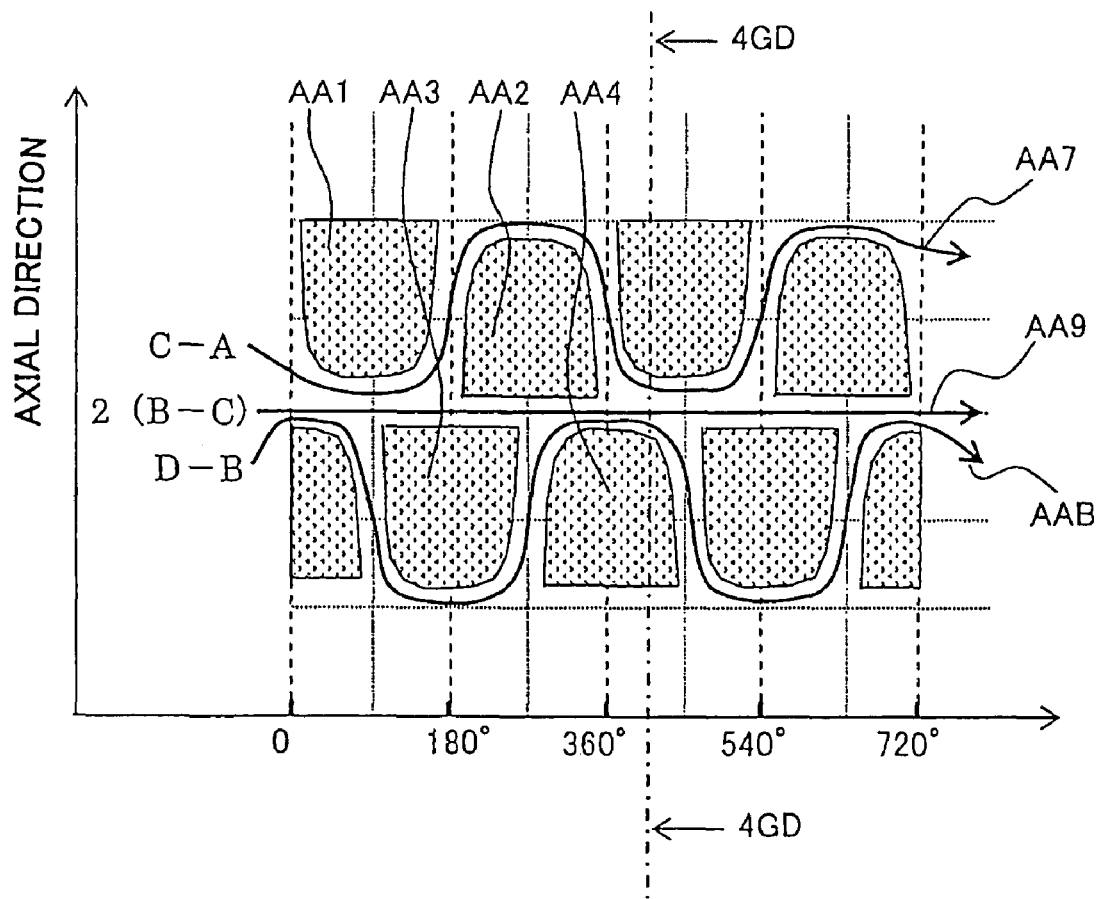
FIG. 108 is a schematic diagram illustrating a configuration of a 4-phase motor having loop windings.
Figure 110:
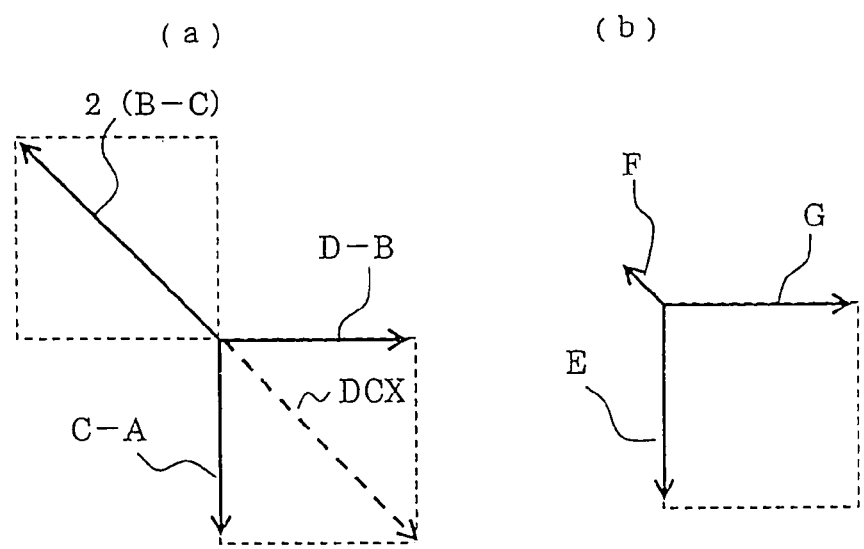
FIG. 110 vectorially illustrates the electrical currents of the motor shown in FIG. 108.
Figure 111:
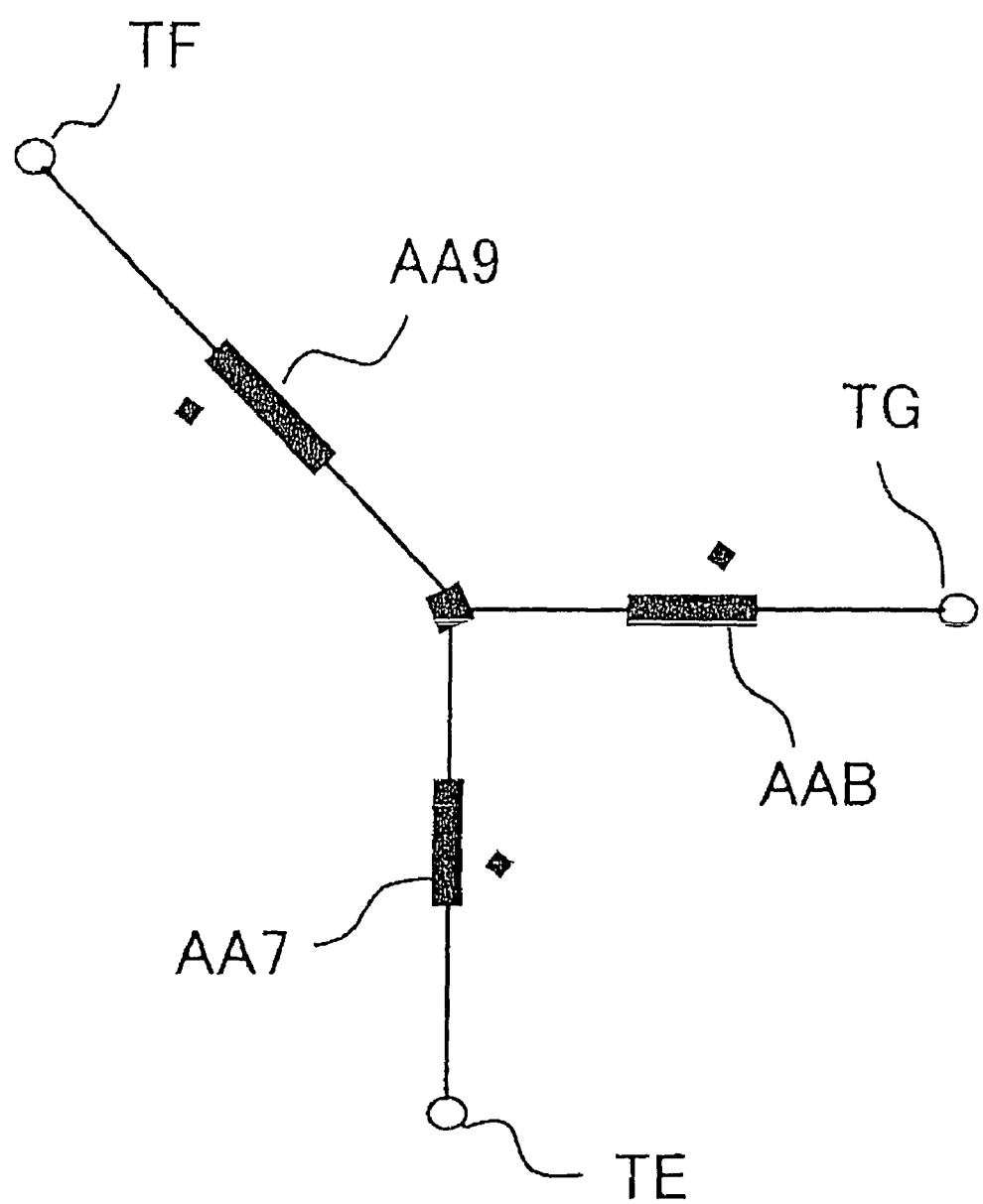
FIG. 111 illustrates a wire connection, in which the windings of the motor shown in FIG. 108 are star-connected to provide 3-phase windings.

FIG. 108 shows a stator pole and winding configuration which is the improvement of the configuration shown in FIG. 106. Indicated by AA1 are A-phase stator poles, by AA2 are C-phase stator poles, by AA3 are B-phase stator poles and by AA4 are D-phase stator poles. Unlike the stator pole configuration shown in FIG. 106, the stator poles are arranged covering substantially the entire surface facing the rotor. Accordingly, magnetic fluxes from the rotor can be efficiently passed toward the stator for interlinkage with the windings, so that large torque can be expected to be generated. Current corresponding a vector C-A shown by (a) of FIG. 110 is passed through a winding AA7. The number of turns of the winding AA9 is one half of that of the windings AA7 and AAB. The winding AA9 is supplied with current corresponding to a vector 2×(B-C), while the winding AAB is supplied with current corresponding to a vector D-B. Such a configuration can constantly zero a sum of the three currents of the three windings. A relationship of the vectors C-A, D-B and 2×(B-C) may be established as shown by (a) of FIG. 110. Thus, a star connection as shown in FIG. 111 may enable use of a 3-phase inverter. Indicated by TE, TG and TF are terminals of the star connection.

The voltages of the windings have the characteristics as shown by (b) of FIG. 110, for example, where indicated by E is a voltage of the winding AA7, and by G is a voltage of the winding AAB. Voltage of the winding AA9, which is generated at a time rate of the leaked flux, is basically zero because the current 2×(B-C) is passed through the winding AA9 so that no flux is interlinked therewith. However, as shown by a symbol F at (b) of FIG. 110, the winding AA9 is slightly applied with voltage, which corresponds to voltage drop of winding resistance and voltage generated at a time rate of the leaked flux. Thus, mostly three-phased voltages can be provided, which can zero the sum of the currents at the three terminals, enabling driving by a 3-phase inverter.

Figure 112:
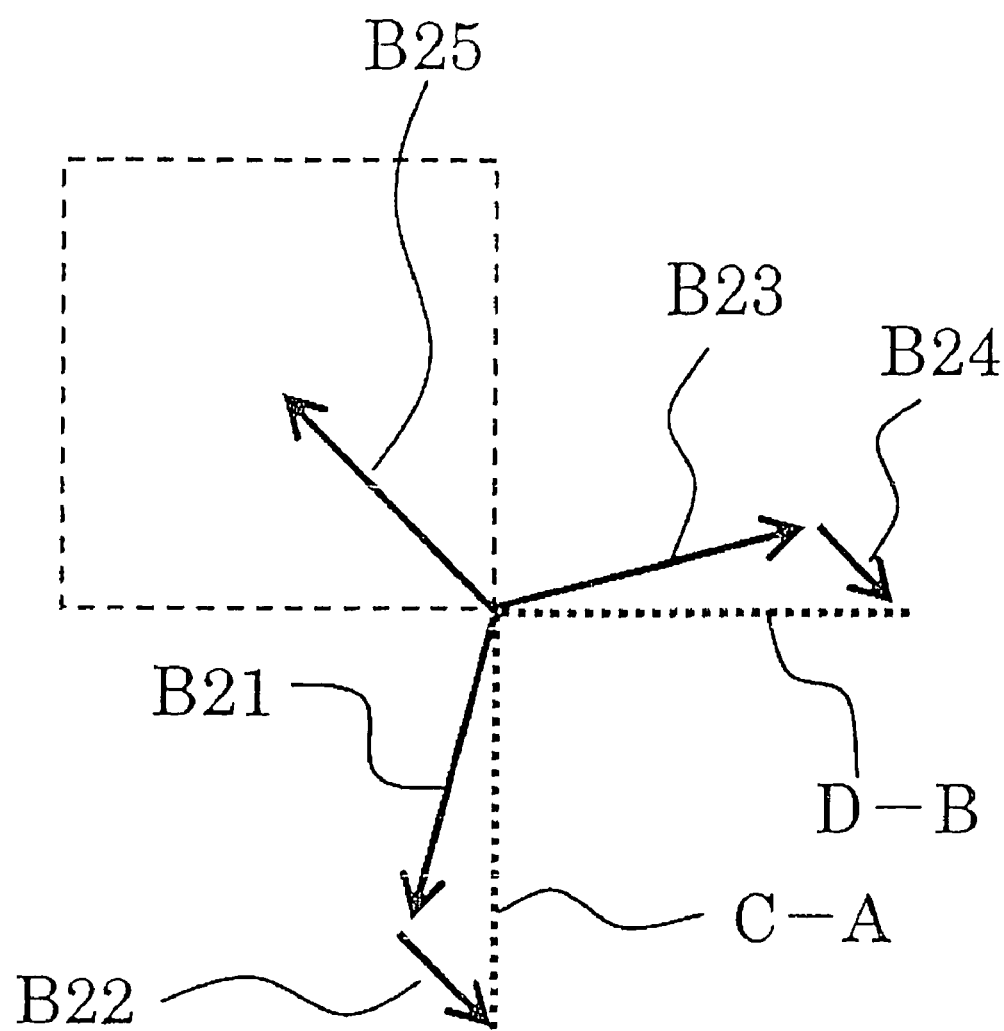
FIG. 112 vectorially illustrates the electrical currents of the motor shown in FIG. 108.
Figure 113:
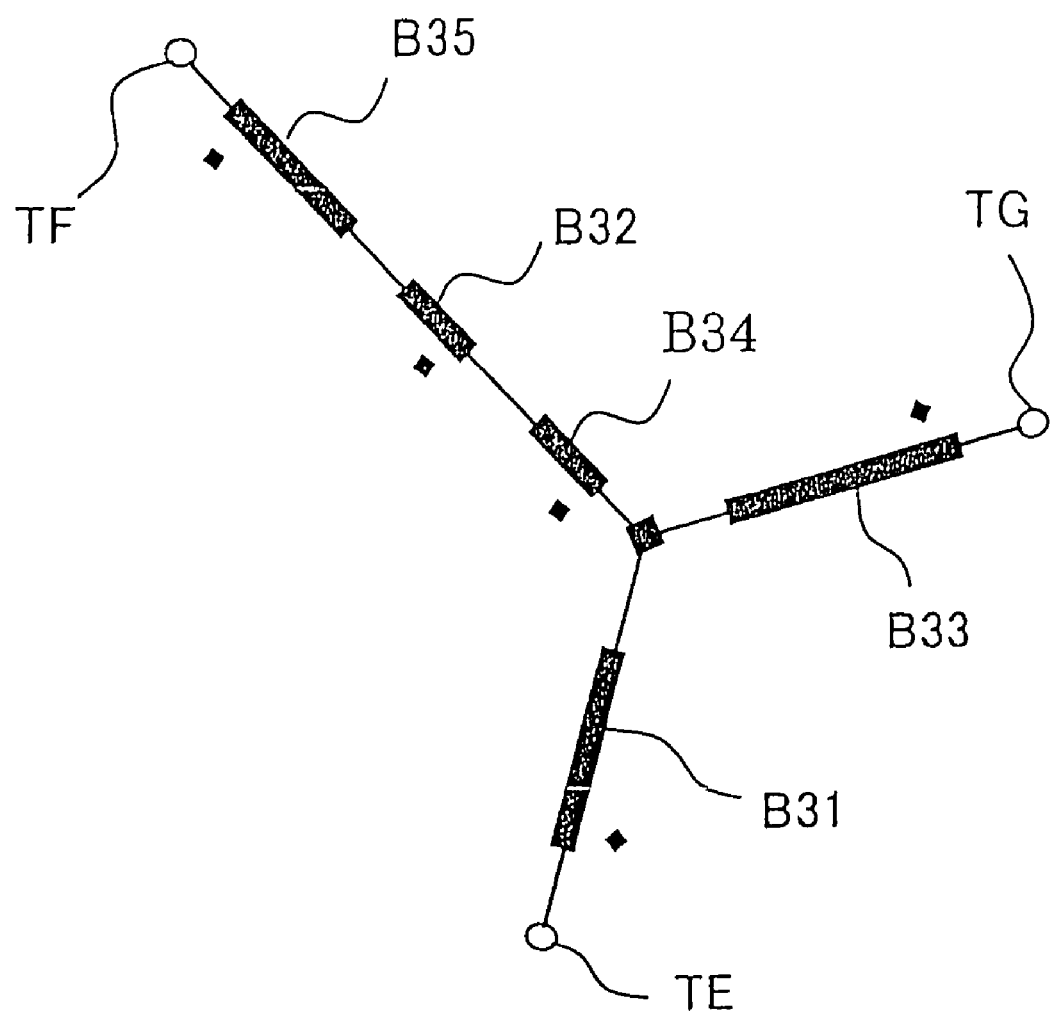
FIG. 113 illustrates a wire connection, in which the windings of the motor shown in FIG. 108 are star-connected to provide 3-phase windings.
Figure 114:
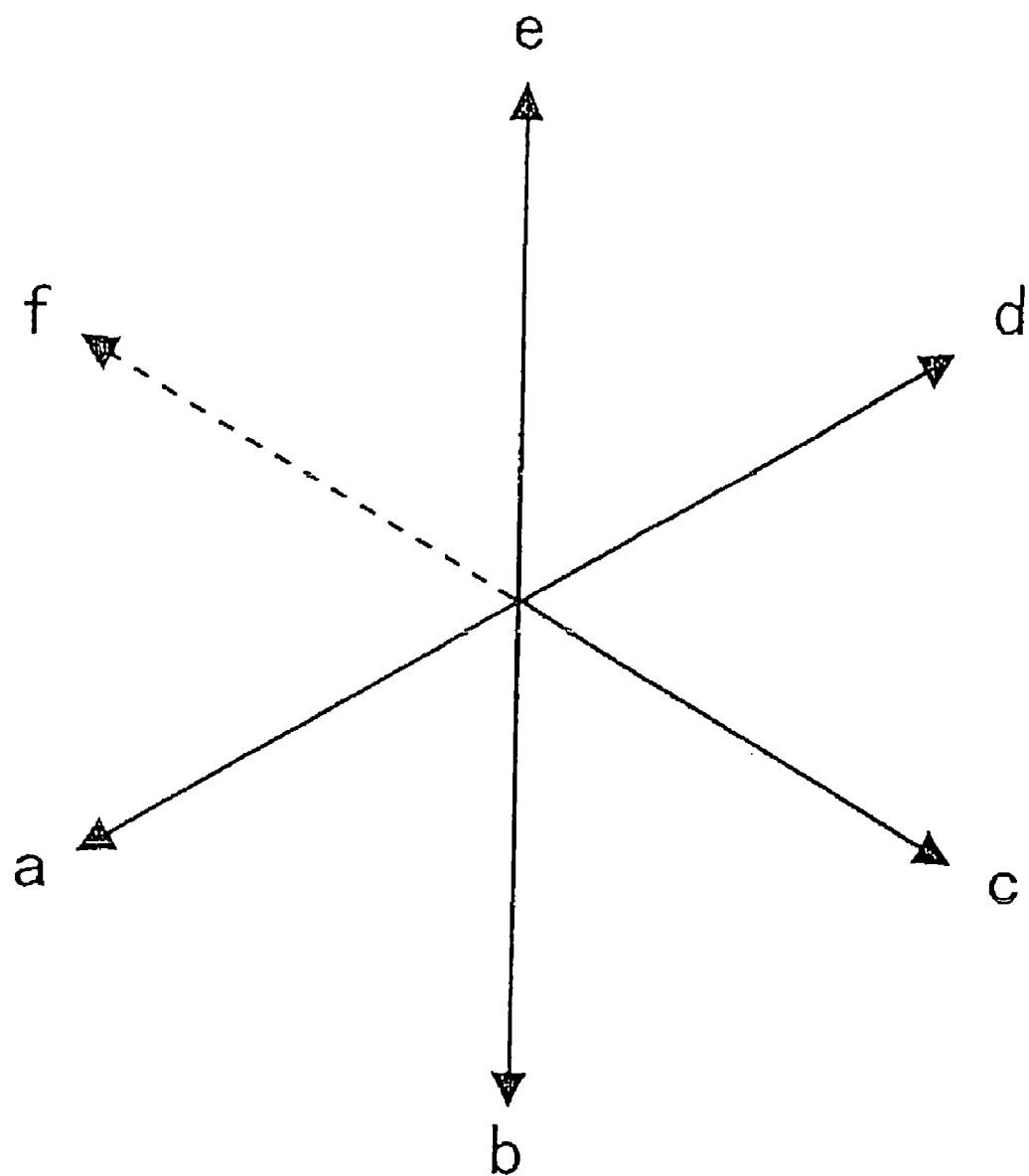
FIG. 114 vectorially illustrates electrical current of the 6-phase motor shown in FIG. 35.

In a precise sense, however, the relationship between the inter-terminal voltages of the three terminals TE, TG and TF have a relationship of 2:2:2.828 as can be seen from (b) of FIG. 110, providing 3-phase AC voltages which are not balanced. In this regard, FIGS. 112 and 113 show a method for more efficiently using the 3-phase AC voltages and currents. In FIG. 112, current vectors B21, B22, B23 and B24 are 3-phase vectors having a phase difference of 120° from each other. A vector C-A is a combination of the vectors B21 and B22. A vector D-B is a combination of the vector B23 and B24. The wire connection shown in FIG. 113 allows a vector B25 to have the same amplitude as the vectors B21 and B23. Thus, in order to match the current vectors of FIG. 112, the numbers of turns of the windings shown in FIG. 111 are required to be recalculated. In this example, for the number of turns of the winding AA7, the numbers of turns of windings B31 and B33 may be indicated by a factor of 0.8165, windings B82 and B84 may have the numbers of turns by a factor of about 0.3, and the winding AA9 may have the number of turns by a factor of 0.866. This configuration may allow the currents at the terminals TE, TF and TG shown in FIG. 113 to be balanced 3-phase alternating currents so as to be efficiently operated and driven by a 3-phase inverter. In this case, the arrangement of the windings may be such that the winding AA7 is replaced by the two windings B31 and B32, the winding AA9 is replaced by the winding B35 and the winding AAB is replaced by the windings B33 and B34.

As a matter of course, as another method of wire connection, the windings can be arranged as shown in FIG. 103. In this case, a 4-phase inverter is required.

Figure 109:
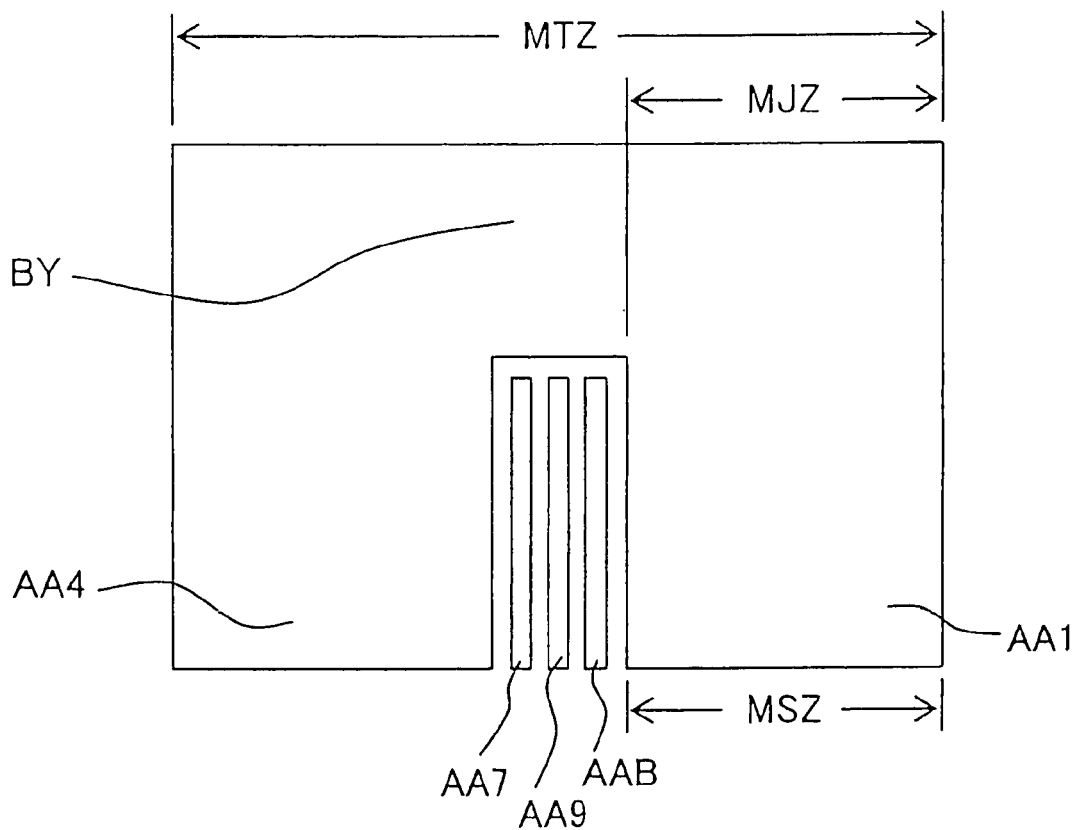
FIG. 109 is a transverse cross section illustrating the stator poles of the motor shown in FIG. 108.

A cross section taken along a line 4GD-4GD of FIG. 108 has a configuration as shown in FIG. 109. One of the differences of this motor from the motor shown in FIG. 106 is the stator pole configuration in the plane facing the rotor. Indicated by BY is a back yoke of the stator, by MTZ is a length of the back yoke along the rotor shaft, and by MSZ is a length of a portion of the B-phase stator pole AA1 facing the rotor. The length MSZ is larger than MTZ/4. In FIGS. 97 and 98, the length MSZ has a value close to 2×MTZ/4. Accordingly, the rotation rate of the flux passing through the stator pole AA1 is so high that large torque can be expected. A thickness MJZ of a magnetic path extending from the stator pole AA1 in the vicinity of the rotor surface to the back yoke BY is the same as the MSZ at the end of the stator pole, thereby providing a structure unlikely to cause magnetic saturation. Comparing with the magnetic path width WDT of the stator pole 144 shown in FIG. 29, the magnetic path of this motor is larger by a factor of two or more. The windings AA7, AA9 and AAB of FIG. 109 are located between the B-phase stator pole and the D-phase stator pole so as to fully extend up to an opening portion of the stator poles facing the rotor, thereby providing an arrangement structure which is unlikely to cause flux leakage between stator poles of different phases. In the arrangement structure of FIG. 108, the windings are located between the stator poles of the individual phases in the similar fashion to reduce flux leakage as much as possible between the stator poles of different phases. The winding configuration has an irregularity in the rotor shaft direction, that is, has the structure as shown in FIG. 76, so that the same effect can be exerted. Thus, the motor having the structure as shown in FIGS. 108 and 109 is adapted to obtain large peak torque.

The stator pole of FIG. 108 has a special shape close to a rectangle, but can be modified to various shapes. For example, when electromagnetic steel plates are used for each stator pole by being stacked in the rotor shaft direction, considering the material, or for the convenience of fabrication, the stator pole shown in FIG. 108 may better have a rectangular shape to facilitate fabrication by pressing and punching and to facilitate stacking. On the other hand, when each stator pole is fabricated by press-molding a dust core with a mold, the stator pole may have a high degree of freedom in its shape. In this case, the curved shape as shown in FIG. 108 is convenient for press molding.

Hereinafter are described currents and voltages of the 6-phase motor of the present invention shown in FIG. 35. As described above, in this motor, current is passed through one winding and current of opposite direction is passed through other winding having a phase difference of 180°, and these windings are oppositely connected in series so as to be controlled and driven by a 3-phase inverter. Motor can be configured by using methods other than this to provide a configuration shown in FIGS. 114 to 118 or a configuration shown in FIGS. 119 and 120.

Figure 115:
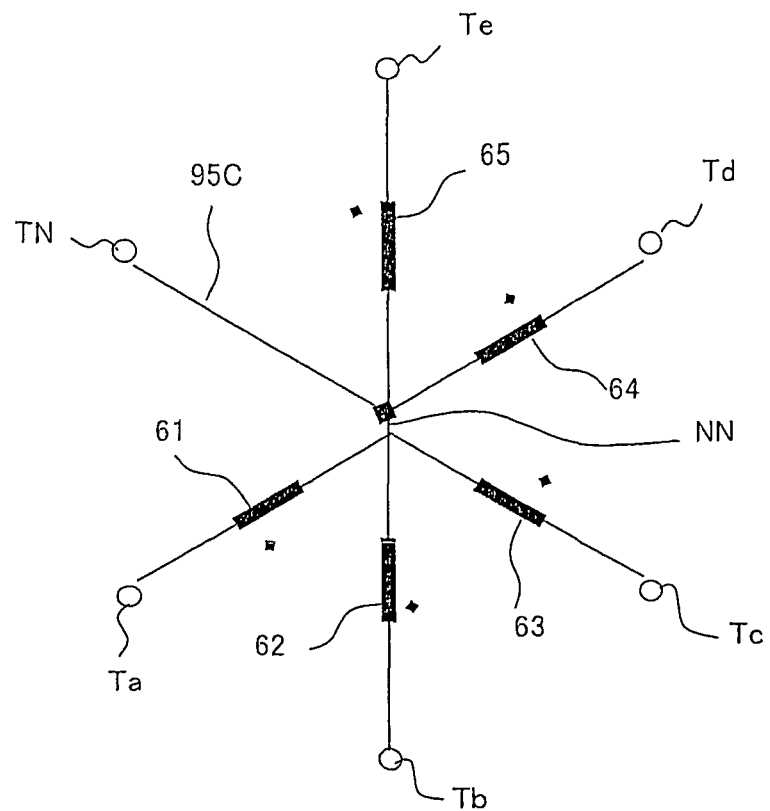
FIG. 115 illustrates a wire connection, in which the windings of the motor shown in FIG. 35 are star-connected.
Figure 116:
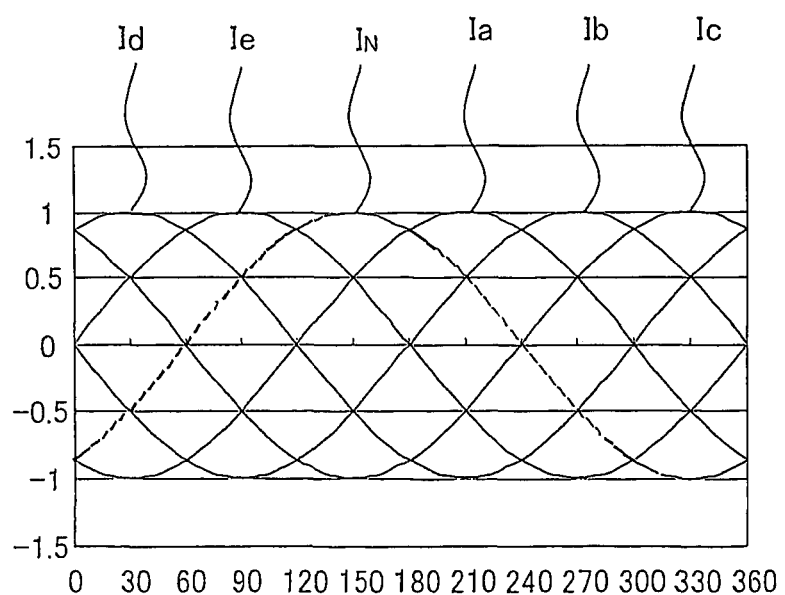
FIG. 116 is a current waveform diagram associated with the motor shown in FIG. 35.
Figure 117:
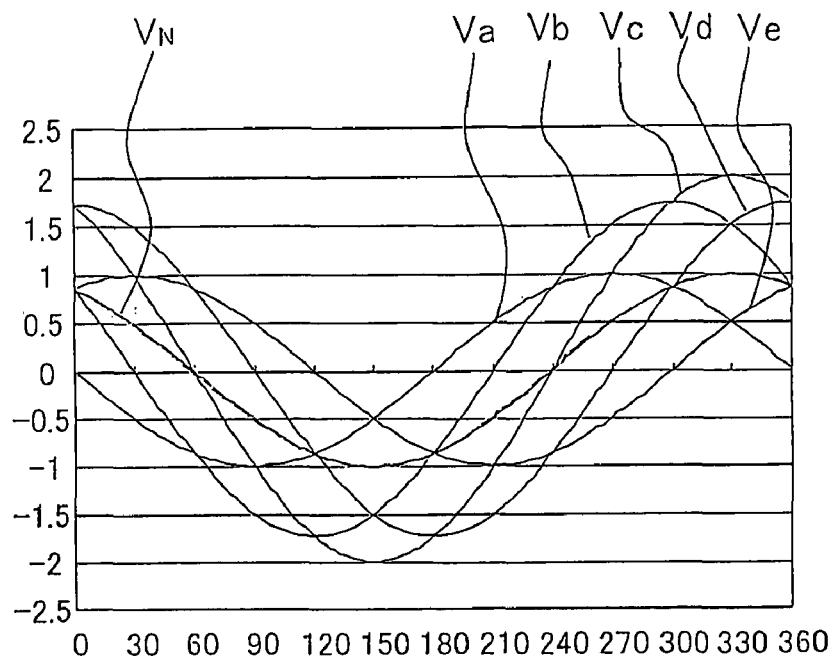
FIG. 117 is a voltage waveform diagram associated with the motor shown in FIG. 35.
Figure 118:
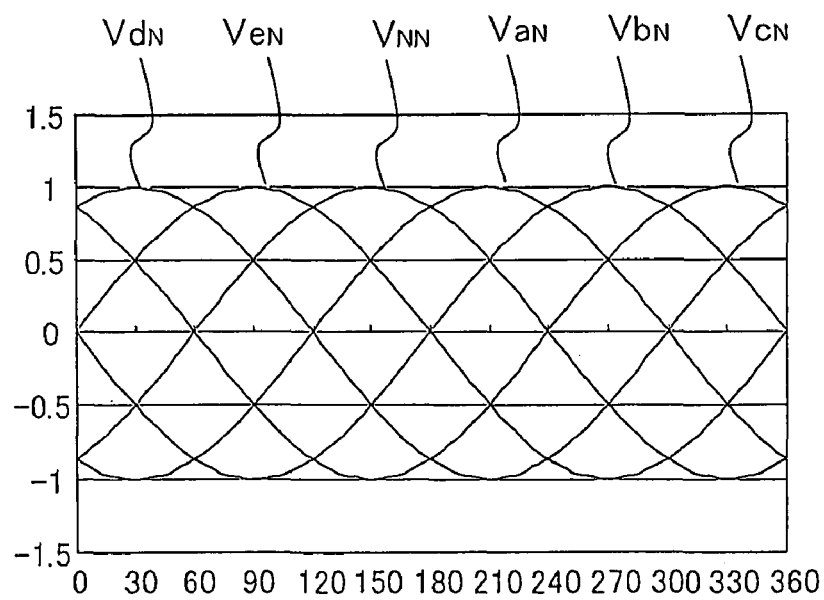
FIG. 118 is a voltage waveform diagram associated with the terminals in case the windings of the motor shown in FIG. 35 are star-connected.

The windings 61, 62, 63, 64 and 65 of FIG. 35 are star-connected as shown in FIG. 115 so as to have a center point NN as well as six terminals Ta, Tb, Tc, Td, Te and TN. These windings are supplied with currents Ia, Ib, Ic, Id and Ie shown in FIG. 116 and the terminal TN is supplied with a current In. Voltages applied to the windings are Va, Vb, Vc, Fd and Ve as shown in FIG. 117. These five voltages are added up and divided by six to obtain a value Vn. With −Vn as a potential at the center point NN of the star connection, potentials at the individual terminals are obtained as represented by Van, Vbn, Vcn, Vdn, Ven and Vnn as shown in FIG. 118. Under such conditions, application of 6-phase voltages and currents to the six terminals of the star connection shown in FIG. 115 has revealed that the motor shown in FIG. 35 can be efficiently driven. Thus, a 6-phase inverter can be used for the driving.

Figure 119:
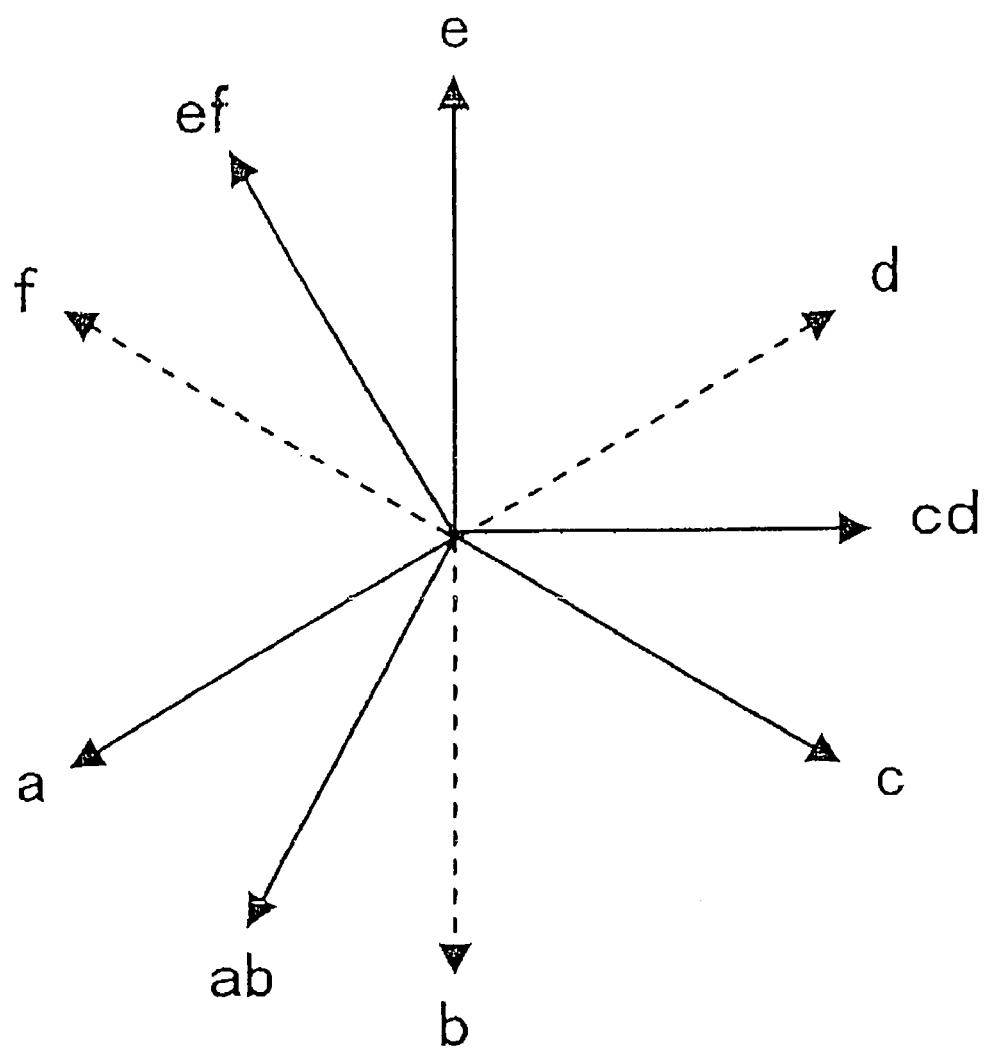
FIG. 119 is a vector diagram of two sets of 3 phases, in which phases are relatively shifted by 30°.
Figure 120:
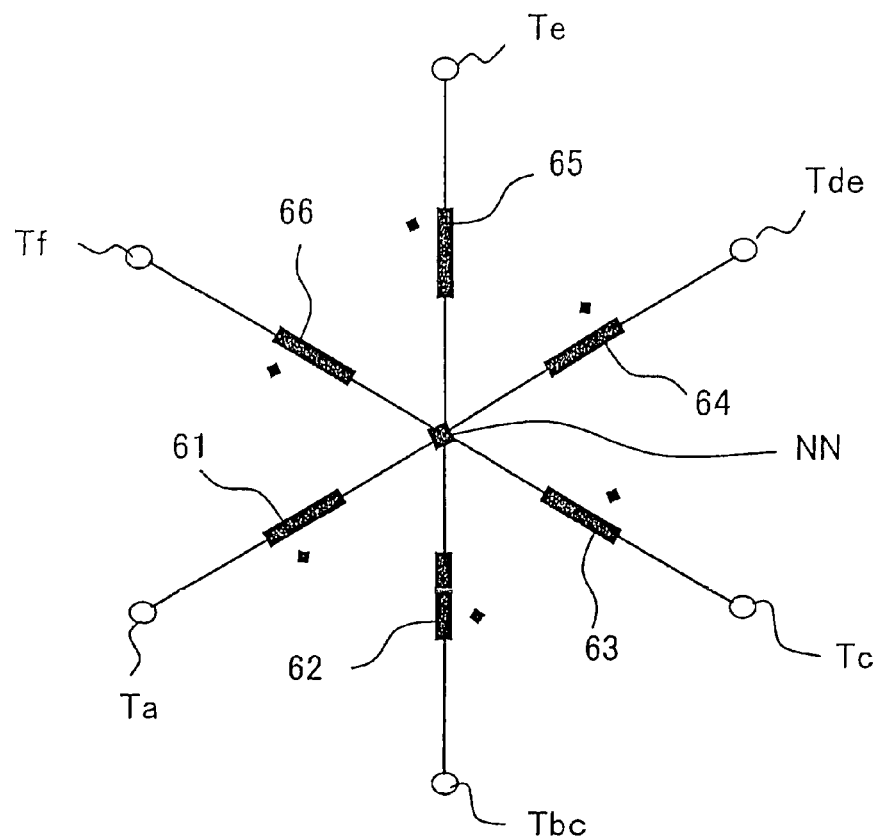

Thereinafter is described a method for realizing a motor having small torque ripple, vibration and noise by cancelling the harmonic components of the individual phases of the motor, the motor having an N number of phases, where N is an even number of "4" or more as shown in FIG. 34. In FIG. 119, vectors "a", "c" and "e" are left as they are to pass balanced 3-phase currents therethrough. Meanwhile, vectors "b", "d" and "f" are rotated in a clockwise direction CW by 30° to obtain vectors "ab", "cd" and "ef", through which balanced 3-phase currents are passed. Such a configuration can exert an effect as a 12-phase motor against the harmonic components, such as torque ripple. Thus, a motor having small torque ripple, vibration and noise can be realized. In the same fashion, the stator poles of FIG. 35 are moved by 120° in electrical angle, or moved along the circumference by 30° in electrical angle for three phases of the stator pole groups having different phases. In the above description, currents corresponding to three phases and stator poles corresponding to three phases have both been varied, but variation of only currents or stator poles may exert good effects.

A relationship between the number of phases of an inverter and the cost is explained. In case of driving a motor of large output capacitance, such as a motor of 50 kw or more, power transistors may mostly be used in parallel. In this case, even when the number of phases is increased by a factor of two, such as from three phases to six phases, the number of the power transistors remains unchanged, placing only a small burden of cost. The large number of phases may provide such merits as reduction of the harmonic components of the motor or reduction of torque ripple.

Contrarily, in case of a motor of kw or less, the cost of the inverter is mostly varied by the number of the elements. This means that the large number of phases is disadvantageous as far as cost is concerned. Thus, in this case, 3-phase AC driving is preferable for driving a small capacitance motor.

Another example of the present application will be described. The motor shown in FIG. 27 has seven stator pole groups along the rotor shaft with a phase difference of 180° therebetween and with six types of phases within 360° in electrical angle. Two windings are arranged between the respective stator pole groups. These two windings are combined into a single winding and a current equivalent to an arithmetic additional vale of the currents passed through the two windings is passed through the single winding to realize an equivalent motor. In this case, unless the two types of currents are of the same phase and have the same current density, copper loss can be reduced and the efficiency is enhance. FIG. 27 shows, by broken lines, partial expansion of the stator poles along the rotor shaft, which can contribute to the increase of an area of each stator pole facing the rotor as indicated by numerals 140 and 141 in FIG. 29. Further, as shown in FIGS. 108 and 109, each tooth as a whole may be projected along the rotor shaft, or alternatively, the tooth may be formed into a shape intermediate between the one shown in FIG. 29 and the one shown in FIGS. 108 and 109. The example of the stator poles shown in FIG. 27 has an N number of phases, where N is "6". The similar configuration can be achieved when N is an even number of "4" or more.

The example of the motor shown in FIG. 28 is obtained by combining the stator poles at both ends in the rotor shaft direction into one for location at one end and by combining the two windings between the stator poles into a single winding. In the configuration of FIG. 28, the number of windings between the stator poles may be two. FIGS. 106 and 107 show an example of a 4-phase version of such a configuration. In this example, the windings A88 and A89 passed with the currents of the same phase are oppositely connected in series, and the windings A8A and A8B are oppositely connected in series to constitute, together with other windings A87 and A8C, a star connection made up of four types of windings, enabling balanced driving with a 4-phase inverter.

Figure 121:
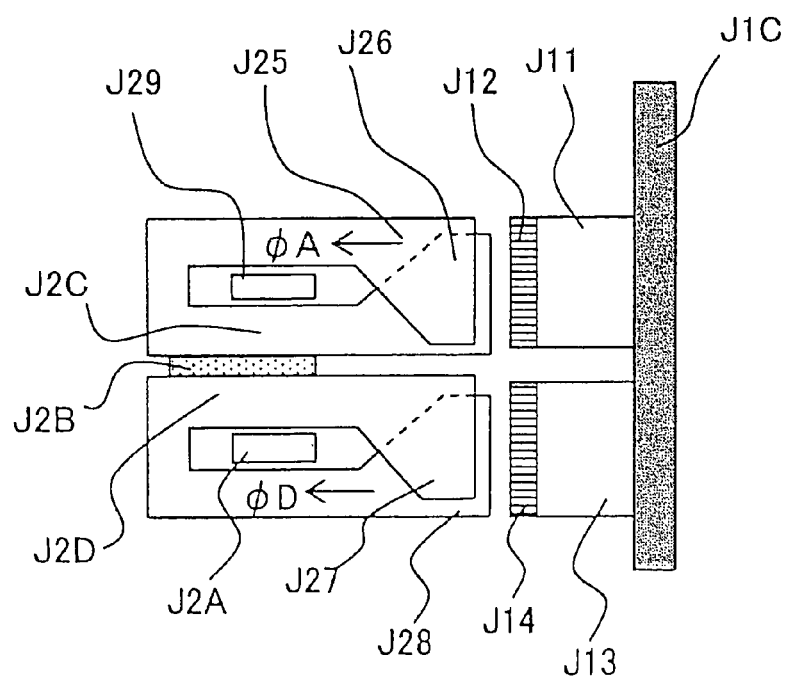

FIG. 121 shows another example of the present invention. Indicated by 31C is a rotor shaft. This figure is a cross section of a left half from the rotor shaft. The rotor is provided with two rotors, which are arranged being magnetically separated from each other. Indicated by J11 and J12 are a first rotor and permanent magnets thereof, respectively, and by J13 and J14 are a second rotor and permanent magnets thereof, respectively. The permanent magnets are provided along the circumference with the alternation of N-poles and S-poles as shown in FIG. 2. Indicated by J25 is an A-phase stator pole, by J26 is a C-phase stator pole, by J27 is a B-phase stator pole, and by J28 is a D-phase stator pole. Indicated by J29 is a loop winding arranged for interlinkage with A- and C-phase fluxes, and by J2A is a loop winding arranged for interlinkage with B- and D-phase fluxes. Indicated by J2B is a nonmagnetic spacer for magnetically separating both of the stator cores from each other. A C-phase magnetic flux J2C passes through a magnetic path J2C, and a magnetic flux $\phi B$ passes through a magnetic path J2D. The magnetic relationship is the same as those shown in FIGS. 106 and 108, although the configurations are different. The configuration of FIG. 121 can omit the windings corresponding to the windings A89, A8A and AA9, and thus can reduce copper loss and size. The stator cores and windings of FIG. 121 may be modified as shown in FIG. 108 to realize higher torque.

Figure 122:
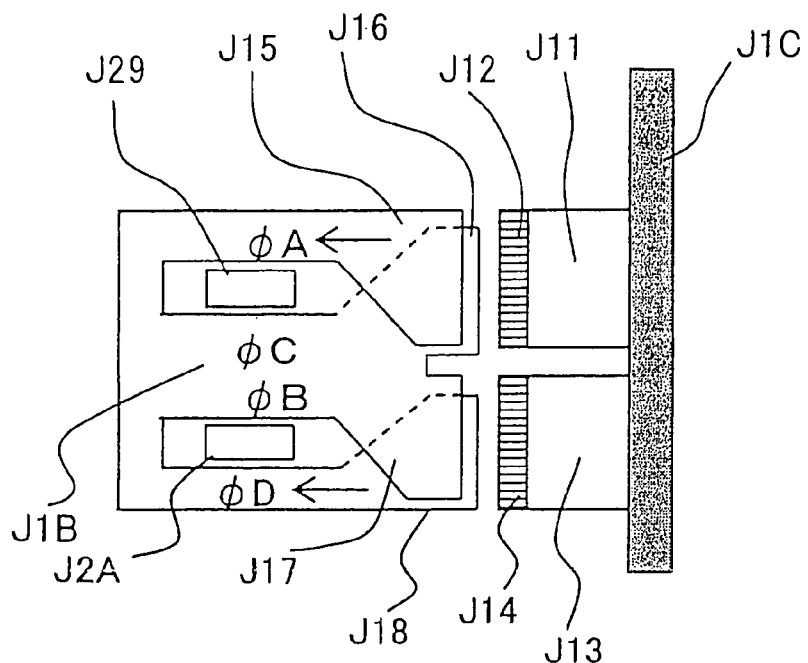

In FIG. 121, both of the rotor side and stator side are magnetically separated in the rotor shaft direction. However, according to a simple theory ignoring the flux leakage between the rotor and the stator, if only either the rotor side or the stator side is separated, two sets of rotor and stator can function being electromagnetically independent. FIG. 122 shows a structure in which the rotor side is magnetically separated and the stator side is provided with no spacer J2B in order to bring the two stators into close contact with each other. Indicated by J15 is an A-phase stator pole, by J16 is a C-phase stator pole, by J17 is a B-phase stator pole, and by J18 is a D-phase stator pole. In this case, a C-phase magnetic flux $\phi C$ and a B-phase magnetic flux $\phi B$ resultantly pass through a magnetic path 31B. Since $\phi C$ and $\phi B$ have a phase difference of 45°, the magnetic path can be made smaller by a factor of 0.707 comparing with the paths J2C and J2D in FIG. 121. Thus, the motor size can be reduced. Also, the stator cores and windings of FIG. 121 may be modified as shown in FIG. 108 to realize higher torque.

Figure 123:
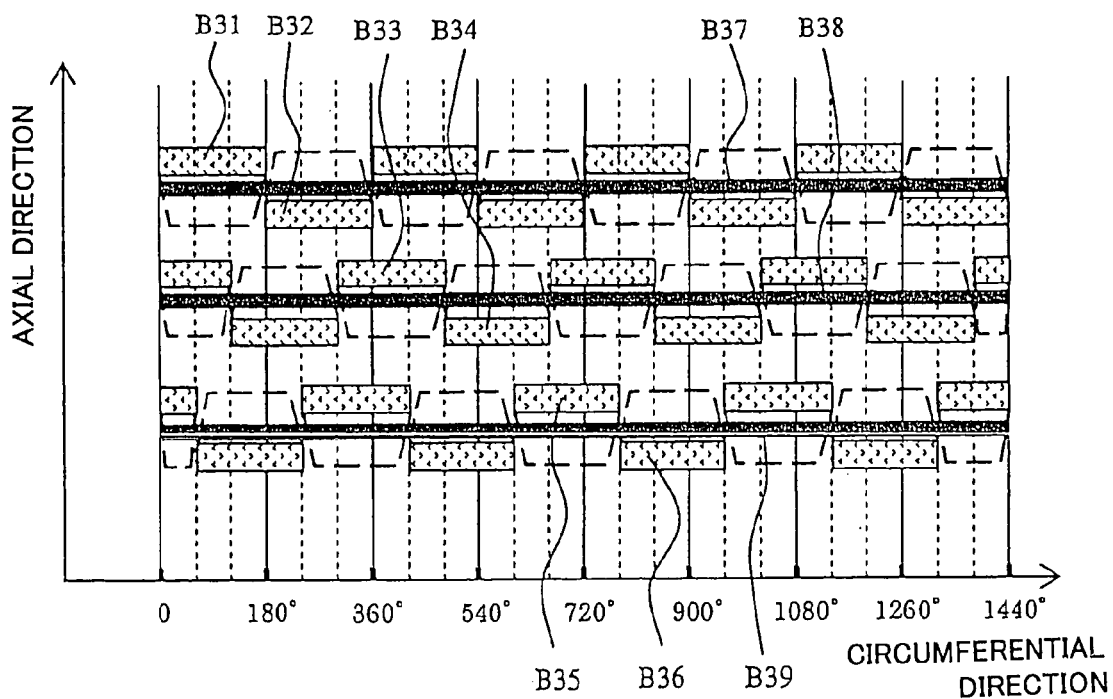
Figure 124:
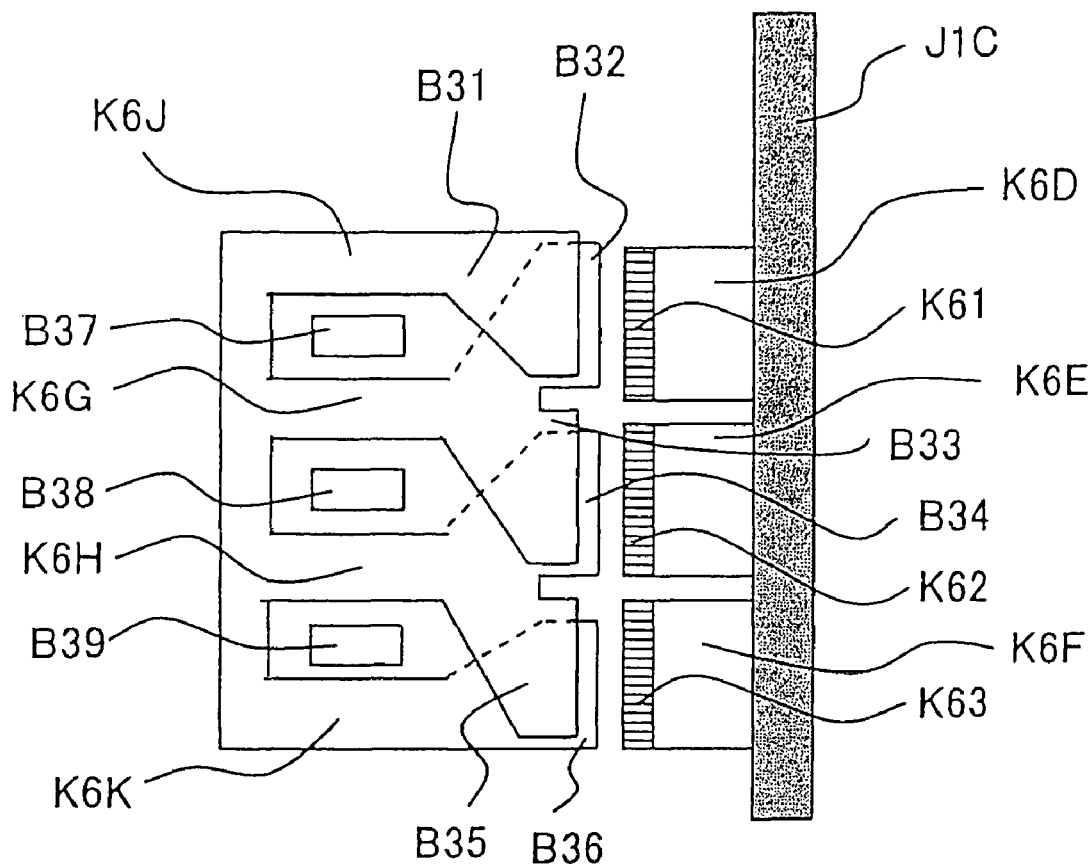

FIGS. 123 and 124 show a 6-phase motor having a structure, in which the rotor side is magnetically separated into three and the stator side cores of individual phases are linked at the back yoke. Indicated by B31 is an A-phase stator pole, by B32 is a D-phase stator pole, by B33 is an F-phase stator pole, by B34 is a C-phase stator poles, by B35 is an E-phase stator pole, and by B36 is a B-phase stator pole. Indicated by K6D and K61 are a first rotor and permanent magnets thereof, respectively, by K6E and K62 are a second rotor and permanent magnets thereof, respectively, and by KF6 and K63 are a third rotor and permanent magnets thereof, respectively. An A-phase magnetic flux passes through a magnetic path KJ6 and a B-phase magnetic flux passes through a path K6K. Meanwhile, D- and F-phase magnetic fluxes are adapted to pass through a magnetic path K6G arranged inside the stator. Combination of these two fluxes can encourage the phase difference therebetween to be large. Thus, the phase difference between these fluxes is 120° in electrical angle, so that a sum of the D- and F-phase fluxes is equivalent to the size of the flux of a single phase. Accordingly, the path K6G, being passed with a flux equivalent to the fluxes of two phases, may have the same thickness as that of the path K6J passed with the A-phase flux. The same applies to a magnetic path K6H. That is, the path K6H is passed with the C- and E-phase fluxes having a phase difference of 120° in electrical angle, while the thickness of the path K6H may be the same as that of the path K6J passed with the A-phase flux. In this way, by contriving the configuration and arrangement of the rotor, the size of the stator can be partially reduced to realize a motor reduced in size and cost. Also, the stator cores and windings of FIG. 121 may be modified as shown in FIGS. 108 and 109 to realize higher torque.

FIGS. 125 and 126 show another example of the present invention. Indicated by B51 are A-phase stator poles, by B52 are C-phase stator poles, by B53 are E-phase stator poles, by B54 are B-phase stator poles, and by B55 are D-phase stator poles. FIG. 126 vectorially illustrates currents, magnetic fluxes and the like. In the figure, indicated by A, B, C, D and E are vectors representing basic five phases. Current represented by a vector C-A is passed through a winding B57, current represented by a vector E-C is passed through a winding B59, current represented by a vector B-E is passed through a winding B5B, and current represented by a vector D-B is passed through a winding B5D. The vectors are rearranged as shown in FIG. 127 to provide a star connection as shown therein, which connection can pass current represented by a vector A-D through a center NN. In this case, a relationship between the windings is the same as the one shown in FIGS. 90 to 96. Therefore, efficient driving can be achieved by a 5-phase inverter. Since the phase difference between the adjacent stator poles is 144°, the stator poles facing the rotor surface can be readily expanded as shown by broken lines in FIG. 157 to thereby generate larger torque.

The motor shown in FIG. 125 may be modified to a 5-phase motor with six stator poles and five windings. Also, the stator cores and windings of FIG. 121 may be modified as shown in FIGS. 108 and 109 to realize higher torque.

FIG. 128 shows another example of the present invention. Indicated by B91 are A-phase stator poles, by B92 are B-phase stator poles, by B93 are C-phase stator poles, by B94 are D-phase stator poles, by B95 are E-phase stator poles, and by B96 are F-phase stator poles. In this configuration, two rotors are used, which are magnetically insulated from each other as shown in FIG. 121. Stator poles B91, B93 and B95 constitute one 3-phase motor and stator poles B92, B94 and B96 constitute the other motor to provide a configuration in which two motors are incorporated. Current represented by a vector C-A in a vector diagram of FIG. 129 is passed through a winding B97. Similarly, current expressed by a vector E-C is passed through a winding B98, current expressed by a vector F-B is passed through a winding B99, and current expressed by a vector D-F is passed through a winding B9A. This configuration corresponds to a configuration in which two motors having the configuration shown in FIGS. 1, 2 and 7 are driven, being juxtaposed. These two motors having a relative phase difference of 60° are imparted with characteristics equivalent to a 6-phase motor, and thus can attain a motor configuration for reducing torque ripple. As shown in FIG. 129, the omitted windings and currents corresponding to reversed vectors D-B and F-B are cancelled with each other. As a result, the electromotive force along the rotor shaft generated by all the currents is zeroed. That is, no electromotive force is generated along the rotor shaft. Therefore, there is no risk of magnetizing the peripheral components of the motor, leading to eliminating a problem of attaching iron powder present in the surrounding area.

Another example of the present invention will be described. A configuration of a 5-phase motor has been described referring to FIG. 125. In case of a motor of 7-phase version, 7-phase stator poles having phases A, B, C, D, E, F and G are arranged. In case of seven phases, a width of one phase in terms of electrical angle is 51.43°, and an integer for a pole width close to 180° is "3", establishing an equation 3×51.43=154.3°. Accordingly, when phases are increased to seven with the idea of the motor shown in FIG. 125, the phases may better be rearranged in the order of A, D, G, C, F, B and E along the rotor shaft with two phases being skipped between adjacent stator poles. Such a configuration may increase torque generation and may comparatively readily enable arrangement of the loop windings that will give irregularity in the rotor shaft direction.

FIG. 130 shows another example of the motor of the present invention. In each of the various motors of the present invention, the stator poles of each phase are not arranged in the same circumference, and hence, torque ripple may possibly occur by some causes. The causes include factors originating from the arrangement order of the stator poles of the individual phases and factors originating from the difference between the conditions at both ends of the rotor in the rotor shaft direction and the conditions at the portions of the rotor other than the both ends. As a method for reducing torque ripple induced by these factors, the circumference may be divided into a plurality of sections for mutual replacement, so that the harmonic components can be cancelled.

FIG. 130 shows a structure for mutually displacing the positions of the stator poles and windings along the semiperimeter of the motor shown in FIG. 108. Indicated by DD1 is an A-phase stator pole, and by DD2 is a C-phase stator pole. On the right side of FIG. 130, the stator poles and windings are mutually displaced to the opposite sides along the rotor shaft. Specifically, DD9 and DDB turn to A-phase stator poles, and DDA turns to a C-phase stator pole. Indicated by DD3 is a B-phase stator pole, and by DD4 is a D-phase stator pole. As a result of displacement, DD5 and DD7 turn to B-phase stator poles, and DD6 and DD8 turn to D-phase stator poles. The stator poles of each phase are arranged so as to belong to the same phase in terms of electrical angle, however, the relationship between the center portion of the stator and the ends thereof in the rotor shaft direction is inverted. In particular, a rounded portion of the A-phase stator pole DD1 close to a winding DDC is positioned substantially the center of the stator. As for DD9, however, the rounded portion is positioned at an end in the rotor shaft direction, that is, at a lower end of FIG. 130. In this way, displacement along the rotor shaft can provide a structure which is able to cancel the electromagnetic effects of the rotor and the stator that would be exerted at the ends thereof along the rotor shaft and at the center thereof. As a result, torque ripple can be reduced and steady torque output can be realized.

In FIG. 130, vacant spaces are present because of the displacement of the stator poles. These spaces may be effectively utilized for torque generation by, for example, placing a little smaller stator poles.

In FIG. 130, an example of 4-phase motor has been described. In case of a 3-phase version having phases A, B and C, the A-, B- and C-phases may be sequentially displaced for the reduction of torque ripple.

Figure 14:
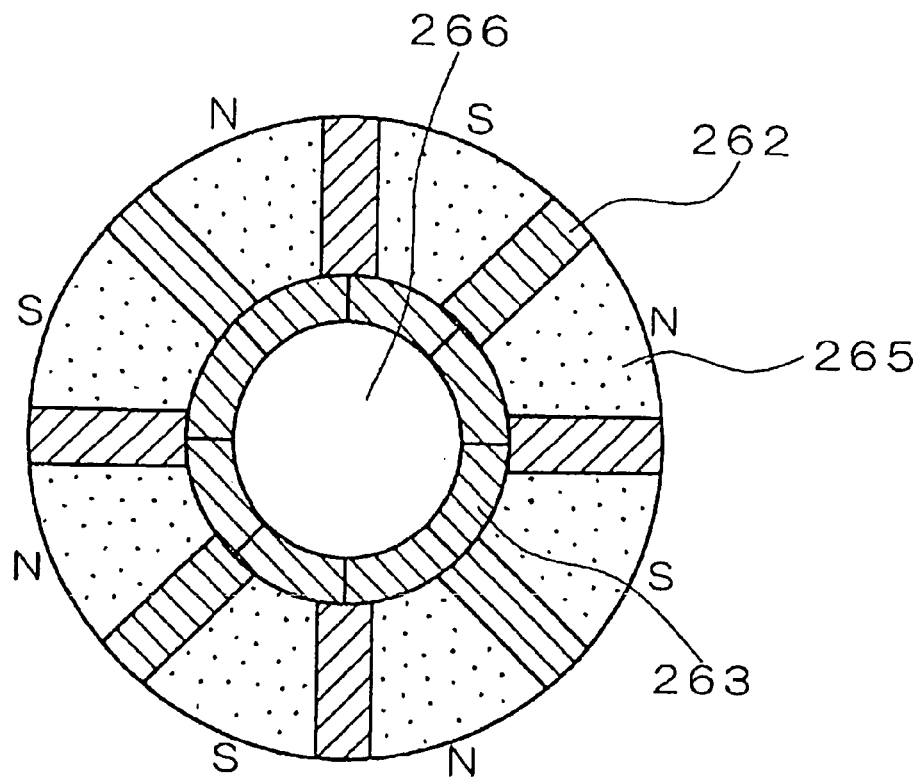
FIG. 14 is a transverse cross section of a rotor incorporating permanent magnets.
Figure 15:
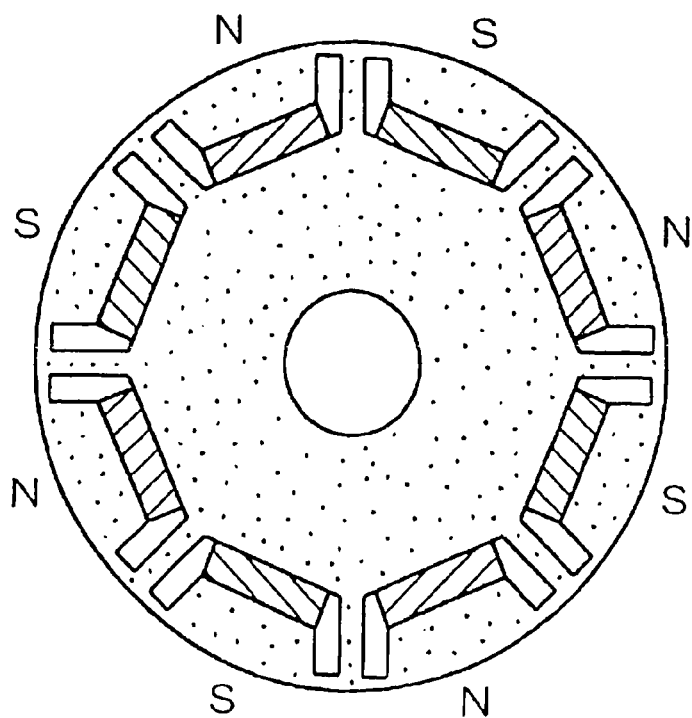
FIG. 15 is a transverse cross section of a rotor incorporating permanent magnets.
Figure 16:
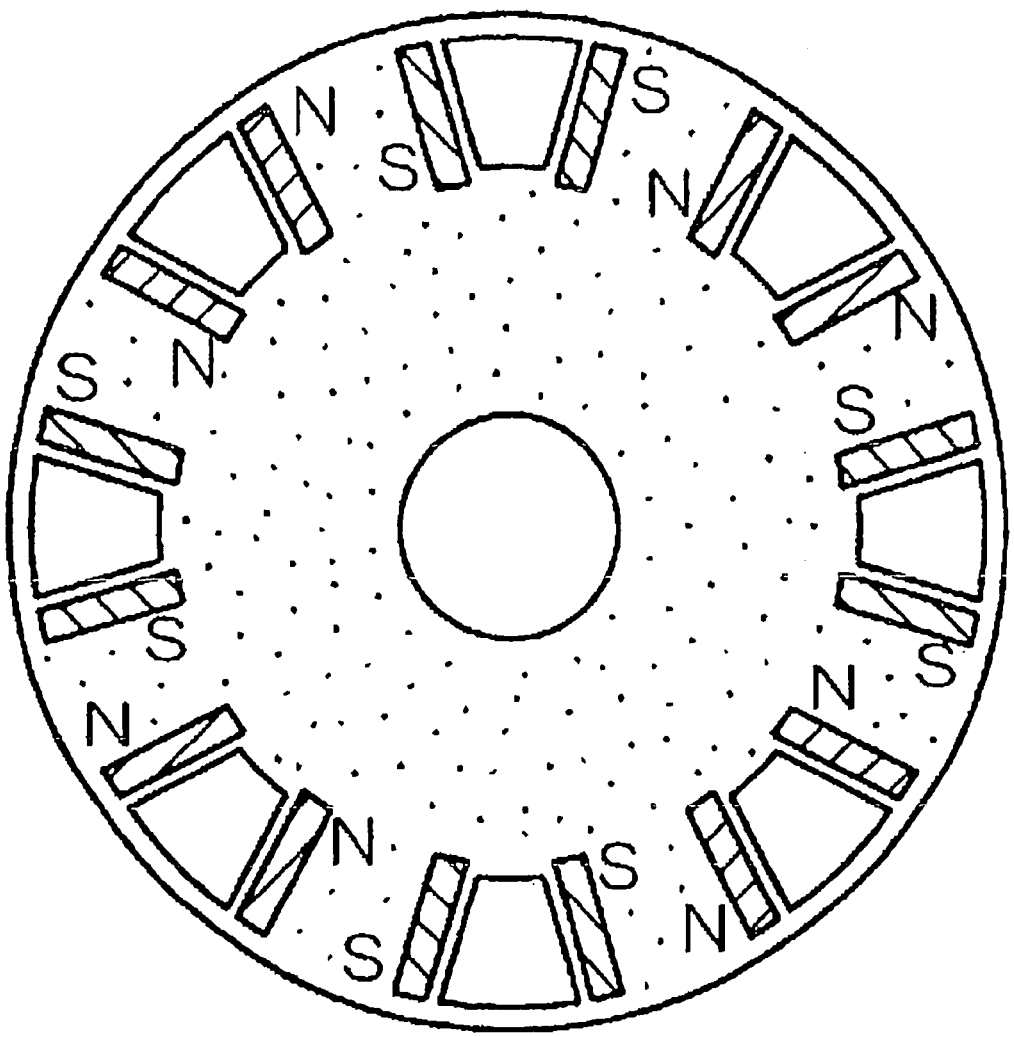
FIG. 16 is a transverse cross section of a rotor incorporating permanent magnets.
Figure 17:
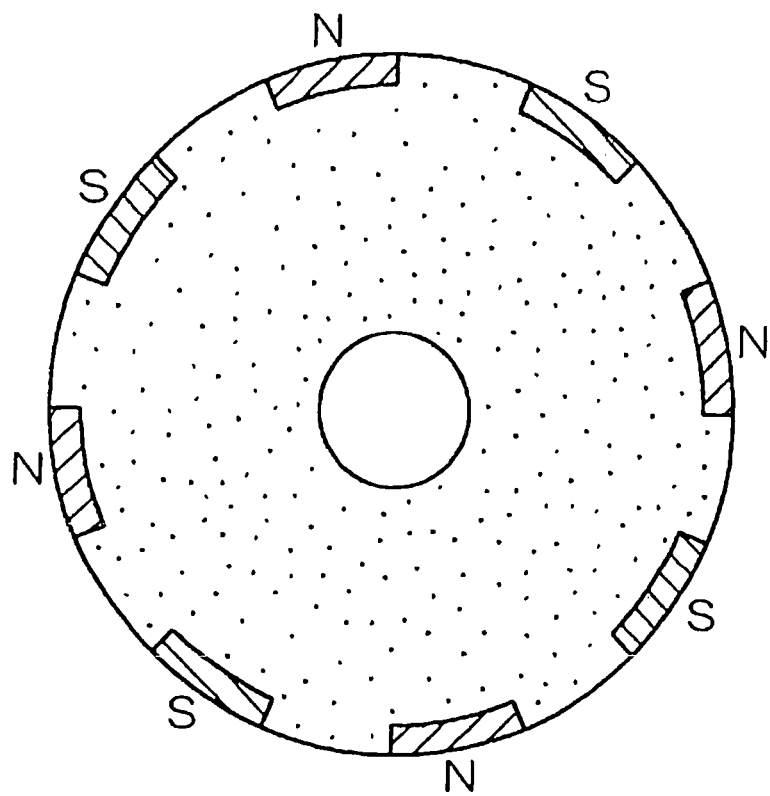
FIG. 17 is a transverse cross section of a rotor incorporating permanent magnets.

Hereinafter will be described a motor obtained by combining: a rotor having a magnet-embedded structure as shown in FIGS. 14 to 16, which is able to generate torque by the permanent magnets and reluctance torque by utilizing a so-called soft magnetic material; or a magnet-inset-type rotor as shown in FIG. 17; with a stator as shown, for example, in FIGS. 21, 22, 34, 35, 42 and 43. The rotors having these configurations are different from each other in the characteristics, and thus are appropriately used for the intended purposes. Contrary to these rotors, each of the surface magnet rotors shown in FIGS. 21 and 22 has a structure, in which the magnetic flux distribution is mostly determined depending on the characteristics of the employed permanent magnets. Accordingly, such a surface magnet rotor has such a characteristic that the magnetomotive force generated by each winding of the stator has little to do with the flux density at portions in the motor. That is to say, such a surface magnet rotor mostly generates so-called magnet torque and hardly generates reluctance torque.

As described above, a so-called concentrated-winding stator as shown in FIG. 73 has a pole width of about 120° in electrical angle, and thus has a difficulty in providing a sinusoidal magnetomotive force distribution along the circumference. Accordingly, in case of a rotor as shown in FIGS. 14 to 17, sufficient reluctance torque may not often be obtained. Further, cogging torque and torque ripple tend to be increased. In addition, such a rotor also has a difficulty in performing constant-power control utilizing the magnetic characteristics of the soft magnetic material portion of the rotor.

However, the stator of the invention shown, for example, in FIG. 35 enables a stator pole arrangement with comparatively small discreteness of 60° in electrical angle along the circumference. Further, this stator enables production of smooth rotating field from the magnetomotive force that effects the stator poles, by controlling the amplitude and phase of current passing through each winding. Combination of such a stator with a rotor as shown in FIGS. 14 to 17 may attain large torque. Further, flexible magnetomotive force control according to a rotational position of the rotor may realize the constant-power control as obtained by the stator shown in FIG. 74. In addition, the smooth rotating field may comparatively readily reduce cogging torque and torque ripple.

On the other hand, the stator shown in FIG. 74 has slots with narrow openings, and thus tends to complicate the arrangement of the 3-phase windings. This may lead to the problems, for example, of low space factor of the windings, low assembling properties of the windings and tendency of allowing the coil ends to be lengthy with the resultant increase in the motor size. The stator of the present invention shown, for example, in FIG. 35 has such a characteristic, for example, that it can reduce the amount of the windings for the reduction of copper loss, and can facilitate fabrication because the windings are simple loop windings. In particular, unlike the stator shown in FIGS. 73 and 74, the stator of FIG. 35 has no axially arranged windings, and thus may not reduce the cross sectional area for arranging the windings even when multi-polarized. In this way, the stator of FIG. 35 has such characteristics, for example, that multipolarization will not reduce the cross sectional area for arranging the windings but the multipolarization can achieve high torque, and that the elimination of coil ends can reduce the motor size.

It should be appreciated that usable soft magnetic materials include electromagnetic steel plates or dust cores obtained by electrically insulating the surfaces of powdered soft magnetic materials, followed by pressing.

Hereinafter will be described a motor, which is a combination of a stator of the present invention as shown, for example, in FIG. 35 and a rotor of a synchronous reluctance motor as shown in FIG. 74. It should be appreciated that a gap portion of a slit 58 of the rotor may be made of a nonmagnetic material, or a permanent magnet may be inserted into the gap portion for the purpose of obtaining high torque.

The characteristics created by the combination of a 4-pole stator with so-called concentrated winding as shown in FIG. 73 and the 4-pole rotor shown in FIG. 74 may also create a problem of generating large torque ripple. Good characteristics are known to be obtained by combining the stator of FIG. 74, which, however, involves the above mentioned problem of the stator. In particular, synchronous reluctance motors have such excellent characteristics that they can be realized at low cost without using expensive materials, such as permanent magnet, or by using a small amount of permanent magnet, and that they can perform field-weakening control and thus can perform low-output control. However, the above mentioned problem of the stator shown in FIG. 74 discourages competitiveness of this motor.

However, by combining the stator of the present invention shown, for example, in FIG. 35, an excellent motor can be realized, which has a combination of the characteristics of the rotor of the synchronous reluctance motor and the characteristics of the stator of the invention shown, for example, in FIG. 35.

A rotor structure of the motor of the present invention will be described. FIG. 131 illustrates a cross section of the rotor. Rotor poles are structured by stacking electromagnetic steel plates as shown by (a) of FIG. 131. Indicated by D13 is a rotor shaft, and by D12 is a support member for supporting magnetic paths of the rotor. Indicated by D11 are electromagnetic steel plates, each of which has a bent shape as shown by (a) of FIG. 132, and are arranged parallel to the rotor shaft. The electromagnetic steel plates having analogous shapes and different sizes are stacked to form an 8-pole rotor configuration. Gaps made between the stacked electromagnetic steel plates are left vacant or arranged with nonmagnetic members. This will lead to the increase of magnetic resistance between the individual magnetic paths formed by the electromagnetic steel plates and the decrease of magnetic resistance from a rotor pole to another rotor pole. As a result, a d-axis inductance Ld of the motor is increased, while increasing magnetic resistance from a rotor pole boundary to an adjacent rotor pole boundary to decrease a q-axis inductance Lq of the motor. It should be appreciated that the gap or the nonmagnetic member for the space may be arranged for every plurality of electromagnetic steel plates.

Although the rotor configuration of FIG. 131 does not show how the electromagnetic steel plates are fixed, these plates may be fixed by various ways, for example, by fixing the plates to the rotor shaft with bolts, or by fixing the plates with an adhesive, or by impregnating the plates with a resin. This figure shows only the electromagnetic factors.

The motors of the present invention shown heretofore mostly have structures where magnetic fluxes pass not only in circumferential and radial directions but also in the rotor shaft direction. In this regard, the electromagnetic steel plates each having the shapes as shown in FIGS. 131 and 132 can permit the magnetic fluxes to pass along the shapes of the electromagnetic steel plates even when the fluxes pass along the rotor shaft. Thus, the electromagnetic steel plates can readily pass the fluxes along the rotor shaft, and thus can provide a magnetic path configuration which is particularly convenient for the stator structure of the present invention. Further, improvement may be made by, for example, increasing the number of the electromagnetic steel plates, or imparting the rotor surface with an outer configuration in which an arc shape is provided for every rotor pole. For a motor employing such reluctance torque, it is important to make an improvement in the outer shape of the motor in order to reduce torque ripple.

When a rotor structured by the electromagnetic steel plates shown by (a) of FIG. 132 is used, magnetic flux changes in the vicinity of the rotor surface along the circumference of the rotor during high torque rotation of the motor. As a result, eddy current is induced by the magnetic flux that fluctuates in the direction of a thickness of the electromagnetic steel plates, which brings about a problem of eddy current loss.

This problem can be effectively solved by providing very small slits, as shown by (b) of FIG. 132, at portions of the electromagnetic steel plates, which are positioned in the vicinity of the rotor surface, for the reduction of the eddy current. Such very small radial slits create almost no problem from the viewpoint of either the amount of magnetic flux or the strength for the centrifugal force.

The rotor configuration of FIG. 131 may create a problem that the centrifugal force exerted on portions of the rotor in high-speed rotation may threaten the strength of the rotor. This rotor having a little complicated configuration requires some measures for strengthening the rotor when it is use in high-speed rotation. If the motor structure shown in FIG. 131 is modified to an outer rotor type, a strong ring steel member may be arranged at an outer periphery of the rotor to mitigate the problem of centrifugal force.

Referring now to FIG. 133, hereinafter is described a method for enhancing torque of a motor having the rotor shown in FIGS. 131 and 132. For example, as indicated by D31, permanent magnets D31 and D32 oriented as shown in the figure may be arranged at the individual stator poles. In this case, the magnets which are arranged at the magnetic poles in opposite directions are required to be oppositely oriented. In the rotor as shown in FIG. 131, the flux leakage in a stacking direction of the electromagnetic steel plates at the time of large current flow may bring about reduction in the power factor which is led to torque reduction. In this regard, addition of the permanent magnets D31 may have an effect of compensating the flux leakage. The permanent magnets D31 also have an effect of positively supplying torque flux, realizing the increase of torque.

The example shows that the permanent magnets D31 are inserted covering substantially the entire surfaces of the electromagnetic steel plates. Alternatively, short permanent magnets may be arranged at portions between the electromagnetic steel plates as indicated by D32. Alternatively, permanent magnets may be partially arranged without being arranged at all the spaces between the electromagnetic steel plates, which may also attain significant effects. Thus, arrangements may be made depending on the characteristics required motors, manufacturability of motors, as well as the types and characteristics of magnets.

Figure 18:
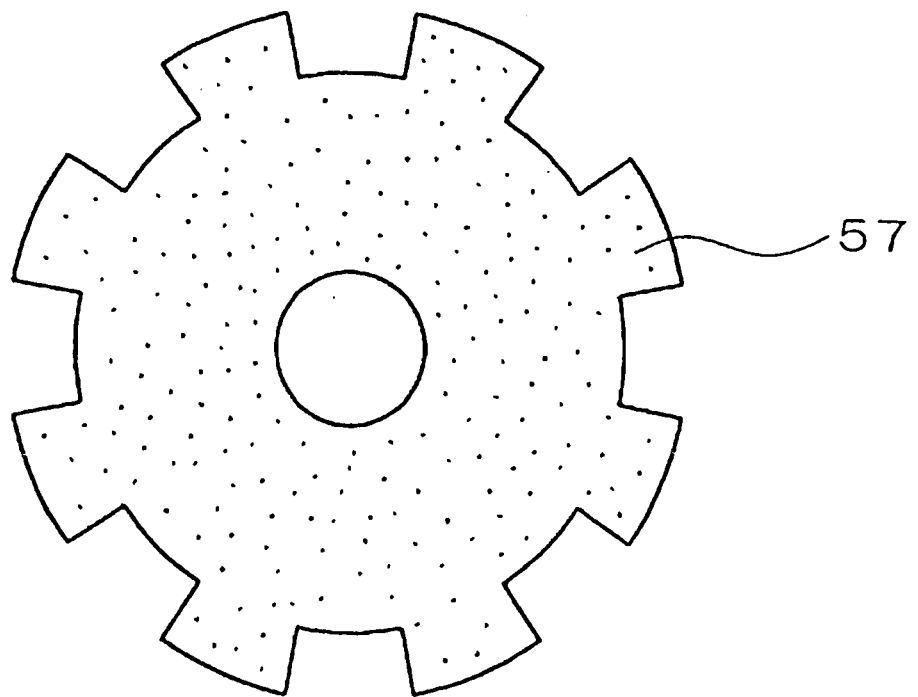
FIG. 18 is a transverse cross section illustrating an example of a rotor of a reluctance motor having salient magnetic poles.

Alternatively, the salient-pole rotor made up of a soft magnetic material as shown in FIG. 18 may be combined with the stator shown, for example, in FIG. 35 to realize a solid motor that can facilitate control in high-speed rotation. It should be appreciated that the shape of each salient pole of a rotor is not limited, but may be modified by additionally providing slits in the rotor or by additionally providing permanent magnets.

Hereinafter will be described a motor of the present invention, which is a combination of the stator shown in FIG. 35, for example, and the induction-motor rotor shown in FIG. 19. For the rotor shown in FIG. 19, the conductors 170 may be formed by die casting aluminum or may be formed by inserting copper rods into the slots. In either of the formations, the rotor is fabricated with the coil end portions of the windings being short circuited so that induced current may flow. Alternatively, secondary conductors of the rotor may be structured using surface-insulated copper wires which also structure the windings of the stator. Generally, induction motors are widely used employing the stator configuration shown in FIG. 74 and the rotor configuration shown in FIG. 19. Such an induction motor has such characteristics that it is solid and excellent in the performance of field-weakening constant-power control and can easily drive and stop a commercial power source of 50 or 60 Hz by opening/closing an electromagnetic contactor. However, as have been described referring to the stator shown in FIG. 74, there are some problems in efficiency, productivity, motor size and cost.

Figure 19:
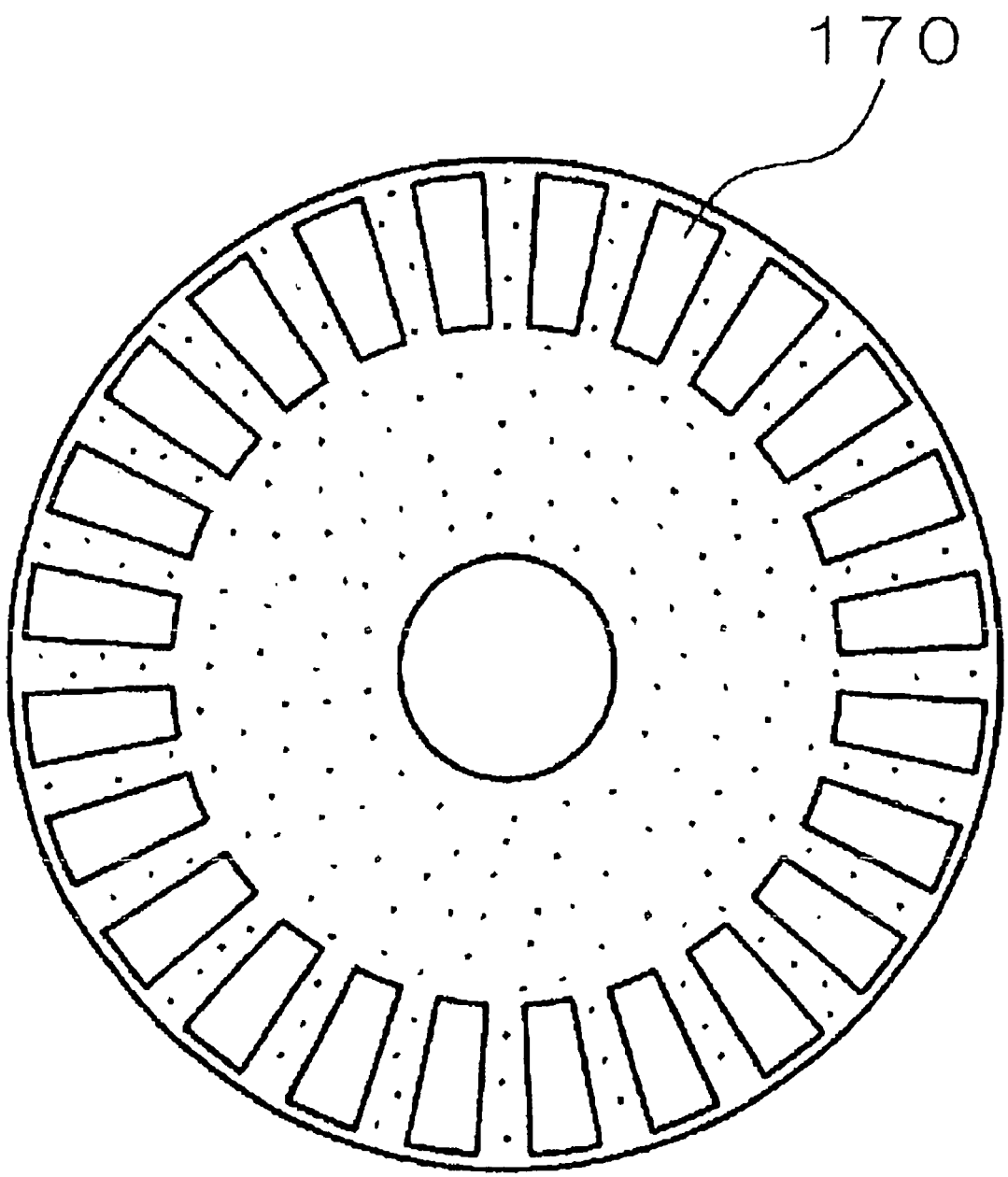
FIG. 19 is a schematic transverse cross section illustrating a configuration of a rotor of an induction motor.

However, combination of the stator shown in FIG. 35, for example, and the induction motor rotor shown in FIG. 19 may eliminate the above problems while maintaining the characteristics of an induction motor, thereby providing an excellent induction-type motor.

Figure 57:
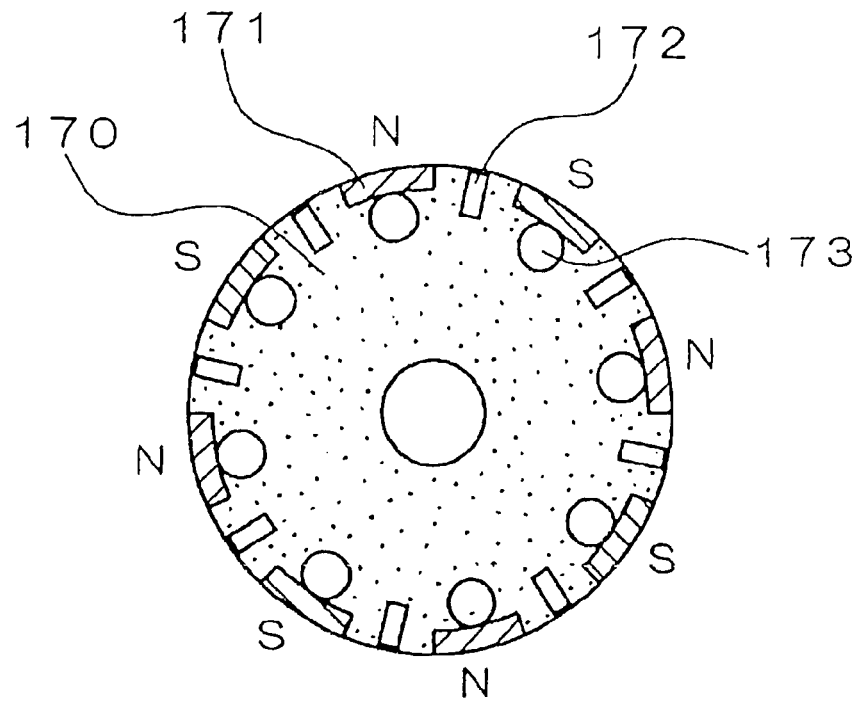
FIG. 57 illustrates the rotor shown in FIG. 17 with induction windings being arranged therein.

The rotor shown in FIG. 57 has a structure of the rotor shown in FIG. 17 with an addition of inductive windings 172 and 173. Addition of the inductive windings 172 and 173 to the rotor of such a synchronous motor may enable starting and stopping the motor by turning on/off a commercial power source of 50 or 60 Hz and thus may be efficiently operated as a synchronous motor in a normal operation. Indicated by numeral 171 are permanent magnets, and by 170 is a soft magnetic material. The inductive windings 172 and 173 may also be additionally provided to the rotors shown in FIGS. 14 to 18.

Figure 58:
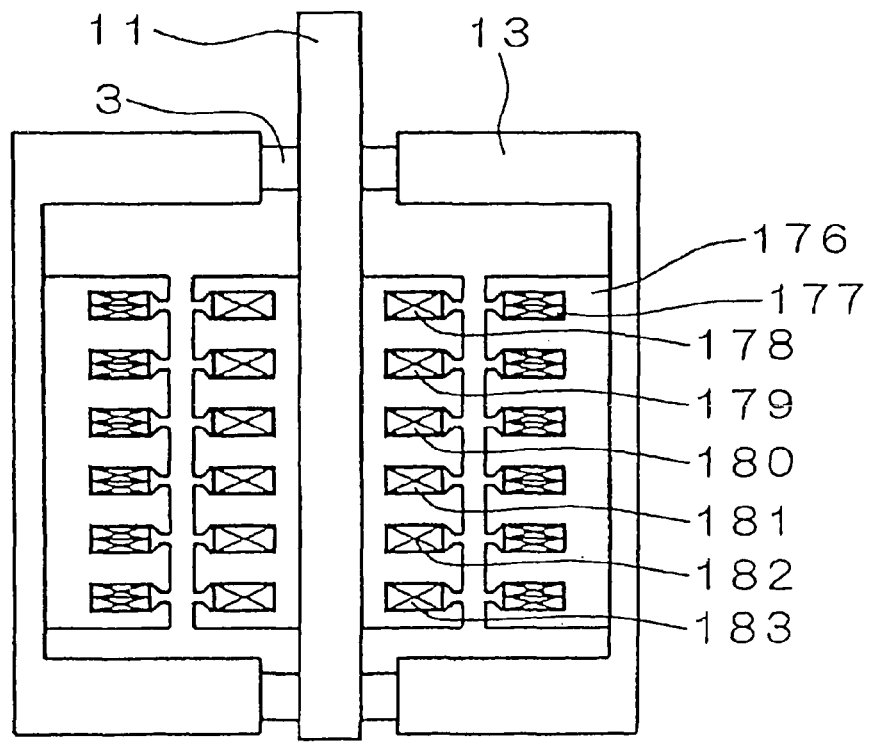
FIG. 58 is a vertical cross section illustrating a configuration of an induction motor in which both of stator-side primary windings and rotor-side secondary windings are made up of loop windings.

Another problem of the induction motors is secondary copper loss caused by the induced current that flows through the secondary conductors of the rotor. The secondary copper loss may be led to a problem of lowering motor efficiency, or, depending on use, to a problem of temperature rise. FIG. 58 shows a motor which can solve the problem, or can reduce the secondary copper loss of the rotor. A stator 176 shown in FIG. 58 is the same as the stator 14 shown in FIG. 21. Stator windings 177 shown in FIG. 58 may be modified to those of the stator shown in FIG. 35 to reduce heat generation at the stator windings and to reduce copper loss as well. The rotor shown in FIG. 58 has been fabricated by reversing the idea of inner and outer diameters concerning the stator structure shown in FIG. 34. In FIG. 58, windings 178 to 183 are short-circuited loop windings for passing the secondary induced current. The number of turns of the windings 178 to 183 can be optionally selected from one turn to a plurality of turns. When these windings are fabricated by die casting aluminum, each winding may have one turn and may be short circuited.

The motor shown in FIG. 58 is characterized in that both of the stator and the rotor have structures using loop windings. As described above, the motor can reduce the amount of the windings for the reduction of copper loss, and can facilitate fabrication because the windings are simple loop windings. In particular, unlike the stator shown in FIGS. 73 and 74, the motor of FIG. 58 has no axially arranged windings, and thus may not reduce the cross sectional area for arranging the windings even when multipolarized. In this way, the motor of FIG. 58 has such characteristics that it can achieve high torque with multipolarization and can reduce the motor size because there is no coil end. In particular, when the motor is multipolarized, the rotor of FIG. 58 may much more contribute to reducing copper loss than the rotor of FIG. 19.

The motor FIG. 58 is illustrated to have the same number of teeth and the same number of slots between the stator and the rotor in order to demonstrate that the stator and the rotor have the structures based on the same idea. However, a combination of a stator and a rotor having analogous configurations may raise a problem that torque ripple is likely to be caused. In this sense, it is preferable that, in the motor shown in FIG. 58, the stator and the rotor have different number of teeth, slots and windings.

Hereinafter will be described a stator configuration having three phases and satisfies the relation expressed by Formula (31), i.e. Nss=Pn×Ns. That is, a description will be provided on a motor which is a combination of a stator having a configuration expressed by Nss=Pn×Ns and a rotor shown in FIGS. 14 to 19 or FIG. 57. As described above, a surface of each rotor contains soft magnetic materials to provide a structure that can readily change the rotor flux distribution by the current of the stator, or can effectively operate when a sinusoidal electromotive force distribution is applied from the stator along the circumference. On the other hand, the 6-phase stator shown in FIG. 35, for example, has a magnetomotive force distribution of 60° pitch with low discreteness. Accordingly, this stator can apply a sinusoidal magnetomotive force distribution along the circumferential direction with comparatively high precision, and thus can be effectively driven in combination with the rotor shown in FIGS. 14 to 19 or FIG. 57. When the stator configuration shown in FIG. 35 is modified to 3-phase configuration, discreteness of the stator will be 120°, which is larger by a factor of two. This may create a problem of decrease in average torque and increase in torque ripple when the rotor shown in FIGS. 14 to 19 or FIG. 57 is driven, that is, a problem that the motor cannot be effectively driven. To cope with this, the stator pole configurations SPS as shown in FIG. 39 may be utilized so as to bring the circumferential area distribution of each stator pole configuration SPS at the inner periphery of the stator, close to the sinusoidal distribution. In this way, the sinusoidal magnetomotive force distribution can be applied along the circumference of the rotor to enable more effective driving of the rotor.

In order to satisfy the desire that the magnetomotive force distribution applied to the rotor should be sinusoidal in the circumferential direction, some effective methods can be employed. For example, in the radial configuration of the rotor, a recess may be provided between the pole boundaries as shown in FIG. 40, or both ends of each stator pole along the circumference may have a larger radius for the center of the stator as shown in FIG. 40, so that these both ends may be smoothed toward the outer-diameter side. These methods may be combined.

As described above, the stator shown in FIG. 35 has excellent performance but has a little complicated configuration due to the large number of phases. In this regard, the structure obtained by modifying the stator of FIG. 35 to a 3-phase stator and allowing the stator to have a sinusoidal area distribution along the circumference in the stator configuration SPS at the inner periphery, can provide a sinusoidal magnetomotive force along the circumference and thus can effectively drive the rotor shown in FIGS. 14 to 19 or FIG. 57. Accordingly, although the stator is simplified, effective driving can be realized with an achievement of both of low cost and high performance.

The stator structure and the configurations of the individual portions thereof, in which the stator is the 3-phase version of the stator shown in FIG. 35 with the stator pole configurations SPS being of FIG. 39, is equivalent to the structure, in which the stator is the stator shown in FIG. 1 with the inner surface stator pole configurations SPS being of FIGS. 11 to 13 or of the stator pole configurations shown in FIG. 39.

Figure 59:
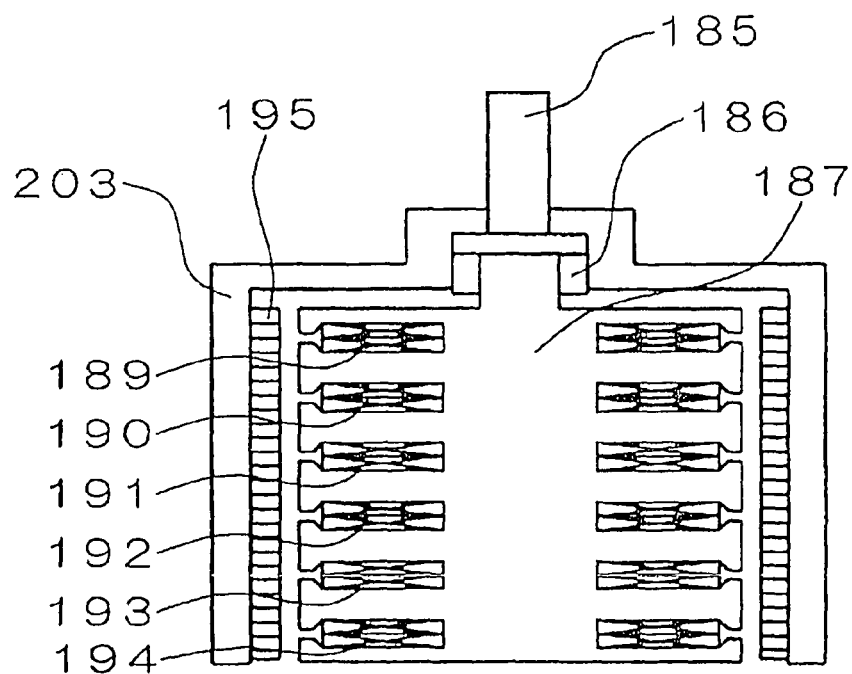
FIG. 59 is a vertical cross section illustrating an outer rotor motor in which a rotor is arranged on the side of an outer diameter.

Referring now to FIG. 59, hereinafter is described a configuration of a so-called outer rotor motor, in which a relationship between an inner- and outer-diameter sides of the stator and the rotor, respectively, is inverted and the outer-diameter side is rotated. Indicated by numeral 187 is a stator arranged on the inner-diameter side, with loop windings 189 to 194 being arranged inside thereof. In the example shown in the figure, two sets of loop windings are arranged in one slot, however, these windings may be combined in the same fashion as the windings shown in FIGS. 34 and 35. Indicated by numeral 186 is a rotatable bearing for supporting a rotor, by 185 is an output shaft of a rotor, and by 203 is a rotor. Indicated by numeral 195 are permanent magnets which are fixed to the inner-diameter side of the rotor and have a circumferential linear development configuration similar to that of the permanent magnets 12 as shown by (b) of FIG. 22, although the inner and outer diameters are different. The motor shown in FIG. 59 has such characteristics that the output can be increased, in addition to the characteristics that the outer-diameter side can just be rotated. This is because an electromagnetic circuit can be effectively structured up to the inner-diameter side of the motor to make larger the cross section of the windings 189 to 194 than that of the windings 41 to 52 of the motor shown in FIG. 21 and to make larger the supply currents. As to the amount of electromagnetically functioning magnetic flux as a motor, both current and magnetic flux are increased because the permanent magnets 195 can be arranged on the outer-diameter side, in comparison with the permanent magnets 12 shown in FIG. 21 to thereby increase the output torque. However, the outer rotor motor shown in FIG. 59 may create a problem depending on the purpose of use of the motor, and the ambient environment in which the motor is used. For example, a motor case, which is not illustrated in FIG. 59, may be required depending on the purpose of use. Also, the position of arranging the rotor bearing is required to be devised, which may mostly reduce the rigidity of the rotor shaft.

Figure 60:
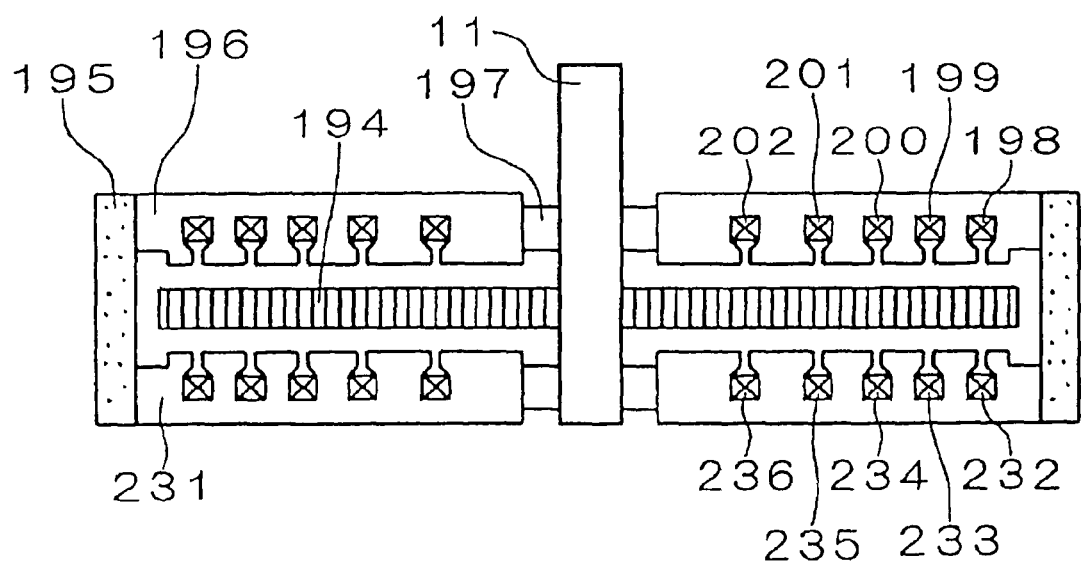
FIG. 60 is a vertical cross section illustrating an axial gap motor in which a stator and a rotor are relatively arranged in an axial direction of the rotor.
Figure 61:
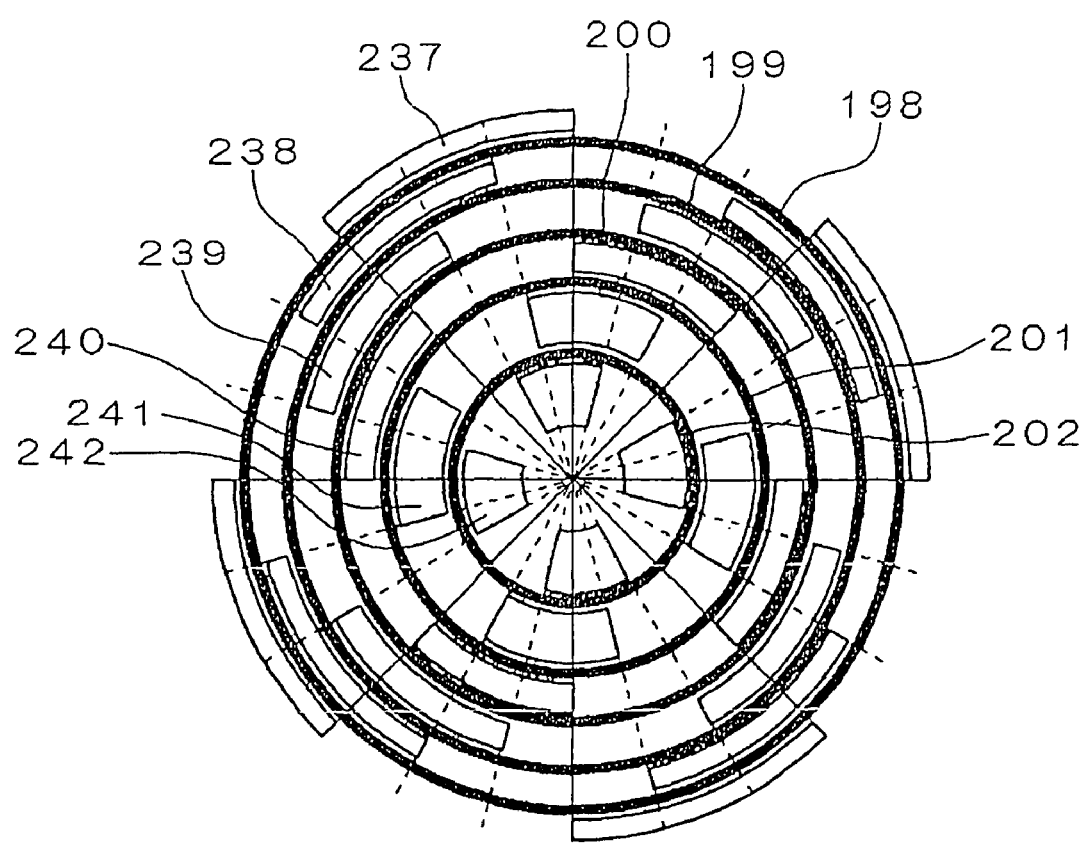
FIG. 61 is a transverse cross section illustrating a configuration of the stator poles shown in FIG. 60 with the loop windings being arranged therein.

FIG. 60 shows an example of a motor which has been obtained by modifying the cylindrical stator shown in FIG. 35 into disk-like stators. Stators 196 and 231 are arranged at axial ends of a rotor 194 made up of permanent magnets. Indicated by numeral 195 is a stator case, which is made up of a nonmagnetic material. Indicated by numeral 11 is a rotor shaft made of a nonmagnetic material, and by 197 is a bearing. Indicated by numerals 198 to 202 are loop windings of the individual phases. FIG. 61 is an arrangement plan of the stator 196 as viewed from a side opposite to the side from which the rotor shaft 11 is loaded. Indicated by numeral 237 are first-phase stator poles, by 238 are second-phase stator poles, by 239 are third-phase stator poles, by 240 are fourth-phase stator poles, by 241 are fifth-phase stator poles, and by 242 are sixth-phase stator poles. The stator poles of the individual phases are arranged so as to have a relative phase difference of 60° in electrical angle. Arrangement of the windings 198 to 202 of the stator 196 are shown in FIG. 61 by the same reference numerals. As to the stator 231 as well, the arrangement as viewed from the side opposite to the side from which the rotor shaft 11 is loaded, is the same as the one shown in FIG. 61. Distances from the center of the motor to the individual stator poles are different from each other.

Figure 62:
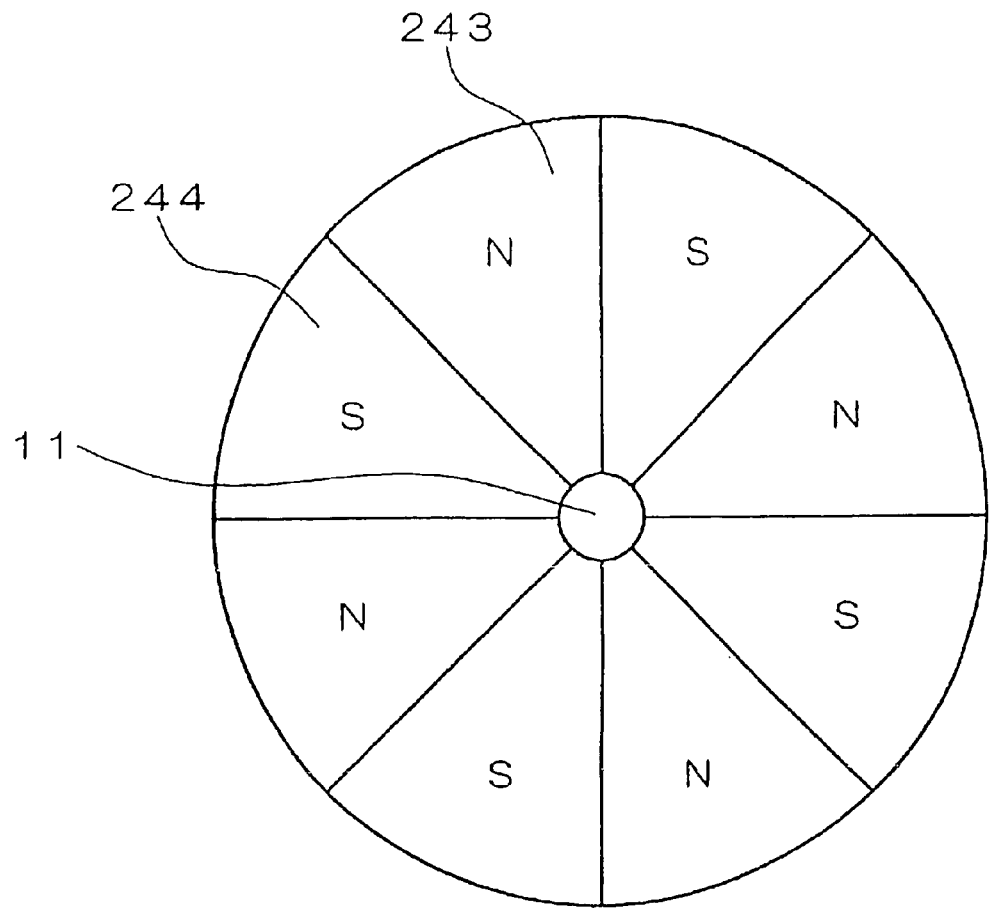
FIG. 62 is a transverse cross section of the motor shown in FIG. 60.

Accordingly, a radial width of the stator poles of each phase is determined so that the area of the stator poles of each phase will be the same with that of each of the other phases. FIG. 62 shows a configuration of the rotor 196 as viewed from the side opposite to the side from which the rotor shaft 11 is loaded. In the figure, N-poles 243 and S-poles 244 of the permanent magnets are alternately arranged along the circumference to constitute an 8-pole rotor. Electromagnetic attractions along the rotor shaft are exerted to the rotor 196 from the sides of both the stators 196 and 231. Therefore, the attractions are counterbalanced. Thus, in total, the structure is adapted not to generate a large force along the rotor shaft, i.e. a large thrust force.

The motor shown in FIG. 60 is provided with the stators 196 and 231 which include the phase windings, but the electromagnetic effects are the same as those of the stator shown in FIG. 35. As to the stator pole configuration, the loop windings and the rotor, the various modifications described above can be applied. Also, the stators 196 and 231 can be imparted with different configurations. For example, one of the stators may be a disk of a soft magnetic material without including windings. The stators 196 and 231 may be replaced with two rotors and the rotor 196 may be replaced with a stator. The example described above has had six phases and eight poles, however, the numbers of phases and poles may be optionally selected, e.g. three phases and sixteen poles.

Motors having the structure shown in FIG. 60 will be flat and thin. In comparison with the motors shown in FIGS. 21 and 35, the motor shown in FIG. 60 can be provided with relatively large permanent magnets, so that the magnetic flux interlinked with each winding may be large and thus large torque may be generated.

Figure 63:
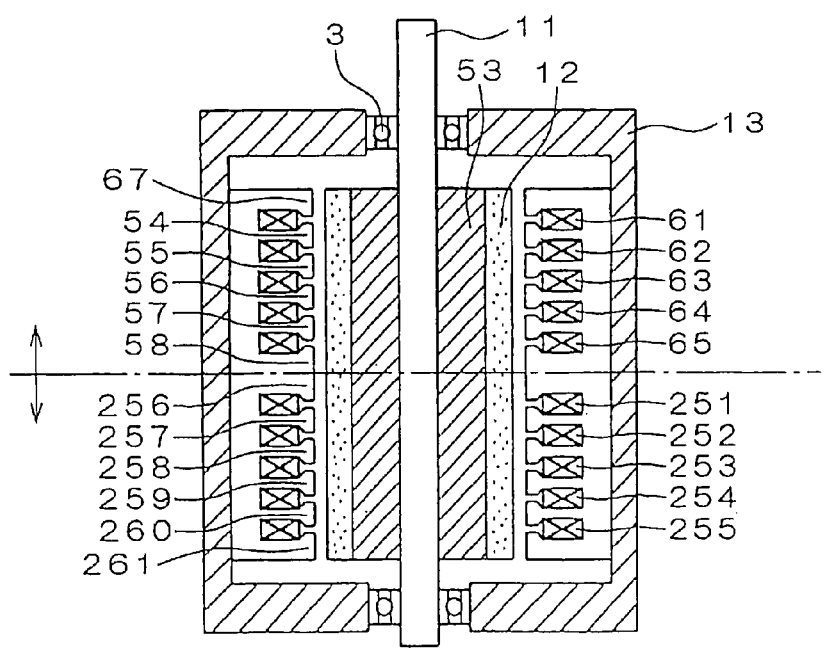
FIG. 63 is a vertical cross section of a motor of the invention in which two motors are incorporated.
Figure 64:
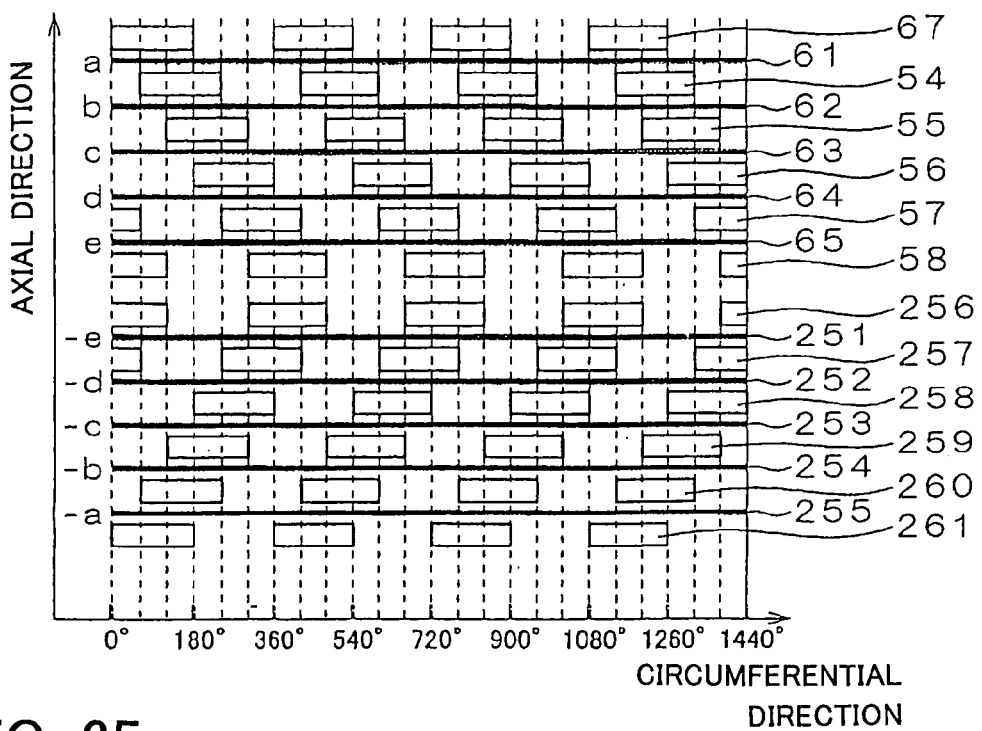
FIG. 64 illustrates an example of an inner peripheral surface configuration of the stator shown in FIG. 63 linearly developed along the circumference with loop windings being arranged therein.

FIG. 63 shows an example of a motor incorporating two motors, each of which has the stator configuration shown in FIG. 35. The motor shown in FIG. 63 is incorporated with two motors indicated at upper and lower sides of the figure being defined by a horizontal dashed-dotted line. Similar to FIG. 35, FIG. 64 is a linear development of inner peripheral configurations of the stators as viewed from the rotor side. An upper half motor shown in FIG. 63 includes stator poles 67, 54, 55, 56, 57 and 58, and loop windings 61 to 65, constituting the same stator configuration as shown in FIG. 35. Specifically, the upper half motor has a structure of the windings with balanced 6-phase currents as indicated by the current vectors of FIG. 33, but omitted with the winding corresponding to the current vector "f" with the magnetomotive force equivalent to the current unbalance being generated along the rotor shaft. Comparing with the stator configuration of FIG. 35, the configuration of a lower half motor shown in FIG. 63 is inverted in the arrangement order of the stator poles, in the order of currents to be supplied to the loop windings and in the polarity, with the magnetomotive force equivalent to the current unbalance being generated in a direction reverse from that in the upper half motor. However, the direction and magnitude of the torque generated by the lower half motor of FIG. 63 are adapted to be the same as those of the torque generated by the upper half motor of FIG. 63. The current vectors "a", "b", "c", "d", "e", "-a", "-b", "-c", "-d" and "-e" indicated at the left ends of the loop windings shown in FIG. 64, which are the current vectors shown in FIG. 33, are the currents to be supplied to the individual windings. In this way, the incorporation of two motors can cancel or counterbalance the axial magnetomotive forces generated in the individual motors. Thus, use of such a motor incorporating two motors is advantageous under the circumstances where iron powder present in the surrounding area is attached to the motor output shaft as the rotor shaft is axially magnetized, or where a magnetic encoder is mounted on the rotor shaft and thus the magnetomotive forces along the rotor shaft become problematic. Alternatively, three or more electromagnetically unbalanced motors may be coaxially arranged to maintain the electromagnetic balance.

In FIG. 63, the electromagnetic effects exerted by the upper and lower half motors defined by the dashed-dotted line are adapted to be plane-symmetric with respect to a plane at the dashed-dotted line. Accordingly, the example of FIG. 63 does not cause electromagnetic interference between the two motors even when the stators are closely arranged. Other structures, each of which is made up of two motors, may also cancel the magnetomotive force along the rotor shaft. When no electromagnetically symmetric configuration is provided with respect to the plane at the dashed-dotted line, a space may be provided between the two stators to attain electromagnetic separation.

Incorporation and connection of a plurality of motors is also advantageous for the purpose of reducing the size of the motor in its entirety by the efficient use of the spaces, for the purpose of simplifying the motor by shared use of components, and for the purpose of reducing cost. In case a plurality of motors are axially connected, an elongated motor structure can be readily obtained. In case a plurality of motors are radially connected, a flat motor structure can be readily obtained. For example, when two motors are radially incorporated, an outer rotor motor is arranged inside and an inner rotor motor is arranged outside for integration of both of the rotors. In this case, since the inner-diameter side motor and the outer-diameter side motor are significantly different in the shapes, motors of the types appropriated for the individual shapes are used. Thus, from the viewpoints of spaces and output densities of the motors, an effective configuration can be achieved. Any combination of motors may be available for attaining the incorporation described above, such as a combination between the motors of the present invention, or a combination of the motors of the present invention and motors of the conventional art. Thus, by combining merits and demerits of a plurality of motors, purposes and performances of the use may be attained.

Figure 65:
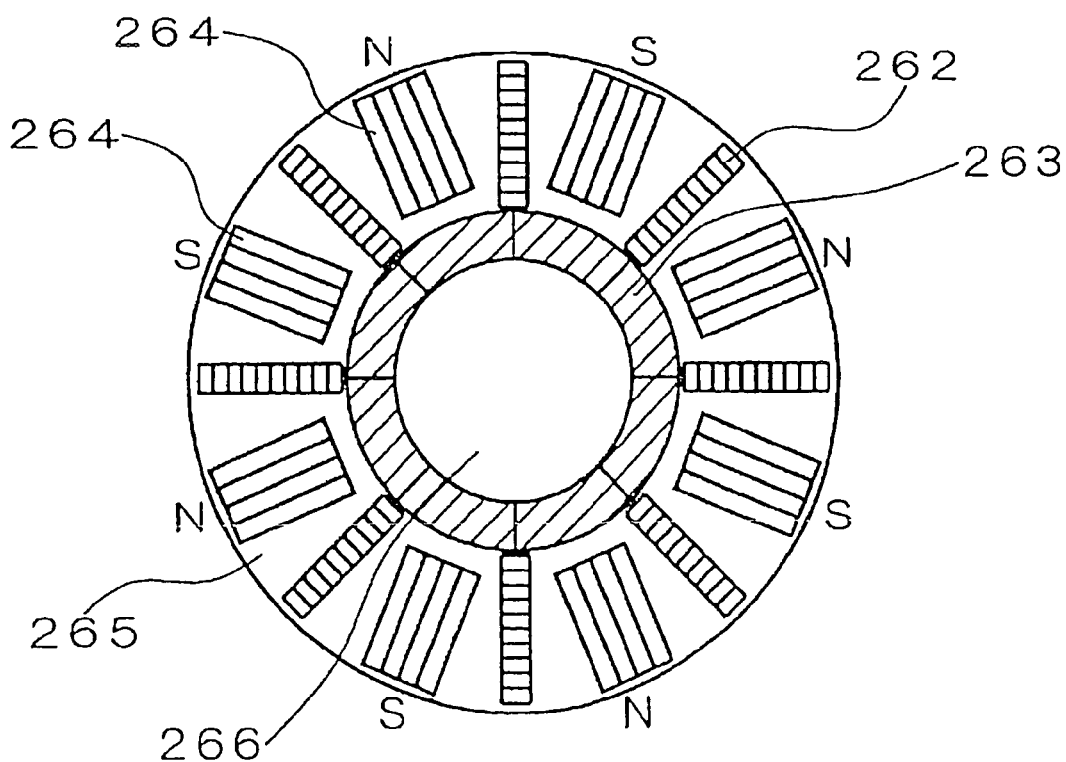
FIG. 65 is a transverse cross section of a rotor having an axial magnetic path therein.

With reference to FIG. 65, hereinafter will be described a rotor which is provided therein with electromagnetic steel plates arranged parallel to the rotor shaft. In the rotor shown in FIG. 14, numeral 265 indicates the electromagnetic steel plates stacked along the rotor shaft, and numeral 266 indicates the soft magnetic rotor shaft. Numerals 262 and 263 are permanent magnets which are individually polarized as indicated by the N- and S-poles at the outer periphery of the rotor. The rotor shown in FIG. 14 is so configured that eddy currents in the electromagnetic steel plates may hardly become excessively large even when the magnetic flux in the rotor is directed in the circumferential or radial direction. However, when this rotor is used in combination with the stator shown in FIG. 35, the magnetic flux of the electromagnetic steel plates 265 along the rotor shaft unavoidably varied. As a result, the eddy currents in the electromagnetic steel plates 265 in rotation may become large to cause a problematic eddy current loss.

Figure 66:
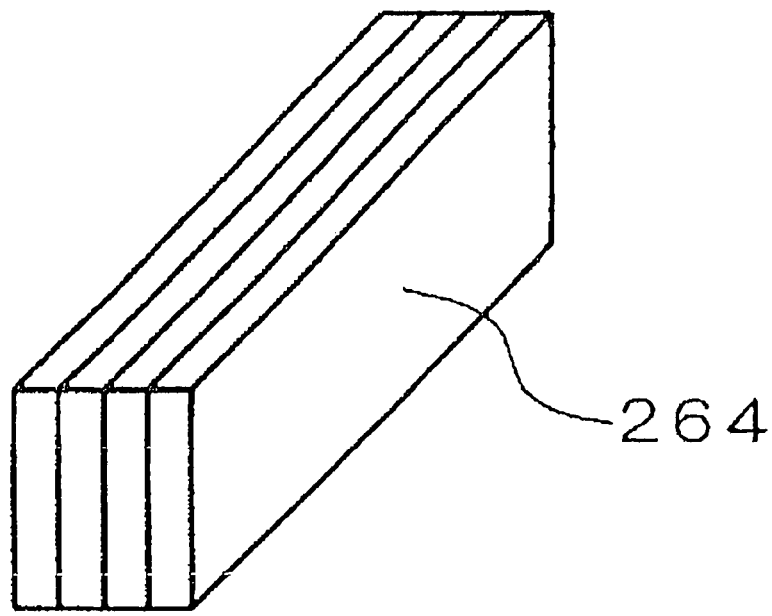
FIG. 66 illustrates a configuration of a stack of electromagnetic steel plates.

The rotor, whose transverse cross section is shown in FIG. 65, has a structure in which holes are formed in the electromagnetic steel plates 265 shown in FIG. 14, and stacked electromagnetic steel plates 264 are arranged in these holes. Each stack of the electromagnetic steel plates 264 has a configuration as shown in FIG. 66. In the configuration, thin electromagnetic steel plates, each of which is applied with an insulating film at its surface, are stacked to provide a structure which hardly passes an eddy current when magnetic flux perpendicular to the direction of stacking is increased/decreased, thereby providing a structure that may decrease an iron loss. The stacked electromagnetic steel plates 264 arranged as shown in FIG. 65 is oriented so as to be substantially perpendicular to the circumferential direction. By this arrangement, the iron loss may be reduced even when the magnetic flux is directed to a direction other than the circumferential direction, or even when the magnetic flux is directed to the rotor shaft direction or radial direction. In this way, the rotor shown in FIG. 65 is arranged so that the stacked electromagnetic steel plates 264 and 265 as permeable magnetic paths are mutually intersected. Thus, the rotor of FIG. 65 is configured to hardly generate eddy currents even when the magnetic fluxes of the rotor poles are increased/decreased in the rotor shaft direction. As a result, in a motor obtained by combining the rotor shown in FIG. 65 and the stator shown, for example, in FIG. 35, the magnetic fluxes generated by the permanent magnets 262 and 263 can be effectively directed to the stator poles 67, 54, 55, 56, 57 and 58 shown in FIG. 35 to advantageously reduce the eddy current loss when rotated.

Although the electromagnetic steel plates 264 are arranged being stacked, the stacking is not essential. Only an amount of electromagnetic steel plates required for passing magnetic flux may be arranged, being divided or being dispersed. Instead of the electromagnetic steel plates, a so-called dust core, which is a material of less eddy current obtained by pressing soft magnetic powder, may be used to direct magnetic flux along the rotor shaft with a low iron loss. Alternatively, the entire soft magnetic material portion of the rotor may be made up of the dust core.

Each of the stator pole configurations shown in FIGS. 21 and 35 provides a structure in which the width WDD of each stator pole along the rotor shaft is smaller than the distance WDP between the stator poles along the rotor shaft, as in the stator pole configuration shown in FIG. 31. However, in case of obtaining large torque generation by directing much more magnetic fluxes from the rotor, it is advantageous to provide a structure that may allow the width WDX of the stator pole to be large along the rotor shaft, as in the stator pole configuration 54SS shown in FIG. 38. In this case, however, the radial thickness HD1 of the end portion of the stator pole shown in FIG. 31 becomes as large as the radial thickness HD2 of the end portion of the stator pole shown in FIG. 38 in order to pass much more magnetic fluxes along the rotor shaft. Accordingly, a cross-sectional area of each adjacent slot may become small, which may necessitate reducing the wire thickness, thus creating a problem of reducing current-carrying capacity.

To cope with this problem, the stator shown in FIG. 38 and the rotor shown in FIG. 65 may be combined. As described above, magnetic flux in the rotor shown in FIG. 65 may readily pass along the rotor shaft, which may contribute to reducing the radial thickness HD2 of the stator pole shown in FIG. 38. Accordingly, the cross-sectional area of each slot and the cross-sectional area of each wire can be made large, whereby the copper loss may be reduced and the output may be increased.

Addition of the electromagnetic steel plates 246 has been explained based on the rotor shown in FIG. 14. Such an addition is also possible in other types of rotors shown, for example, in FIGS. 15 to 18. As to the configuration of the additionally provided soft magnetic material, an example of the stacked electromagnetic steel plates 264 has been shown in FIG. 66. However, various configurations may be usable if only the configurations cause less eddy currents.

Figure 67:
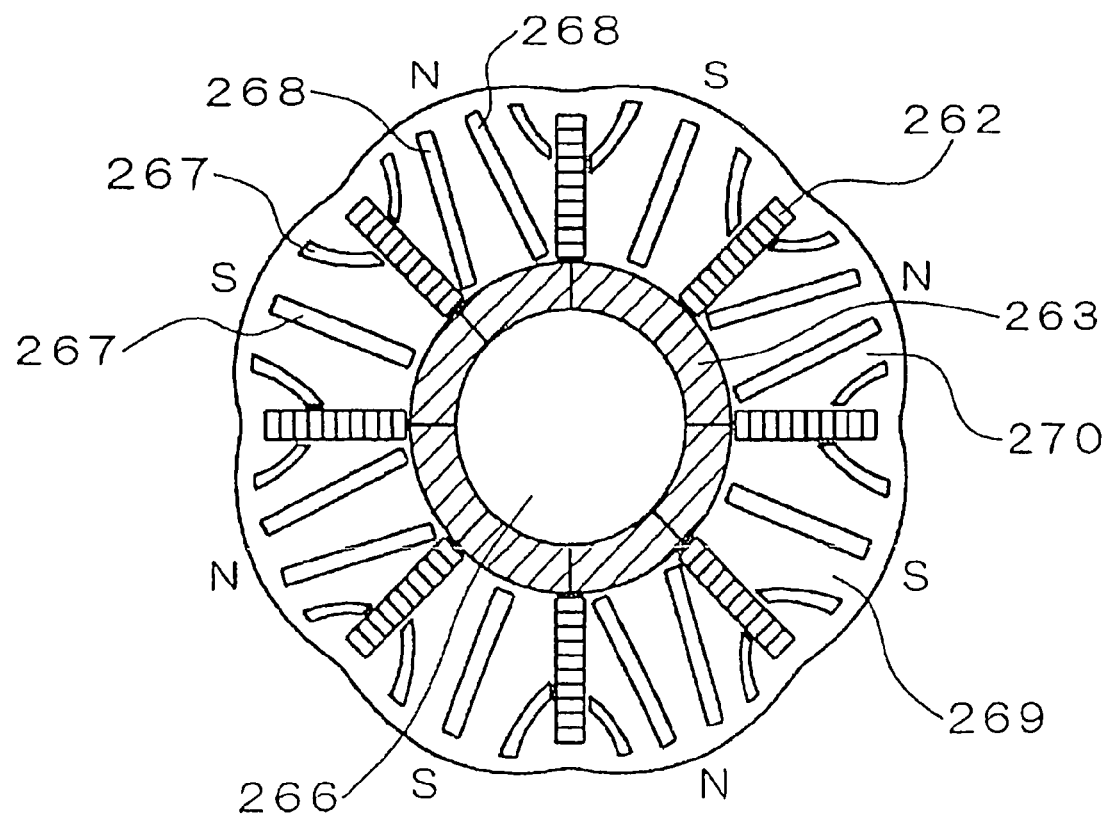
FIG. 67 illustrates an example of a rotor having air gaps formed in soft magnetic material portions of rotor poles for limiting rotation direction freedom of magnetic fluxes.

Referring now to FIG. 67, hereinafter is described a rotor structure where the soft magnetic material portion of the rotor poles is provided with gap portions or nonmagnetic material portions for limiting the rotation direction freedom of magnetic fluxes. The rotor shown in FIG. 67 is obtained by forming the gap portions indicated by numerals 267 and 268 or nonmagnetic material portions in the soft magnetic material portion 265 of the rotor shown in FIG. 14. In the outer peripheral configuration of the rotor, each boundary between the poles has a recessed form to impart an outer periphery of each rotor pole with a smooth circular shape whose radius is smaller than that of the rotor radius. The gaps 267 and 268 limit the rotation direction freedom of the fluxes in magnetic paths 269 and 270 sandwiched between these gap portions, so that the magnetic fluxes may not freely move along the circumference. The gap portions 267 and 268 are arranged and structured in such a way that the slits of the gap portions may have shapes that can collect the magnetic fluxes from the permanent magnets 262 and 263, so that the flux density may be increased at the center of the rotor poles. Thus, the rotor is structured to provide a flux distribution comparatively close to a sinusoidal distribution at the surface of each rotor pole, so that the flux density may be high in the vicinity of the center and may be low at each boundary between the poles. The shape of each boundary between the rotor poles has a low rate of contribution in allowing the flux thereof to generate motor torque. Contrarily, high flux density at the boundary may tend to be a factor of causing torque ripple. For this reason, the boundaries are recessed to reduce the flux density of the fluxes passing therethrough to the stator.

Each pole is provided with three gap portions 267 and four gap portions 268, while a circumferential pitch SPP of the gap portions are even. The gap portions 267 and 268 are relatively offset in the circumferential direction by SPP/2 with respect to the pole center. As a result, cogging torque and torque ripple induced by the gap portions are counterbalanced to realize smoother rotor rotation.

Hereinafter will be described a technique for removing portions of the stator poles of the motor of the present invention to utilize the spaces for arranging coil ends of the loop windings or for disposing a position detector, a temperature sensor or the like.

In most of the conventional methods, a sensor, such as an encoder or the like for detecting rotor position has been disposed at an axial rear end of a motor. This, however, has raised a problem that the overall length of the motor will be large. For the stator of a conventional motor shown in FIG. 71, spaces near coil ends 5 have often been utilized to install wiring of coil ends, or to dispose various types of sensors. However, for a motor having coil ends whose axial length is short, or for a motor having no coil end portions as the motors of the present invention shown in FIGS. 1 and 21, the axial length of the motor is problematically increased when wiring of coil ends is installed in an axial end of the motor, or when various types of sensors are disposed.

Some measures can be taken for resolving this problem. In case where stator poles are circumferentially and adjacently arranged covering most of an inner peripheral surface of a stator as in the stator pole configurations shown in FIGS. 10, 11, 12 and 13, several of the stator poles may be removed, or a portion of the stator configuration may be removed by recessing a portion of each stator pole, so that some spaces can be retained, although not particularly indicated in the figures. The spaces can be used for arranging coil ends of the loop windings that have been subjected to a bending process, or for establishing connection with wires that have been subjected to heat-resistance and insulation processes. Also, utilizing the spaces, various types of sensors can also be disposed, such as a current sensor, voltage sensor, flux sensor, acceleration detector, speed detector, position detector, temperature sensor and vibration sensor.

The motor shown in FIG. 1 is a 3-phase 8-pole motor having the U-phase stator poles 119, the V-phase stator poles 120 and the W-phase stator poles 121. FIG. 4 shows the linearly developed circumferential configuration of the inner peripheral surface of the motor. In this case, the interval between the adjacent stator poles is small. Therefore, for example, flux leakage may occur between the stator poles, such as flux leakage from the U-phase stator poles 119 to the V-phase stator poles 120. This may raise a problem that the field flux produced, for example, by the permanent magnets of the rotor may leak out to reduce the components to be interlinked with the motor windings. As a result, the motor torque is reduced. Another problem may also be raised that the leaked flux, i.e. a leaked inductance Lx induced by the magnetomotive force produced by the current I of each winding, may be become unignorably large to bring about a voltage drop $Vx=\omega \times Lx \times I$, where $\omega$ is high-speed rotation and I is large current, to finally reduce the output torque at high-speed rotation. There may still be another problem that as the leaked inductance Lx becomes large, current responsiveness in a motor control unit may be deteriorated.

Figure 68:
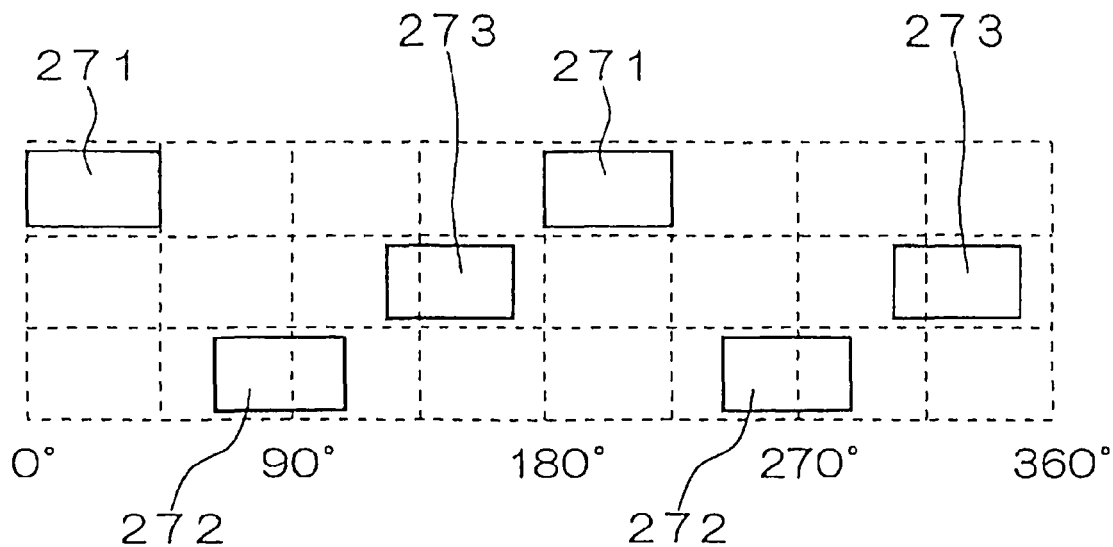
FIG. 68 illustrates an example of a stator having larger intervals between stator poles to reduce magnetic flux leakage between the stator poles.

These problems may be solved by modifying the configuration shown in FIG. 4 to the one shown in FIG. 68, in which an interval between the stator poles are made large to reduce flux leakage between the stator poles. Both of FIGS. 4 and 68 show an 8-pole motor, with the horizontal axis indicating mechanical angle ranging from 0° to 360° which corresponds to 360°×4=1440° in electrical angle. Indicated by numeral 271 are U-phase stator angles, and by 272 are V-phase stator angles. Comparing with FIG. 4, the stator poles of the individual phases are alternately arranged and the number of the poles is reduced by half, i.e. from four to two. A circumferential pitch for arranging the stator poles of the same phase is 720° in electrical angle. Since the interval between the stator poles is large, flux leakage can be reduced. Accordingly, the problems mentioned above may also be solved. However, the reduced number of stator poles may create a new problem of torque reduction. This problem may be effectively solved by combining the above solution with such a solution as expanding the stator configuration in the vacant spaces or increasing the number of the poles of the motor, for example. In this way, the problem of flux leakage between the stator poles may be solved by one approach, and the problem of reduction of generated torque may be solved by another approach.

The stator pole configuration shown in FIG. 4, which can increase the interlinked fluxes of the phase windings and thus can increase torque, may be modified to various stator pole configurations, such as the ones shown in FIGS. 10 to 13. However, each of these stator pole configurations, in comparison with the stator pole configuration shown in FIG. 4, has larger adjoining areas between the stator poles of the individual phases. Accordingly, the flux leakage will be increased between phases to make the flux leakage problem of FIG. 4 more serious. Also, there may be another problem that spaces for magnetic paths will run short. These spaces form magnetic paths for passing rotor fluxes therethrough to the back yoke of the stator, the rotor fluxes being collected to the inner peripheral surface of the stator including the stator poles 122 to 136. Shortage of such spaces for magnetic paths may cause magnetic saturation in the magnetic paths, by which torque may be reduced.

Figure 69:
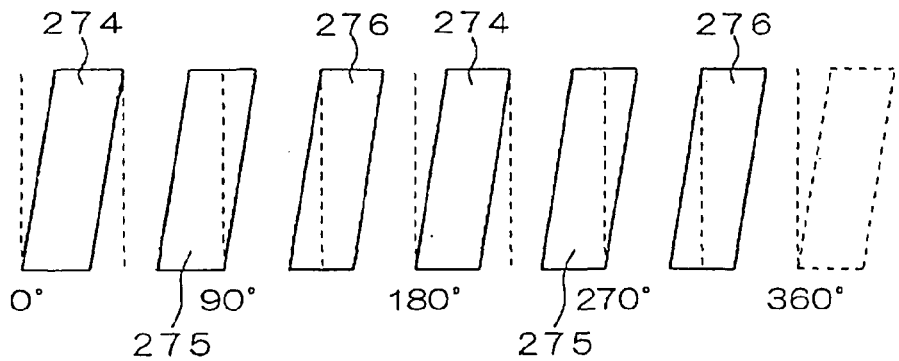
FIG. 69 illustrates an example of a stator having larger intervals between stator poles to reduce magnetic flux leakage between the stator poles.

These problems may be solved as follows. For example, for the stator poles shown in FIG. 11, the circumferential pitch of the same-phase stator poles may be 720° in electrical angle as shown in FIG. 69. The motor shown in FIG. 69 is also a 3-phase 8-pole motor. The horizontal axis in each of FIGS. 10 to 13 indicates mechanical angle ranging from 0° to 360° which corresponds to 360°×4=1440° in electrical angle. The stator pole configuration shown in FIG. 69 can apparently increase the interval between the adjacent stator poles to decrease the flux leakage therebetween. As a result, reduction may be attained in the adverse effects ascribed to such problems as the torque reduction induced by the flux leakage, the high-speed rotation induced by leaked inductance, and the inductance voltage drop induced by large current. The problem concerning the spaces for magnetic paths extending from the inner peripheral surfaces of the stator poles to the back yoke of the stator, may be solved by expanding the spaces between the stator poles as shown in FIG. 69. Ensuring such sufficiently large spaces for magnetic paths may also solve the problem of magnetic saturation. However, comparing with FIG. 11, the number of stator poles is reduced by half in FIG. 69. Therefore, a problem of torque reduction is newly raised. This problem may be effectively solved by combining the above solution with such a solution as expanding the stator configuration in the vacant spaces or increasing the number of the poles of the motor, for example. In this way, the problem of flux leakage between the stator poles may be solved by one approach, and the problem of reduction of generated torque may be solved by another approach.

Figure 70:
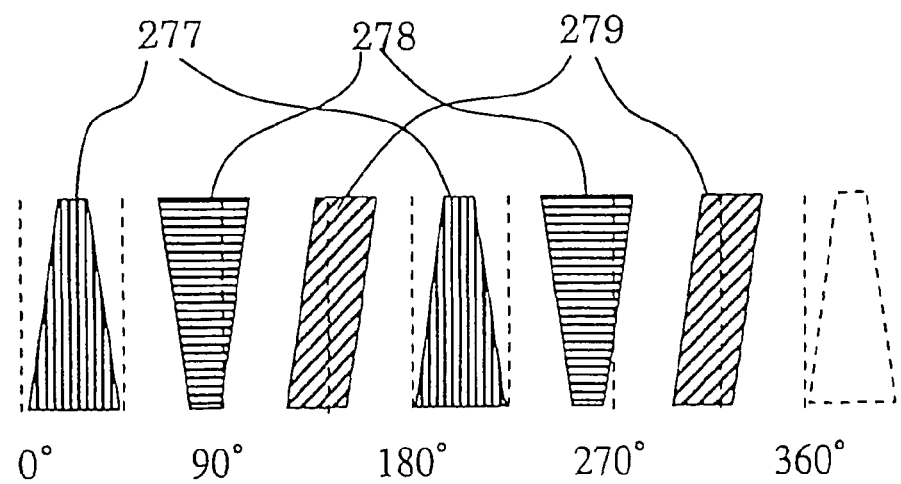
FIG. 70 illustrates an example of a stator having larger intervals between stator poles to reduce of magnetic flux leakage between the stator poles.

In the similar fashion, the stator pole configuration shown in FIG. 12 may be modified to a 3-phase 8-pole motor configuration shown in FIG. 70, which is provided with U-phase stator poles 277, V-phase stator poles 278 and W-phase stator poles 279, with a stator pole pitch being 720° in electrical angle and a circumferential average interval between the adjacent stator poles being 240°. Description so far has been provided for 8-pole examples, but the number can be optionally selected. In particular, for the motor of the present invention having loop windings, the larger the number of the poles may be, the larger the generated torque may become. Thus, as far as the torque generation is concerned, advantageous results may be obtained by a larger number of poles.

The above approach may be applied to motors having other various types of stator pole configurations. In case the number of the phases is two, the circumferential intervals between the same phase stator poles may be 720° in electrical angle. Since the phase difference is 90° in case of the two phases, the circumferential intervals between the adjacently provided stator poles may be a repetition of 360°+90°=450° and 360°−90°=27°. Although the repetition is a little anomalistic, a regular arrangement may be attained.

When the number of the phases is an odd number, such as "5", "7" or "9", a regular arrangement may be attained, with the circumferential intervals between the same phase stator poles being 7200 in electrical angle. As to multiphase motors having four or more phases, various removing methods may be used, such as a method for circumferentially removing one from every three stator poles and a method for circumferentially removing one from every four stator poles. In any one of these methods, a space may be formed in the vicinity of each stator pole. Such a space may form a space for reducing flux leakage caused in the magnetic path extending from the inner peripheral side of each stator pole to the back yoke. At the same time, a cross-sectional area of each magnetic path extending from the inner peripheral surface of each stator pole to the back yoke, can be retained so as not to cause magnetic saturation in the path.

As to the method for removing stator poles, when an identical and regular removal can be effected along the entire circumference, excellent characteristics can be expected, which are close to the theory of multiphase sine wave alternating current. Even when a stator pole configuration is somewhat irregular and unbalanced along the circumference, the formation of the spaces may reduce the flux leakage between the stator poles, or may retain the cross-sectional area of each magnetic path extending from the inner peripheral surface of each stator pole to the back yoke.

Various modes of the present invention so far have been described. The present invention may be modified in various ways and these modifications will be included in the present invention. For example, as to the number of phases, description herein has mostly been provided on three phases and six phases. However, the present invention may be applied to a 2-, 4-, 5- or 7-phase motor or a multiphase motor having more number of phases. It is preferable for small-capacity machinery to have a less number of components from the viewpoint of cost, and thus a less number of phases, such as two or three phases, may be advantageously used. However, from the viewpoint, for example, of the torque ripple, a large number of phases may often be more advantageous. A large number of phases may also be more advantageous from the viewpoint of the maximum current limitation in a one-phase power device in large-capacity machinery. The number of the poles may also not be limited. In particular, in the modes of the motors of the present invention, a large number of poles may be principally advantageous. However, an appropriate number of poles may desirably be selected depending on the use and the motor size, considering, for example, the physical limitation, adverse effects of flux leakage, increase in the iron loss due to multipolarization, and limitation of a control unit due to the multipolarization.

Rotor types have been described referring to FIGS. 14 to 19, 73 and 74. However, the present invention may be applied to various types of rotors, such as a winding field type rotor having windings, and a rotor having a so-called claw pole structure where each field winding is fixed at an axial end and magnetic flux is created through a gap. Types and shapes of permanent magnets may also not be limited.

As to the mode of the motor as well, various modifications may be available. For example, in terms of the air-gap configuration between the stator and the rotor, the modifications may include an inner rotor motor or an outer rotor motor having a cylindrical air-gap configuration, and an axial gap motor having a disk-like air-gap configuration. Alternatively, the motor having the cylindrical air-gap configuration may be modified so as to have a slightly tapered air-gap configuration. In this case, in particular, the stator and the rotor may be axially moved to vary the length of the air gap, so that the size of the field magnet can be varied and thus the motor voltage can be varied. The air gap variability may realize constant output control.

A plurality of motors including the motor of the present invention may be incorporated into a single motor. For example, two motors may be arranged on inner- and outer-diameter sides, respectively. Alternatively, a plurality of motors may be axially arranged in series. Alternatively, the motor of the present invention may have a structure with omission/removal of portions thereof. As the soft magnetic materials, amorphous electromagnetic steel plates and dust cores obtained by press-molding powdered soft iron, for example, may be used other than the ordinary silicon steel plates. In a small motor, in particular, a three-dimensional component may be formed, for example, by punching, bending and forging electromagnetic steel plates to provide a portion of the configuration of the motor according to the present invention.

As to the windings of the motor, description has mostly been provided on the loop windings. However, the windings may not necessarily be circular, but may somewhat be modified so as to be elliptic or polygonal, for example, or may be modified into a configuration partially irregular along the rotor shaft, for the convenience of magnetic circuits. Alternatively, for example, in case a stator is provided therein with loop windings having a phase difference of 180°, a closed circuit may be formed by connecting semicircular windings to different semicircular windings that have a phase difference of 180°, so that the loop windings can be modified into semicircular windings. Alternatively, the semicircular windings may be further divided into arcs. Further, description so far has been provided on a motor structure where the loop windings are arranged in the slots. However, in a structure having no slots, thin windings may be disposed in the vicinity of the surface of the stator facing the rotor to provide a so-called coreless motor structure. As to the currents to be fed to the motor, description has been provided on the assumption that the phase currents have a sinusoidal waveform. However, control may also be possible with various waveforms other than the sinusoidal waveform. As to the motors of such various modifications, the modification techniques should be included in the present invention as far as the techniques fall within the spirit of the motor of the present invention.

Hereinafter will be described an approach for reducing torque ripple by contriving the stator structure. For example, in case of reducing torque ripple of the order RN1, a plurality of A-phase stator poles are divided into N1 number of groups. Then, the stator pole positions in the rotation direction of each group are relatively shifted by an integral multiple of 360°/(RN1×N1) in electrical angle. The stator pole positions of other phases are also shifted in the rotation direction in the fashion similar to the A-phase stator poles.

FIG. 134 shows a specific example of shifting the stator pole positions carried out for reducing torque ripple. This figure shows a specific example of the A-phase stator poles. Since the same applies to the stator poles of other phases, such, as B- and C-phase stator poles, detailed illustrations are omitted. The horizontal axis of FIG. 134 indicates electrical angles along the circumference of the stator. For example, an explanation is given on a stator configuration that can remove torque ripple components of sixth order (RN1=6). The four A-phase stator poles shown in FIG. 134 are classified into two sets, i.e. a set of A-1 and A-3 and a set of A-2 and A-4 (where N1=2). Since 360°/(RN1×N1)=360°/(6×2)=30° is established, the circumferential positions of the stator poles A-2 and A-4 may only be circumferentially shifted by an electrical angle of 30° as shown in FIG. 30. In the torque generated by the U-phase stator poles 19 in each of the two sets, the sixth harmonic components have a phase difference of 180° with each other. As a result, the sixth harmonic components, i.e. the torque ripple of 60° cycle in electrical angle, in total are cancelled in the brushless motor 100.

In order to further reduce a plurality of torque ripple components from this state, the idea shown in FIG. 134 may further be superimposed. However, one should be careful in this case so that the schemes for reducing the plurality of torque ripples may not function independently to interfere with each other.

Since the stator and the rotor are relatively arranged, the same scheme for reducing torque ripple shown in FIG. 134 by changing stator pole arrangement and configuration may be applied to the rotor to achieve an effect of torque ripple reduction. Alternatively, one torque ripple component may be reduced by the arrangement and configuration of the stator, and another torque ripple component may be reduced by the arrangement and configuration of rotor poles. For each of the motors having large torque ripple components of two or more, a scheme for reducing the torque ripple at both the stator and the rotor sides may be effective.

Hereinafter is described a method for enhancing torque by improving the rotor and stator pole configurations. FIG. 135 shows an example of a 4-phase motor. Indicated by D51, D53, D55 and D57 are A-, B-, C- and D-phase rotor poles. Indicated by D52, D54, D56 and D58 are A-, B-, C- and D-phase stator poles. The rotation change rate dφ/dθ of the magnetic flux φ of each phase is proportionate to torque. Accordingly, in an area where the rotor poles and the stator poles face with each other, the length of the area along the rotor shaft, in particular, significantly influences the rotation change rate dφ/dθ of the magnetic flux φ of each phase, and thus is closely related to the magnitude of the torque. In this regard, as shown in FIG. 135, each of rotor poles and each of stator poles, which are opposed to each other, may be imparted with a trapezoidal shape. The configuration obtained in this way may pass more fluxes and increase torque. The shape of each pole may be further modified from the one shown in FIG. 135. For example, each pole may have a triangle shape or a simple concavo-convex shape.

However, the shape of the poles shown in FIG. 135 poses a complication and thus may create a problem in fabrication and assembling. Therefore, some scheme may be required for ensuring fabrication properties. Various schemes may be available in manufacturing such motors. For example, dividing portion along the rotor shaft between the stator and the rotor may be brought to the center of each stator pole, or each of the elements may be provided with steps, concavity and convexity, or the like in order to retain assembling accuracy and motor strength.

In the motor configuration of FIG. 135, indicated by D59, D5A and D5B are windings. Each of these windings has a looped shape and thrust into the rotor. As far as the efficient use of the vacant spaces of the rotor is concerned, this configuration may provide an advantage in that copper loss can be reduced, because the rotor has a smaller diameter and thus because the wire length for the same current is small. As a result, a small motor with high efficiency and high torque may be realized.

FIG. 136 shows an example, in which the windings B37, B38 and B39 of the motor shown in FIG. 124 have been replaced by pipe windings. Indicated by numeral D61 are pipes made of copper, for example. When current is passed, cooling water, cooling air or gas, for example, can be simultaneously passed through the center portion of the motor by utilizing the pipes. Also, a coolant for a cooling system may be passed through the pipes. The pipes are required to be electrically insulated from each other by, for example, giving insulation treatment to the surfaces of the pipes. This is effective in increasing continuous output torque of the motor.

In case where copper is used as a conductive material for the pipes, resistance variation of the copper ascribed to temperature becomes as high as about 40%/100°. Thus, in a sense of reducing copper loss as well, cooling the conductive material may exert large effect.

As far as the thickness of the wires is concerned, the configuration shown in FIG. 136 does not appear to be too realistic in the conventional motors. However, the motor of the present invention can comparatively easily enable multipolarization and can reduce the number of turns of each motor winding, and thus may practically allow each winding to have a thickness almost as large as the thickness of a pipe.

A control unit of the motor of the present invention will be described below. FIG. 137 shows a control unit having simply-structured drivers whose number is the same as that of the windings, the number of the latter not being specified. Indicated by D70 is a DC voltage power source, and by D75, D76, D77 and D88 are motor windings whose number is not specified. Indicated by D71 and D72 are power transistors, e.g. so-called IGBTs, power MOSs and FETs. These two transistors are paired for the control of voltage at mutually connected output portions to constitute a voltage-variable unit for supplying positive or negative current. Similarly, each of pairs D73 and D74, D7A and D7B, and D7C and D7D constitutes a voltage-variable unit. As shown in FIG. 173, two voltage-variable units can differentially supply voltage and current to each winding. In the configuration shown in the figure, comparatively simply-structured voltage-variable units are juxtaposed by the number of the windings. However, this configuration raises a problem that the number of the transistors is large.

A control unit for driving a 5-phase motor will be described below. FIG. 138 shows a configuration for controlling the motor with 5-phase windings shown in FIGS. 83, 84 and 85. The windings are arranged between the five stator poles, and the windings sandwiching two stator poles are oppositely controlled in series to constitute one phase. As have been described above, the star connection shown in FIG. 85 can present 5-phase voltage, where voltages at the individual terminals in the star connection are balanced. Thus, the motor can be efficiently controlled by the 5-phase inverter shown in FIG. 138. It should be appreciated that this 5-phase inverter has five juxtaposed voltage-variable units mentioned above, with each of the transistors being parallelly connected with oppositely directed diodes for supplying oppositely directed currents.

Since the voltages/currents of the windings in the star connection shown in FIG. 85 are balanced between the five phases, control may be effected with a delta connection. In this case, however, one should be careful about the harmonic components of the motor and the unbalanced components of the control unit because circulating current passes through the delta connection.

As to motors having phases other than five, or motors having three or more phases, a similar configuration can be presented by using the voltage-variable units provided by the number of the motor phases.

Figure 89:
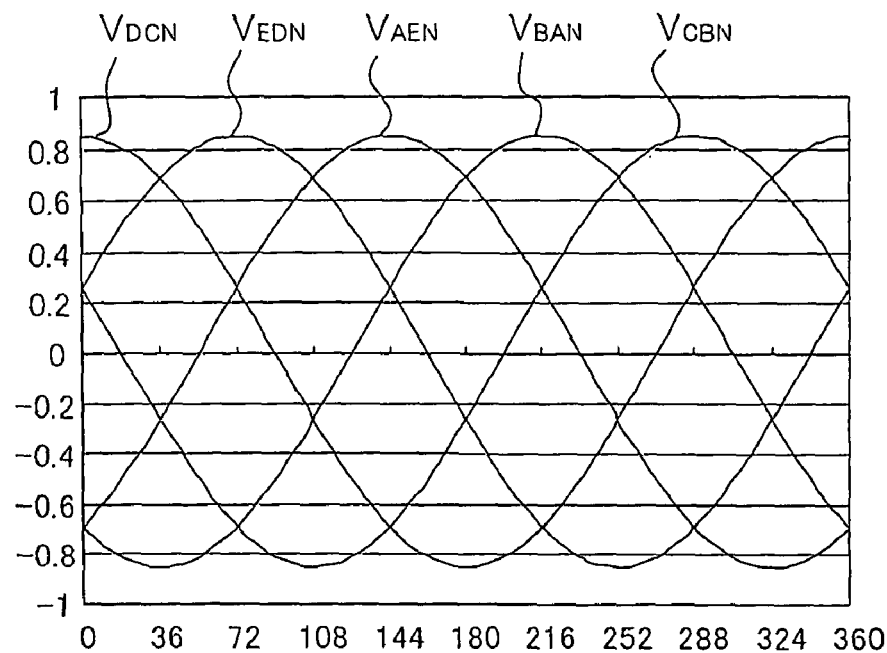
FIG. 89 is a voltage waveform diagram associated with the terminals in case the windings of the motor shown in FIG. 83 are star-connected.

Hereinafter will be described a drive unit for a 5-phase motor having windings of uneven voltage amplitude. FIG. 139 shows a configuration for controlling the 5-phase motor with five windings shown in FIGS. 86 to 89. As have been already described, the windings present unbalanced voltages and phases as shown in FIG. 88. However, as shown in FIG. 89, star connection of the windings allows the voltages/currents at the individual terminals to be balanced to realize efficient driving.

However, when precise control is required for every winding, it is necessary to perform control based on the voltage relationship shown in FIG. 83. For example, in case a certain harmonic current is superimposed for every winding, it is necessary to perform feedforward control for every winding as calculated from the voltage relationship of FIG. 88.

The star connection may be turned to a delta connection, although unbalanced, by establishing serial connection in the order of the phases. However, the unbalanced voltages of the windings may rather deteriorate the driving efficiency of the inverter.

As to motors with phases other than five, or motors having three or more phases, a configuration can be presented in the similar fashion by using the voltage-variable units provided by the number of the motor phases.

Hereinafter will be described a drive unit for a 5-phase motor of the present invention with one less number of windings than the number of the phases and having uneven voltage amplitude between the windings. FIG. 139 shows a configuration for controlling the 5-phase motor with four windings shown in FIGS. 90 to 96. As have been already described, the windings present unbalanced voltages and phases as shown in FIG. 95. However, as shown by (a) of FIG. 93, by allowing the center point NN of the star connection to serve as one terminal of the motor, the voltages/currents of the individual terminals can be balanced as shown in FIG. 96 to thereby perform efficient driving.

However, when precise control is required for every winding, it is necessary to perform control based on the voltage relationship shown in FIG. 95. For example, in case a certain harmonic current is superimposed for every winding, it is necessary to perform feedforward control for every winding as calculated from the voltage relationship of FIG. 95.

The star connection may be turned to a delta connection, although unbalanced, by establishing serial connection in the order of the phases. In this case, however, as in the connection shown by (b) of FIG. 93, two terminals at the ends of the absent terminal may also be allowed to serve as terminals of the delta connection. Thus, the motor can be driven with delta connection. However, the unbalanced voltages of the windings may rather deteriorate the driving efficiency of the inverter.

As to motors with phases other than five, or motors having three or more phases, a configuration can be presented in the similar fashion by using the voltage-variable units provided by the number of the motor phases.

The present application is based on Japanese patent application Nos. 2005-131808 (filed Apr. 28, 2005), 2005-144293 (filed May 17, 2005), 2005-151257 (filed May 24, 2005) and 2005-208358 (filed Jul. 19, 2005). Disclosures of these applications are all incorporated herein by reference.

The invention of the present application should not be construed as being specified by the accompanying claims only, and should also not be construed as being limited to the embodiments or the like described in the specification.

What is claimed is:

1. A multiphase electric motor comprising:
a rotor having a rotor shaft, the rotor having rotor pole groups in which north(N)-poles and south(S)-poles are alternately arranged in a circumferential direction of the rotor shaft toward an air gap;
a stator having an (N+1) number of stator pole groups (N is an integer of 3 or more) associated to respective phases of the motor, wherein each stator pole group includes a plurality of stator poles arranged in the circumferential direction towards the gap, corresponding stator poles of different phases being arranged at certain electric angles along the circumferential direction so as to be offset from each other; and
a 2N number of loop windings arranged at the stator such that the loop windings are arranged between stator pole groups for the respective phases in an axial direction of the rotor shaft and loop windings for the same phase are arranged at both ends in the axial direction,
wherein the (N+1) number of stator pole groups are arranged so that the stator pole groups corresponding to two phases having an electrical angle difference of about 180° are adjacent to each other.

2. The motor according to claim 1, wherein: with the stator pole groups corresponding to two phases having an electrical angle difference of about 180° as being one set, the (N+1) number of stator pole groups are arranged so that adjacently positioned stator pole groups, each of which belongs to one of two adjacent sets, have a minimum phase difference in electrical angle.

3. The motor according to claim 1, wherein:
the stator poles have planes having a width in the axial direction of the rotor shaft the width being larger than an interval between n stator poles adjacently positioned along the rotor shaft, the planes being opposed to the rotor.

4. The motor according to claim 1, wherein:
among the stator pole groups, stator pole groups for two phases having an electrical angle difference of about 180° are arranged so as to be adjacent to each other;
back yoke portions of the stator pole groups for two phases, which are mutually different by about 180°, are electromagnetically connected through a soft magnetic material;
back yoke portions of rotor pole groups opposed to the stator pole groups for two phases having an electrical angle difference of about 180°, are also mutually electromagnetically connected through a soft magnetic material; and
at least one of a space made between a pair of the stator pole groups for two phases having a difference by 180°, and another adjacent pair of the stator poles, and a space made between two pairs of rotor pole groups which are opposed to these stator pole groups, is vacant or provided with a nonmagnetic material for electromagnetic separation.

5. The motor according to claim 1, wherein:
a portion or all of the windings of the motor are made up of metal pipes; and
the metal pipes serving as conductors are provided with a cooling mechanism with a structure for passing liquid or gas.

6. A multiphase electric motor comprising:
a rotor having a rotor shaft, the rotor having rotor pole groups in which north(N)-poles and south(S)-poles are alternately arranged in a circumferential direction of the rotor shaft toward an air gap;
a stator having an (N+1) number of stator pole groups (N is an integer of 3 or more) associated to respective phases of the motor, wherein each stator pole group includes a plurality of stator poles arranged in the circumferential direction towards the gap, corresponding stator poles of different phases being arranged at certain electric angles along the circumferential direction so as to be offset from each other, and
a 2N number of loop windings arranged at the stator such that the loop windings are arranged between stator pole groups for the respective phases in an axial direction of the rotor shaft and loop windings for the same phase are arranged at both ends in the axial direction,
wherein the (N+1) number of stator poles are arranged so that a sum of widths of planes of two stator poles among the stator poles, which two stator poles are positioned at both ends in the axial direction, is equal to a width of a plane of each of other stator poles in the axial direction, wherein the planes of the stator poles are opposed to the rotor.

7. A multiphase electric motor comprising:
a rotor having a rotor shaft, the rotor having rotor pole groups in which north(N)-poles and south(S)-poles are alternately arranged in a circumferential direction of the rotor shaft toward an air gap;
a stator having an (N+1) number of stator pole groups (N is an integer of 3 or more) associated to respective phases of the motor, wherein each stator pole group includes a plurality of stator poles arranged in the circumferential direction towards the gap, corresponding stator poles of different phases being arranged at certain electric angles along the circumferential direction so as to be offset from each other; and a 2N number of loop windings arranged at the stator such that the loop windings are arranged between stator pole groups for the respective phases in an axial direction of the rotor shaft and loop windings for the same phase are arranged at both ends in the axial direction, wherein the stator poles have planes whose areas are approximated into a distribution of a sinusoidal form or a form analogous to the sinusoidal in the circumferential direction.

8. A motor, comprising:

a rotor having rotor pole groups, in which north(N)-poles and south(S)-poles are alternately arranged in the circumferential direction; and a stator having an (N+1) number of stator pole groups, in which a plurality of stator poles are arranged for each phase along or around the circumference so as to be positioned at substantially the same rotational phase position in terms of electrical angle, wherein:

among the stator pole groups, stator pole groups which correspond to two phases having an electrical angle difference of about 180° are arranged so as to be adjacent to each other; and an N number of loop windings are arranged between, of the stator pole groups, stator pole groups of individual phases.

9. The motor according to claim 8, wherein:

two stator pole groups at both ends in the rotor shaft direction are arranged on one side being adjacent to each other to provide a single stator pole group.

* * * * *